US012462217B2

(12) United States Patent
Borger et al.

(10) Patent No.: US 12,462,217 B2
(45) Date of Patent: Nov. 4, 2025

(54) METHOD, DEPOT FACILITY AND SYSTEM FOR HANDOVER OF A PLURALITY OF PARCELS TO A PLURALITY OF RECIPIENTS AND/OR TO RECEIVE A LARGE NUMBER OF PARCELS FROM MULTIPLE DEPOSITORS

(71) Applicant: Innovative Robot Delivery GMBH, Bonn (DE)

(72) Inventors: Christian Borger, Bonn (DE); Boris Mayer, Bonn (DE); Christof Schares, Bonn (DE)

(73) Assignee: Innovative Robot Delivery GMBH, Bonn (DE)

( * ) Notice: Subject to any disclaimer, the term of this patent is extended or adjusted under 35 U.S.C. 154(b) by 0 days.

(21) Appl. No.: 18/004,016

(22) PCT Filed: Nov. 19, 2021

(86) PCT No.: PCT/EP2021/082263

§ 371 (c)(1),
(2) Date: Dec. 30, 2022

(87) PCT Pub. No.: WO2022/106598

PCT Pub. Date: May 27, 2022

(65) Prior Publication Data

US 2023/0274224 A1 Aug. 31, 2023

(30) Foreign Application Priority Data

Nov. 20, 2020 (DE) ......................... 102020214660.8
Dec. 23, 2020 (DE) ......................... 102020216558.0
(Continued)

(51) Int. Cl.
*G06Q 10/0836* (2023.01)

(52) U.S. Cl.
CPC ................................ *G06Q 10/0836* (2013.01)

(58) Field of Classification Search
CPC .... G06Q 10/0836; G06Q 10/04; G06Q 10/08; G06Q 50/28
See application file for complete search history.

(56) References Cited

U.S. PATENT DOCUMENTS 9,256,852 B1 2/2016 Myllymaki
10,787,325 B1 * 9/2020 Pippin .................... B65G 57/03
(Continued)

FOREIGN PATENT DOCUMENTS

DE 10149637 A1 4/2003
DE 19817426 B4 6/2004
(Continued)

OTHER PUBLICATIONS

B. Madani and M. Ndiaye, "Autonomous Vehicles Delivery Systems Classification: Introducing a TSP With a Moving Depot," 2019 8th International Conference on Modeling Simulation and Applied Optimization (ICMSAO), Manama, Bahrain, 2019, pp. 1-5, doi: 10.1109/ICMSAO.2019.8880379. (Year: 2019).*

*Primary Examiner* — Jeff Zimmerman
*Assistant Examiner* — Tayar M Kyu
(74) *Attorney, Agent, or Firm* — International IP Law Group, PLLC

(57) ABSTRACT

Disclosed is a method for handover of a plurality of parcels to several recipients and/or for receipt of parcels from several depositors. The method includes determining a joint optimized handover point for handover of parcels to the respective recipients and/or depositors within a specific handover period for a plurality of parcels from a multiplicity of possible handover points spatially separated from one another, taking into account at least one effort parameter of at least one respective recipient and/or at least one respective depositor. The joint optimized handover point is determined
(Continued)

by a selection from the multiplicity of possible spatially separated handover points with at least one selection step, the selection step taking into account effort parameters for the recipients and/or the depositors for which at least one effort parameter for the respective recipients and/or depositors is decreased during a handover period for the parcels.

21 Claims, 52 Drawing Sheets

(30) Foreign Application Priority Data

| | | |
|---|---|---|
| Dec. 23, 2020 | (DE) | 102020216560.2 |
| Feb. 8, 2021 | (DE) | 102021201155.1 |
| Feb. 18, 2021 | (DE) | 102021103926.6 |
| Feb. 23, 2021 | (DE) | 102021200970.0 |
| Mar. 2, 2021 | (DE) | 102021104973.3 |
| Mar. 2, 2021 | (DE) | 102021201964.1 |
| Jul. 16, 2021 | (DE) | 102021207617.3 |
| Jul. 16, 2021 | (DE) | 102021207620.3 |

(56) References Cited

U.S. PATENT DOCUMENTS

| | | | | |
|---|---|---|---|---|
| 2008/0109246 | A1 | 5/2008 | Russell | |
| 2013/0262334 | A1 | 10/2013 | Rozenblatt | |
| 2014/0081445 | A1 | 3/2014 | Villamar | |
| 2014/0156062 | A1 | 6/2014 | Perez et al. | |
| 2016/0239788 | A1 | 8/2016 | Hanks | |
| 2017/0330144 | A1* | 11/2017 | Wakim | G06Q 10/083 |
| 2019/0012640 | A1 | 1/2019 | Ferguson et al. | |
| 2019/0113935 | A1* | 4/2019 | Kuo | G06Q 50/40 |
| 2019/0114564 | A1 | 4/2019 | Ferguson et al. | |
| 2019/0259000 | A1* | 8/2019 | Buckhalt | G07C 9/00817 |
| 2019/0285424 | A1 | 9/2019 | Imai et al. | |
| 2020/0026281 | A1 | 1/2020 | Xiao et al. | |
| 2020/0039766 | A1 | 2/2020 | Haban et al. | |
| 2020/0074396 | A1 | 3/2020 | Boccuccia et al. | |
| 2020/0090121 | A1* | 3/2020 | Gupta | G06Q 10/087 |
| 2020/0334637 | A1 | 10/2020 | Turner et al. | |

FOREIGN PATENT DOCUMENTS

| | | | |
|---|---|---|---|
| DE | 10317855 | A1 | 11/2004 |
| DE | 202005013992 | U1 | 11/2005 |
| DE | 202007013673 | U1 | 2/2009 |
| DE | 102016009563 | A1 | 11/2017 |
| DE | 102016217717 | A1 | 3/2018 |
| DE | 102017011550 | A1 | 7/2018 |
| DE | 102018206131 | A1 | 10/2019 |
| DE | 102018211570 | A1 | 1/2020 |
| DE | 102018219234 | A1 | 5/2020 |
| DE | 102019200504 | A1 | 7/2020 |
| EP | 1298552 | B1 | 11/2006 |
| EP | 2252412 | B1 | 8/2016 |
| EP | 3115319 | B1 | 8/2019 |
| EP | 3593913 | A1 | 1/2020 |
| WO | 2017060198 | A1 | 4/2017 |
| WO | 2017164914 | A1 | 9/2017 |
| WO | 2018050334 | A1 | 3/2018 |

* cited by examiner

ERSATZBLATT (REGEL 26)

1

Creating the shipping label

Create your shipping label and ensure that both barcodes are included – the identification code and the routing code, including the correctly coded destination address.

2

Printing the shipping label

Print the shipping label and deliver it so that it is printed without errors and so that the size of the barcodes and the quiet zones between the barcodes and the edge of the label are correct.

3

Attaching the label

Attach the shipping label to the largest surface of your parcel and make sure that the label is completely smooth and not covered by strapping or adhesive tape.

Fig. 30

METHOD, DEPOT FACILITY AND SYSTEM FOR HANDOVER OF A PLURALITY OF PARCELS TO A PLURALITY OF RECIPIENTS AND/OR TO RECEIVE A LARGE NUMBER OF PARCELS FROM MULTIPLE DEPOSITORS

The present invention relates to a method and a system for handover of a plurality of parcels to a plurality of recipients and/or for receiving a plurality of parcels from a plurality of depositors.

PRESENTATION OF THE STATE OF THE ART

In the state of the art, systems are known which make it possible to deliver a large number of parcels to a large number of recipients or to receive parcels from a large number of shippers.

It is known from numerous press reports that delivery does not always go smoothly. In fact, a large proportion of parcels do not reach the actual recipient the first time a logistics service provider attempts to deliver them. This means additional effort for the recipient of a parcel and at the same time additional costs for the logistics service provider. In addition, parcels are lost or delivered with considerable delay.

From the European patent specification EP 1 438 641 B1 an electronic parcel compartment system with a plurality of electronic parcel compartments is known, whereby in each case an operating unit is assigned to several electronic parcel compartments.

This known electronic parcel locker system is characterised by the fact that a central control unit is provided for controlling the operating units, the central control unit containing a means for a variable assignment of the parcel lockers to the operating units.

BRIEF DESCRIPTION OF THE INVENTION

The invention is based on the task of providing a method and a system for handover of a large number of parcels so that the parcels can be processed quickly and reliably.

According to the invention, this task is solved by a method and by a system according to the independent claims.

This provides a method for transferring a plurality of parcels to a plurality of recipients in an efficient, reliable and flexible manner. Furthermore, according to the invention, a system suitable for carrying out this method is provided.

Advantageous further embodiments of the invention are the subject of the dependent claims.

Structure

- Presentation of the Invention
- List of Figures
- Detailed Description of the Drawings
  - Introduction
  - Logic of joint optimized handover points
  - FIG. 1
  - FIG. 2
    - FIG. 3
    - FIGS. 4*a*, 4*b*, 4*c* and 4*d*
  - Overall view of the logistics system and logistics processes
    - Parcel identification characteristic
    - Prioritisation of shipments

- FIG. 5
      - Introduction
      - Ordering system 5010
      - Logistics system 5020
      - Linking interface 5015
      - Control component 5012 of the logistics system
      - User app 5021, 5022
      - User database 5023 of the user app
      - Network configuration module 5024 and network configuration tool 5025
      - Control module for transport of mobile depot facilities 5026
      - Notification component 5027
      - Parcel processing operations 5100
      - Parcel processing in distribution centres 5110
      - Handover point selection 5120
      - Loading preparation of the depot facilities 5130
      - Loading of the depot facilities 5140
      - Storage units 5342
      - Transport and installation of depot facilities at sites 5150
      - Handover of parcels to recipient 5160
      - (Local) control unit for the handover of parcels 5170
      - Handover of parcels at individual handover points 5175
      - Request unit for handover at individual handover points 5180
      - Deposit of parcels 5190
      - Return transport of the depot facility and removal 5195 of the parcels
    - Handover of goods
    - Local logistics
- Site selection procedure in detail
  - FIG. 6
    - Description Procedure
    - Means to achieve the overall objective
      - A. Filtering method
      - B. Maximisation procedure
      - C. Constraints
    - MLLLS—Mobile Locker Location Learning System
  - FIG. 7
- Logistics vehicle & mobile depot facility
  - FIG. 8
  - FIG. 9
  - FIG. 10
  - FIGS. 11*a*-11*d*
  - FIGS. 14, 15
- transport unit
  - FIG. 12
  - FIG. 13
  - FIGS. 16*a*, 16*b*
- Sorting in the distribution centre, loading preparation &:
  - Loading
  - Sorting
    - FIG. 17
    - FIGS. 20, 20*a* and 20*b*
    - FIG. 20*a*
    - FIG. 21
    - FIG. 21*a*
  - Loading preparation
    - FIG. 18
  - Loading
    - FIG. 19
  - Handover
    - Overview
    - FIG. 16 (c and d)

FIG. 22 (a and b)
Unloading at the distribution centre
Overview
FIG. 27
FIG. 28
FIG. 29
FIG. 31
FIG. 31*a*
Loading and unloading modes in detail
Overview
Special forms of design
Individual handover points
Alternative loading option for depot facility
FIG. 23
Paternoster systems as alternative depot facilities
FIGS. 24 and 25
Multiple depot facilities
FIG. 26
Distribution centres of the future
FIGS. 32, 34, 36 and 37
FIG. 30
FIGS. 39 and 40
FIG. 41
Flexible shelving systems
FIGS. 43, 43*a* and 43*b*
Logistics solution for goods storage
FIG. 44
Label & Ident codes
FIG. 30
FIGS. 38 to 42
Assignment of parcels to recipients based on recipient attributes
FIG. 45
FIG. 46
FIG. 47

Presentation of the Invention

The present application is part of an overarching concept whose goal is to perform processing operations of parcels as automated as possible and preferably also contactless and/or autonomously and with the smallest possible ecological footprint.

As part of this concept, methods, depot facilities and logistics systems for handover of a plurality of parcels to multiple recipients and/or for receiving parcels from multiple depositors are disclosed.

In this application, the term logistics system means a system that can perform at least one of the following processing operations on objects, in particular parcels:

Handover, in particular depositing and/or handing out
Transport
Sorting
Storage
Commissioning.

Preferably, it is a logistics system with several logistics nodes at which logistical processing operations can take place.

In this application, parcels are understood to be any physical objects that can be transported and preferably do not exceed certain dimensions and/or a certain weight.

Items of daily use such as consumables or foodstuffs are just as eligible as technical items and equipment. The parcels are unpackaged objects, packaged objects and repackaged objects, whereby in the case of packaged and repackaged objects the parcel comprises the packaging or repackaging and the object packaged therein. Likewise, it is appropriate to process unpackaged objects, in particular commodity objects, according to the invention. Mail items as well as advertising materials and brochures are also parcels within the meaning of this application, where appropriate.

Unless parcels are specifically referred to as data parcels or virtual parcels in this application, the parcels depicted in this application are physical parcels.

Commodity objects are physical objects that can first be physically acted upon by the logistics system or a component of the logistics system and are then transferred into physical access of another entity. The other entity may be a recipient of the goods or a physical facility configured to exert physical means of action on behalf of the recipient. In various embodiments of the invention, in particular in embodiments of the depot facilities shown in this application as vending facilities, it is appropriate that the transfer of physical availability over the commodity object occurs when the recipient has previously acquired the commodity object.

It is possible to keep any items ready in the depot facilities as parcels for handover to recipients, both recipients to whom the respective items were already assigned at or before their storage in the respective depot facilities, and also to keep items ready which are only assigned to a recipient after their storage in the depot facility, possibly also only immediately before their removal.

The present invention is suitable both for use with individualised parcels, where it is relevant that a parcel with a previously defined content is transmitted to a recipient, and for use for dispensing goods, in particular bulk goods including such goods for which there is no defined recipient before or after storage, possibly even at the time of dispensing, but for which an unidentified person can also be the recipient, in particular when the depot facility is designed as a sales facility.

In order to enable the goods objects to be handed out, it is also possible to transport the goods objects—preferably using a depot facility according to the invention. When dispensing goods objects, a plurality of parcels can be provided within one storage position depending on the respective dimensions of the goods objects. In such an application, it is appropriate to use product codes, which are already applied to a large number of goods objects, as parcel identification characteristics.

However, the present invention is not limited to embodiments in which the commodity objects are permanently transferred to recipients, but also includes embodiments in which the commodity objects are made available to recipients in a returnable manner, wherein the time period may be fixed or variable. In particular, such goods objects can also be handled as parcels according to the invention.

The handover of the parcels, in particular the plurality of parcels, takes place in particular as one delivery and/or as one removal of the parcels.

The present application concerns handovers of parcels to recipients and/or handovers of parcels by depositors. If it is not specified that the handover is to a recipient, handovers by a depositor are also included. Likewise, if it is not specified in each case that it is a handover by a depositor, a handover to a recipient is also included. In the present application, handovers by a depositor are also referred to as delivery or acceptance, while handovers to a recipient are also referred to as delivery.

Recipients within the meaning of the present invention are entities to which the logistics system or a component of the logistics system transfers or can transfer parcels or other objects. Both natural persons and technical units can be recipients in the context of the present application.

Depositors within the meaning of the present application are entities that hand over or can hand over parcels or other objects to the logistics system or a component of the logistics system. Both natural persons and technical units can be depositors in the context of the present application. Natural persons or technical units that hand over parcels to the logistics system for a transport operation are also referred to as shippers in the context of the present application. In particular, shipper refers to those depositors who commission a transport of parcels, including a pick-up, if applicable. The present application includes embodiments in which the depositors of parcels are shippers.

In order to achieve the goal of carrying out processing operations of parcels as automatically as possible and preferably also contactlessly and/or autonomously and with the smallest possible ecological footprint, several measures are proposed in this application, which already contain advantages in their individual application, but whose synergetic interaction is particularly advantageous.

It is particularly appropriate that a joint optimized handover point for the handover to the respective recipients and/or depositors within a certain handover period is determined for a plurality of parcels from a multitude of possible spatially separated handover points, taking into account at least one effort parameter of at least one respective recipient and/or at least one respective depositor.

The effort parameter takes into account the effort for the respective recipients and/or depositors of parcels for a handover of the respective parcel, in particular for handovers at joint optimized handover points.

The present invention proposes numerous embodiments in which the effort parameter for the recipients and/or depositors is reduced, in particular limited, whereby an effort parameter that is as low as possible, in particular as limited as possible, is particularly advantageous for as many recipients and/or depositors of parcels as possible.

The effort parameter can be taken into account directly or indirectly. An indirect consideration of the effort parameter is carried out in particular via one of the scoring values presented in this application. The scoring values are preferably values with different dimensions, such as in particular the quantification of an effort, which can be reduced to a key figure using the scoring tool.

The effort parameter preferably includes one or more of the following components of effort for the respective recipients and/or depositors of parcels:

- Additional distance for reaching the joint optimized handover point;
- Additional time required to reach the joint optimized handover point;
- Probability that the recipient or depositor of the parcel is in the vicinity of the handover point;
- Effort to move a parcel of a certain size or weight from the handover point, in particular from the joint optimized handover point to the home address and/or a place of use (of the parcel).

Optimisation is particularly preferred for each of the handover periods, so that different handover points can be used for different handover periods, in particular at least partially different joint optimized handover points for the handovers of the parcels.

While in known logistics systems, alternative destination addresses are defined in the event that handover is not possible at a desired handover point, the invention provides for the inclusion of further parameters, in particular the effort parameters. By including the effort parameters, not only is the effort for the handover of the parcels reduced, but the probability of a successful handover is also increased compared to a method without taking the effort parameters into account.

In an advantageous embodiment of the invention, a particularly preferred component of the effort parameter is the consideration of probabilities that the recipient of the parcel will be at or near one of the handover points within a handover period and/or of an expected additional effort of the recipient to reach the handover point and, if applicable, in an advantageous embodiment of the invention, also for a transport of the parcel from the handover point to a destination desired by the recipient.

In the present application, the term handover point is chosen for a geographically more precisely definable location that is particularly suitable for at least one parcel to be handed over at it. Handover points are places where handovers of parcels can take place. Joint handover points are locations at which handovers of a plurality of parcels can take place, in particular within a handover period. Handover points that are selected by a user and/or the logistics system are called selected handover points. The selection may be made directly and/or indirectly, in particular by taking into account the handover point selection procedures disclosed in this application. Selected handover points may in particular be the following handover points disclosed in this application:

- individual handover points
- joint handover points
- joint optimized handover points.

Individual handover points are, in particular, locations at which a handover of a parcel takes place for an individual recipient and/or for an individual depositor of a parcel. Individual handover points are therefore handover points for an individual recipient and/or depositor of a parcel.

In principle, it is possible to drive to individual handover points one after the other by a mobile depot facility and to carry out handovers of parcels there. Such a handover is possible in principle, but the present invention also includes embodiments that have a significantly lower resource requirement and/or a significantly lower CO2 footprint compared to such an implementation.

It is particularly appropriate to further develop the invention in such a way that the transport unit, starting from a location of the depot facility, can autonomously carry out a transport as a handover unit to the individual handover point for the individual recipient or the individual depositor and, at the individual handover point, carry out the delivery of the parcel to the recipient and/or the acceptance of the parcel from the depositor.

In this further embodiment of the invention, it is particularly appropriate that parcels stored in the depot facility are transported to recipients of the parcels by handover units and made accessible to the recipients of the parcels.

Another solution to the task of handing over parcels at handover points and/or during handover periods in which only a few parcels are handed over, which can be combined with this solution, is for the depot facility to successively move to various joint optimized handover points for the handover of parcels and/or individual handover points.

In contrast to methods for route optimisation for the sequential handover of generally individual parcels to individual recipients at different locations, preferably their home addresses, a preferred further embodiment of the invention provides in particular for the determination of joint optimized handover points for the handover of parcels for a plurality of recipients, wherein in each case a handover of the plurality of parcels to recipients assigned to the parcels takes place as a rule at the handover points, wherein the handover preferably takes place at least partially using mobile depot facilities for the parcels, as disclosed in the present application.

It is possible to use the handover points shown in this application as individual handover points. Handover points at which handovers of parcels take place for a definable group of recipients and/or depositors are also possible as individual handover points.

Examples of the use of individual handover points are locations for depot facilities that are set up in such a way that handovers of parcels take place exclusively for a definable group of recipients and/or depositors.

Definable groups of persons can be variably determined—in particular through the use of the control component. It is thus possible to provide depot facilities that are only made accessible to a limited number of depositors, including a single depositor, the depot facility and/or depositors and/or recipients exclusively assigned to it by the logistics system.

Furthermore, it is possible to use the depot facility as a goods outlet by means of which goods objects are transferred to recipients. In a preferred embodiment of the invention, this is done by delivering goods objects to the depot facility, storing them and transferring them to recipients as parcels.

In the present application, the term joint handover point is chosen for a geographically more precisely definable location that is particularly suitable for multiple parcels to be handed over at it. Because of the possibility of handover of a plurality of parcels, this handover point is referred to as a joint handover point.

Joint optimized handover points are joint handover points at which handovers of a plurality of parcels can take place in such a way that at least one effort parameter is optimized, in particular for the depositor and/or recipient of the parcels.

The joint optimized handover point can be selected and/or determined in various ways. In particular, the selection procedures for determining the joint optimized handover point presented in this application are suitable for this purpose.

The additional characterisation of a joint handover point as an optimised joint handover point means that the location is particularly suitable for the handover of parcels. In particular, it is a handover point that has been optimised using one of the selection procedures presented in this application. In particular, joint optimized handover points are locations that are suitable for handover of as many parcels as possible from as many depositors as possible and/or to as many recipients as possible, with as little effort as possible for the respective depositors and/or recipients.

Preferably, at least some of the parcels are transferred at the joint optimized handover points disclosed in this application. However, the advantageous parcel processing operations and parcel processing systems disclosed in this application are not limited to parcel processing embodiments in which handovers of parcels occur at joint optimized handover points.

It is particularly advantageous to design methods, depot facilities and logistics systems for the handover of a plurality of parcels to several recipients and/or for the receipt of parcels in such a way that the joint optimized handover point is determined by a selection from the plurality of possible spatially separated handover points with at least one selection step, the selection step taking into account effort parameters for the recipients and/or the depositors for which at least one effort parameter is reduced for the respective recipients and/or depositors within a handover period for the parcels.

It is particularly advantageous to define a duration of the handover period at the joint optimized handover point as a function of a number of parcels to be handed over at the joint optimized handover point during the handover period.

It is particularly appropriate to determine the duration of the handover period at the respective joint optimized handover point as a function of a relation between the number of parcels to be handed over during the handover period at the respective joint optimized handover point and the total number of parcels present in the depot facility on the day in question.

Such optimisation should take into account that the handover period should include a certain minimum period to allow flexibility of handovers of parcels for the respective recipients and/or depositors.

However, the invention is also suitable for use cases in which a handover of the parcel takes place within a handover period at a handover point, in particular a joint optimized handover point or an individual handover point for an individual recipient and/or depositor of a parcel.

The use cases in which an individual handover of the parcel takes place within a handover period at a handover point, in particular a joint optimised handover point or an individual handover point for an individual recipient and/or depositor of a parcel, can be combined with the further methods for handing over parcels presented in this application.

The present application discloses several advantageous embodiments characterised in that the joint optimized handover points are determined by an optimization procedure from a plurality of possible locations for depot facilities for the parcels for the handover of the parcels to the recipients.

Here it is particularly advantageous that the optimisation procedure is carried out separately for different handover periods, so that for a first handover period, in particular on a first day, at least partially different joint optimized handover points result than for another handover period, in particular on another day.

It is particularly preferred that at least a part of the depot facilities is designed as a mobile depot facility for a storage and provision of a plurality of parcels within a designated handover period at one location as a joint optimized handover point for the handover of the plurality of parcels to the respective recipients and/or by depositors of the plurality of parcels, that parcels designated for handover within the handover period are transferred to the depot facilities before the handover periods and that the handover to the recipients and/or by the depositors takes place at the associated joint optimized handover point within the designated handover period.

For the purposes of the present invention, depot facilities are all facilities which enable parcels to be made available for handover to recipients and/or by depositors. Preferably, the depot facility includes a means for storing the parcels, in particular within the planned handover period, and at least one means for handing over the parcels. Means for storing the parcels are preferably depot facilities designed like lockers. An important advantage of locker-like depot facilities is the combination of a safe and reliable storage of the parcels and an improved retrievability of the parcels, in particular during the planned transfer period. However, means for storing the parcels can also be other facilities that ensure safe and secure storage of the parcels. Preferably, these facilities include means for protecting the parcels from unauthorised removal. Examples of these other facilities are office or business premises, public buildings and facilities, shop premises, private flats, private houses, containers, vehicles, especially cargo bicycles. Means for handover of the parcels (handover means) are in particular also the handover units shown in this application.

A vehicle that contains one of the depot facilities shown in this application is also referred to below as a mobile locker or logistics vehicle.

The depot facilities are preferably each designed as a module. Preferably, this means that the depot facilities are separable components of a logistics system.

The depot facility can itself be designed as a handover facility or realise functions of a handover facility or also have a handover facility which, in particular, can be designed as a lock in an operating state of the depot facility.

The term mobile depot facility also includes depot facilities which are partly stationary and partly mobile and which are located at a location, in particular for a variable period of time from a few minutes to possibly several years, but which can be removed from this location again by being detachably connected to a fixed reference point. Preferably, the term mobile depot facility refers to depot facilities that are particularly easy to move from one location to another, in particular by means of a means of transport and/or by a logistics vehicle containing the depot facility.

The more recipients and/or depositors are in the vicinity of joint optimized handover points anyway, or can use alternative routes that can be implemented with as little effort as possible from existing routes, or can change a route planning with as little effort as possible, the more parcels can be handed over at the handover point. With a correspondingly large number of parcels to be handed over in a handover period, the use of correspondingly large depot facilities and/or several depot facilities at a joint optimized handover point is advantageous.

Large depot facilities, especially in the order of magnitude of lorries, or semi-trailers of lorries and even larger depot facilities are used in particular where a correspondingly high number of handovers of parcels takes place in the respective handover periods and/or is determined by the system.

As shown before, it is advantageous that the joint optimized handover point is determined by selecting from the multitude of possible spatially separated handover points with at least one selection step.

It is particularly advantageous that the selection step for a predefinable high proportion, preferably above 80%, in particular 95%, of the parcels for handover at the joint optimized handover points is carried out in such a way that a respective effort parameter does not exceed a predefined limit.

A preferred further embodiment of the invention is characterised by the fact that for as many recipients and/or depositors of the parcels as possible, a sum of additional time requirements for additional routes from anyway-routes and/or anyway-locations to the joint optimized handover point is limited for the handovers within the respective planned handover period, in that the effort parameter takes these time requirements into account.

An "anyway" route means a route that the recipient or the depositor takes for reasons other than the handover of a parcel ("anyway").

An "anyway" location means a location where the recipient or the depositor is present for reasons other than the handover of a parcel ("anyway").

Preferably, the determination of the possible handover points and one or more possible handover periods is carried out with mutual consideration of the whereabouts, distances and residence times of a large number of recipients, which are either known to the system or estimated (from existing data).

Particularly suitable reference points for determining the effort parameter for a recipient to reach one of the handover points proposed in the present invention, in particular one of the joint optimized handover points, are the anyway routes or the anyway locations.

The present application proposes numerous approaches for determining these routes or locations, whereby it is particularly appropriate to use localisation information when determining the routes and/or locations to the extent that the respective data protection requirements of the recipient or depositor or the legal system of the area in which the handover points are located are taken into account. In the territory of the Federal Republic of Germany this is in particular the Basic Data Protection Regulation and in other Member States of the European Union corresponding data protection rules.

In order to take into account the distances that the respective recipient or depositor travels in any case, or the locations where he is anyway, in accordance with data protection, components of the system, in particular the control components shown, are programmed in such a way that this localisation information is only used for the logistical processes shown, including the selection processes, to the extent that it has previously been determined that the recipient or depositor has been authorised to do so in accordance with data protection law.

The consideration of these data protection regulations is not a purely administrative activity, as it involves a direct consideration including selection and in particular non-selection of joint optimized handover points. In particular, this avoids that handovers are initiated at handover points for a recipient or depositor, although the respective recipient or depositor does not wish a handover at this certain joint optimized handover point and prefers this certain handover point to be excluded.

An appropriate embodiment of the invention provides that the joint optimized handover point is selected not only by including the effort parameter for the respective recipient/depositor, but also by including effort parameters for further recipients/depositors.

A preferred further embodiment of the invention is characterised in that, for the selection of the joint optimized handover point for at least some of the recipients and/or depositors, one or more locations indicated by the recipient and/or depositor for the handover of at least one parcel and/or one or more routes of the recipient and/or depositor are taken into account.

Further joint optimized handover points can be determined by examining which handover points are in the vicinity of the deposited delivery addresses or known routes of the recipient.

An appropriate embodiment of the invention provides that expected locations and/or routes of the recipients/depositors are determined by a self-learning system, which are taken into account for the selection of the joint optimized handover point for at least some of the recipients and/or depositors.

This consideration takes place in particular through an implementation of a learning or self-learning system. The self-learning system is preferably implemented by a neural network. Calibrations, in particular learning processes of the neuronal network, are carried out in particular with the inclusion of the data described in the article "Learning".

"Three useful tools to evaluate your machine learning system".

https://medium.com/@turicodeag/drei-n%C3%BCtzliche-instruments-to-evaluate-your-machine-learning-system-cd8fa92d82a1 evaluation tools presented. The relevant data points presented in this article preferably correspond to the joint optimized handover points as defined in this notification.

A preferred further embodiment of the invention is characterised by the fact that the selection of the joint optimized handover point and the handover to the respective recipient and/or the handover by the depositors, whereby several of the recipients and/or depositors have different locations and/or cover different distances in a first and a second handover period, is carried out taking into account a route distance between the specified locations which has been communicated in advance by the recipient and/or the depositor or is estimated by a route algorithm.

In particular, if a handover of significantly fewer parcels than the total number of parcels in the depot facility on the day in question takes place at individual handover points, it is appropriate for the handover period to be shorter than one day so that daily or even intraday optimisation of the joint optimized handover points is possible.

Also in this optimisation, it is advantageous that the handover period should include a certain minimum period in order to allow flexibility of handover periods for the handover of the parcels for the respective recipients and/or depositors.

A preferred further embodiment of the invention is characterised in that the determination of the joint optimized handover point is carried out as a multi-stage process with several selection steps and that before a selection step which takes into account effort parameters for the recipients and/or the depositors, at least one other selection step is carried out taking into account at least one suitability parameter and that at least one further selection step is carried out.

Advantageous embodiments of the invention include consideration of further parameters, in particular a suitability parameter for the selection of the joint optimized handover point. The suitability parameter is a quantified parameter which in particular takes into account a suitability, in particular availability of the joint optimized handover point and in particular quantifies an effort to provide a depot facility at the handover point, in particular during the specified handover period.

An appropriate embodiment of the invention provides that a control component controls the process.

The control component is in particular a central component of one of the logistics systems presented in this application. Preferably, the control component is designed in such a way that it controls as many or even all of the processing steps of the parcels as possible. However, it is also possible that the control component only controls individual process steps as described in this application.

The control component of the logistics system can be designed in such a way that the control component can carry out individual or several or even all of the procedures presented in this application.

A preferred further embodiment of the invention is characterised by the fact that at least one of the further selection steps takes into account the effort required by an operator of the logistics system to provide a depot facility at the respective locations. An advantage of this system is that expenses for recipients and/or depositors as well as for an operator of the logistics system are reduced.

An appropriate embodiment of the invention provides that a depot facility is provided at the joint optimized handover point for joint storage of the plurality of parcels and for handover of the plurality of parcels to the respective recipients of the plurality of parcels and/or for deposit by the respective depositors of the plurality of parcels at the associated joint optimized handover point within the planned handover period.

A preferred further embodiment of the invention is characterised by the fact that additional local logistics are provided at a depot facility so that, in addition to the parcels provided for handover at the joint handover points, goods objects can be delivered to the depot facility, stored and handed over to recipients as parcels. This results in an additional integration of local logistics.

With an advantageous integration of local logistics at a depot facility, transfer periods can be defined depending on expected order orders.

In particular, it is appropriate to pre-fill the depot facility with goods objects for which there is a minimum probability that order requests for a minimum number of the goods objects will be made within the handover period.

In an equally advantageous embodiment of the invention, at least some of the order requests can be made via an ordering system, wherein the ordering system is in particular a system for ordering deliveries of parcels and/or collections of parcels.

In a particularly preferred embodiment of the invention, a first part of the order requests can be made via an ordering system and a second part of the order requests can be made directly at the depot facility.

A preferred further embodiment of the invention is that the mobile depot facilities transport the parcels to the joint optimized handover points assigned to them and that during the planned handover period the parcels are stored in the mobile depot facilities and made available for handover to the recipients of the parcels using the depot facilities.

An appropriate embodiment of the invention provides that a plurality of parcels planned for handover at one of the joint optimized handover points are transported to a transfer facility and, at the transfer facility, are transported as individual parcels to the mobile depot facilities and are introduced as individual parcels into one of the mobile depot facilities in such a way that storage of the parcels takes place in storage positions of a storage facility of the depot facility, taking into account parcel identification characteristics.

Transfer facilities within the meaning of the present application are all units that are designed to be able to transport parcels between a distribution centre and at least one depot facility.

The term distribution centre includes, in particular, large handling centres of a logistics service provider for parcels.

In an advantageous implementation, the logistics system comprises at least one inbound distribution centre. In the inbound distribution centre, a parcel is sorted for the first time after it is received by the logistics service provider from the shipper for further transport to the delivery area.

In an advantageous implementation, the logistics system comprises at least one outbound distribution centre. In the outbound distribution centre, the parcel is sorted to a specific delivery depot after delivery from the inbound distribution centre.

The term delivery depot includes in particular facilities of a logistics service provider in which of the parcels are sorted for the last time and prepared for delivery tours.

Parcel identification characteristics are used for the reliable identification of parcels, preferably for the unique identification of parcels. In the context of the present application, preferred embodiments of the invention distinguish between different parcel identification characteristics with a different suitability for identifying parcels. Depending on the suitability for identifying the parcels, a distinction is made between primary parcel identification characteristics and secondary parcel identification characteristics.

A parcel identification characteristic is a unique data element that is physically and/or virtually assigned to the parcel and enables its reliable identification, in particular its unique identification. The reliable identification can refer to one or more process steps or to the entire logistics process from the delivery of a parcel to the output of the parcel. It is particularly advantageous that the parcel identification characteristic relates to the entire logistics process, but the use of the parcel identification characteristic in fewer process steps than the overall process is also encompassed by the invention.

A parcel identification characteristic preferably includes one or more characteristics which, alone or in combination with each other and/or in combination with information about one or more processing operations of a parcel, allow a reliable identification of the parcel.

Parcel identification characteristics are in particular

- Parcel identification codes;
- Product codes;
- Shipper identification characteristics;
- Depositor identification features;
- Recipient identifiers;
- Weight of the parcel;
- Dimensions of the parcel;
- Shape of the parcel;
- Colour of the parcel or the individual sides of the parcel;
- Image of the parcel, including a picture of the parcel taken by a camera unit.

A particularly preferred use of the parcel identification characteristic differs significantly from the use of delivery information known in the prior art, especially recipient address attributes. The delivery information known in the prior art is used for the control of handling processes of parcels. In particular, a parcel which is posted in Hamburg and which is planned for a recipient in Aachen is controlled between the drop-off point and the delivery point on the basis of the delivery information in such a way that it is sorted, in particular at a parcel centre located in the vicinity of Hamburg, in such a way that it is transferred to a means of transport which is transported to a parcel centre located in the vicinity of Aachen.

A particularly preferred use of parcel identification characteristics goes far beyond this. In a processing operation, in particular in a sorting operation or several processing operations, possibly even in all process steps, the parcel is processed using the parcel identification characteristic. The parcel identification characteristic can be used in several places of the logistics system, so that in particular during a sorting process in the parcel centre located in the vicinity of Hamburg, it is determined that the recipient is located in the vicinity of Frankfurt during a delivery period requested by the recipient. In this case, the parcel is processed, in particular sorted, on the basis of the parcel identification characteristic, in particular for the fastest and safest possible transport to one of the handover points, in particular in the vicinity of Frankfurt.

In particular, in embodiments in which multiple processing operations of the parcel occur, it is appropriate for the parcel identification characteristic to be associated with the parcel both physically and virtually.

In order to facilitate or enable the autonomous handling of parcels, individual, several and particularly preferably as many as possible of the processing units shown in this application, in particular depot facilities or transfer facilities, are preferably equipped with a means for detecting parcel identification characteristics of the parcels and for handling the parcels according to the parcel identification characteristics.

In particular, the handling of the parcels according to the parcel identification characteristics, and in particular a storage of the parcels in storage positions of a storage unit of the depot facility taking into account the parcel identification characteristics, supports an autonomous handling of the parcels. It is particularly advantageous to design the transfer facilities in such a way that they can carry out autonomous handling of the parcels. Appropriate measures for autonomous handling of the parcels relate in particular to:

- Transport,
- Routing,
- Sorting,
- Storage and
- Commissioning.

In particular, it is possible to carry out individual, several, especially many and possibly even all of the following processing operations autonomously:

- contactless handover of parcels;
- Handling of parcels based on at least one parcel identification characteristic;
- Handover of a plurality of parcels at a joint optimized handover point within a handover period;
- Selection procedure (determination procedure) for determining the joint optimized handover point;
- Use of depot facilities for the storage of parcels;
- Use of depot facilities for the temporary storage of parcels, in particular also in distribution centres;
- Use of depot facilities for commisioning parcels;
- Use of depot facilities as sales facilities.

A preferred further embodiment of the invention is characterised in that a singular transfer of the parcels takes place by means of at least one movable transport unit, wherein the movable transport unit is controllable in such a way that it can transfer the singularised parcels into the storage positions of the storage facility of the depot facilities, taking into account the parcel identification characteristics.

A parcel identification code is in particular a code which is used to identify the parcel and which is in particular physically and/or virtually connected to the parcel, whereby it is particularly advantageous if the parcel identification code is also physically connected to the parcel. This applies in particular if the parcel identification code is used as a parcel identification characteristic or as one of the parcel identification characteristics.

An appropriate embodiment of the invention provides that during a stay of the depot facility at the transfer facility, the following data elements are transmitted to the depot facility for each of the parcels transferred as individual parcels at the transfer facility:

- At least one of the parcel identification characteristics that is suitable to enable reliable identification of a respective parcel and
- information on an identification of the storage position within the storage facility of the depot facility, in particular for the storage of the respective parcel.

A preferred further embodiment of the invention is characterised in that parcels which are not collected at the joint optimized handover point during the original handover period are transported to a transfer facility at the end of the handover period.

An appropriate embodiment of the invention provides that parcels stored in one of the depot facilities are transported within the depot facility by a transport unit in response to a received dispensing request into a handover facility and are made accessible to the recipients of the parcels there and/or are transported to respective recipients by means of a handover unit and that the parcels are made accessible to the respective recipients by the handover unit.

A preferred further embodiment of the invention is characterised in that a delivery of a parcel by a depositor to the depot facility includes the following process steps:

Detection of at least one parcel identification characteristic, if necessary also by a user component;

Activation of a handover gate;

Assignment of a storage position of a storage unit of the depot facility to the parcel taking into account the parcel identification characteristic;

Transport of the parcel to a storage position of a storage unit of the depot facility.

An appropriate embodiment of the invention provides that a depositing of a parcel by a depositor at a handover unit includes the following process steps:

Activation of the handover unit;

Detection of at least one parcel identification characteristic, if necessary also by a user component;

Handover of the parcel to the handover unit;

Transport of the parcel to the depot facility;

Assignment of a storage position of a storage unit of the depot facility to the parcel taking into account the parcel identification characteristic;

Transport of the parcel to the storage position of the storage facility of the depot facility.

A preferred further embodiment of the invention is characterised in that at least one depot facility is used, wherein the depot facility comprises a storage unit with at least one storage rack and wherein compartments of the storage rack form storage positions of the depot facility and in that a number and/or at least one dimension of the compartments is variable and wherein the number and/or the dimension of the compartments is variably adapted depending on a number and/or a dimension of parcels to be delivered to and stored in the depot facility.

An appropriate embodiment of the invention provides that the variable adaptability of the number and/or the dimensions of the compartments of depot facilities is taken into account in a determination of joint optimized handover points for a handover of the parcels to the respective recipients and/or for the delivery by the depositors of the parcels within a certain handover period.

The corresponding adaptation of a compartment includes in particular an adaptation of its dimensions, in particular by increasing and/or decreasing its dimensions or the volume resulting from the dimensions of the respective pact to be stored. In particular, the width of the compartment can be reduced and at the same time the height of the compartment can be increased, or vice versa.

A preferred further embodiment of the invention is characterised in that an order for goods from at least one of the customers is accepted as an order by an order system for processing order requests from customers, in that an order for carrying out a handover of the parcel to a recipient is transmitted from the order system to a control component of a logistics system on the basis of the order request, in that the order contains a recipient identification feature assigned to the recipient, in that the control component checks whether a recipient data record with localisation information is available for the recipient identification feature, and in that, if the recipient data record with localisation information is available, at least one processing operation of the logistics system is carried out taking into account the localisation information.

Unlike in the prior art, where even when ordering interfaces are integrated into logistics systems, the ordering process is such that the person ordering a parcel selects a handover point and that subsequently the transport process of the parcel is controlled so that transport to the selected handover point takes place, the present invention enables flexible selection of a joint optimized handover point for the parcel, whereby multiple parcels are provided to a plurality of recipients within the handover period at a joint optimized handover point.

In contrast to known ordering processes and ordering platforms, in the invention selected joint optimized handover points can be taken into account by a logistics system—preferably at least partially instead of handover points originally specified by the recipient. Whereas in the prior art the recipient has to select a deposited delivery point himself when ordering a parcel, an advantageous further embodiment of the invention provides that the logistics system selects the optimum handover point, in particular as the location of a depot facility described in this patent application.

An appropriate embodiment of the invention provides that, when determining the joint optimized handover point, different locations for a depot facility are optimized over the course of a day and that the depot facility is in use at the different locations over the course of the day.

A preferred further embodiment of the invention is characterised in that a variable adaptability of the number and/or the dimensions of compartments of depot facilities is taken into account in a determination of joint optimized handover points for a handover of the parcels to the respective recipients and/or for the delivery by the depositors of the parcels within a certain handover period.

An appropriate embodiment of the invention provides that the selection steps relate to different time periods for optimising the joint handover point.

A preferred further embodiment of the invention is characterised by the fact that general location properties are taken into account in the first selection step, that a long list of all potential locations is transformed by the selection step into a list of locations which are in principle qualified for the handover of parcels, and that in the further selection step following the first selection step, those handover points, in particular locations for depot facilities, are determined for which a respective effort parameter for the commissioning of the depot facilities is as low as possible within a handover period for the parcels determined as an optimisation period.

An appropriate embodiment of the invention provides that in a selection step preceding other selection steps, in particular in the first selection step, locations at which the respective depot facility can be parked are determined and taken into account.

A preferred further embodiment of the invention is characterised by the fact that, in a third selection step, those handover points are determined at which, within a handover period for the parcels preferably determined as an optimisation period, a respective effort parameter for the depositors and/or recipients of parcels at the depot facilities is low.

An appropriate embodiment of the invention provides that the individual parcels are rotated before their transfer to the storage positions so that they have a defined orientation.

A preferred further embodiment of the invention is characterised by the fact that the individual parcels are rotated during a stay on a transfer platform of a transport unit.

Transfer platform of a transport unit means a component of the transport unit which is particularly suitable for effecting storage in a storage position of a storage unit or removal from the storage position of the storage unit.

An appropriate embodiment of the invention provides that the individual parcels are rotated during a stay on a conveyor belt, in particular a conveyor belt of the transfer facility.

A preferred further embodiment of the invention is characterised in that a parcel identification code is preferably assigned and/or recorded for each parcel and is subsequently stored as a primary parcel identification characteristic, in that at least one secondary parcel identification characteristic different from the primary parcel identification characteristic is assigned to the parcel, and in that at least one processing operation of the parcel is carried out on the basis of the secondary parcel identification characteristic.

A primary parcel identification characteristic in the context of the present application is in particular a parcel identification characteristic that is suitable to uniquely identify the parcel to which it is assigned, respectively.

A secondary parcel identification characteristic is preferably a parcel identification characteristic which alone is not sufficient to identify a parcel, but which in combination with information about a processing status of the parcel and/or at least one further secondary parcel identification characteristic and/or at least one primary parcel identification characteristic serves to identify the parcel.

Alternatively and/or additionally, it is possible to distinguish parcel identification characteristics from each other with regard to their presence when a parcel is delivered to the logistics system.

Original parcel identification characteristics are preferably parcel identification characteristics that are assigned to the parcel before the parcel enters the logistics system or when the parcel enters the logistics system.

Non-original parcel identification characteristics are parcel identification characteristics that can be changed after the parcel has entered the logistics system. In particular, variable recipient attributes can be components of non-original parcel identification characteristics.

An appropriate embodiment of the invention provides that the parcel identification code is formed by a logistics system or a control component of the logistics system from at least one characteristic of the parcel transmitted by the shipper, this characteristic being such that it is detected during at least one of the processing operations of the parcel and is taken into account during the processing of the parcel.

A preferred further embodiment of the invention is characterised in that the parcel identification code is formed by a logistics system or a control component of the logistics system from at least two characteristics of the parcel transmitted by the shipper, these characteristics being such that they are detected together in at least one of the processing operations of the parcel and that the parcel identification code is taken into account in at least one processing operation of the parcel.

An appropriate embodiment of the invention provides that the secondary parcel identification characteristic is easier and/or faster to identify than the primary parcel identification characteristic.

A preferred further embodiment of the invention is characterised in that the secondary parcel identification characteristic is used alone or in combination with further secondary parcel identification characteristics to control a correctness that a parcel is the parcel identified by the primary parcel identification characteristic and/or to control a further processing operation.

An appropriate embodiment of the invention provides that the primary parcel identification characteristic is used to form a digital twin of the parcel and at least one of the secondary parcel identification characteristics is associated with a digital twin of the parcel.

In a preferred further embodiment of the invention, the parcel identification code is a physical code or combination of physical codes directly associated with the parcel and is readable.

An appropriate embodiment of the invention provides that a primary parcel identification characteristic is checked using a shipper's readable data carrier associated with the parcel, and that the primary parcel identification characteristic is taken into account in at least one processing operation of the parcel.

A preferred further embodiment of the invention is characterised in that at least one of the following properties of a parcel is detected as a secondary parcel identification characteristic and is taken into account when carrying out at least one processing operation:

Weight of the parcel;
Dimensions of the parcel;
Shape of the parcel;
Shipper identification characteristics;
Picture of the parcel;
Colour of the parcel;
Data contents of a readable data carrier;
Information about one or more completed processing operations;
spectroscopic response of the parcel.

An appropriate embodiment of the invention provides that at least one of the following processing operations of the parcels is carried out taking into account at least two mutually different parcel identification characteristics:

Deposit of parcels;
Selection procedure (determination procedure) for determining a joint optimized handover point for several recipients and/or depositors;
Sorting in distribution centres;
Sorting at logistical nodes;
Routing at a node of the logistics system;
Transport between distribution centres;
Transport between distribution centres and logistical nodes;
Transport between logistical nodes;
Sorting in delivery depots;
Loading of depot facilities:
autonomous and/or semi-autonomous transport to joint optimized handover points;
autonomous and/or semi-autonomous transport to individual handover points;
Handover of a plurality of parcels at a joint optimized handover point within a handover period;
Handover of parcels at individual handover points;
Acceptance/delivery of multiple parcels at a joint optimized handover point within a handover period;
Acceptance/delivery of parcels at individual handover points;
Use of depot facilities for the storage of parcels;
Use of depot facilities for the acceptance of parcels;

- Use of depot facilities for commisioning parcels;
- Use of depot facilities for the handing out of parcels; and
- Use of depot facilities as sales facilities.

Routing in the sense of the present invention refers in particular to a determination of a particularly suitable transport connection between starting points (in particular current positions of the respective parcels) and destination points (in particular subsequent logistical nodes).

Logistical nodes are in particular network nodes of the logistics system.

Network nodes of the logistics system are preferably components of the logistics system where decisions about processing operations of the parcels to be carried out are implemented. The processing operations of the parcels are carried out in particular by processing units of the logistics system that are located at the logistics nodes. The processing operations at the logistics nodes are in particular the following

- Sorting operations, which preferably take place in distribution centres and/or in depot facilities for parcels,
- Storage operations, which preferably take place in parcel distribution centres and/or depot facilities,
- Routing at a node of the logistics system.

A preferred further embodiment of the invention is characterised in that at least two of the following processing operations of the parcels are carried out taking into account at least two parcel identification characteristics which are different from one another:

- Deposit of parcels;
- Selection procedure (determination procedure) for determining a joint optimized handover point for several recipients and/or depositors;
- Sorting in distribution centres;
- Sorting at logistical nodes;
- Routing at a node of the logistics system;
- Transport between distribution centres;
- Transport between distribution centres and logistical nodes;
- Transport between logistical nodes;
- Sorting in delivery depots:
- Loading of depot facilities;
- autonomous and/or semi-autonomous transport to joint optimized handover points;
- autonomous and/or semi-autonomous transport to individual handover points;
- Handover of a plurality of parcels at a joint optimized handover point within a handover period;
- Handover of parcels at individual handover points;
- Acceptance of multiple parcels at a joint optimized handover point within a handover period;
- Acceptance of parcels at individual handover points;
- Use of depot facilities for the storage of parcels;
- Use of depot facilities for the acceptance of parcels;
- Use of depot facilities for commisioning parcels;
- Use of depot facilities for the handing out of parcels; and
- Use of depot facilities as sales facilities.

An appropriate embodiment of the invention provides that two secondary parcel identification characteristics different from each other are used for the identification of the parcel.

A preferred further embodiment of the invention is characterised in that a depositing of a parcel by a depositor includes at least one of the following process steps:

- Detection of at least one of the parcel identification characteristics, if necessary also by a user component;
- Handover of the parcel to a handover unit and/or a handover gate;
- Transport of the parcel to the depot facility;
- Transport of the parcel to a storage position of a storage unit of the depot facility.

An appropriate embodiment of the invention provides that, after the parcel identification code or other parcel identification characteristics which permit a unique/reliable identification of a parcel have been established and/or determined, a controlled and/or measured transport route and/or sorting route of the parcel is planned and/or tracked so that a subsequent processing operation of the parcel, in particular a sorting of the parcel and/or a transport of the parcel is carried out as precisely on the basis of a combination of the previously determined parcel identification code and/or parcel identification characteristic with a determination of another, preferably more easily and/or more quickly measurable secondary parcel identification characteristic as is the case with a determination of the parcel identification code itself.

The invention further relates to a depot facility, in particular for use in any of the methods and/or logistics systems set forth in this application.

A preferred embodiment of the depot facility is characterised in that it is designed as a mobile depot facility for storage and provision of a plurality of parcels within an planned handover period at a location as a joint optimized handover point for handover of the plurality of parcels to the respective recipients and/or by depositors of the plurality of parcels, in that the depot facility can be connected to an assignment means for assignment of parcel identification characteristics to the storage positions, in that at least one transport path is located in the depot facility, wherein at least one transport unit can move along the transport path, wherein the transport unit is set up in such a way that it can support a removal of parcels from a parcel shipment flow in particular on the basis of parcel identification characteristics, that a transport of the parcels from the shipment flow into storage positions of the depot facility is made possible using the transport unit, and that the transport of the parcels by the transport units within the depot facility can be controlled taking into account the storage positions assigned to the respective parcels on the basis of the parcel identification characteristics.

An advantageous further embodiment of the depot facility is that the transport unit is set up in such a way that it is possible to transport parcels from the assigned storage positions in the depot facility to a handover gate using parcel identification characteristics.

An appropriate embodiment of the invention provides that the depot facility comprises at least one handover gate for handovers of parcels at joint handover points and at least one handover unit for handovers at individual handover points different from the joint handover points.

An advantageous further embodiment of the depot facility is that it contains at least one transport unit that can be moved inside and outside the depot facility.

An appropriate design of the transfer facility is characterised by the fact that it contains at least one transport unit which can be moved within the transfer facility and within the depot facility.

An advantageous further embodiment of the invention provides that the handover gate and/or a handover unit are designed as a dispensing unit for dispensing parcels to recipients and/or as a receiving unit for receiving parcels from a depositor.

An advantageous further embodiment of the depot facility is that the transport unit, starting from a location of the depot facility, can autonomously carry out a transport as a handover unit to the individual handover point for the individual recipient and/or for the individual depositor and can carry out the delivery of the parcel to the recipient and/or the acceptance of the parcel from the depositor at the individual handover point.

An appropriate embodiment of the invention provides that the depot facility is designed for storing and providing a plurality of parcels and that it has at least two different loading modes and/or at least two different unloading modes.

An advantageous further embodiment of the depot facility is that in a first loading mode, an uninterrupted path is formed between an environment of the depot facility and an interior of the depot facility.

Uninterrupted path means in particular a configuration in which a possible transport path of the parcel and/or of a transport unit set up for the transport of the parcel is not interrupted, i.e. in particular is not interrupted by a lock, a barrier or any other obstacle.

An appropriate design of the depot facility is that in a second loading mode, an individual storage of a parcel can take place using a lock.

An advantageous further embodiment of the depot facility is that in a first unloading mode, an uninterrupted path is formed between an interior of the depot facility and an environment of the depot facility.

An appropriate embodiment of the depot facility is that in a second unloading mode, an individual handover of a parcel to a recipient can take place using the airlock.

An advantageous further embodiment of the depot facility is that the mobile depot facility is designed as a logistics vehicle.

An appropriate embodiment of the depot facility is that it has a door that occupies as much of the rear of the depot facility as possible.

According to the invention, a depot facility, in particular one of the depot facilities shown in this application, is further used for carrying out a method for handover of a plurality of parcels to a plurality of recipients and/or for receipt of a plurality of parcels from a plurality of depositors, wherein a joint optimized handover point for the handover to the respective recipients and for the acceptance by the depositors within a specific handover period is determined for a plurality of parcels from a plurality of possible handover points spatially separated from one another, taking into account at least one effort parameter, and in that the handover to the recipients and/or the acceptance by the depositors takes place at the associated joint optimized handover point within the planned handover period.

An advantageous further embodiment of the use of the depot facility is that the depot facility is used at a distribution centre and/or a delivery depot as a temporary storage facility for parcels.

A preferred further embodiment of the use of the depot facility is characterised in that the depot facility is provided during a stay at a joint optimized handover point within a planned handover period at a joint optimized handover point for joint storage of a plurality of parcels and for handover to recipients and/or by depositors of the plurality of parcels and that the depot facility is used during a stay at a distribution centre and/or a delivery depot as a temporary storage facility for parcels.

The invention further relates to a system for handover of a plurality of parcels to a plurality of recipients and/or for receipt of a plurality of parcels from a plurality of depositors.

According to the invention, the system is characterised in that it is set up to carry out a method for handover of a plurality of parcels to a plurality of recipients and/or for receipt of a plurality of parcels from a plurality of depositors, in that a joint optimized handover point for handover to the respective recipients and/or for receipt from the depositors within a specific handover period can be determined in each case for a plurality of parcels from a plurality of possible spatially separate handover points, taking into account at least one effort parameter, and in that the handover to the recipients and the receipt from the depositors can take place at the assigned joint optimized handover point within the planned handover period, and in that the system has at least one distribution centre and/or at least one delivery depot and in that the system has, at the at least one distribution centre and/or the at least one delivery depot, at least one means for transferring the parcels to a transfer facility, in that the system has a control component, the control component being set up in such a way that the control component can control the transfer facility in such a way that the transfer facility can carry out the transport of the parcels in accordance with control instructions from the control component, the parcels being transported at the transfer facility as individual parcels by transport units.

An advantageous further embodiment of the system is that it comprises a plurality of depot facilities, at least some of the depot facilities being mobile depot facilities, and that the control component is further arranged to control a transport of the mobile depot facilities from the transfer facility to set-up locations as joint optimized handover points for the handover of the parcels.

An appropriate embodiment of the system is that it comprises a means for selecting a joint optimized handover point from the plurality of possible handover points for handover to the respective recipients and/or for receipt from the respective depositors within the planned handover period and that it comprises a depot facility for handover to the recipient and/or for receipt from the respective depositors at the joint optimized handover point within the planned handover period.

An advantageous further embodiment of the system is that, in addition to the parcels planned for handover at the joint handover points, goods objects can be delivered to the depot facility, stored and handed over as parcels.

An appropriate embodiment of the system provides that at least some of the goods objects can be dispensed at the depot facility where they were handed over as parcels.

An advantageous further embodiment of the system is characterised in that it has a means for detecting a plurality of possible locations for depot facilities, in particular mobile depot facilities, and in that it includes a means for assigning the depot facilities, in particular the mobile depot facilities, to the joint optimized handover points as locations for the depot facilities, in particular the mobile depot facilities.

An appropriate embodiment of the system is that it comprises at least one means for controlling the transfer facilities, whereby the transfer facilities can be controlled in such a way that the parcels planned for delivery at a handover point, in particular at a joint optimized handover point, are transported to the mobile depot facility associated with the handover point, in particular the joint optimized handover point.

An advantageous further embodiment of the system is that it includes means for transmitting geographical information to the joint optimized handover points to the depot facilities and/or a transport means for transporting the depot facilities so that transport of the depot facilities to the joint optimized handover points can take place taking into account the geographical information.

An appropriate embodiment of the system is that it is designed as a logistics system with an associated ordering system, that the ordering system is designed in such a way that several handover points can be selected for a selection of the joint optimized handover points for the parcels, taking into account a self-learning system, and that the handover to the respective recipients and/or the deposit by the respective depositors takes place at the joint optimized handover points, taking into account expected locations and/or routes of the recipients/deliverers determined by the self-learning system.

An advantageous further embodiment of the system is characterised in that it has a user component which contains a processor for controlling functions of the user component, in that the user component contains at least one position determining means, the position determining means being set up in such a way, that it can detect positions of the user component as localisation information of a user of the user component, that the user component contains a means for transmitting the localisation information to the system, that the user component can cooperate with a storage means particularly protected against unauthorised access for storing data protection requests of a user of the user component, in that the data protection requirements of the user include a location-dependent specification of which localisation information is transmitted to the system for localisation of the user component, in that the processor carries out an evaluation of the extent to which and/or the accuracy with which a transmission of the localisation information corresponds to the data protection requirements of the user, and in that a transmission of the localisation information to the system takes place only to the extent which and/or with the accuracy which corresponds to the data protection requirements of the user.

An appropriate embodiment of the system provides that it has a user app and the user app is set up to transmit localisation information of a user to a control component of the system, wherein the user app can interact with a storage means, which is specially protected against unauthorised access, for storing data protection requirements of the user, that the data protection requirements of the user include a specification of which localisation information is transmitted to the system for localisation of the user component, that the processor carries out an evaluation, the extent and/or accuracy to which a transmission of the location information meets the user's privacy requirements, and that a transmission of the location information to the system is only to the extent and/or accuracy that meets both the user's privacy requirements and the extent necessary to support a selection of joint optimized handover points by transmitting the location information and/or to support a packet handover in close proximity to a handover means.

An advantageous further embodiment of the system is that the control component forwards information on parcel identification characteristics to the transfer facility so that the parcels can be stored in the storage positions of the storage units of the depot facilities on the basis of the parcel identification characteristics.

An appropriate embodiment of the system is that the transport units of the transfer facility are set up to support storage of the parcels in storage positions of storage facilities of the depot facilities.

An advantageous further embodiment of the system is that the control component forwards information on parcel identification characteristics to the transfer facility so that the parcels can be stored in the storage positions of the storage units of the depot facilities on the basis of the parcel identification characteristics.

The invention further relates to a logistics system for handover of a plurality of parcels, preferably for use in any of the methods disclosed in this application or with any of the systems disclosed in this application, wherein the logistics system is arranged to handover parcels from a plurality of shippers to a plurality of recipients, and wherein the logistics system is further arranged to perform at least one processing operation on the parcels based on a respective parcel identification code associated with the parcels.

According to the invention, the logistics system or a further embodiment of the logistics system is characterised in that the parcels each have at least one recipient attribute, in that a control component of the logistics system has an interface for receiving recipient attributes of the parcels, in that the control component has a means for determining positions of the parcels in the course of their transport route, and in that the control component is furthermore set up in such a way that it can assign to the plurality of parcels in the course of the transport route of the respective parcels, as a function of the positions of the parcels, changing proportions of fixed recipient attributes and variable recipient attributes assigned to them in each case.

Recipient attributes are in particular attributes that are assigned to recipients in the sense of characteristics. These are characteristics, whereby each recipient can be identified by individual, several or all of its attributes. Recipient attributes are in particular data elements which serve to identify a respective planned recipient of a parcel, it being advantageous to provide recipients which change as a function of a processing state of the parcel and/or recipient groups which change as a function of a processing state of the parcel for at least some of the parcels processed by a logistics system according to the invention.

Whereas in conventional logistics systems, the recipient to whom the parcel is addressed and the recipient's address are already known before parcels are delivered to the logistics system, or at the latest when parcels are delivered to the logistics system, an advantageous further embodiment of the invention enables a considerably higher flexibility of an assignment between parcels and recipients.

A recipient attribute is preferably called fixed if it is not changed before or during subsequent processing operations of the parcel.

Fixed recipient attributes are in particular recipient address attributes that have already been taken into account for the processing of the parcel on a transport route to a recipient A recipient attribute is preferably called variable if it is changed or can be changed before or during subsequent processing operations of the parcel.

Variable recipient attributes are recipient attributes, in particular recipient address attributes, which have not yet been taken into account for processing the parcel on a transport route to a recipient and can be changed according to the invention.

With the consideration in a processing step, variable recipient attributes are preferably changed to fixed recipient attributes. It is also advantageous if the shipper first only communicates a few recipient attributes that are taken into account in the first processing steps and then adds further recipient attributes before further processing steps.

An advantageous example of a recipient attribute is a recipient address attribute that contains, in particular as an attribute value, components of a physical address for the handover of one or more physical parcels.

Recipient contact attributes are preferably part of the attribute values of data objects relating to information that enables the recipient to be contacted.

A combination of different types of recipient attributes is possible. In particular, recipient contact attributes, which enable the recipient to be contacted, can be combined with recipient address attributes, which control routing of the parcel.

Examples of recipient attributes are:

- the components of the address depth shown in this application, in particular components of a physical address of a recipient of the parcel, in particular
  - Leading digits of a postcode (this is also an example of a recipient address attribute),
  - Further digits of the postcode (this is also an example of a recipient address attribute),
  - Alternatively or additionally complete postcode (this is also an example of a recipient address attribute),
  - Street or street section (this is also an example of a recipient address attribute),
  - House number or flat number (this is also an example of a recipient address attribute).
- Information on a joint optimized handover point for the parcel (this is also an example of a recipient address attribute);
- Information on an individual handover point (this is also an example of a receiver address attribute);
- Recipient's email address (this is also an example of a recipient contact attribute);
- Recipient's phone number (this is also an example of a recipient contact attribute);
- User name of the recipient;
- User identification code of the recipient;
- Payment card identification number, in particular credit card identification number of credit cards:
- Existence of monetary information relating to a payment transaction (in particular, monetary information involving a payment transaction relating to the parcel).

Address depth in the sense of the present application means in particular the recipient address depth, in particular the specification of a physical handover point, in particular a joint optimized handover point, an individual handover point, in particular a physical address of a recipient.

Recipient attributes within the meaning of the present application are linked in particular with parcel identification characteristics, the linking being carried out in particular by a control component. The links between parcels and recipients enable the logistics system and/or at least one component of the logistics system to assign a parcel to a recipient.

It is particularly advantageous if many parcels, in particular as many parcels as possible, are linked by the shipper(s) with parcel identification characteristics and/or recipient attributes. Particularly preferred embodiments of the use of parcel identification characteristics and/or recipient attributes are explained in particular in the section Parcel identification characteristic and with reference to FIGS. 45 to 47.

Although receiver address attributes and receiver contact attributes are particularly preferred embodiments of the invention, the present invention is not limited to these embodiments of receiver attributes.

An advantageous further embodiment of the logistics system is that a plurality of parcels are assigned changing proportions of fixed recipient attributes and variable recipient attributes assigned to them in the course of a transport route.

Parts of delivery attributes are, in particular, components of the delivery attributes, especially digits of a postcode.

An appropriate design of the logistics system provides that at least some of the recipient attributes are components of a recipient address depth, whereby the proportion of the fixed recipient attributes taken into account in the recipient address depth and assigned to the parcels in each case can be changed in a time sequence of individual production stages of a logistics company from handover by the shipper to final handover to the recipient.

An advantageous further embodiment of the logistics system is that the leading digit of a postcode and further digits of the postcode are components of the recipient address depth.

An appropriate design of the logistics system is that a street and/or a street section or a house number and/or a flat number are components of the recipient address depth.

An advantageous further embodiment of the logistics system is that joint optimized handover points are components of the recipient address depth.

An appropriate design of the logistics system provides that individual handover points are components of the recipient address depth.

An advantageous further embodiment of the logistics system is characterised in that a control component of the logistics system receives instructions from the shippers via an interface for receiving instructions from the shippers, in that the instructions from the respective shippers each contain at least one instruction for defining further or modified variable recipient attributes of at least one selected parcel, and in that the logistics system carries out at least one processing operation of the selected parcel taking into account the further or modified variable recipient attributes assigned to the selected parcel, which thereby become fixed recipient attributes.

An appropriate embodiment of the logistics system provides that a parcel identification code is used to identify the selected parcel, and that at least one subsequent processing operation of the parcel is carried out both taking into account the further or modified recipient attribute assigned to the selected parcel and taking into account the parcel identification code.

An advantageous further embodiment of the logistics system is characterised by the fact that the parcel identification code contains at least one shipper identification information respectively shipper identification characteristics wherein the shipper identification characteristic identifies the shipper.

An appropriate design of the logistics system is that the parcel identification code is stored as a primary parcel identification characteristic, that at least one secondary parcel identification characteristic different from the primary parcel identification characteristic is assigned to the parcel, and that at least one processing operation of the parcel is carried out on the basis of the secondary parcel identification characteristic.

An advantageous further embodiment of the logistics system is that the secondary parcel identification characteristic is easier and/or faster to identify than the primary parcel identification characteristic.

An appropriate further embodiment of the logistics system is characterised by the fact that both the parcel identification code and at least one fixed recipient attribute and/or at least one of the variable recipient attributes are assigned to a digital twin of the parcel.

An advantageous further embodiment of the logistics system is that the processing operations are supplemented by the provision of process protocols, including individual process protocols for the individual parcels, and the process protocols are used to control the processing operations.

An optional use of individual process protocols for individual parcels has the advantage that real-time applications can be implemented and/or that a link between individual parcels and their respective digital twins is facilitated.

An appropriate further embodiment of the logistics system is characterised by the fact that at least one of the subsequent processing operations of the parcel is carried out taking into account at least one of the variable recipient attributes:

- Deposit of parcels;
- Selection procedure (determination procedure) for determining a joint optimized handover point for several recipients and/or depositors;
- Sorting in distribution centres;
- Sorting at logistical nodes;
- Routing at a node of the logistics system;
- Transport between distribution centres;
- Transport between distribution centres and logistical nodes;
- Transport between logistical nodes;
- Sorting in delivery depots;
- Loading of depot facilities;
- autonomous and/or semi-autonomous transport to joint optimized handover points;
- autonomous and/or semi-autonomous transport to individual
- Handover points;
- Handover of a plurality of parcels at a joint optimized handover point within a handover period;
- Handover of parcels at individual handover points;
- Acceptance of multiple parcels at a joint optimized handover point within a handover period;
- Acceptance of parcels at individual handover points;
- Use of depot facilities for the storage of parcels;
- Use of depot facilities for the acceptance of parcels;
- Use of depot facilities for commisioning parcels;
- Use of depot facilities for the handing out of parcels; and
- Use of depot facilities as sales facilities Most of the processing operations depicted in this application are logistical processing operations in which the respective objects, in particular the depicted parcels including the likewise depicted goods objects themselves are not changed, in particular handover, transport and sorting.

However, it is possible to provide additional manipulation operations. In a manipulation operation, an object is manipulated in such a way that at least one of its properties is changed. Examples of such manipulation operations, which may be performed on any of the parcels shown in this application, including commodity objects, are: Fabrication, assembly, repair, disassembly and cleaning.

The invention further relates to a use of the logistics system disclosed in this application for carrying out one of the methods disclosed in this application for handover of a plurality of parcels.

Particularly preferred is the use of the logistics system disclosed in this application for the flexible assignment of a final recipient of a parcel and/or a final handover point for the parcel.

The invention can also be described by the following characteristics. The characteristics presented below can be combined with each other as well as with the following presentation of preferred embodiments based on the figures, whereby particularly preferred combinations of characteristics are highlighted by reference to previously presented combinations of characteristics.

AA) Method for handing over a plurality of parcels to a plurality of recipients and/or for receiving parcels from a plurality of depositors, in which a joint optimized handover point for handover to the respective recipients and/or depositors is determined for a plurality of parcels from a plurality of possible spatially separate handover points, taking into account at least one effort parameter of at least one respective recipient and/or at least one respective depositor within a specific handover period, the joint optimized handover point is determined by selecting from the multiplicity of possible spatially separated handover points with at least one selection step, the selection step taking into account effort parameters for the recipients and/or the depositors for which a respective effort parameter for the respective recipients and/or depositors is as low as possible within a handover period for the parcels, the joint optimized handover points are determined by an optimization procedure from a multiplicity of possible locations for depot facilities for the parcels for the handover of the parcels to the recipients, the optimization procedure is carried out separately for mutually different handover periods in each case, so that at least partially different joint optimized handover points result for a first handover period on a first day than for another handover period on another day, at least some of the depot facilities are designed as mobile depot facilities for storage and provision of a plurality of parcels within a planned handover period at a location as a joint optimized handover point for handover of the plurality of parcels to the respective recipients and/or by depositors of the plurality of parcels, parcels planned for handover within the handover period are transferred to the depot facilities before the handover periods and handover to the recipients and/or by the depositors takes place at the assigned joint optimized handover point within the planned handover period.

AB) Method for handing over a plurality of parcels to a plurality of recipients and/or for receiving parcels from a plurality of depositors, in which a joint optimized handover point for handover to the respective recipients and/or depositors is determined for a plurality of parcels from a plurality of possible spatially separate handover points, taking into account at least one effort parameter of at least one respective recipient and/or at least one respective depositor within a specific handover period, the joint optimized handover point is determined by selecting from the multiplicity of possible spatially separated handover points with at least one selection step, the selection step taking into account effort parameters for the recipients and/or the depositors for which a respective effort parameter for the respective recipients and/or depositors is restricted within a handover period for the parcels, the joint optimized handover points are determined by an optimization procedure from a multiplicity of possible locations for depot facilities for the parcels for the handover of the parcels to the recipients, the optimization procedure is carried out separately for mutually different handover periods in each case, so that at least partially different joint optimized handover points result for a first handover period on a first day than for another handover period on another day, at least some of the depot facilities are designed as mobile depot facilities for storage and provision of a plurality of parcels within a planned handover period at a location as a joint optimized handover point for handover of the plurality of parcels to the respective recipients and/or by depositors of the plurality of parcels, parcels planned for handover within the handover period are transferred to the depot facilities before the handover periods and handover to the recipients and/or by the depositors takes place at the assigned joint optimized handover point within the planned handover period.

AC) Method for handover of a plurality of parcels to a plurality of recipients and/or for receipt of parcels from a plurality of depositors preferably according to AA or AB, wherein the selection step for a pre-determinable high proportion, e.g. above 80%, of the parcels is performed in such a way that a respective effort parameter does not exceed a pre-determined limit.

AD) Method for handover of a plurality of parcels to a plurality of recipients and/or for receipt of parcels from a plurality of depositors preferably according to AA or AB, in which for as many recipients and/or depositors of the parcels as possible, for the handovers within the respective planned handover period, a sum of additional time requirements for deviations from anyway-routes and/or anyway-locations is limited by the effort parameter taking these time requirements into account.

AE) Depot facility, in particular for use in a method preferably according to AA or AB, in which it is designed as a mobile depot facility for storage and provision of a plurality of parcels within a planned handover period at a location as a joint optimized handover point for handover of the plurality of parcels to the respective recipients and/or of depositors of the plurality of parcels, the depot facility can be connected to an assignment means for assignment of parcel identification characteristics to the storage positions, at least one transport path is located in the depot facility, wherein at least one transport unit can move along the transport path, wherein the transport unit is set up in such a way that it can support a removal of parcels from a parcel shipment flow, in particular on the basis of parcel identification characteristics, a transport of the parcels from the shipment flow into storage positions of the depot facility is made possible using the transport unit, and the transport of the parcels by the transport units within the depot facility can be controlled taking into account the storage positions assigned to the respective parcels on the basis of the parcel identification characteristics.

AF) Depot facility, preferably corresponding to AE, in which the transfer facility and/or the transport unit are set up in such a way that a transport of parcels is made possible on the basis of parcel identification characteristics from the assigned storage positions in the depot facility to a handover gate.

AG) Depot facility, preferably corresponding to AE, in which the depot facility has at least one handover gate for handovers of parcels at joint handover points and at least one handover unit for handovers at individual handover points different from the joint handover points.

AH) System for handover of a plurality of parcels to a plurality of recipients and/or for receipt of a plurality of parcels from a plurality of depositors, which is set up to carry out a method for handover of a plurality of parcels to a plurality of recipients and for receipt of a plurality of parcels from a plurality of depositors, in which, for a plurality of parcels, from a plurality of possible handover points spatially separated from one another, taking into account at least one effort parameter, in each case a joint optimized handover point can be determined for the handover to the respective recipients and for the acceptance from the depositors within a specific handover period, and the handover to the recipients and the acceptance from the depositors can take place at the assigned joint optimized handover point within the planned handover period, the system having at least one distribution centre and/or at least one delivery depot and having, at the distribution centre and/or delivery depot, at least one means for transferring the parcels to a transfer facility, the system having a control component, the control component being set up in such a way that the control component can control the transfer facility in such a way that the transfer facility can carry out the transport of the parcels in accordance with control instructions from the control component, the parcels being transported at the transfer facility as individual parcels by transport units.

AI) System for handover of a plurality of parcels to a plurality of recipients and/or for receipt of a plurality of parcels from a plurality of depositors, preferably according to AH, which has a plurality of depot facilities, at least some of the depot facilities being in the form of mobile depot facilities, the system having at least one distribution centre and/or one delivery depot and having, at the distribution centre and/or the delivery depot, at least one means for transferring the parcels to the transfer facility, the control component being set up in such a way that it can control the transfer facility in such a way that the transfer facility can carry out the transport of the parcels to the depot facilities in accordance with control instructions from the control component, and in that the control component is further set up in such a way that it can control a transport of the mobile depot facilities from the transfer facility to set-up locations as joint optimized handover points for the handover of the parcels.

AJ) Method for handover of a plurality of parcels to a plurality of recipients and/or for handover of a plurality of parcels from a plurality of depositors, in which a joint optimized handover point for handover to the respective recipients and for acceptance by the depositors within a specific handover period is determined for a plurality of parcels from a plurality of possible handover points spatially separated from one another, taking into account at least one effort parameter, handover to the recipients and/or acceptance by the depositors takes place at the assigned joint optimized handover point within the planned handover period, the joint handover point is selected not only by taking into account the effort parameter for the respective recipient, but also by taking into account effort parameters for further recipients, and one or more locations indicated by the recipient and/or depositor or estimated by the logistics system for the handover of a parcel and/or one or more routes communicated by the recipient and/or depositor or estimated by the logistics system are taken into account for the selection of the joint handover point.

AK) Method for handing over a plurality of parcels to a plurality of recipients and/or for receiving a plurality of parcels from a plurality of depositors, in which, for a plurality of parcels from a plurality of possible handover points spatially separated from one another, a joint handover point for handover to the respective recipients and/or for receipt by the depositors within a specific handover period is determined in each case, taking into account at least one effort parameter, and handover to the recipients and/or receipt by the depositors takes place at the assigned joint handover point within the planned handover period.

AL) Method for handing over a plurality of parcels to a plurality of recipients and/or for receiving parcels from a plurality of depositors, in which a joint optimized handover point for handover to the respective recipients and/or depositors is determined for a plurality of parcels from a plurality of possible spatially separate handover points, taking into account at least one effort parameter of at least one respective recipient and/or at least one depositor within a specific handover period, the joint optimized handover point is determined by selecting from the multiplicity of possible spatially separated handover points with at least one selection step, the selection step taking into account effort parameters for the recipients and/or the depositors for which a respective effort parameter for the respective recipients and/or depositors is as low as possible within a handover period for the parcels.

AM) Method for handover of a plurality of parcels to a plurality of recipients and/or for receipt of a plurality of parcels from a plurality of depositors, preferably in accordance with AK, in which handovers to the recipients and/or receipt take place for a plurality of parcels at joint handover points using depot facilities, the depot facilities are provided for joint storage of the plurality of parcels and for handover of the plurality of parcels to the respective recipients and/or for receipt from the plurality of depositors, the parcels planned for handover at the handover points are placed in the depot facilities, at least some of the depot facilities are designed as mobile depot facilities and the mobile depot facilities transport the parcels to joint handover points assigned to them, in particular joint optimized handover points, and during a planned handover period the parcels are stored in the mobile depot facilities and made available for handover to the recipients of the parcels using the depot facilities.

AN) Method for handover of a plurality of parcels to several recipients and/or for receipt of a plurality of parcels from several depositors, preferably according to AL, in which the selection of the joint, in particular the jointly optimized handover point is made not only by including the effort parameter for the respective recipient, but also by including effort parameters for further recipients.

AO) Method for handover of a plurality of parcels to a plurality of recipients and/or for receipt of a plurality of parcels from a plurality of depositors, preferably according to AL, in which one or more locations indicated for the handover of at least one parcel by the recipient and/or depositor and/or one or more routes of the recipient and/or depositor are taken into account for the selection of the joint optimized handover point.

AP) Method for handover of a plurality of parcels to a plurality of recipients and/or for receipt of a plurality of parcels from a plurality of depositors, preferably according to AK, wherein for the selection of the joint handover point for at least some of the recipients and/or depositors, a plurality of locations indicated for the handover of at least one parcel by the recipient and/or depositor and/or one or more routes of the recipient and/or depositor are taken into account.

AQ) Method for handover of a plurality of parcels to a plurality of recipients and/or for receipt of a plurality of parcels from a plurality of depositors preferably according to AL, in which, for the selection of the joint optimized handover point for at least some of the recipients and/or depositors, in each case at least one location determined for the handover of a parcel to the recipient and/or by the depositor by means of a self-learning system and/or a determined route is taken into account, and in that the handover to the respective recipient and/or the handover by the depositor at the joint optimized handover points takes place taking into account the locations determined by the self-learning system and/or the determined routes.

AR) Method for handover of a plurality of parcels to a plurality of recipients and/or for receipt of a plurality of parcels from a plurality of depositors preferably according to AL, in which the selection of the joint optimized handover point and the handover to the respective recipient and/or the handover by the depositors, wherein several of the recipients and/or depositors have different locations and/or travel different distances in a first and a second handover period, is carried out taking into account a route distance between the specified locations, which has ideally been communicated in advance by the recipient and/or the depositor or is otherwise estimated by a route algorithm.

AS) A method for handover of a plurality of parcels to several recipients and/or for receipt of a plurality of parcels from several depositors, preferably according to AK or AL, in which the handover period is shorter than one day, so that a daily or even intraday optimisation of the handover points is possible.

AT) Method for handover of a plurality of parcels to a plurality of recipients and/or for receipt of a plurality of parcels from a plurality of depositors preferably according to AL, in which the determination of the joint optimized handover point takes place as a multistage process with a plurality of selection steps and before a selection step which takes into account effort parameters for the recipients and/or the depositors, at least one other selection step takes place taking into account at least one suitability parameter and at least one further selection step takes place.

AU) Method for handover of a plurality of parcels to a plurality of recipients and/or for receipt of a plurality of parcels from a plurality of depositors preferably according to AK or AL, in which the method is controlled by a control component.

AV) Method for handover of a plurality of parcels to a plurality of recipients and/or for receipt of a plurality of parcels from a plurality of depositors, preferably according to AL, in which the selection of the joint optimized handover points takes into account that a plurality of the recipients and/or depositors have different locations and/or travel different distances in a first and a second handover period.

AW) Method for handover of a plurality of parcels to a plurality of recipients and/or for receipt of a plurality of parcels from a plurality of depositors, preferably according to AL, in which at least one of the further selection steps takes into account an effort of an operator of the logistics system to provide a depot facility at respective locations.

AX) Method for handover of a plurality of parcels to a plurality of recipients and/or for receipt of a plurality of parcels from a plurality of depositors preferably according to AL, in which for a plurality of parcels at least one of the possible handover points is a location which forms the joint optimized handover point for handover to the respective recipients and/or by the respective depositors, and a depot facility is provided at the joint optimized handover point for joint storage of the plurality of parcels and for handover of the plurality of parcels to the respective recipients of the plurality of parcels and/or for deposit by the respective depositors of the plurality of parcels at the associated joint optimized handover point within the planned handover period.

AY) Method for handing over a plurality of parcels to a plurality of recipients and for receiving a plurality of parcels from a plurality of depositors, preferably in accordance with AX, in which additional integration of local logistics at a depot facility takes place in that, in addition to the parcels planned for handover at the joint handover points, goods objects are delivered to the depot facility, stored and handed over to recipients as parcels.

AZ) Method for handover of a plurality of parcels to a plurality of recipients and/or for receipt of a plurality of parcels from a plurality of depositors, preferably in accordance with AX, in which the parcels planned for handover at the handover points are introduced into the depot facilities, at least some of the depot facilities are designed as mobile depot facilities and the mobile depot facilities transport the parcels to the joint optimized handover points assigned to them and during the planned handover period the parcels are stored in the mobile depot facilities and made available for handover to the recipients of the parcels using the depot facilities.

BA) Method for handing over a plurality of parcels to a plurality of recipients and/or for receiving a plurality of parcels from a plurality of depositors, preferably in accordance with AX, in which a plurality of parcels planned for handover at one of the joint optimized handover points are transported to a transfer facility and, at the transfer facility, are transported as individual parcels to the mobile depot facilities and are introduced as individual parcels into one of the mobile depot facilities in such a way that storage of the parcels takes place in storage positions of a storage facility of the depot facility taking into account parcel identification characteristics.

BB) Method for handover of a plurality of parcels to a plurality of recipients and/or for receipt of a plurality of parcels from a plurality of depositors, preferably in accordance with BA, in which an individual transfer of the parcels takes place by means of at least one movable transport unit, the movable transport unit being controllable in such a way that it can transfer the individual parcels into the storage positions of the storage facility of the depot facilities taking into account the parcel identification characteristics.

BC) Method for handover of a plurality of parcels to a plurality of recipients and/or for receipt of a plurality of parcels from a plurality of depositors, preferably in accordance with AX, in which, during a stay of the depot facility at the transfer facility, the following data elements are in each case transmitted to the depot facility for the parcels transferred as individual parcels at the transfer facility:

At least one of the parcel identification characteristics that is suitable to enable reliable identification of a respective parcel and information on an identification of the storage position within the storage facility of the depot facility, in particular for the storage of the respective parcel.

BD) Method for handing over a plurality of parcels to a plurality of recipients and/or for receiving a plurality of parcels from a plurality of depositors, preferably according to AL, in which further parcels are delivered to the depot facility in addition to the plurality of parcels provided at the assigned joint optimized handover point within the planned handover period.

BE) Method for handing over a plurality of parcels to a plurality of recipients and/or for receiving a plurality of parcels from a plurality of depositors, preferably according to AL, in which a part of the parcels located at the joint optimized handover point, in particular in depot facilities, is transported to a transfer facility after the handover period for the plurality of parcels has expired, provided they are not collected during the original handover period.

BF) Method for handing over a plurality of parcels to a plurality of recipients and/or for receiving a plurality of parcels from a plurality of depositors, preferably in accordance with AX, in which parcels stored in the depot facility are transported within the depot facility to a handover gate in response to a received handover request and are made available there to the recipients of the parcels.

BG) Method for handing over a plurality of parcels to a plurality of recipients and/or for receiving a plurality of parcels from a plurality of depositors, preferably in accordance with AX, in which parcels stored in one of the depot facilities are transported within the depot facility by a transport unit into a handover facility and/or are transported to respective recipients by means of a handover unit in response to a received handover request, and in that the parcels are made accessible to the respective recipients by the handover facility and/or the handover unit.

BH) Method for handover of a plurality of parcels to a plurality of recipients and/or for receipt of a plurality of parcels from a plurality of depositors, preferably in accordance with AX, in which a handover of a parcel by a depositor to the depot facility includes the following method steps:

Detection of at least one parcel identification characteristic, if necessary also by a user component;

Activation of a handover gate,

Assignment of a storage position of a storage unit of the depot facility to the parcel taking into account the parcel identification characteristic Transport of the parcel to a storage position of a storage unit of the depot facility.

BI) Method for handover of a plurality of parcels to a plurality of recipients and/or for receipt of a plurality of parcels from a plurality of depositors, preferably according to AX, in which the transport of the parcel into the storage position of the storage facility of the depot facility is assisted by a transport unit.

BJ) Method for handover of a plurality of parcels to a plurality of recipients and/or for receipt of a plurality of parcels from a plurality of depositors, preferably in accordance with AX, in which a handover of a parcel into a handover unit by a depositor includes the following method steps:

Activation of a handover unit;

Detection of at least one parcel identification characteristic, if necessary also by a user component;

Handover of the parcel to the handover unit;

Transport of the parcel to the depot facility;

Assignment of a storage position of a storage unit of the depot facility to the parcel taking into account the parcel identification characteristic;

Transport of the parcel to the storage position of the storage facility of the depot facility.

BK) Method for handover of a plurality of parcels to a plurality of recipients and/or for receipt of a plurality of parcels from a plurality of depositors, preferably in accordance with AX, in which at least one depot facility is used, wherein the depot facility has a storage unit with at least one storage rack and wherein compartments of the storage rack form storage positions of the depot facility and a number and/or at least one dimension of the compartments is variable and the number and/or the dimension of the compartments is variably adapted in dependence on a number and/or a dimension of parcels to be delivered to and stored in the depot facility.

BL) Method for handing over a plurality of parcels to a plurality of recipients and/or for receiving a plurality of parcels from a plurality of depositors, preferably according to BK, in which the variable adaptability of the number and/or the dimensions of the compartments of depot facilities is taken into account in a determination of joint optimized handover points for a handover of the parcels to the respective recipients and/or for the delivery by the depositors of the parcels within a certain handover period.

BM) Method for handover of a plurality of parcels to a plurality of recipients and/or for receipt of a plurality of parcels from a plurality of depositors, preferably in accordance with AX, in which the parcels planned for handover at the handover points are introduced into the depot facilities, at least some of the depot facilities are designed as mobile depot facilities and the mobile depot facilities transport the parcels to the joint optimized handover points assigned to them and during the planned handover period the parcels are stored in the mobile depot facilities and made available for handover to the recipients of the parcels using the depot facilities.

BN) Method for handing over a plurality of parcels to a plurality of recipients, in particular method preferably according to AK or AL, in which an order for goods from at least one of the customers is accepted as an order by an ordering system for processing order requests from customers, in that an order for carrying out a handover of the parcel to a recipient is transmitted from the ordering system to a control component of a logistics system on the basis of the order request, in that the order contains a recipient identification feature assigned to the recipient, in that the control component checks whether a recipient data record with localisation information is available for the recipient identification feature, and in that, if the recipient data record with localisation information is available, at least one processing operation of the logistics system is carried out taking into account the localisation information.

BO) Depot facility, in particular for use in a method according to AK or AL, which is designed as a mobile depot facility for a storage and provision of a plurality of parcels within a planned handover period at one location as a joint optimized handover point for the handover of the plurality of parcels to the respective recipients and/or by depositors of the plurality of parcels.

BP) Depot facility preferably according to BO, which it contains at least one transport unit that can be moved outside the depot facility.

BQ) Depot facility preferably according to BO, in which the transport unit is designed as a transfer means for a transfer of parcels between the depot facility and a transfer facility.

BR) Deposit facility preferably according to BO, in which the handover facility and/or a handover unit are designed as an issuing unit for issuing parcels to recipients and/or as a receiving unit for receiving parcels from a depositor.

BS) A depot facility, preferably corresponding to BR, in which the handover unit can perform a transport of a parcel between the depot facility and an individual handover point for an individual recipient of the parcel and/or an individual depositor of the parcel.

BT) Depot facility, preferably corresponding to BR, where the handover unit at the individual handover point for the individual recipient can carry out the delivery of the parcel to the recipient and/or the acceptance of the parcel from the depositor.

BU) Deposit facility preferably according to BO, in which the transport unit can autonomously carry out a transport as a handover unit from a location of the deposit facility to the individual handover point for the individual recipient and/or for the individual depositor and can carry out the delivery of the parcel to the recipient and/or the acceptance of the parcel from the depositor at the individual handover point.

BV) Depot facility preferably corresponding to BO, which is designed for storage and provision of a plurality of parcels and has at least two different loading modes and/or at least two different unloading modes.

BW) Depot facility preferably according to BV, which in a first loading mode an uninterrupted path is formed between an environment of the depot facility and an interior of the depot facility.

BX) Depot facility, preferably according to BV, in which individual storage of a parcel can take place in a second loading mode using a lock.

BY) Depot facility preferably according to BV, in which an uninterrupted path is formed between an interior of the depot facility and an environment of the depot facility in a first unloading mode.

BZ) Depot facility preferably according to BV, in which an individual handover of a parcel to a recipient can take place in a second unloading mode using the airlock.

CA) Logistics vehicle containing a depot facility, preferably corresponding to BO.

CB) Use of a depot facility, in which the depot facility is provided for carrying out a method for handover of a plurality of parcels to a plurality of recipients and/or for receipt of a plurality of parcels from a plurality of depositors, in which a joint optimized handover point for the handover to the respective recipients and for the acceptance by the respective depositors within a specific handover period is determined for a plurality of parcels from a plurality of possible handover points spatially separated from one another, taking into account at least one effort parameter, and the handover to the recipients and/or the acceptance by the depositors takes place at the assigned joint optimized handover point within the planned handover period.

CC) Use of a depot facility in which the depot facility is used as a temporary storage facility for parcels in the area of a distribution centre and/or a delivery depot.

CD) Use of a depot facility, in which the depot facility is provided during a stay at a joint optimized handover point within a planned handover period for carrying out the procedure according to AA or AB at a joint optimized handover point for joint storage of a plurality of parcels and for handover to recipients and/or by depositors of the a plurality of parcels and the depot facility is used during a stay in the area of a distribution centre and/or a delivery depot as a temporary storage facility for parcels.

CE) Use of a depot facility in which loading of the depot facility in an area of the distribution centre and/or delivery depot is carried out in such a way that a door, which preferably occupies a complete rear side of the depot facility, is opened to such an extent that the depot facility can be loaded and/or unloaded quickly.

CF) System for handover of a plurality of parcels to a plurality of recipients and/or for receipt of a plurality of parcels from a plurality of depositors, which is set up to carry out a method for handover of a plurality of parcels to a plurality of recipients and for receipt of a plurality of parcels from a plurality of depositors, a joint optimized handover point for handover to the respective recipients and/or for acceptance by the depositors within a specific handover period can be determined in each case for a plurality of parcels from a plurality of possible handover points spatially separated from one another, taking into account at least one effort parameter, and the handover to the recipients and the acceptance by the depositors can take place at the assigned joint optimized handover point within the planned handover period.

CG) A system for handing over a plurality of parcels to a plurality of recipients and/or for receiving a plurality of parcels from a plurality of depositors, preferably according to CF, wherein it comprises a means for selecting a joint optimized handover point from the plurality of possible handover points for handover to the respective recipients and/or for receiving from the respective depositors within the planned handover period and it comprises a depot facility for handover to the recipient and/or for receiving from the respective depositors at the joint optimized handover point within the planned handover period.

CH) System for handover of a plurality of parcels to several recipients and/or for receipt of a plurality of parcels from several depositors, preferably in accordance with CF, in which additional integration of local logistics with handing out and receipt of parcels takes place at a depot facility in that, in addition to the parcels planned for handover at the joint handover points, goods objects can be delivered to the depot facility, stored and handed over as parcels.

CI) System for handover of a plurality of parcels to a plurality of recipients and/or for receipt of a plurality of parcels from a plurality of depositors preferably according to CF, in which at least some of the commodity objects can be dispensed at the depot facility at which they were handed over as parcels.

CJ) System for handover of a plurality of parcels to a plurality of recipients and/or for receipt of a plurality of parcels from a plurality of depositors preferably according to CF, in which it has a means for detecting a plurality of possible locations for depot facilities, in particular mobile depot facilities, and it includes a means for assigning the depot facilities, in particular the mobile depot facilities, to the joint optimized handover points as locations for the depot facilities, in particular for the mobile depot facilities.

CK) System for handing over a plurality of parcels to a plurality of recipients and/or for receiving a plurality of parcels from a plurality of depositors, preferably according to CF, in which it has at least one means for controlling transfer facilities, it being possible to control the transfer facilities in such a way that the parcels planned for handover at a handover point, in particular at a joint optimized handover point, are transported into the mobile depot facility associated with the handover point, in particular the joint optimized handover point.

CL) System for handover of a plurality of parcels to a plurality of recipients and/or for receipt of a plurality of parcels from a plurality of depositors preferably according to CF, in which it includes means for transmitting geographical information to the joint optimized handover points to the depot facilities and/or a transport means for transporting the depot facilities so that a transport of the depot facilities to the joint optimized handover points can take place taking into account the geographical information.

CM) System for handing over a plurality of parcels to a plurality of recipients and/or for receiving a plurality of parcels from a plurality of depositors preferably according to CF, in which it is designed as a logistics system with an associated ordering system, the ordering system is designed in such a way that for a selection of the joint optimized handover points for the parcels a plurality of handover points can be selected taking into account a self-learning system, and the handover to the respective recipients and/or the deposit by the respective depositors takes place at the joint optimized handover points taking into account the handover points selected by the self-learning system.

CN) User component for interaction with a system preferably according to CF, which includes a processor for controlling functions of the user component, the user component including at least one positioning means, the positioning means being arranged to detect positions of the user component as localisation information of a user of the user component, the user component includes means for transmitting the location information to the system, the user component is adapted to cooperate with storage means specially protected against unauthorised access for storing privacy requests of a user of the user component, the user's data protection requests include a location-dependent determination of which localisation information is transmitted to the system for localisation of the user component, the processor carries out an evaluation of the extent to which and/or the accuracy with which a transmission of the localisation information corresponds to the user's data protection requests, and a transmission of the localisation information to the system only takes place to the extent that and/or with the accuracy that corresponds to the user's data protection requests.

CO) User app for interaction with a system preferably in accordance with CF, the user app being set up to transmit localisation information of a user to a control component of the system, the user app being able to interact with a storage means, which is specially protected against unauthorised access, for storing data protection requirements of the user, the data protection requirements of the user including a specification of which localisation information is transmitted to the system for localisation of the user component, the processor carries out an evaluation, the extent and/or accuracy to which a transmission of the location information meets the user's privacy requirements, and a transmission of the location information to the system is only to the extent and/or accuracy that meets both the user's privacy requirements and the extent necessary to support a selection of joint optimized handover points by transmitting the location information and/or to support a packet handover in close proximity to a handover means.

CP) System for handover of a plurality of parcels to a plurality of recipients and/or for receipt of a plurality of parcels from a plurality of depositors, which has a plurality of possible handover points spatially separated from one another, having means for selecting a joint optimized handover point from the plurality of possible handover points for handover to the respective recipients within the planned handover period, and having a plurality of depot facilities for handover to the recipients and/or from the depositors at the joint optimized handover point within the planned handover period, and a control component controlling the transport of the parcels to the depot facility.

CQ) System for handover of a plurality of parcels to a plurality of recipients and/or for receipt of a plurality of parcels from a plurality of depositors preferably according to CP, in which it has a plurality of depot facilities, at least some of the depot facilities being in the form of mobile depot facilities, the system has at least one distribution centre and/or delivery depot and it has at least one means for transferring the parcels to a transfer facility in the area of the distribution centre and/or delivery depot, the control component is set up in such a way that it can control the transfer facility in such a way that the transfer facility can carry out the transport of the parcels to the depot facilities in accordance with control instructions of the control component, and the control component is further set up in such a way that it can control a transport of the mobile depot facilities from the transfer facility to set-up locations as joint optimized handover points for the handover of the parcels.

CR) System for handover of a plurality of parcels to a plurality of recipients and/or for receipt of a plurality of parcels from a plurality of depositors preferably according to CQ, in which the transfer facility has transport units to support a storage of the parcels in storage positions of storage facilities of the depot facilities.

CS) System for handover of a plurality of parcels to a plurality of recipients and/or for receipt of a plurality of parcels from a plurality of depositors preferably according to CQ, in which at least some of the transfer facilities of the transfer facility can be transported to other areas of the distribution centre, respectively delivery depots and/or depot facilities.

CT) System for handover of a plurality of parcels to a plurality of recipients and/or for receipt of a plurality of parcels from a plurality of depositors preferably according to CP, in which the control component forwards information on parcel identification characteristics to the transfer facility so that the storage of the parcels in the storage positions of the storage units of the depot facilities can take place on the basis of the parcel identification characteristics.

CU) System for handover of a plurality of parcels to several recipients and/or for receipt of a plurality of parcels from several depositors, preferably in accordance with CP, in which additional integration of local logistics with handover and receipt of parcels takes place at a depot facility in that, in addition to the parcels provided for handover at the joint handover points, goods objects can be delivered to the depot facility, stored and handed over as parcels.

CV) System for handover of a plurality of parcels to a plurality of recipients and/or for receipt of a plurality of parcels from a plurality of depositors preferably according to CP, in which the control component contains a means for transmitting geographical information to the joint optimized handover points to the depot facilities and/or to a transport means for a transport of the depot facilities, so that a transport of the depot facilities to the joint optimized handover points can take place taking into account the geographical information.

CW) System for handover of a plurality of parcels to a plurality of recipients and/or for receipt of a plurality of parcels from a plurality of depositors preferably in accordance with CP, in which it is designed as a logistics system with an associated ordering system, wherein the ordering system is designed in such a way, that for a selection of the joint optimized handover points for the parcels, several handover points can be determined taking into account a self-learning system and the handover to the respective recipients and/or the deposit by the respective depositors at the joint optimized handover points takes place taking into account the expected locations and/or expected routes selected by the self-learning system.

CX) System for handover of a plurality of parcels to a plurality of recipients and/or for receipt of a plurality of parcels from a plurality of depositors, which is set up to carry out a method for handover of a plurality of parcels to a plurality of recipients and for receipt of a plurality of parcels from a plurality of depositors, wherein for a plurality of parcels from a plurality of possible spatially separated handover points, taking into account at least one effort parameter, in each case a joint optimized handover point can be determined for the handover to the respective recipients and for the acceptance by the depositors within a specific handover period, and the handover to the recipients and the acceptance by the depositors can take place at the associated joint optimized handover point within the planned handover period.

CY) System for transferring a plurality of parcels, the system having at least one distribution centre and/or at least one delivery depot and the system having, at the distribution centre and/or delivery depot, at least one means for transferring the parcels to a transfer facility, the system having a control component, the control component being set up in such a way that the control component can control the transfer facility in such a way that the transfer facility can carry out the transport of the parcels in accordance with control instructions from the control component, the parcels being transported as individual parcels by transport units at the transfer facility.

CZ) System for transferring a plurality of parcels, preferably according to CY, in which it comprises at least one means for controlling the transfer facility, the transfer facility being able to be controlled so as to be transported for delivery at a handover point to a mobile depot facility associated with the handover point.

DA) System for transferring a plurality of parcels preferably according to CZ, in which it includes means for transmitting geographical information to joint optimized handover points to a plurality of depot facilities and/or to transport means for transporting the depot facilities, so that transport of the depot facilities to joint optimized handover points can take place taking into account the geographical information.

DB) System for transferring a plurality of parcels preferably according to CY, in which it has a plurality of depot facilities, at least some of the depot facilities being designed as mobile depot facilities, the system has at least one distribution centre and/or one delivery depot and it has, at the distribution centre and/or the delivery depot, at least one means for transferring the parcels to the transfer facility, the control component is set up in such a way that it can control the transfer facility in such a way that the transfer facility can carry out the transport of the parcels to the depot facilities in accordance with control instructions of the control component, and the control component is further set up in such a way that it can control a transport of the mobile depot facilities from the transfer facility to setup locations as joint optimized handover points for the handover of the parcels.

DC) System for transferring a plurality of parcels preferably according to DB, in which the transport units of the transfer facility are set up to support storage of the parcels in storage positions of storage facilities of the depot facilities.

DD) System for transferring a plurality of parcels preferably according to CY, in which the control component forwards information on parcel identification characteristics to the transfer facility so that storage of the parcels can take place in the storage positions of the storage units of the depot facilities on the basis of the parcel identification characteristics.

EN) Parcel distribution centre comprising means for transporting the parcels one by one, comprising transfer facilities for dispensing the parcels one by one and means for discharging the parcels one by one to the transfer facilities.

DF) Ordering system for processing order requests from customers, wherein the ordering system is set up in such a way that each customer of the ordering system has the option of placing an order for a good and wherein, on the basis of the customer's order, the good is dispatched as a parcel to a recipient, wherein it is linked to a logistics system which has a plurality of possible handover points spatially separated from one another, it has a means for selecting a joint optimized handover point from the plurality of possible handover points for handover to the respective recipients within the planned handover period, and in that it has a depot facility for handover to the recipient at the assigned handover point within the planned handover period.

DG) Method for handing over a plurality of parcels to a plurality of recipients and/or for handing over a plurality of parcels from a plurality of depositors, wherein for a plurality of parcels from a plurality of possible spatially separate handover points, taking into account at least one effort parameter, a joint optimized handover point is determined in each case for handover to the respective recipients and for acceptance by the depositors within a specific handover period, and handover to the recipients and/or acceptance by the depositors takes place at the assigned joint optimized handover point within the planned handover period.

DH) Method for handover of a plurality of parcels to a plurality of recipients and/or for handover of a plurality of parcels from a plurality of depositors preferably according to DG, in which the selection of the joint handover point is made not only by including the effort parameter for the respective recipient and/or for the respective depositor, but also by including effort parameters for further recipients and/or further depositors.

DI) Method for the handover of a plurality of parcels to a plurality of recipients and/or for the handover of a plurality of parcels from a plurality of depositors, preferably according to DG, in which one or more locations indicated for the handover of a parcel by the recipient and/or depositor and/or one or more routes of the recipient and/or depositor are taken into account for the selection of the joint handover point.

DJ) Method for handover of a plurality of parcels to a plurality of recipients and/or for handover of a plurality of parcels from a plurality of depositors preferably according to DG, in which, for the selection of the joint optimized handover point for at least some of the recipients and/or depositors, in each case at least one expected location and/or an expected route selected by a self-learning system for the handover of a parcel to the recipient and/or by the depositor is taken into account, and the handover to the respective recipient and/or the handover by the depositor takes place at the joint optimized handover points taking into account the expected locations and/or expected routes selected by the self-learning system.

DK) Method for the handover of a plurality of parcels to several recipients and/or for the handover of a plurality of parcels from several depositors preferably according to DG, in which the selection of the joint optimized handover point and the handover to the respective recipient and/or the handover by the depositors is carried out taking into account a route distance between the specified staging points, which has been communicated in advance by the recipient and/or by the depositor or is otherwise estimated by a route algorithm.

DL) Method for handover of a plurality of parcels to several recipients and/or for handover of a plurality of parcels from several depositors, preferably according to DG, in which the handover period is shorter than one day, so that daily or even intraday optimisation of the handover points is possible.

DM) Method for handover of a plurality of parcels to a plurality of recipients and/or for handover of a plurality of parcels from a plurality of depositors preferably according to DG, in which the determination of the joint optimized handover point takes place as a multistage process with a plurality of selection steps and before a selection step which takes into account effort parameters for the recipients and/or the depositors, at least one other selection step takes place taking into account at least one suitability parameter and at least one further selection step takes place.

DN) Method for handover of a plurality of parcels to a plurality of recipients and/or for handover of a plurality of parcels from a plurality of depositors, preferably according to DM, in which at least one of the further selection steps takes into account an effort of an operator of the logistics system to provide a depot facility at respective locations.

DO) A method for handover of a plurality of parcels to a plurality of recipients and/or for handover of a plurality of parcels from a plurality of depositors, preferably according to DG, wherein the selection of the joint optimized handover points takes into account that a plurality of the recipients and/or depositors have different locations and/or travel different distances in a first and a second handover period.

DP) Method for handover of a plurality of parcels to a plurality of recipients and/or for handover of a plurality of parcels from a plurality of depositors, preferably in accordance with DG, in which, when determining the joint optimized handover point, a location for a depot facility is optimized in such a way that for as many recipients and/or depositors of parcels as possible, in particular for all recipients of parcels from the respective depot facility and for all depositors of parcels in the respective depot facility for handovers within the planned handover period, a sum of deviations in terms of distance from any route and/or any location is minimised.

DQ) Method for handover of a plurality of parcels to a plurality of recipients and/or for handover of a plurality of parcels from a plurality of depositors, preferably in accordance with DG, in which, when determining the joint optimized handover point, a location for a depot facility is optimized in such a way that for as many recipients and/or depositors of parcels as possible, in particular for all recipients of parcels from the respective depot facility and for all depositors of parcels in the respective depot facility for handovers within the planned handover period, a sum of additional time requirements for deviations from the already route and/or already locations is minimised.

DR) Method for handover of a plurality of parcels to a plurality of recipients and/or for handover of a plurality of parcels from a plurality of depositors, preferably in accordance with DG, in which, when determining the joint optimized handover point, a location for a depot facility is selected in such a way that for the highest possible proportion of recipients and/or depositors of parcels, in particular for all recipients of parcels from the respective depot facility and for all depositors of parcels in the respective depot facility, for handovers within the planned handover period, an additional time requirement for journeys from anyway routes and/or from anyway locations to the handover point does not exceed a certain limit.

DS) Method for handover of a plurality of parcels to a plurality of recipients and/or for handover of a plurality of parcels from a plurality of depositors, preferably according to DG, in which different locations for a depot facility are optimised over a day when determining the joint optimized handover point and the depot facility is in use at the different locations over the day.

DT) Method for handover of a plurality of parcels to several recipients and/or for handover of a plurality of parcels from several depositors, preferably according to DG, in which a variable adaptability of the number and/or the dimensions of compartments of depot facilities is taken into account in a determination of joint optimized handover points for a handover of the parcels to the respective recipients and/or for the delivery by the depositors of the parcels within a certain handover period.

DU) Method for handover of a plurality of parcels to a plurality of recipients and/or for handover of a plurality of parcels from a plurality of depositors preferably according to DG, in which the selection steps refer to different time periods for optimisation.

DV) Method for handover of a plurality of parcels to several recipients and/or for handover of a plurality of parcels from several depositors, preferably accordingly, in which general location properties are taken into account in the first selection step, a long list of all potential locations is transformed by the selection step into a list of locations which are in principle qualified for the handover of parcels, and in the further selection step following the first selection step, those handover points, in particular locations for depot facilities, are determined for which a respective effort parameter for the commissioning of the depot facilities is as low as possible within a handover period for the parcels which is determined as an optimisation period.

DW) Method for handover of a plurality of parcels to a plurality of recipients and/or for handover of a plurality of parcels from a plurality of depositors preferably according to DV, in which in a selection step preceding other selection steps, in particular in the first selection step, locations at which the respective depot facility can be parked are determined and taken into account.

DX) Method for handover of a plurality of parcels to a plurality of recipients and/or for handover of a plurality of parcels from a plurality of depositors preferably in accordance with DG, in which in a third selection step those handover points are determined at which, within a handover period for the parcels preferably determined as an optimisation period, a respective effort parameter for the depositors and/or recipients of parcels at the depot facilities is low.

EA) Method for handing over a plurality of parcels to several recipients and/or for handing over a plurality of parcels from several depositors, preferably in accordance with DG, in which, in addition to the plurality of parcels which are made available at the assigned joint handover point within the planned handover period in the depot facilities for handover to recipients, further parcels are delivered to the depot facilities at the handover point and stored.

EB) Method for handover of a plurality of parcels to a plurality of recipients and/or for handover of a plurality of parcels from a plurality of depositors preferably according to DG, in which for a plurality of parcels at least one of the possible handover points is a location which forms the joint optimized handover point for handover to the respective recipients and/or by the respective depositors, and a depot facility is provided at the joint optimized handover point for joint storage of the plurality of parcels and for handover of the plurality of parcels to the respective recipients of the plurality of parcels and/or for deposit by the respective depositors of the plurality of parcels at the associated joint optimized handover point within the planned handover period.

EC) Method for transferring a plurality of parcels, wherein several of the parcels are transported to a transfer facility and are transported at the transfer facility as individual parcels by transport units.

ED) Method for transferring a plurality of parcels preferably according to EC, in which the parcels are transferred.

EE) Method for transferring a plurality of parcels preferably according to EC, in which the transport of the individual parcels by the transport units takes place taking into account parcel identification characteristics of the individual parcels.

EF) Method for transferring a plurality of parcels preferably according to EC, in which the parcels are transferred by the transport units to storage positions of depot facilities and/or from storage positions of depot facilities.

EG) Method for transferring a plurality of parcels preferably according to EC, in which the parcels are introduced into the depot facilities, that at least some of the depot facilities are designed as mobile depot facilities and that the mobile depot facilities transport the parcels to handover points and that the parcels are stored in the mobile depot facilities and made available for handover to the recipients of the parcels using the depot facilities.

EH) Method for transferring a plurality of parcels preferably according to EC, in which the storage of the parcels in the storage positions of a storage unit of the depot facility takes place taking into account parcel identification characteristics.

EI) Method for transferring a plurality of parcels, preferably in accordance with EC, in which, during a stay of the depot facility at the transfer facility, the following data elements are transmitted to the depot facility in each case for the parcels transferred as individual parcels at the transfer facility:

At least one parcel identification characteristic that is suitable to enable a reliable identification of a respective parcel and information on an identification of the storage position within the storage facility of the depot facility for the storage of the respective parcel.

EJ) Method for transferring a plurality of parcels preferably according to EC, in which the individual parcels are rotated before being transferred to the storage positions so that they have a defined orientation.

EK) Method for transferring a plurality of parcels preferably according to EC, in which the individual parcels are rotated during a stay on a transfer platform of a transport unit.

EL) Method for transferring a plurality of parcels preferably according to EC, in which the individual parcels are rotated during a stay on a conveyor belt.

EM) Method for processing order requests from customers of an ordering system, wherein each customer of the ordering system has the option of placing an order for a good and wherein the good is dispatched as a parcel to a recipient on the basis of the customer's order, wherein a joint optimized handover point for handover to the respective recipient within a specific handover period is determined in each case for a plurality of parcels from a multiplicity of possible spatially separate handover points, taking into account at least one effort parameter, and handover to the recipients takes place at the assigned joint optimized handover point within the planned handover period.

EN) Method for handover of a plurality of parcels which are transported from shippers to recipients by a logistics system, whereby a plurality of parcels are assigned changing proportions of fixed recipient attributes and variable recipient attributes assigned to them respectively in the course of a transport route.

EO) Method for handover of a plurality of parcels which are transported from shippers to recipients by a logistics system, preferably in accordance with EN, in which at least some of the recipient attributes are components of a recipient address depth, the proportion of the fixed recipient attributes which are taken into account in the recipient address depth and are assigned to the parcels in each case being variable in a time sequence of individual production stages of a logistics company from handover by the shipper to final handover to the recipient.

EP) Method for handover of a plurality of parcels transported from shippers to recipients by a logistics system, preferably according to EO, in which components of the recipient address depth are leading digit of a postcode and further digits of the postcode.

EQ) Method for handover of a plurality of parcels transported from shippers to recipients by a logistics system, preferably according to EO, in which a street and/or a street section or a house number and/or a flat number are components of the recipient address depth.

ER) Method for handover of a plurality of parcels transported from shippers to recipients through a logistics system, preferably according to EO, in which joint optimized handover points are components of the recipient address depth.

ES) Method for handover of a plurality of parcels transported from shippers to recipients by a logistics system preferably according to EO, in which individual handover points are components of the recipient address depth.

ET) Method for handover of a plurality of parcels transported from shippers to recipients by a logistics system preferably according to EN, in which a control component of the logistics system receives instructions from the shippers via an interface for receiving instructions from the shippers, the instructions of the respective shippers each contain at least one instruction for defining further or modified variable recipient attributes of at least one selected parcel, and the logistics system carries out at least one processing operation of the selected parcel taking into account the further or modified variable recipient attributes assigned to the selected parcel, which thereby become fixed recipient attributes.

EU) Method for handover of a plurality of parcels transported from shippers to recipients by a logistics system preferably according to EN, in which a parcel identification code is used to identify the selected parcel, and that at least one subsequent processing operation of the parcel is carried out both taking into account the further or modified recipient attribute assigned to the selected parcel and taking into account the parcel identification code.

EV) Method for handover of a plurality of parcels transported from shippers to recipients through a logistics system preferably according to the EU, wherein the parcel identification code contains at least one shipper identification characteristic identifying the shipper.

EW) Method for handover of a plurality of parcels transported from shippers to recipients by a logistics system preferably according to EU, in which the parcel identification code is stored as a primary parcel identification characteristic, that at least one secondary parcel identification characteristic different from the primary parcel identification characteristic is assigned to the parcel, and that at least one processing operation of the parcel is carried out on the basis of the secondary parcel identification characteristic.

EX) Method for handover of a plurality of parcels transported from shippers to recipients through a logistics system, preferably according to EU, in which the secondary parcel identification characteristic is easier and/or faster to identify than the primary parcel identification characteristic.

EY) Method for handover of a plurality of parcels transported from shippers to recipients through a logistics system, preferably according to EU, in which both the parcel identification code and at least one fixed recipient attribute and/or at least one of the variable recipient attributes are assigned to a digital twin of the parcel.

EZ) Method for handover of a plurality of parcels transported from shippers to recipients by a logistics system, preferably according to EN, in which the processing operations are supplemented by a provision of process protocols, including individual process protocols for the individual parcels, and the process protocols are used for controlling the processing operations.

FA) Method for handover of a plurality of parcels transported from shippers to recipients by a logistics system preferably according to EN, in which at least one of the subsequent processing operations of the parcel is performed taking into account at least one of the variable recipient attributes:

Deposit of parcels;
Selection procedure (determination procedure) for determining a joint optimized handover point for several recipients and/or depositors;
Sorting in distribution centres;
Sorting at logistical nodes;
Routing in the area of a node of the logistics system;
Transport between distribution centres;
Transport between distribution centres and logistical nodes;
Transport between logistical nodes;
Sorting in delivery depots:
Loading of depot facilities;
autonomous and/or semi-autonomous transport to joint optimized handover points;
autonomous and/or semi-autonomous transport to individual handover points;
Handover of a plurality of parcels at a joint optimized handover point within a handover period;
Handover of parcels at individual handover points;
Acceptance of multiple parcels at a joint optimized handover point within a handover period;
Acceptance of parcels at an individual handover point;
Use of depot facilities for the storage of parcels;
Use of depot facilities for the acceptance of parcels;
Use of depot facilities for commisioning parcels;
Use of depot facilities for the handing out of parcels; and
Use of depot facilities as sales facilities.

FB) Logistics system for handover of a plurality of parcels, the logistics system being set up in such a way that it can hand over parcels from a plurality of senders to a plurality of recipients, and the logistics system being further set up in such a way that it can carry out at least one processing operation on the parcels on the basis of a parcel identification code assigned in each case to the parcels, the parcels each having at least one recipient attribute, a control component of the logistics system has an interface for receiving recipient attributes of the parcels, the control component has a means for determining positions of the parcels in the course of their transport path, and the control component is further set up in such a way that it can assign to the plurality of parcels, in the course of the transport path of the respective parcels, as a function of the positions of the parcels, changing proportions of fixed recipient attributes and variable recipient attributes assigned to them in each case.

FC) Use of the logistics system preferably according to FB to perform a procedure for handover of a plurality of parcels according to EN.

FD) Use of the logistics system preferably according to FB for flexible assignment of a final recipient and/or a final handover point.

FE) Use of the logistics system preferably according to FB, where the final handover point is a joint optimized handover point for handover to the final recipient.

FF) Use of the logistics system preferably according to FB, where the final handover point is an individual handover point for the handover to the final recipient.

FG) Method for handover of a parcel to a recipient and/or for handover by a depositor, wherein a parcel identification code is assigned and/or recorded for the parcel and is then stored as a primary parcel identification characteristic, at least one secondary parcel identification characteristic different from the primary parcel identification characteristic is assigned to the parcel and at least one processing operation of the parcel is carried out on the basis of the secondary parcel identification characteristic.

FH) Method for handover of a parcel to a recipient and/or for handover by a depositor, preferably in accordance with FG, in which the parcel identification code is formed by a logistics system or a control component of the logistics system from at least one characteristic of the parcel transmitted by the shipper, this characteristic being such that it is detected during at least one of the processing operations of the parcel and is taken into account during the processing of the parcel.

FI) Method for handover of a parcel to a recipient and/or for handover by a depositor, preferably in accordance with FG, in which the parcel identification code is formed by a logistics system or a control component of the logistics system from at least two characteristics of the parcel transmitted by the shipper, these characteristics being such that they are recorded jointly in at least one of the processing operations of the parcel and that the parcel identification code is taken into account in at least one processing operation of the parcel.

FJ) Method for handover of a parcel to a recipient and/or for handover by a depositor preferably according to FG, in which the secondary parcel identification characteristic is easier and/or faster to identify than the primary parcel identification characteristic.

FK) Method for handover of a parcel to a recipient and/or for handover by a depositor preferably according to FG, in which the secondary parcel identification characteristic is used alone or in combination with further secondary parcel identification characteristics for checking a correctness that a parcel is the parcel identified by the primary parcel identification characteristic and/or for controlling a further processing operation.

FL) Method for handover of a parcel to a recipient and/or for handover by a depositor preferably according to FG, in which the primary parcel identification characteristic is used to form a digital twin of the parcel and at least one of the secondary parcel identification characteristics is assigned to a digital twin of the parcel.

FM) A method of handover of a parcel to a recipient and/or handover by a depositor preferably according to FG, in which the parcel identification code is a physical code or combination of physical codes directly associated with the parcel and is readable.

FN) Method for handover of a parcel to a recipient and/or for handover by a depositor, preferably according to FG, in which a primary parcel identification characteristic is checked by means of a readable data carrier of a shipper connected to the parcel and the primary parcel identification characteristic is taken into account in at least one processing operation of the parcel.

FO) Method for handover of a parcel to a recipient and/or for handover by a depositor, preferably according to FG, in which at least one of the following properties of a parcel is recorded as a secondary parcel identification characteristic and is taken into account when carrying out at least one processing operation:

- Weight of the parcel;
- Dimensions of the parcel;
- Shape of the parcel;
- Shipper identification characteristics;
- Picture of the parcel;
- Colour of the parcel;
- Data contents of a readable data carrier;
- Information about one or more completed processing operations;
- spectroscopic response of the parcel.

FP) Method for handover of a parcel to a recipient and/or for handover by a depositor, preferably according to FG, in which at least one of the following processing operations of the parcels is carried out taking into account at least two parcel identification characteristics which are different from one another:

- Deposit of parcels;
- Selection procedure (determination procedure) for determining a joint optimized handover point for several recipients and/or depositors;
- Sorting in distribution centres;
- Sorting at logistical nodes;
- Routing in the area of a node of the logistics system;
- Transport between distribution centres;
- Transport between distribution centres and logistical nodes;
- Transport between logistical nodes;
- Sorting in delivery depots;
- Loading of depot facilities;
- autonomous and/or semi-autonomous transport to joint optimized handover points;
- autonomous and/or semi-autonomous transport to individual handover points;
- Handover of a plurality of parcels at a joint optimized handover point within a handover period;
- Handover of parcels at individual handover points;
- Acceptance/delivery of multiple parcels at a joint optimized handover point within a handover period;
- Acceptance/delivery of parcels at an individual handover point;
- Use of depot facilities for the storage of parcels;
- Use of depot facilities for the acceptance of parcels;
- Use of depot facilities for commisioning parcels;
- Use of depot facilities for the handing out of parcels; and
- Use of depot facilities as sales facilities.

FQ) Method for handover of a parcel to a recipient and/or for handover by a depositor, preferably according to FG, in which at least two of the following processing operations of the parcels are carried out taking into account at least two parcel identification characteristics which are different from one another:

- Deposit of parcels;
- Selection procedure (determination procedure) for determining a joint optimized handover point for several recipients and/or depositors;
- Sorting in distribution centres;
- Sorting at logistical nodes;
- Routing in the area of a node of the logistics system;
- Transport between distribution centres;
- Transport between distribution centres and logistical nodes;
- Transport between logistical nodes;
- Sorting in delivery depots;
- Loading of depot facilities;
- autonomous and/or semi-autonomous transport to joint optimized handover points;
- autonomous and/or semi-autonomous transport to individual handover points;
- Handover of a plurality of parcels at a joint optimized handover point within a handover period;
- Handover of parcels at individual handover points;
- Acceptance of multiple parcels at a joint optimized handover point within a handover period;
- Acceptance of parcels at an individual handover point;
- Use of depot facilities for the storage of parcels;
- Use of depot facilities for the acceptance of parcels;
- Use of depot facilities for commisioning parcels;
- Use of depot facilities for the handing out of parcels; and
- Use of depot facilities as sales facilities.

FR) Method for handover of a parcel to a recipient and/or for handover by a depositor preferably according to FG, in which two secondary parcel identification characteristics different from each other are used for the identification of the parcel.

FS) Method for handover of a parcel to a recipient and/or for handover by a depositor preferably according to FG, in which a handover of a parcel by a depositor includes at least one of the following method steps:

- Detection of at least one of the parcel identification characteristics, if necessary also by a user component;
- Handover of the parcel to a handover unit and/or a handover gate;
- Transport of the parcel to the depot facility;
- Transport of the parcel to a storage position of a storage unit of the depot facility.

FT) Method for handover of a parcel to a recipient and/or for handover by a depositor preferably in accordance with FG, in which, after the parcel identification code or other parcel identification characteristics which permit unambiguous/reliable identification of a parcel have been determined and/or determined, a controlled and/or measured transport route and/or sorting route of the parcel is planned and/or tracked, so that a subsequent processing operation of the parcel, in particular a sorting of the parcel and/or a transport of the parcel is carried out on the basis of a combination of the previously determined parcel identification code and/or parcel identification characteristic with a determination of another, preferably more easily and/or more quickly measurable secondary parcel identification characteristic as precisely as is the case with a determination of the parcel identification code itself.

FU) Method for handover of a parcel to a recipient and/or for handover by a depositor, preferably in accordance with FG, in which the parcels are assigned to predetermined storage positions of a depot facility on the basis of at least one of the parcel identification characteristics.

FV) Method for handover of a parcel to a recipient and/or for handover by a depositor, preferably in accordance with FG, in which at least some of the processing operations are supplemented by the provision of process protocols, advantageously including individual process protocols for individual parcels, and/or process protocols provided are used for controlling processing operations.

FW) Logistics system for handover of a plurality of parcels to a plurality of recipients and/or for receipt of a plurality of parcels from a plurality of depositors, which can perform at least one of the following processing operations on objects, in particular parcels:
Handover, in particular depositing and/or handing out;
Transport;
Sorting;
Storage;
Commissioning;
wherein the logistics system is set up in such a way that it can assign at least two mutually different parcel identification characteristics to the parcels, wherein the logistics system can carry out the processing operations of the parcels on the basis of the parcel identification characteristics, the logistics system can carry out at least one processing operation of the parcels on the basis of a primary parcel identification characteristic, and the logistics system can carry out at least one further processing operation of the parcels on the basis of a secondary parcel identification characteristic.

FX) Logistics system for handover of a plurality of parcels to a plurality of recipients and for receipt of a plurality of parcels from a plurality of depositors, which can perform at least one of the following processing operations on objects, in particular parcels:
Handover, in particular depositing and/or handing out,
Transport,
Sorting,
Storage,
Commissioning;
the logistics system being able to carry out the processing operations of the parcels on the basis of parcel identification characteristics, the logistics system being set up in such a way that it can in each case assign at least one parcel identification code to the parcels, the parcel identification code or at least one component of the parcel identification code being used for unambiguous identification of the parcel, the parcel identification code or at least one component of the parcel identification code is a primary parcel identification characteristic, the logistics system can carry out at least one processing operation of the parcels using the primary parcel identification characteristic, and the logistics system can carry out at least one further processing operation of the parcels using a secondary parcel identification characteristic.

BRIEF DESCRIPTION OF THE DRAWINGS

FIG. 30 a flowchart for the creation of a prior art shipping label;

DETAILED DESCRIPTION OF THE DRAWINGS

Introduction

The present application relates to various inventions which are linked by the joint concept of carrying out processing operations on objects as far as possible automatically and preferably also without contact.

The present application includes, in particular, inventions having at least one of the following characteristics:

- contactless handover of parcels;
- handling of parcels based on at least one parcel identification characteristic;
- Handover of a plurality of parcels at a joint optimized handover point within a handover period;
- Selection procedure (determination procedure) for determining the joint optimized handover point;
- Use of depot facilities for the storage of parcels;
- Use of depot facilities for sorting parcels;
- Use of depot facilities for the picking of parcels;
- Use of depot facilities as vending facilities.

Figure 5:
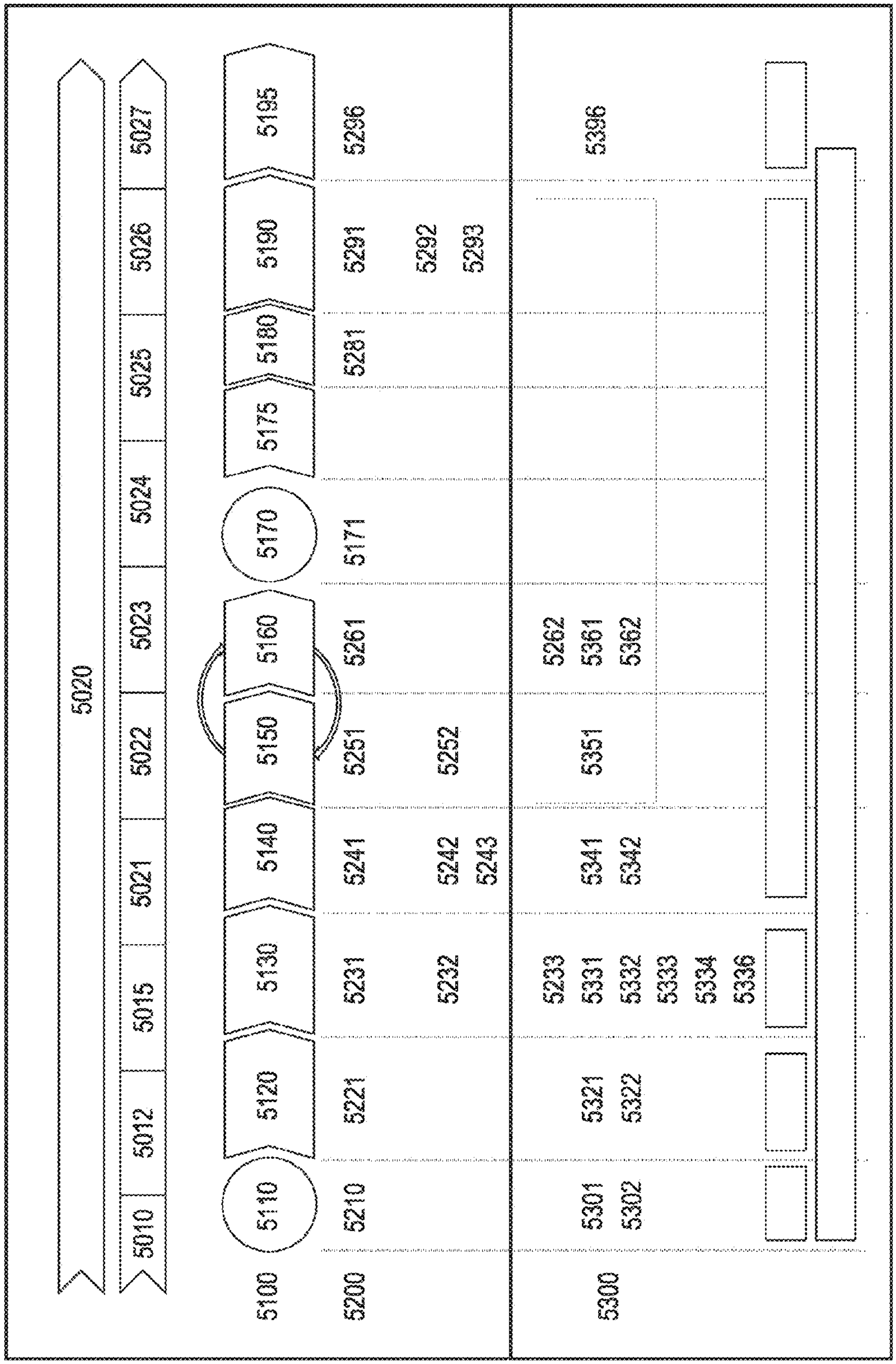
FIG. 5 A schematic diagram of a logistics system according to the invention.

It is possible to combine these characteristics with each other, whereby it is particularly advantageous to implement a logistics system based on the system according to the invention, as exemplified in FIG. 5, which increases the flexibility, efficiency and reliability of processing operations of parcels by using several combinations of characteristics as parallel as possible.

Preferably, at least some of the parcels are transferred at the joint optimized handover points shown in this application. However, the advantageous parcel processing operations and parcel processing systems disclosed in this application are not limited to parcel processing embodiments in which handovers of parcels occur at joint optimized handover points.

Even though the inventions enable handling operations of conventional parcels, it is possible to additionally and/or instead handle objects as parcels that cannot be handled as parcels in conventional logistics systems. As already disclosed in the introductory part, the present application further includes a handling of objects with certain minimum dimensions, maximum dimensions, minimum weights and maximum weights as parcels, wherein the respective handling means are adapted to the reference quantities: Minimum dimensions, Maximum dimensions, Minimum weights and Maximum weights can be adapted. It is possible to process objects of daily use such as consumables or foodstuffs as well as technical objects and equipment as parcels, whereby, as already entered in the introductory part, the parcels can be unpackaged objects, packaged objects and repackaged objects, whereby in the case of packaged and repackaged objects the parcel comprises the packaging or repackaging and the object packaged therein. Likewise, it is appropriate to process unpackaged objects, in particular commodity objects, according to the invention. Mail items as well as advertising materials and brochures are also parcels within the meaning of this application.

Preferred handover points of a corresponding logistics system are shown in FIGS. 1, 2, 3, 4 and 7. The handover points shown there are in particular joint optimized handover points for handover to the respective recipients and/or for receipt from the depositors, preferably within a certain handover period.

Preferably, several handover points are locations for depot facilities. Preferred designs of the depot facilities and their loading or unloading are shown in FIGS. 8, 9, 10, 11*a*, 11*b*, 11*c*, 11*d*, 14, 15, 16*c*, 16*d*, 17, 18, 19, 21, 22, 23, 24, 25, 26, 27, 28, 29, 31, 32, 33, 34, 35, 36, 37, 43, 43*a* and 43*b*.

FIGS. 1 to 7 show a preferred system and method for handover of a plurality of parcels to multiple recipients.

In the following, advantageous embodiments of a method for handover of a plurality of parcels to a plurality of recipients and/or for delivery of a plurality of parcels from a plurality of depositors are explained on the basis of these illustrations.

Logic of Joint Optimized Handover Points

FIG. 1

Figure 1:
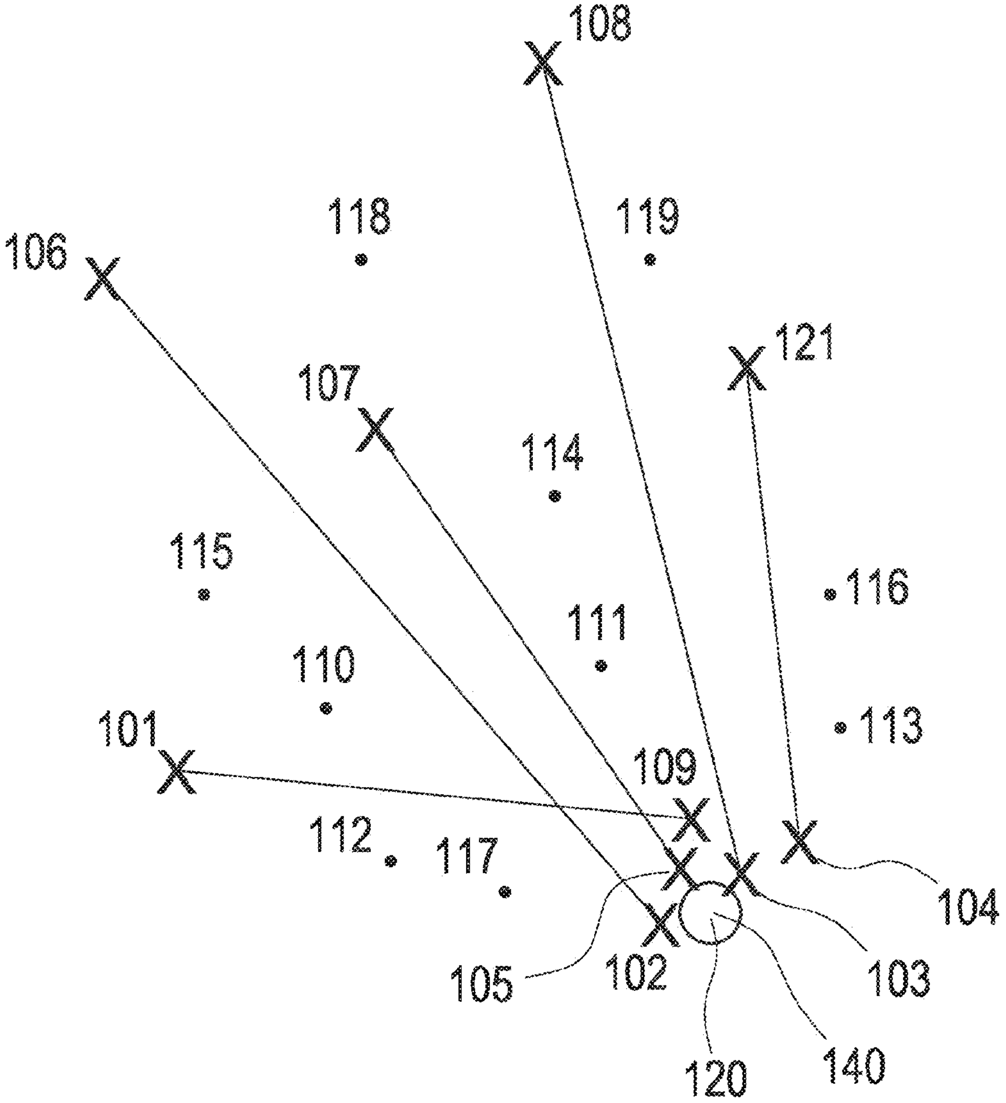
FIG. 1 A schematic diagram of handover points for delivering parcels to recipients according to the invention.

FIG. 1 shows a principle diagram in which a recipient of a parcel moves between a location 101 and a location 109, another recipient moves between a location 106 and a location 102, a third recipient moves between a location 108 and a location 103, and another recipient moves between a location 104 and a location 121.

In this case, location 120 is selected as the optimised joint handover point 120 for a handover of parcels to the aforementioned recipients—and thus as the handover point—because locations 102, 105, 109, 104 and 103 are in the immediate vicinity of handover point 120, so that all of the aforementioned recipients are in the vicinity of handover point 120 at least once within the handover period and a handover of parcels at this joint optimized handover point can take place with the least possible effort for the recipients.

In a particularly preferred embodiment of the invention, the handover point 120 is a location for any mobile depot facility 140.

The aforementioned considerations also apply analogously if the aforementioned persons, instead of taking parcels at the handover point, deliver parcels at the handover point. This selection procedure (optimisation procedure) is therefore equally appropriate for the handover of parcels to recipients as well as for the delivery of parcels by depositors.

FIG. 2

Figure 2:
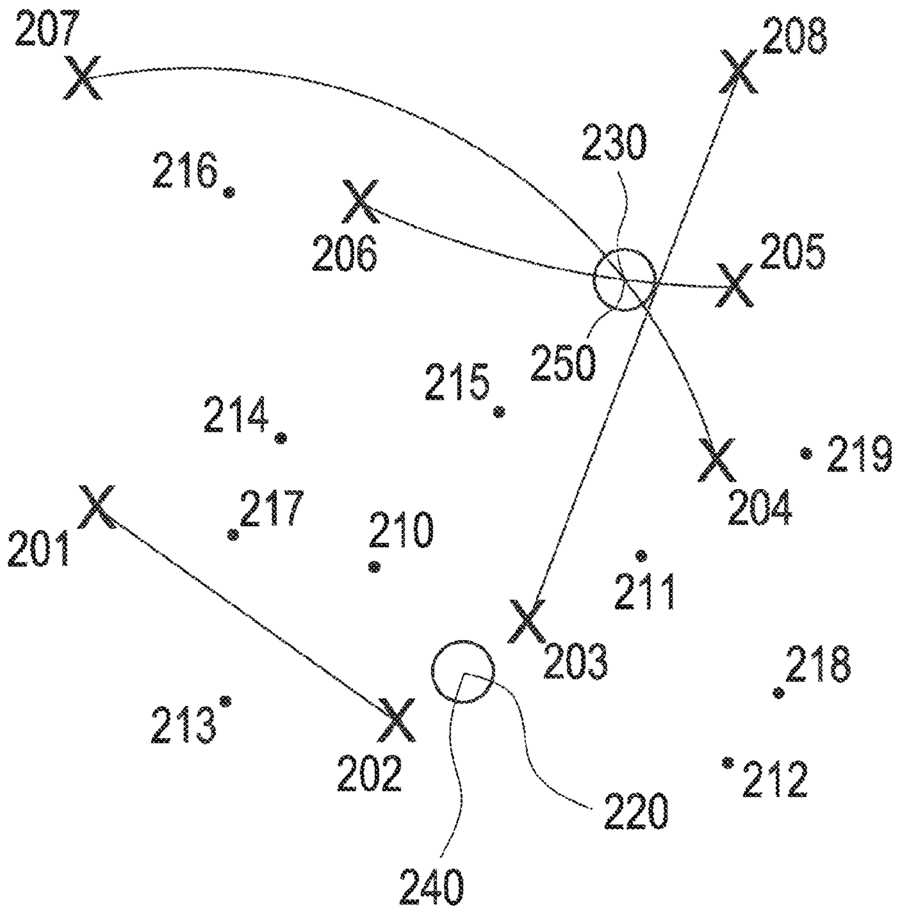
FIG. 2 A principle representation of handover points for a delivery of parcels to recipients according to the invention.

FIG. 2 shows a principle diagram in which one recipient of a parcel moves between a location 201 and a location 202, with another recipient moving between a location 203 and a location 208, a third recipient moves between a location 207 and a location 204, and another recipient moves between a location 206 and a location 205.

As this example shows, it is not possible here to determine an optimised joint handover point for a handover to all recipients because the time required for at least individual recipients is very high, which corresponds exemplarily to a high—unfavourable—effort parameter for at least individual recipients and thus a high averaged effort parameter for all recipients.

In this case, a joint optimized handover point 220 is selected for a handover of parcels to the recipients moving between locations 201 and 202 and the recipients moving between locations 203 and 208 because locations 202 and 203 are in close proximity to handover point 220 so that all of these recipients are in close proximity to handover point 220 and a handover of parcels at this joint optimized handover point can be performed with the least possible effort for these recipients.

Furthermore, in this case, a joint optimized handover point 230 is selected for a handover of parcels to the recipients moving between locations 205 and 206 and the recipients moving between locations 207 and 204, because routes between these locations are in the immediate vicinity of the handover point 230, so that the routes of all these recipients run in the vicinity of handover point 230 and a handover of parcels at this joint optimized handover point 230 can be carried out with the least possible effort for these recipients.

In a particularly preferred embodiment of the invention, the handover point 220 is the location for a mobile depot facility 240, if applicable. Furthermore, it is appropriate that a mobile depot facility 250 is also located at the handover point 230. In this case, the duration of stay of mobile depot facilities at the respective handover point 220 or 230 corresponds to the handover period.

In the embodiment shown in FIG. 2, for the recipient/depositor moving between handover points 203 and 208, instead of the joint optimized handover point 220 selected here, handover at the joint, equally optimized handover point 230 is also possible as an alternative. This example shows that in addition to the parameters described so far for the selection of joint optimized handover points, further aspects can advantageously be taken into account, such as capacity planning for the depot facilities at the respective handover points.

Also included in the invention are appropriate embodiments in which a single depot facility is used for the handover of parcels at the two handover points 220 and 230. In this case, the depot facility is located at a first handover point 220 in a first handover period and at the second handover point 230 in a second handover period. In this case, it is appropriate that the movement (transport) of the depot facility is controlled by the logistics system shown in FIG. 5.

All of the aforementioned considerations also apply analogously if the aforementioned persons deliver parcels to a handover point, in particular to a depot facility, instead of removing parcels at a handover point. This selection procedure (optimisation procedure) for determining joint optimised handover points is therefore equally appropriate for the handover of parcels to recipients as well as for the delivery of parcels by depositors.

FIG. 3

Figure 3:
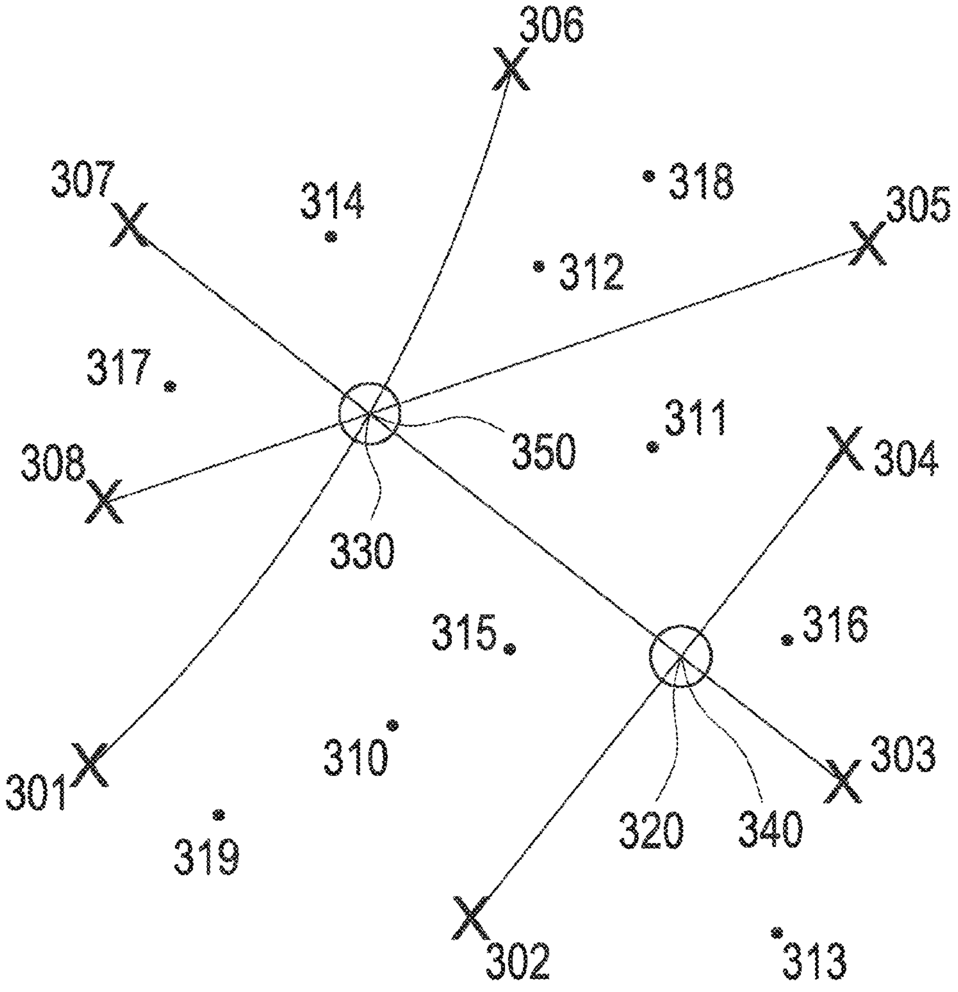
FIG. 3 A principle illustration of handover points for handing over parcels to recipients according to the invention.

FIG. 3 shows a principle representation of a selection of two joint optimized handover points 320 and 330 from a plurality of possible spatially separated handover points 310, 311, 312, 313, 314, 315, 316, 317, 318, 319, 320, 330, where one recipient of a parcel moves between a location 301 and a location 306, another recipient moves between a location 303 and a location 307, a third recipient moves between a location 308 and a location 305, and another recipient moves between a location 302 and a location 304.

Also included in the invention are appropriate embodiments in which a single depot facility is used for the handover of parcels at the two handover points 320 and 330. In this case, the depot facility is located at a first handover point 320 and at a second handover point during a first handover period. In this case, it is appropriate that the movement (transport) of the depot facility is controlled by the logistics system shown in FIG. 5.

The aforementioned considerations also apply analogously if the aforementioned persons, instead of taking parcels at the handover point, deliver parcels at the handover point. This selection procedure (optimisation procedure) is therefore equally appropriate for the handover of parcels to recipients as well as for the delivery of parcels by depositors.

As this example shows, it is less possible here to determine a joint optimized handover point for a handover to all recipients, since the time required for at least individual recipients is very high, which corresponds, as an example, to a high—unfavourable—effort parameter for at least individual recipients and thus a high averaged effort parameter for all recipients.

If the averaged effort parameter is the decision criterion for selecting handover points, a joint optimized handover point 320 is selected for a handover of parcels to the recipients moving between locations 302 and 204 and the recipients moving between locations 303 and 307, because the handover point 320 is in close proximity to the handover paths between these locations, so that a handover of parcels at this joint optimized handover point 320 can take place with the least possible effort for all recipients travelling paths that are in the vicinity of the handover point 320.

Furthermore, in this case, a joint optimized handover point 330 is selected for a handover of parcels to the recipients moving between locations 301 and 306 and the recipients moving between locations 307 and 303, as well as for the recipients moving on a route between locations 305 and 308, because routes between these locations are in the immediate vicinity of the handover point 330, so that the routes of all these recipients run in the vicinity of the handover point 330 and a handover of parcels at this joint optimized handover point 330 can be carried out for these recipients with the least possible effort.

In a particularly preferred embodiment of the invention, the handover point 320 is the location for any mobile depot facility 340. Furthermore, it is appropriate that a mobile depot facility 350 is also located at the handover point 330. The handover period for the handover of parcels by mobile depot facilities at the respective handover point 320 or 330 corresponds as far as possible to the duration of stay of the mobile depot facility or facilities at the respective handover point 320 or 330.

In the embodiment shown in FIG. 3, for the recipient/depositor moving between handover points 303 and 307, instead of the joint optimized handover point 320 selected here, handover at the joint, equally optimized handover point 330 is also possible as an alternative. This example shows that in addition to the parameters described so far for the selection of joint optimized handover points, further aspects can advantageously be taken into account, such as capacity planning for the depot facilities at the respective handover points.

FIGS. 1-3 show an example of the invention in use for a small number of recipients. These are individual illustrations of partial aspects of the invention. The present invention is particularly suitable for a handover of several thousand parcels and, in a corresponding expansion stage, for a handover of several million parcels in one day.

FIGS. 4*a*, 4*b*, 4*c* and 4*d*

FIGS. 4*a*, 4*b*, 4*c* and 4*d* show schematic maps to illustrate the geographical layout of the handover points shown in FIGS. 1-3.

FIGS. 4*a*, 4*b*, 4*c* and 4*d* show the use of the invention in an idealised city.

Each city has a variety of possible handover points 401, 410, 415, 420, 480 and 495. In the illustrated embodiment, location 495 is in a car park of a highway tangent to the city; in the illustrated case, without restriction to the general public in the outbound direction of the city.

Figure 4A:
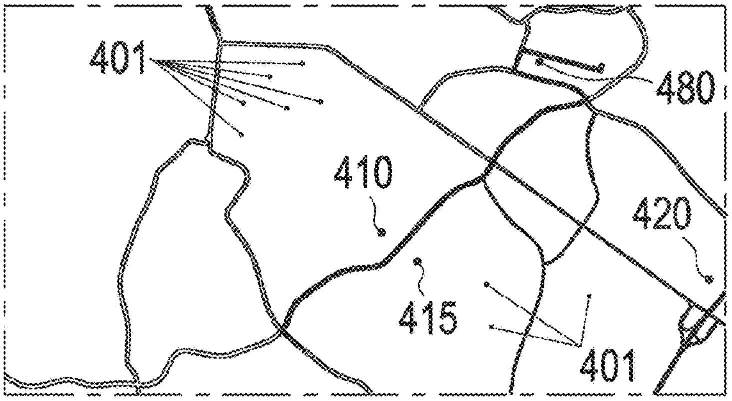
FIG. 4*a*, 4*b*, 4*c*, 4*d* Maps illustrating the geographical layout of the handover points shown in FIGS. 1-3.
Figure 4B:
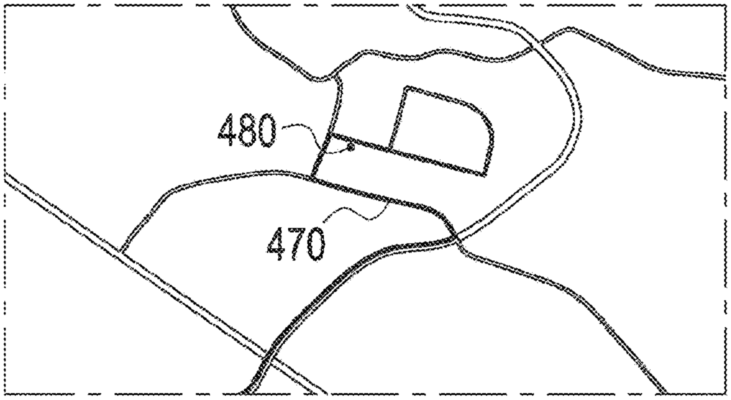

FIG. 4*b*, a detail of FIG. 4*a*, in this case the upper middle part of 4*a*, shows an application of the invention for a handover period during daytime hours of a working day, for example a Friday.

Figure 4C:
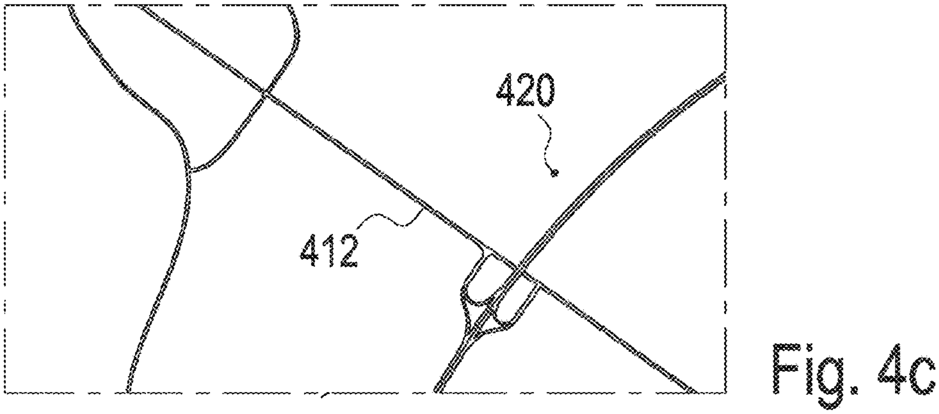

FIG. 4*c*, also a section of FIG. 4*a*, here on the right-hand side, shows an application of the invention for a handover period at times of day of any day and, if necessary, also without time interruption 24/7.

Figure 4D:
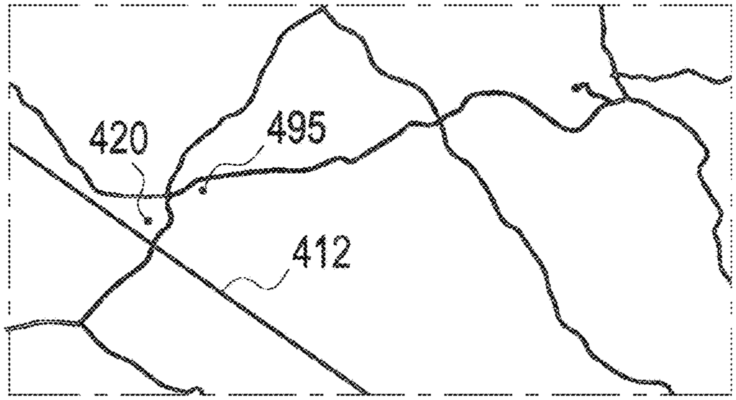

FIG. 4*d* shows an implementation of the invention with an idealised map of a trunk road, in which the idealised city shown in FIGS. 4*a*, 4*b* and 4*c* is located in the left-hand area and in which a route running over possibly several motorways is shown as a solid line and in which this route is also a route within the meaning of this application.

On weekdays, many people drive into or around the city on a ring road, which is marked by a dark line in FIG. 4*a*. An arterial road 412 shown in FIG. 4*c* and FIG. 4*d* is used extensively on both weekdays and weekends.

The ring road runs in sections near a zoo that is sparsely visited on weekdays. The zoo has its own large car parks. Only when these parking spaces are almost fully used do visitors to the zoo park on sections of the Ring Road located near the zoo, for example in parking space 410 shown in FIG. 4*a*.

Unless Friday is a public holiday, the zoo has few visitors and none of the zoo's visitors use parking spaces other than the zoo's car parks. The ring road therefore has plenty of free parking spaces on weekdays. Car park 410 is always free on weekdays and even on weekends a depot facility or a logistics vehicle containing the depot facility can be parked in car park 410 if it arrives at an early hour.

Figure 6:
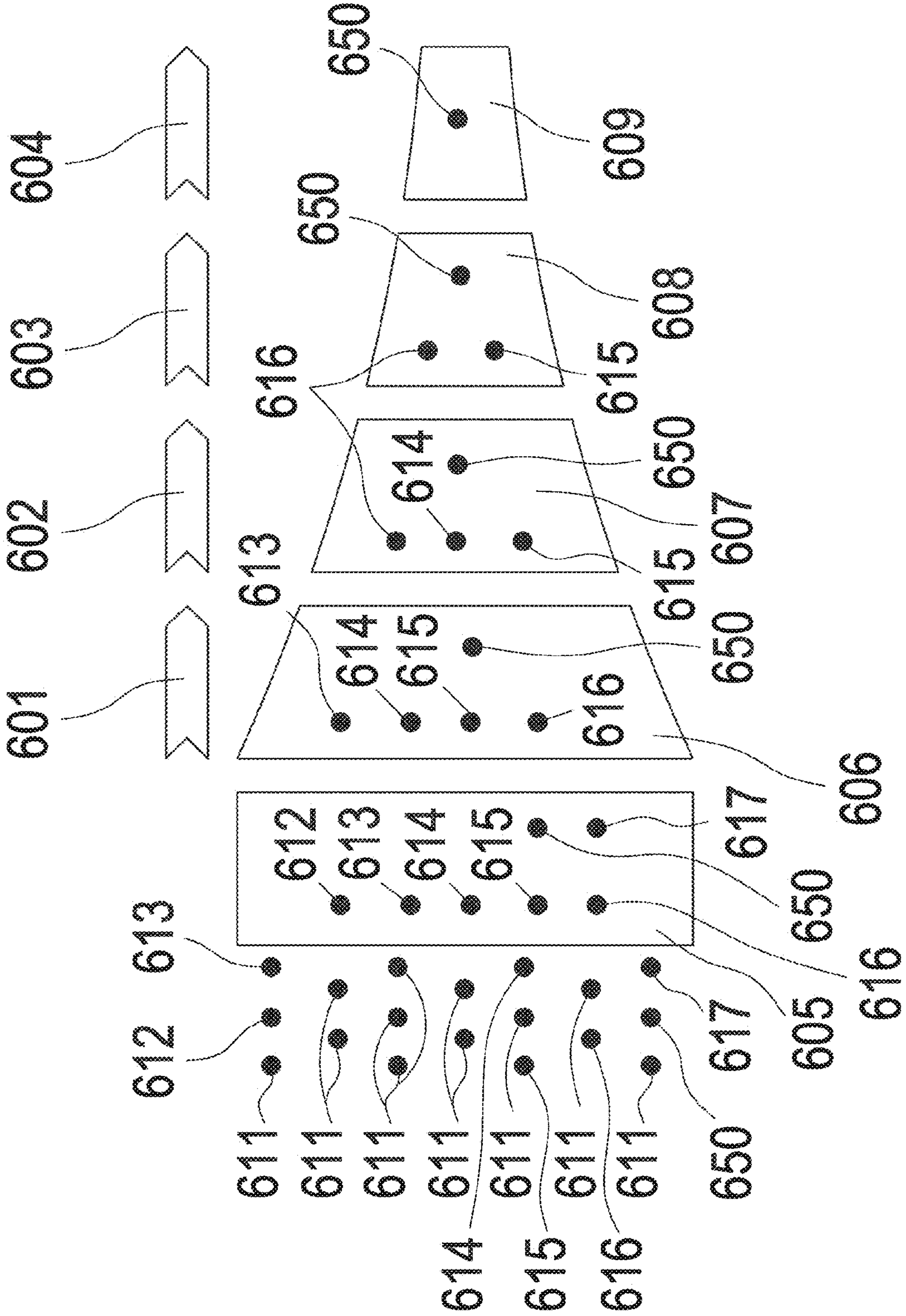
FIG. 6 A schematic diagram of a selection procedure according to the invention for joint optimized handover points for a plurality of parcels.

In the method according to the invention, it is established—for example in method steps such as those exemplified by FIG. 6—that therefore both the handover point 410 and, in the case of parking spaces directly adjacent thereto, at least one suitable handover point 410 for parcels are located on the ring road. The handover point 410 is therefore particularly advantageous because it is directly adjacent to further parking spaces. For users of public transport, the handover point 410 can only be used to a limited extent because on weekdays only a few people get on or off at the bus stop of the local bus company located in the immediate vicinity.

Another suitable handover point for parcels is handover point 480, which is located in a publicly accessible car park directly in front of an industrial site. It is equally easily accessible for users who reach the industrial site by bicycle as well as for people who use motor vehicles. It is also a suitable handover point for public transport users, as it is located in the immediate vicinity of a bus stop for several lines, just like handover point 410. Due to its proximity to several industrial sites and numerous companies located there, the nearby bus stop is intensively used as a boarding stop, respectively as an alighting stop, from the early morning hours until the late evening hours.

Another joint optimized handover point for the handover of numerous parcels is handover point 420, which is located on the premises of a DIY store. Furthermore, this handover point 420 is very easy to reach for commuters, as it is located in the immediate vicinity of the arterial road 412 connecting the city centre with outer residential areas. Furthermore, it is used by customers of the DIY store and adjacent shops as well as visitors of a nearby police headquarters. The aforementioned facilities are also used by users of public transport, in particular with the use of a bus stop extensively used accordingly as a boarding and alighting stop.

It is appropriate, in particular on weekdays, to use the aforementioned handover points 410, 420 and 480 as locations for depot facilities 140, 240, 250, 340, 350, 1710,1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322.

An equally advantageous embodiment of the invention provides that a depot facility is located at at least one, possibly also several, handover points, which is used not only for a handover of parcels transported via the logistics system, but also for the handover of goods objects by the depot facility.

In this case, flexible use of the depot facility 140, 240, 250, 340, 350, 1710,1720, 1730, 1810,1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 to a variable extent, if necessary, for the handover of parcels transported via the logistics system and for parcels transported by the depot facility 140, 240, 250, 340, 350, 1710,1720, 1730, 1810, 1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322.

Such use of the depot facility located at the handover point 420 is not only possible on a Friday, as in the case shown, but also on other days.

In equally advantageous embodiments of the invention, a handover period for handover to the recipients and/or receipt from the depositors at the associated joint optimized handover point begins on Saturday morning and ends, by way of example, on Saturday evening or Sunday evening.

For this handover period, the optimisation method according to the invention results in other joint optimized handover points 410, 415, 420, 495 for a handover of parcels than the joint optimized handover points 410, 420, 480, 495 for a handover period starting, for example, early on a working day and ending on the same working day.

The handover point 410 may also be well used on weekends for setting up a depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 are used because the expected arrival time of the depot facility to reach the highest possible number of potential recipients or depositors of parcels is before usual arrival times of visitors to the zoo.

However, handover point 410 is not very suitable on Saturdays and Sundays for a handover of parcels to recipients who use cars, as they have little chance of reaching a parking space near handover point 410 due to the car park occupancy shown earlier.

For the handover of especially lighter parcels to cyclists or to the users of the nearby bus stop, the handover point 410 is also suitable on Saturdays and Sundays, as many of these people pass the handover point 410 on their way from the animal park to their home or another place they want to visit.

Provided there is a sufficient number of recipients and/or depositors of parcels passing the handover point 410 by bicycle or public transport, the handover point 410 is also suitable as a location for a mobile depot facility at weekends.

For motorists, handover point 410 is less suitable at weekends due to the lack of parking facilities in the immediate vicinity.

However, it is possible to provide a further joint optimized handover point 415 at a farm with out-of-home sales as an alternative to the handover point 410 or—if a depot facility 410 is used to capacity by users of public transport and cyclists—in addition to a depot facility at the location 410. Here, the car park of this farm is an optimized handover point 415 and preferably a location for a depot facility according to the invention 140, 240, 250, 340, 350, 1710, 1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 or optionally for several depot facilities.

Handover point 480, which is particularly suitable on weekdays, is less suitable for use at weekends, as the routes and staging areas adjacent to it are hardly used at weekends.

As previously illustrated, at weekends the handover point 420 is a particularly suitable joint optimized handover point. Since a high demand of parcel transfers is expected in the area of handover point 420 at weekends, it is possible to have at handover point 420 not only a depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322, but possibly also several depot facilities. It is also appropriate to use the depot facility 140, 240, 250, 340, 350, 1710,1720, 1730, 1810, 1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322, for a handover of goods objects.

The aforementioned considerations also apply analogously if the aforementioned persons, instead of taking parcels at the handover point, deliver parcels at the handover point. This selection procedure (optimisation procedure) is therefore equally appropriate for the handover of parcels to recipients as well as for the delivery of parcels by depositors.

The figures further show that for the parcels from a plurality of possible spatially separated handover points 110, 111, 112, 113, 114, 115, 116, 117, 118, 119, 120, 210, 211, 212, 213, 214, 215, 216, 217, 218, 219, 220, 230, 240, 310, 311, 312, 313, 314, 315, 316, 317, 318, 319, 320, 330, 611, 612, 613, 614, 615, 616, 617, 650, 710, 711, 712, 713, 714, 714, 715, 716, 716, 717, 718, 719, 720, an associated handover point 120, 220, 230, 320, 330, 410, 415, 420, 495, 650, 720 is determined in each case for the handover to the respective recipient within a specific handover period, taking into account at least one effort parameter, and in that the handover to the recipient takes place at the associated handover point 120, 220, 230, 320, 330, 410, 415, 420, 495, 650, 720 within the planned handover period.

Further handover points can be determined by examining which handover points are in the vicinity of one or more deposited whereabouts.

According to the invention, it is also advantageous to calculate distances between any stored work or whereabouts locations. The reason for this is that there is a minimum probability that the recipient of the parcel will move between these locations.

In contrast to methods for route optimisation for the sequential handover of usually individual parcels to individual recipients and/or individual depositors at different locations, preferably their private addresses, the invention provides in particular for the determination of joint optimized handover points for the handover of parcels for a plurality of recipients and/or depositors, wherein a handover of a part of the plurality of parcels to several recipients and/or by several depositors takes place at each of the handover points, the handover points being determined as a function of parking options for mobile depot facilities for the parcels and of desired handover points and/or of handover points desired by the recipients for the handover of the parcels to the recipients and/or by the depositors for the handover of the parcels from the depositors.

It is advantageous that the selection of the joint optimized handover point 120, 220, 230, 320, 330, 410, 415, 420, 495, 650, 720 is made not only by taking into account the effort parameter for the respective recipient, but also by taking into account effort parameters for further, preferably all, recipients on the respective day.

Furthermore, it is appropriate that handover points selected by the recipient are taken into account for the selection of the joint optimized handover point 120, 220, 320 for the handover of a parcel and that the handover to the respective recipient takes place taking into account any selected handover points.

It is advantageous that for the selection of the joint optimized handover point 120, 220, 230, 320, 330, 410, 415, 420, 495, 650, 720 for at least some of the depositors and/or recipients, at least two handover points selected for the handover of a parcel by the depositor and/or recipient are taken into account in each case and that the handover to the respective recipient takes place taking into account the handover points selected by the recipient and/or depositor.

Furthermore, it is appropriate that the selection of the joint optimized handover point 120, 220, 230, 320, 330, 410, 415, 420, 495, 650, 720 and the handover to the respective recipient is carried out taking into account a distance between the handover points selected by the recipient and/or depositor.

In particular, from a plurality of possible locations 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 714, 715, 716, 717, 718, 719, 720 for mobile depot facilities for the parcels joint optimized handover points 120, 220, 230, 320, 330, 410, 415, 420, 495, 650, 720 for the handover of the parcels to the recipients, and at least one mobile depot facility 140, 240, 250, 340, 350, 740, 830, 1711, 1721, 1731, 1811,1821, 1831, 1911,1921, 1931 for each of the handover points determined, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

parcels planned for handover at the joint optimized handover points 120, 220, 230, 320, 330 are placed in the depot facilities 140, 240, 250, 340, 350 and the depot facilities 140, 240, 250, 340, 350 are transported to the handover points 120, 220, 230, 320, 330, 410, 415, 420, 495, 650, 720 associated with them and during a designated transfer period the parcels are stored in the mobile depot facilities 140, 240, 250, 340, 350, 1710,1720, 1730, 1810,1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 and prepared for handover to the recipients of the parcels.

Overall View of the Logistics System and Logistics Processes

Parcel Identification Characteristic

In the present application, parcel identification characteristics that are the same, in particular, and/or parcel identification characteristics that differ from other parcel identification characteristics may be used to identify a parcel.

As already illustrated, parcels in the sense of the present invention are always physical objects, in particular with constant physical properties, in particular weight and dimensions. It is thus possible, during the stay of the parcel in a logistics system according to the invention, to ensure that it is a specific parcel in each case. Different parcels usually differ in at least one physical property and can be distinguished from each other by measuring this physical property. These physical properties can therefore be used as parcel identification characteristics in an advantageous further embodiment of the invention.

The parcel identification characteristic may also be, for example, a parcel identification code that uniquely identifies a parcel. Such a parcel identification code is applied to a parcel, for example, before it is handed over to a logistics system or a unit of the logistics system, for example, one of the receiving units shown in this application, for example, the depot facilities shown, or the parcel identification code is applied to the parcel during a delivery to the logistics system or one of the processing operations within the logistics system.

Embodiments in which the parcel identification code is a physical code applied, for example, to the parcel, to an outer packaging of the parcel or to a storage unit for the parcel and/or a transport unit for the parcel and/or embodiments in which the parcel identification code is a digital code associated with the parcel and/or a digital twin of the parcel are also encompassed by the invention.

It is advantageous if the respective digital twin of one of the parcels, preferably a plurality of parcels, even more advantageously as many parcels as possible, contains at least one parcel identification characteristic. In advantageous embodiments in which the parcel is associated with a parcel identification code, it is advantageous that the digital twin of the parcel contains the parcel identification code.

It is appropriate to integrate at least one, advantageously several, even more advantageously as much information as possible into the digital twin of a parcel.

It is particularly advantageous to use parcel identification characteristics that are particularly easy to determine. This makes it possible to establish the identity of a parcel more quickly and/or with less effort.

A preferred embodiment of a handling of parcels according to the invention provides for assigning and/or recording a parcel identification code and subsequently storing it as a primary parcel identification characteristic. It is expedient to use at least one further, more easily and/or quickly identifiable characteristic of the parcel as a secondary parcel identification characteristic, in particular for checking the correctness of the primary parcel identification characteristic and/or for controlling a further processing operation. Examples of parcel identification characteristics that can be determined more quickly and/or with less effort are the weight and/or dimensions of a parcel.

Both the primary parcel identification characteristic and the secondary parcel identification characteristic can be parcel identification characteristics within the meaning of the present invention, whereby it is particularly advantageous to carry out processing operations, in particular processing operations of parcels, on the basis of one of these parcel identification characteristics.

A subsequent processing operation of the parcel can then be carried out on the basis of a determination of the other parcel identification characteristic. For this purpose, it is advantageous, for example, to equip conveyor belts of transfer facilities with cameras for detecting the dimensions of the parcels and/or with a scale and/or to equip transport units with a scale.

For example, a parcel with a primary parcel identification characteristic in the form of a parcel identification code 123456789 is determined to have a weight of 5015.6 g. Subsequently, a measured weight of 5015.6 g+/−0.2 g can be used as a secondary parcel identification characteristic. The measurement of the weight thus exemplarily represents a determination of a more easily and/or more quickly identifiable secondary parcel identification characteristic, which controls a correctness that this is the parcel with the parcel identification code 123456789 and/or can be used instead of the parcel identification code for further processing. By checking the accuracy and linking a digital image of the parcel, especially its digital twin, the parcel is reliably identified.

The parcel with the parcel identification code 123456789 can already be assigned to a recipient and/or a handover point, in particular a joint optimized handover point for the handover of a plurality of parcels to several recipients and/or from several depositors, when it is delivered into the logistics system. However, it is equally advantageous to change the assignment to the recipient and/or the handover point for at least one of the parcels between the delivery and the handover to a recipient of the parcel.

According to the invention, this general principle can be implemented in various processing operations, for example within one of the distribution centres according to the invention, in particular a sorting centre and/or also for the storage of parcels in depot facilities according to the invention. For example, the parcel identification code of a parcel can first be determined and then one or more processing operations take place. It is advantageous to take a parcel identification characteristic into account during individual, several or all processing operations.

For example, it is possible to first determine a parcel identification code of a parcel and thereby reliably identify the parcel. Preferably, the parcel identification code is linked as a parcel identification characteristic with at least one other parcel identification characteristic, for example a weight and/or a dimension of the parcel. An image of the parcel, for example the image of a parcel shown in FIG. 41, can also be used as a parcel identification characteristic. This is particularly advantageous when goods objects are processed as parcels.

An advantageous further embodiment of the invention provides for machine-readable data to be assigned to the parcels, the data comprising at least one identifier with which the respective parcel can be identified, in particular uniquely identified. Conveniently, at least one of the parcel identification characteristics shown in this application is used as an identifier for the respective parcel.

It is particularly advantageous to establish a parcel identification code, for example digitally and/or by providing a parcel with a barcode or matrix code containing the parcel identification code or an RFID chip containing the parcel identification code, or to determine an already established parcel identification code, for example by means of a 6-sided scanner or an RFID reader.

After the parcel identification code has been defined and/or determined, a controlled and/or measured transport route and/or sorting route of the parcel can be planned and/or tracked—for example with the inclusion of a digital twin for the parcel—so that a subsequent processing operation of the parcel, in particular a sorting of the parcel and/or a transport of the parcel, can be carried out as precisely on the basis of a combination of the previously determined parcel identification code with a determination of another parcel identification characteristic which is preferably easier and/or quicker to measure, as is the case with a determination of the parcel identification code itself. This means that the parcel is reliably identified even if a parcel identification characteristic is determined more quickly and/or with less effort.

A preferred further embodiment of the invention is to supplement processing operations by providing process protocols, advantageously including individual process protocols for individual parcels, and/or to use the provided process protocols for controlling processing operations. Using individual process protocols for individual parcels has the advantage that real-time applications can be implemented and/or that a link between individual parcels and their respective digital twins is facilitated.

In a preferred embodiment, a preferred implementation of the assignment of parcels to shippers and/or recipients is carried out by means of the links shown in this application and/or the equally shown provision of process protocols, advantageously including individual process protocols for individual parcels, so that in particular a link between individual parcels and their respective digital twins is facilitated.

The information on the parcel identification characteristic is transmitted to a control component 5012. In the case shown, the control component 5012 receives both the information on the parcel identification characteristics and on the recipients of the respective parcels from the ordering system 5010.

Prioritisation of Shipments

The invention includes different ways of handling different parcels. In particular, the invention includes the fact that some of the parcels—as shown above—are already assigned to a recipient when the respective order is placed, as well as the fact that an assignment between parcel and recipient takes place at a later time.

This makes it possible to carry out accelerated handovers of parcels for selected parcels and/or selected recipients.

The assignment of parcels to recipients and/or user classes can be done flexibly. This is relevant, for example, when parcels needed for urgent use are to be given priority in emergencies, including medical emergencies and/or technical emergencies.

In addition to use in emergencies, this also includes procedures for the handover of parcels that have an increased utility value for possible recipients of the parcels: For example, parcels for which a handover is not requested until a later date, in particular in a later handover period, can already be transported in such a way that they can also be handed over in an earlier handover period. In this case, for example, a notification can be sent to the recipient that he or she can collect the parcel earlier if he or she wishes to do so; or another recipient authorised by the original recipient can make a collection request for the parcel so that it is handed over to him or her instead of the originally planned recipient. Alternatively, the parcel may be delivered to a new recipient who ordered it as a special rush and at the same time a "replacement delivery" is arranged to the original recipient.

FIG. 5

Introduction

FIG. 5 shows a logistics system 5020 with an associated ordering system 5010.

An operator of a logistics system according to the invention can be both a provider of an ordering system, in particular a trader, and a logistics system. Conversely, a trader may also offer logistics services in addition to his ordering system.

The inventions presented in this application can be integrated into eProcurement applications and eCommerce applications.

The central task of an operator of a logistics system according to the invention is the handover of the correct parcel to the correct, authorised recipient. To fulfil this task, it is necessary to ensure the unique identification of a parcel and the associated unique recipient.

Each parcel/object of goods preferably has a reliable identifier as a parcel identification characteristic, for example an EAN code in the case of an object of goods, an ISBN number in the case of a book, a parcel identification number in the case of a repackaged parcel.

In addition to name and home address, unique characteristics such as e-mail address or mobile phone number are preferably used to correctly identify the recipient.

Preferably, the logistics system 5020 shown in FIG. 5 includes, in the line marked 5100, processing operations of parcels; in the lines marked 5200, appropriate processing units for handling the parcels; and in the lines marked 5300, preferred embodiments of the processing units shown in lines 5200.

The machining operations and the machining units used can be combined with each other, whereby combinations that are as comprehensive as possible are particularly advantageous. In particular, the present invention is not limited to a specific combination of machining operations and machining units.

In the case of a combination of individual processing operations and processing units, it is particularly appropriate to provide and use the processing units shown only where this is advantageous for the further processing of the parcels. If, for example, the parcels are already transferred separately, measures for separating the parcels are not necessary. Similarly, there is no need to record parcel identification characteristics if the identity of the parcel is already known from one or more of the preceding processing operations of the parcel.

For example, if a parcel identification code of a parcel has already been determined, it is not necessary to determine the parcel identification code a second time, but instead it is equally possible, and in many embodiments more advantageous, to perform a subsequent identification of the parcel using another parcel identification characteristic that can be determined more quickly and/or with less effort.

A subsequent processing operation of the parcel can then be carried out based on the determination of the other parcel identification characteristic.

In addition to the usual components used in the environment of an operator of a logistics system according to the invention, it is advantageous to use individual, several, as many as possible or, particularly preferably, even all of the further components listed in lines 5300.

Ordering System 5010

Ordering system 5010 is understood to mean in particular a system for ordering the delivery and/or collection of parcels.

For example, the ordering system is a computer network with linking interfaces to interact with a variety of users.

In a preferred embodiment, the ordering system is a system with means for the electronic procurement of goods using a network, for example the Internet and other information and communication systems. It can be a system of purchasing by companies or organisations as well as by private individuals.

Preferably, secured accesses in extranets or intranets are used for order orders, especially VPNs (virtual private network), which are specially secured and not accessible to third parties.

Logistics System 5020

The logistics system advantageously concerns both “forward logistics” (from the mail order business or private depositor to the recipient) and “reverse logistics” (from the recipient or private depositor back to the mail order business or another recipient).

The logistics system 5020 according to the invention is preferably designed in such a way that it can interact with one or more ordering systems 5010. These can be links in which the ordering system is embedded in the logistics system, but also links in which the logistics system 5020 receives handling orders for the parcels from the ordering system 5010.

A preferred variant is that the ordering system 5010 and the logistics system 5020 are linked in real time.

In this case in particular, a preferred embodiment of the ordering system 5010 provides that the ordering system has an input means for entering one or more desired handover points for the handover of a parcel to a recipient of this parcel. By means of this information and the required information for identifying the parcel and the recipient, control of the parcel to the authorised recipient by the logistics system 5020 is ensured.

The explanations given for this FIG. 5 and later for FIG. 6 also apply to the case where the logistics system and the ordering system are separate from each other and are not designed as one interacting system.

It is therefore possible to operate the logistics system 5020 independently of an ordering system 5010. The information on the parcel identification characteristic is then transmitted from a separate ordering system—that of a third party—to the logistics system 5020. In the case shown, the logistics system 5020 receives both the information on the parcel identification characteristics and a unique identification characteristic on the recipients of the respective parcels—for example, an e-mail address or mobile phone number.

In the case of the absence of a separate ordering system, information to facilitate the selection of handover points for parcels to the recipient and/or from the recipient, in particular preferred handover points of the recipient, is recorded in an app component 5021 of a user and stored in a back-end system 5021, 5022 of the logistics system 5020 of the operator of a logistics system according to the invention and, in an advantageous further embodiment, supplemented by data containing as much of this information as possible in response to recorded information about a behaviour of the recipient, in particular about distances travelled and choice of means of transport.

Furthermore, it is possible to mark parcels to be delivered to depot facilities. An addition such as “DEPOT FACILITY handover” for delivery to depot facilities on the label is dispensable, but can be made.

Linking Interface 5015

As shown, the invention works with multiple ordering systems and/or ordering components, so the ordering system 5010 shown is merely an example.

In a first advantageous embodiment of the invention, a logistics system 5020 known per se and an ordering system 5010 known per se are first linked to each other by the linking interface 5015.

The link is realised by at least one link interface 5015.

The linking interface 5015 is preferably configured to transmit instructions for handling the parcels and/or assigning the parcels to recipients.

In particularly advantageous embodiments of the invention, the linking interface 5015 is further configured such that assignments of parcels to handover points and/or recipients can be changed.

By using the linking interface 5015, it is possible to assign a parcel to a shipper and/or a recipient even if shipper identification features and/or recipient identification features are omitted.

Control Component 5012 of the Logistics System

The control component 5012 of the logistics system 5020 can be designed in such a way that it controls as many or even all of the processing steps of the parcels as possible. However, it is also possible that the control component 5012 only controls individual process steps as described in this application.

The control component 5012 of the logistics system 5020 can carry out individual or several or even all of the procedures presented in this application, whereby the execution of the procedure, which is characterised by the fact that for a plurality of parcels from a plurality of possible spatially separated handover points 110, 111, 112, 113, 114, 115, 116,

117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 714, 715, 716, 717, 718, 719, 720), taking into account at least one effort parameter, a joint optimized handover point (120, 220, 230, 320, 330, 410, 415, 420, 495, 650, 720) is determined in each case for the handover to the respective recipient within a specific handover period, wherein a control of a handover to the recipients at the associated joint handover point (120, 220, 230, 320, 330, 410, 415, 420, 495, 650, 720) within the planned handover period by the control component 5012 is particularly advantageous.

Details of preferred embodiments of the control component and its interaction with the components of the logistics system according to the invention are shown below.

As shown above, the control component 5012 of the logistics system 5020 can be designed in such a way that the control component 5012 controls as many or even all of the processing operations of the parcels as possible. However, it is equally possible for the control component 5012 to control only individual ones of the process steps illustrated in this application. Preferably, information obtained from as many as possible, and particularly preferably even all of the components shown below, is used:

5022: User app for recording and managing user data as well as communication interface and operating element of a depot facility;

5023: User database of the user app;

5024: Network configuration module, in particular with a database for potential installation locations of mobile depot facilities;

5025: Network configuration tool for mobile depot facilities;

5026: Control module for transport of mobile depot facilities;

5027: Notification component;

Location information to determine the locations and/or storage positions of the parcels.

The following explanations refer both to the control component 5012 shown previously with reference to FIG. 5 and to further control components that may be separate from the control component 5012 shown there. However, the control components shown below can also be operated independently of the control component 5012 and are not dependent on control by the control component 5012 shown in FIG. 5.

However, it is particularly advantageous to use the embodiments illustrated in the further application text also in the control component 5012 illustrated with reference to FIG. 5 and/or in further control components controlled by the control component 5012.

For the targeted distribution of the parcels in the area of the transfer facility 5130, 5336 to the depot facilities, communication protocols of the packet and line switching are used and adapted to be able to handle the distribution of the parcels.

It is particularly advantageous to use telecommunication protocols for the control operations and/or for protocol operations, especially packet-switched and circuit-switched telecommunication protocols and mechanisms for controlling packet delivery, logistics and workflow management systems.

Among other things, the idea is implemented that the use and/or modification of protocols for handling data packages can also be used for processing operations of the physical parcels presented in this application, provided that they already offer a respective required functionality. In order to achieve efficient handling of physical objects, especially parcels, various additions can be implemented.

While parcels in the prior art have to be elaborately labelled with labels that have to be created separately, with the invention it is possible to handle any physical objects—provided that dimensions and/or weights to be taken into account for the respective processing operations are complied with—in particular by means of one or more of the following processing operations:

Deposit;

Commissioning;

Sorting;

Transport;

Handover.

Figure 40:
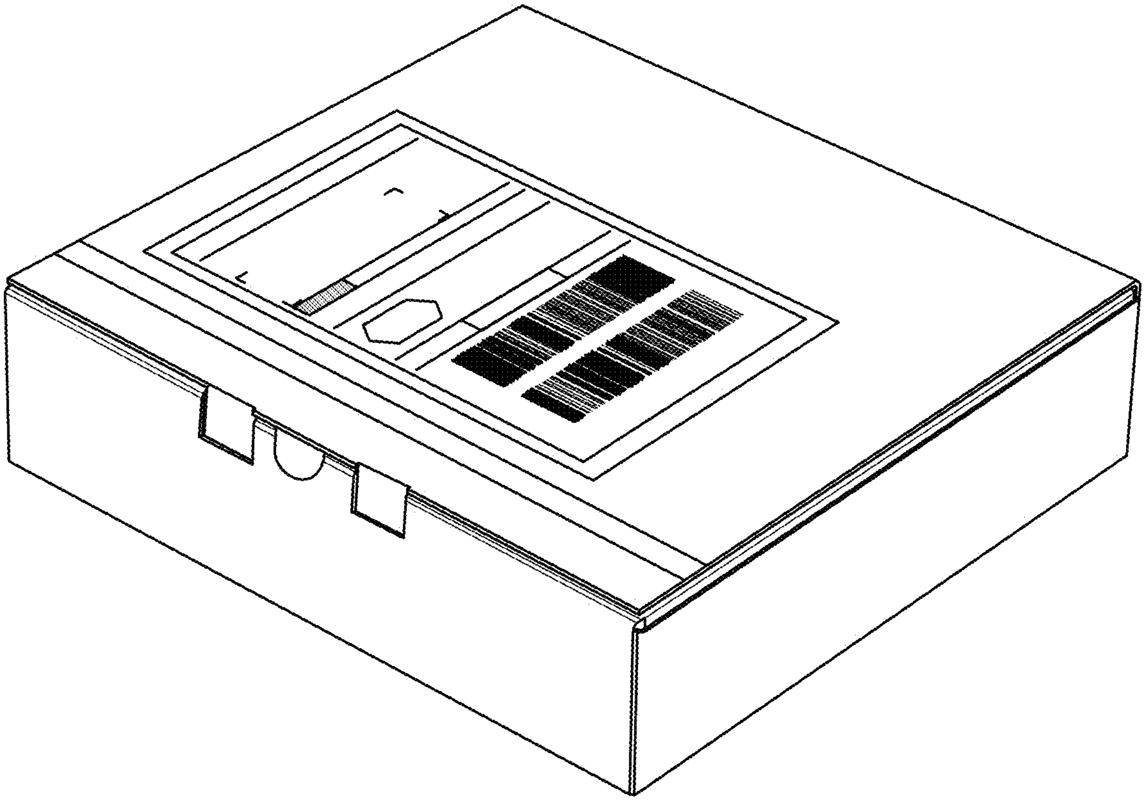
FIG. 40 a parcel according to the state of the art.
Figure 41:
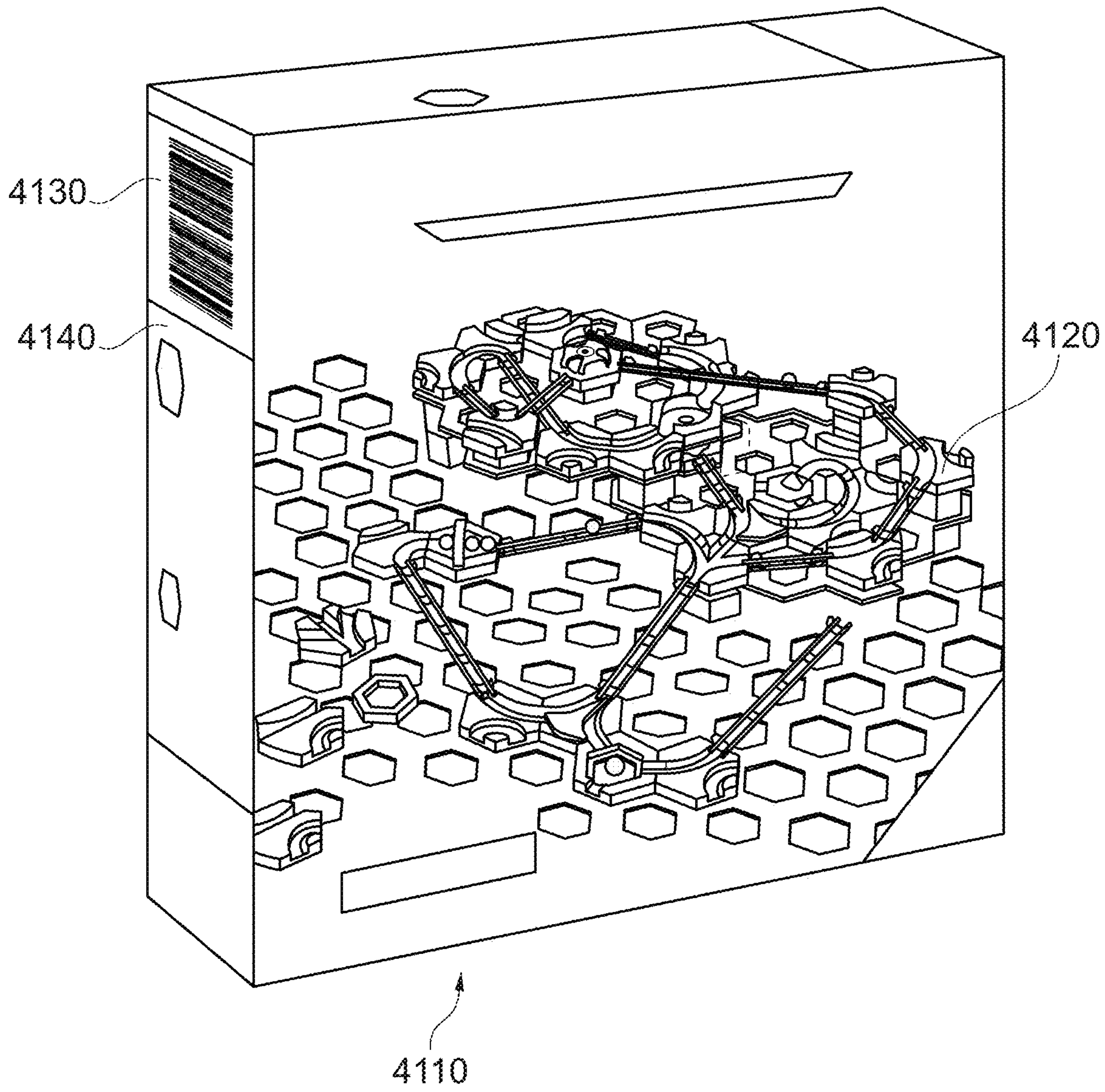
FIG. 41 a commodity object.
Figure 42:
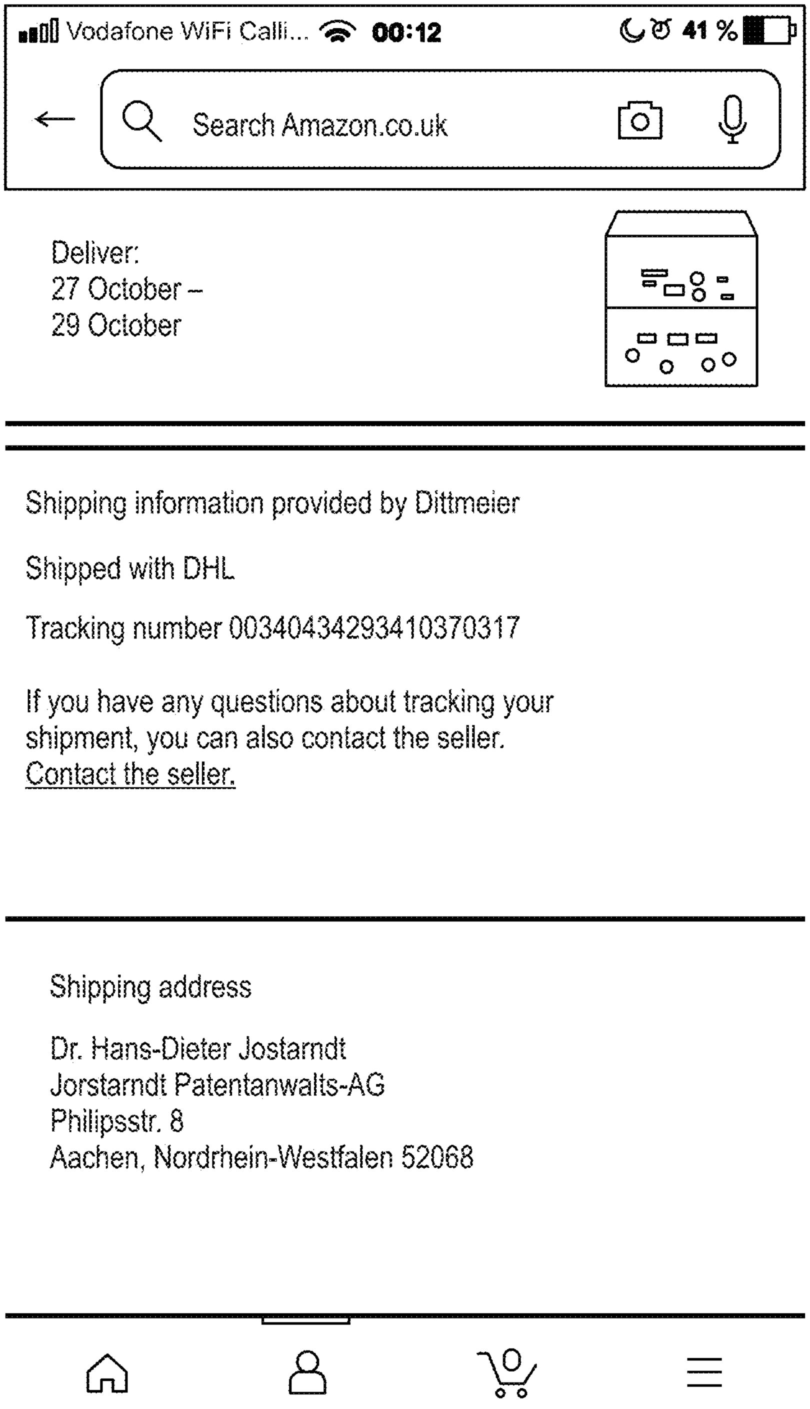
FIG. 42 a graphical user interface of a prior art user component.

Prior art parcels and prior art commodity objects—such as the exemplary parcel shown in FIG. 40 and the commodity object shown in FIG. 41—can likewise be handled as parcels according to the invention, incorporating the processing operations shown.

An advantageous further embodiment of the invention provides that further information is assigned to the parcels as machine-readable data, in particular by using digital twins. An example of the further information is dimensions, in particular the spatial dimension of the parcel and/or the weight of the parcel, due date/time, penalties for late delivery, delivery costs, depositor and recipient information, material, fragility and parameters of the required transport of the parcel, e.g. a refrigerated truck for goods that need to be refrigerated.

It is appropriate to add protocol functionality to the control components.

By using the protocol functionality, various applications can be used. Examples of these applications include managing workflows, retrieving statistical information, tracking parcels, controlling the forwarding of parcels, alarm handling and error handling.

Each parcel in a respective physical transport level can be accompanied by a digital twin, preferably as a logical parcel in a logical transport level, but this is not necessary.

In another advantageous embodiment of the invention, the logical transport layer and the physical transport layer are separate. The logical transport layer may be, for example, a local area network or the Internet. This allows a company to reuse the backbone network used for voice and data transmission, e.g. an IP backbone.

Routing protocols are preferably used to support a determination of an optimal transport route between components of the logistics system according to the invention.

Examples of these routing protocols are metric-based routing and rerouting in case of congestion, e.g. Open Shortest Path First (OSPF), Border Gateway Protocol (BGP).

The creation of virtual routes increases the flexibility of the transport system.

It is also possible to associate at least a portion of the parcels with an IP protocol header to facilitate identification of the parcels. The IP protocol header may be one of the parcel identification characteristics according to the invention.

The different parcels that are processed, especially sorted, transported and stored in the depot facilities have different dimensions, masses and should meet different needs. The different needs are best reflected in specific Quality of Services (QOS) mechanisms. QOS specifications are, for example, fast or safe delivery. The best way to categorise QOS specifications is by special categories representing, for example, commodity items that need to be consumed soon, or by different levels of security.

In an advantageous further embodiment, the fulfilment of QOS specifications can be taken into account in the determination of the respective scoring value according to the invention, in particular in the determination of the scoring value explained in detail with reference to FIG. 6.

Each of the routing protocols described can be used to minimise distances, costs, travel times, etc. and to use bandwidths as efficiently as possible.

Addressing is carried out by a domain name server (DNS), for example.

Special protocols for alarm handling or congestion control allow the system to react flexibly to unforeseen events.

Furthermore, it is advantageous to implement multicast functions.

Scheduling mechanisms enable a further increase in efficiency.

To increase the reliability of communication and transport, the use of a Transmission Control Protocol (TCP) is advantageous.

Real-time processing is required for some parts of the processing of the parcels, especially for their sorting, storage and handover. In order for the system to respond in real time, the use of a Real-Time Protocol (RTP) is suitable. An example of a process based on RTP is the reordering of parcels, which is advantageous when the parcels have been routed differently.

Furthermore, it is preferable to monitor the quality of service through a suitable protocol, such as the Real-Time Protocol (RTP).

The sorting of the parcels can be based on a packet-by-packet routing mechanism, e.g. for the case where there is e.g. no dependency between individual parcels, but it can also be based on virtual connections, especially in the case where all parcels take the same path through the network.

One reason for packet-by-packet routing can be congestion in parts of the network, different routes to be selected due to the fact that the parcels have different parameters (such as dimension or due date, etc.).

In the logistics system according to the invention, parcels can be transported between different locations using any means of transport. Addressing of the location and/or the respective destination can be done by means of IP addresses. The buffering can be done using ICMP, flow control or a mechanism that forwards the digital twin and the physical parcel only after confirmation by any machine or human interface, e.g. one of the operators can use a web-based interface to control the forwarding of the parcel or to perform alarm handling.

Suitable control message protocols are implemented to enable monitoring, for example congestion control. An example of this protocol is the Internet Control Message Protocol (ICMP).

Further routing protocols are preferably used to select an optimal transport path from one physical distribution node to another physical distribution node or to the receiving point. Examples of these routing protocols are metric routing, cost-based routing.

The parcels according to the invention are physical parcels. It is advantageous to use an IP-based communication network for control, logging and/or notifications. In a preferred embodiment of the invention, this is done in that the parcels are preferably accompanied by logical packets in a packet-switched communication network. Preferably, whenever the physical parcel is received in a distribution node, the distribution node informs the respective processing unit/processing component which processing operation is to be performed and waits for a confirmation that the actions have been performed.

In a preferred embodiment of the invention, the represented logical parcels are each treated as a digital twin of the corresponding parcel.

The two embodiments described above may be combined with each other or with any of the previously described embodiments.

It is advantageous to assign at least one IP address to each of the depot facilities according to the invention.

In addition to the usual components used in the environment of an operator of a logistics system according to the invention, it is advantageous to use individual, several, as many as possible or, particularly preferably, even all of the following further components:

User App 5021, 5022

The reference numbers 5021, 5022 designate in particular a user APP for recording and managing user data as well as communication interface and operating element of a depot facility.

It is particularly advantageous to provide users of the logistics system, in particular depositors or recipients of the parcels, in particular before carrying out the steps described, with an app, in particular a user app 5021, 5022 for recording and managing user data as well as a communication interface and operating element of a depot facility, which advantageously allows the methods described in this application for selecting joint optimized handover points to be optimized by transmitting localisation information of the recipients and/or the depositors to the control component 5012.

This makes it possible to take into account the localisation information that the respective user shares with the user app 5021, 5022 as a component of the logistics system 5020, preferably the control component 5012, when selecting the handover points suitable for the respective user in the respective handover period. Such integration takes place for as many users as possible so that joint handover points can be determined for a consolidated handover of the parcels to several recipients.

Preferably, the user app 5021, 5022 can be configured in such a way that the user of the app as a recipient and/or as a depositor of parcels can check by means of the user app 5021, 5022 which parcels that are suitable in principle in terms of their dimensions for storage in storage positions of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are suitable, in particular within the scope of possibly maximum and/or minimum permissible parcel dimensions to the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to be handed out or received.

Corresponding information in a user database 5023 should then be matched as early as possible each day with the shipment database, the digital twin and/or information from the logistics system, preferably information for controlling the processing operations, whereby the corresponding selection of the information available via the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 parcels to be transferred can be carried out by the logistics system 5020 depending on the extent to which the data systems are networked.

Furthermore, it is possible to label parcels to be delivered to depot facilities. An addition such as "DEPOT FACILITY handover" for delivery to depot facilities on the label is dispensable, but can be made.

Example: The user stores his email address and delivery preferences in the user app 5021, 5022 and the user database 5023. The system now has a user with the unique email address e.g. bernd.einstein@gmail.com. As soon as the shipper sends the individual parcel information to the operator of a logistics system according to the invention, which among other things also includes the recipient's e-mail address (bernd.einstein@gmail.com), the system matches/marries both pieces of information (e.g. the e-mail address with the parcel identification code). From now on, all information concerning this parcel will be sent automatically to Bernd Einstein via the user APP 5021, 5022 or will take into account his delivery preferences. If Bernd Einstein generally wishes handover to depot facilities, this delivery preference will be taken into account, even if the parcel does not contain the addition "handover to Depot facility".

User Database 5023 of the User App

The user database 5023 serves as the backend system of the user app.

Mains Configuration Module 5024 and Network Configuration Tool 5025

Reference numeral 5024 designates in particular a network configuration module, preferably with a database for potential installation locations of mobile depot facilities;

A network configuration module 5024 is preferably designed in such a way that it can determine joint optimized handover points for a handover of a plurality of parcels and, if necessary, additionally individual handover points for individual handovers of parcels, in particular taking into account the effort parameters and/or scoring values presented.

As already mentioned, the ordering process can also be partly carried out in such a way that the person ordering a parcel selects one of several stored handover points and that the transport process of the parcel is then controlled in such a way that the transport to the selected handover point takes place.

However, it is particularly advantageous to control the logistics system and perform the transport of at least some of the parcels in such a way that the transport takes place to a handover point determined by one of the optimisation processes presented in this application text.

An advantageous embodiment of the invention provides that the selection of joint optimized handover points is made not only by including the effort parameter for the respective recipient, but also by including effort parameters for further recipients.

The invention provides for consideration of the respective effort parameter of as many recipients as possible, possibly even all recipients in the respective transfer period, for example on the respective day.

An advantageous further embodiment of the invention is characterised in that the logistics system with the network configuration module 5024 comprises a means for detecting a plurality of possible storage locations for mobile depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, and that it has the allocation of mobile depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to the handover points.

The network configuration module 5024 and/or the control component 5012 may perform single or multiple methods presented in this application, wherein the performance of the method characterised in that for multiple parcels from a plurality of possible, spatially separated handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 714, 715, 716, 716, 717, 718, 719, 720, taking into account at least one effort parameter—directly or indirectly by means of a scoring value taking into account the effort parameter—a joint optimized handover point (120, 220, 230, 320, 330, 410, 415, 420, 495, 650, 720) is determined in each case for the handover to the respective recipient within a specific handover period, and providing that the handover to the recipients occurring at the associated joint optimized handover point (120, 220, 230, 320, 330, 650) within the designated handover period is particularly advantageous by the network configuration module 5024.

Scoring values are values with different dimensions, such as the quantification of an effort, which can be reduced to a key figure using the scoring tool.

However, it is equally possible to take into account additional characteristics of the handover of the respective parcels to the respective recipients and/or the depositor when determining the scoring values; such as the dimensions or the weight of the parcels, because these influence the effort of collection and the satisfaction of the customer.

Reference numeral 5025 designates a network configuration tool, in particular for the selection of joint optimized handover points and/or individual handover points, preferably as installation locations (sites) for mobile depot facilities;

Preferably, at least one component of the logistics system 5020, in particular the control component 5012 or the linking interface 5015 of the logistics system, preferably includes a network configuration tool 5025, which defines at least some of the handover points as locations for depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

The control component 5012 can be designed to control as many or even all of the processing operations of the parcels as possible.

The control component 5012 of the logistics system, or the logistics system 5020, controls a method according to the invention for handover of parcels to recipients in such a way that the parcels are made available to the recipients at handover points, in particular joint optimized handover points 120, 220, 230, 320, 330, 410, 415, 420, 495, 650, 720, as exemplarily shown in FIGS. 1, 2, 3, 4, 6 and 7, are made available to the recipients within a (specific) handover period, the handover points being determined in such a way that effort parameters for the recipients are optimised as far as possible.

The effort parameter can be used directly to take into account, for example, the time that a recipient of a parcel or a depositor of a parcel has to spend on the way to the handover point of the parcel, in particular the joint optimized handover point or the individual handover point, from a place that he would also visit independently of the handover of the parcel—anyway place—as well as from a route that he would also travel independently of the handover of the parcel—anyway route.

Furthermore, scoring values can be used where, according to the optimisation of the effort parameters, a reduction of the effort for the recipient improves the respective scoring value for the selection of the handover point. It is of course possible to define the scoring values in such a way that the highest possible scoring value is the best scoring value, as well as to use scoring values where the lowest values are the best values. For reasons of practicability, however, decimal systems are preferred, for example with values from 0 as the minimum value to 10 as the maximum value or from 0 as the minimum value to 100 as the maximum value.

It is particularly advantageous to design the network configuration tool 5025 in such a way that it controls a method for handover of a plurality of parcels in such a way that, for a plurality of recipients of a plurality of possible, spatially separated handover points, in each case at least one scoring value or, in the case of an optimisation of individual effort parameters which takes place with less computational effort, an optimisation process according to the invention is carried out in such a way that a joint optimised handover point for a handover in a planned handover period is determined for a plurality of parcels. However, it is also possible for the control component 5012 to control only individual steps of the process described in this application. It is particularly advantageous to design the control component 5012 in such a way that it controls a method for the handover of a plurality of parcels in such a way that for a plurality of recipients of a plurality of possible, spatially separated handover points in each case at least one scoring value, or in the case of an optimisation of individual effort parameters taking place with a lower calculation effort, a selection method according to the invention (optimisation method) is carried out, so that a joint optimised handover point for a handover in a planned handover period is determined for a plurality of parcels.

The scoring values are values that take into account a quantification of an effort for the recipients of the parcels.

In particular, the scoring values are values that reflect a time expenditure for the individual recipients for the receipt of the respective parcel.

Preferably, the scoring values are numerical values within a predefined number range.

In a first embodiment of the method, for example, the effort parameters for each of the recipients are considered for receiving the parcel. In this case, for example, for a number range extending from 1-10, a provision of the parcel in a depot facility receives 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 for which the recipient of the respective parcel must spend a time of 10 minutes to reach, a scoring value of 1 and a provision in the immediate vicinity of a place where the recipient is staying or at a route which the recipient has to travel anyway with an additional effort of the recipient of 1 minute or less, a scoring value of 10.

Accordingly, the handover points are selected so that the corresponding scoring value is as high as possible for as many recipients of the parcels as possible. However, it is equally possible to provide a minimum scoring value for individual recipients or for individual parcels, so that, for example, the additional time required by the recipient is no more than 5 minutes.

However, it is equally possible to take into account additional characteristics of the handover of the respective parcels to the respective recipients when determining the scoring values.

This is done, for example, with a correspondingly larger number range for the scoring values by also assigning scoring values for the selection of the desired handover period, in particular for the shortest possible time until the earliest possible handover of the parcel and/or for the shortest possible time for receiving the parcels.

The allocation of the corresponding combination of these factors can be handled flexibly. In one embodiment of the invention, for example, points are awarded both for the time between ordering a parcel and the associated handover period and for the time taken by the recipient to reach the handover point.

For example, for a handover on the same day as the order or even for a delivery within a short period of time, which can be less than 1 hour, it is possible to assign a corresponding contribution to the scoring value, for example a maximum of 50. Furthermore, a contribution to the scoring value is then also awarded for the time taken to receive the parcel, for example for a time taken of 10 minutes a contribution to the scoring value of ten, for a time taken of no more than 5 minutes a contribution to the scoring value of 20, for a time taken of no more than 3 minutes a contribution to the scoring value of 30, for a time taken of no more than 2 minutes a contribution to the scoring value of 40 and for a time taken of no more than 1 minute a contribution to the scoring value of 50.

For example, the provision of a parcel within one week of the order with an effort for the receipt of 10 minutes receives a scoring value of 10+10=20, the provision of a parcel on the day of the order with an additional effort for the recipient of 1 minute or less receives a scoring value of 50+50=100.

However, it is also possible to define maximum times until the parcel is made available at the respective handover point as well as maximum efforts for receiving the parcels. This can be taken into account in a corresponding optimisation process, so that, for example, a handover to recipients of a privileged user class takes place in such a way that a scoring value of at least 70 is achieved, whereby this value can be flexibly adjusted like the other values, in particular scoring values.

Preferably, the control is such that within the handover period a plurality of parcels are provided together at the joint optimized handover points (120, 220, 230, 320, 330, 410, 415, 420, 495, 650, 720) for several recipients.

It is appropriate that at least some of the parcels are provided by depot facilities. The invention can be used with a plurality of depot facilities 140, 240, 250, 340, 350, 740, 830, 1711, 1721, 1731, 1811, 1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 including mobile or stationary depot facilities.

It is advantageous that the handover points 120, 220, 230, 320, 330, 650 are determined by a selection from spatially separated handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 715, 716, 716, 717, 718, 719, 720.

It is further appropriate that the selection is made from spatially separated handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 714, 715, 716, 716, 717, 718, 719, 720 is performed by a selection process with several selection steps 601, 602, 603, 604.

Provided that a mobile depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is provided for handover at the handover point, the handover point is preferably the location of the depot facility.

Control Module for Transport of Mobile Depot Facilities 5026

The control module 5026 controls the transport of the mobile depot facilities, including one or more of the transport operations shown below, which preferably include locations determined by optimisation processes according to the invention:

- between different nodes of the logistics system, for example between distribution centres,
- between transfer facilities 5130, 5336 and the joint optimized handover points for the handover of parcels,
- between different joint optimized handover points,
- to locations for a handover of individual parcels and the use of transfer means.

Transfer means are, in particular, the depot facilities and/or handover units cooperating with the depot facilities as shown in this application.

Notification Component 5027

Notification components 5027 can be used as in existing logistics systems, but it is advantageous to additionally consider the flexibility of the handover points, in particular in such a way that a preferably provided respective handover point is preferably communicated to the recipients of the parcels when the control component 5012 has carried out the selection of the handover points, in particular the joint optimized handover points.

Furthermore, it is possible to inform recipients of parcels, as soon as a parcel has been handed over to the logistics network for them, by means of suitable electronic communication channels, for example by means of e-mail and/or SMS or in an app, about an expected handover period and localisation information, which may initially comprise several possible handover points, and to specify this localisation information after the planned handover point has been determined and/or reached by notifying the handover point.

In a preferred embodiment of the notification component 5027, it is possible, in particular when integrating a notification function into the user app 5021, to notify localisation information of the depot facility at the respective handover points of the parcel and preferably additionally also at the respective handover period.

When integrating a notification function into the app, it is particularly advantageous to link it to a navigation system and/or a map service on any of the recipient's terminals so that the localisation information and/or the handover period are forwarded to the recipient's navigation system and/or map service.

Parcel Processing Operations 5100

In a preferred embodiment of the invention, the machining operations shown in line 5100 follow one another. It is particularly advantageous to carry out several, in particular many, of the machining operations shown in line 5100, but it is not necessary to carry out all of the machining operations shown in line 5100.

The handling of parcels according to the invention includes one, several or all of the following processing operations of a parcel:

- Acceptance of the parcel, for example by posting, in particular by a depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322;
- Transport of the parcel between the depot facility (140, 240, 250, 340, 350, 740, 830, 1711, 1721, 1731, 1811, 1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111,3121, 3131, 3141, 3311, 3321,3331,3511, 3521, 3531, 3711,3721, 3731, 5242, 5243, 5321, 5322) and a depositor and/or a recipient of the parcel; in particular by a handover unit,
- Transport of the parcel within the depot facility, in particular between a handover gate and storage positions of a storage unit of the depot facility;
- Transport of the parcel from a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to another depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322;
- Transport of the parcel between depot facility 140, 240, 250, 340, 350, 740, 830, 1711, 1721, 1731, 1811,1821, 1831, 1911,1921, 1931, 2111, 2121, 2131, 2141, 2303,

2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and a transfer facility 5130, 5336;

Transport of the parcel within the transfer facility 5130, 5336; Sorting of the parcel within the transfer facility 5130, 5336;

Transport of the parcel between the transfer facility 5130, 5336 and a parcel distribution centre 5301;

Sorting of the parcel within the parcel sorting centre (parcel sorting centre)

Transport of the parcel between two distribution centres.

It is also advantageous to pre-calculate processing procedures for parcels by means of a simulation calculation before they are carried out. In this case, it is particularly appropriate to provide a digital twin for each of the parcels and to compare the processing operations carried out on the parcels using the respective parcel identification characteristic with the pre-calculated processing process according to the simulation calculation. If there is a match between the parcel identification characteristic determined in each case and the respective associated digital twin, the respective parcel is identified accordingly. Such an advantageous identification of the parcel is also possible if a parcel identification characteristic is matched in conjunction with another parcel identification characteristic determined in a previous processing operation.

Parcel Processing in Distribution Centres 5110

In particular, column 5110 includes processing operations as well as processing units, especially with means for sorting parcels at distribution centres.

Preferred embodiments of main runs and sorting operations 5110 are explained below. The control component 5012 of the logistics system 5020 forwards information on parcel identification characteristics, which enable identification of the parcels, as well as information on the planned handover points to network nodes of the logistics system.

The control component 5012 of the logistics system, or the logistics system 5020, receives information on parcel identification characteristics, which enable the parcels to be identified, from preferably several sources of information, for example when the parcels are delivered by a registration means, by identification devices such as scanners and RFID readers at distribution centres, in the area of transfer facilities 5130, 5336.

The control component 5012 of the logistics system, or the logistics system 5020, passes on information on parcel identification characteristics which enable the parcels to be identified, as well as information on the handover points provided, preferably to transfer facilities 5130, 5336 and/or to depot facilities. The forwarding of the information on the parcel identification characteristics both to the transfer facilities 5130, 5336 and to the depot facilities has the advantage that the storage of the parcels in storage positions of a storage unit of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. Another advantage of this appropriate embodiment is that the storage in the storage positions of the storage facility of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 without the use of sensing devices or other means of detection in depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 can be done.

Network nodes of the logistics system are, in particular, components of the logistics system where decisions about parcel processing operations to be carried out are implemented. These are, for example, sorting operations 5110, which preferably take place in distribution centres 5301 for parcels. Examples of network nodes of the logistics system are preferably transfer facilities 5130, 5336 as well as transport units 5236 and depot facilities 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Here, the parcel identification characteristics are transmitted in such a way that the respective network nodes introduce the parcels into the further transport process, taking into account the respective selected handover points.

Distribution Centre 5301 and Delivery Depot 5302

In an advantageous embodiment of the invention, the delivery depots are designed as distribution centres. It is advantageous to use a two- or multi-stage logistics system in which, preferably, parcels are first transported to a distribution centre, then from one distribution centre to another distribution centre and then from the other distribution centre to delivery depots. The following processing operations take place, for example:

Selection of a distribution centre 5301 suitable for further distribution of parcels by loading depot facilities 140, 240, 250, 340, 350, 740, 830, 1711, 1721, 1731, 1811, 1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322; An initiation of a transport to the distribution centre 5301 and/or to the delivery depot 5302;

An initiation of a transport to the depot facility;

Discharge of parcels at a distribution centre 5301 or delivery depot 5302

Handover Point Selection 5120

Preferably, the processing operations and processing units shown in column 5120 include means for selecting handover points, in particular joint optimized handover points of parcels, in particular using depot facilities 5242, 5243, 5321, 5322.

Depot Facilities 5242, 5243, 5321, 5322

The depot facilities 5242, 5243, 5321, 5322 may be depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, as shown in FIGS. 8-11*d*, 14-15, 17 to 21 and 27 to 31, but the logistics system is not limited to use cases with depot facilities 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 and also when depot facilities 140, 240, 250, 340, 350, 1710,1720, 1730, 1810, 1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322, these may have a different design than that exemplified in these illustrations.

In a particularly preferred embodiment, the depot facilities 5242 include a flexible adaptation of at least one storage unit 1410.

According to a likewise preferred embodiment, the depot facility 5243 comprises a paternoster system.

The in a depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 parcels are preferably stored in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to the handover points, in particular the joint optimized handover points.

The depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 preferably includes a handover gate for the parcels as part of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. The handover gate preferably also serves as a receiving facility for parcels handed over at the handover points into the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Loading Preparation of the Depot Facilities 5130

In a preferred embodiment of the invention, the processing operations and processing units shown in column 5130 include means and process steps 5233, 5331-5336 for a loading preparation of the depot facilities, in particular at transfer facilities 5130, 5336.

The processing operation 5130 includes individual, several or even all of the processing operations for the parcels shown below:

- Transfer of parcels from a distribution centre;
- Separation of the parcels;
- Transport of parcels from a distribution centre to the depot facilities;
- Transporting the parcels from one or more first depot facilities to one or more second depot facilities;
- Preparation for storage of parcels in depot facilities 140, 240, 250, 340, 350, 740, 830, 1711, 1721, 1731, 1811, 1821, 1831, 1911,1921, 1931, 2111, 2121, 2131, as shown by column 5140, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Individual, several or even all of these processing operations for the parcels are carried out by the transfer facilities 5336 in a preferred embodiment of the invention.

The processing operations and processing units shown in column 5130 promote a transfer of parcels to depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. In particular, these are processing operations in which a plurality of parcels are transported, preferably in immediate succession, to the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and then preferably to depot facilities 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. The storage of parcels in depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is preferably done by storing the parcels in storage positions of storage facilities of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322.

To provide storage for parcels in depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and/or to remove parcels from depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931,

3111, 3121, 3131, 3141, 3311, 3321, 3331, 3511, 3521, 3531, 3711, 3721, 3731, 5242, 5243, 5321, 5322 as quickly and reliably as possible, it is appropriate to use transfer facilities, examples of which are shown in FIGS. 17, 18, 19, 20, 21, 27, 28, 29, 31, 32, 33, 34, 35, 36 and 37. The transfer facilities illustrated in FIGS. 17, 18, 19, 20, 21, 27, 28, 29, 31, 32, 33, 34, 35, 36 and 37 are advantageous embodiments of transfer facilities 5336 according to the invention.

Transfer facilities 5336 may also include depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, which serve as intermediate storage for parcels. In such a case, parcels are preferably first placed in a first depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and then removed from this depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are taken out again and placed in a new depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 spent.

Transfer Facility 5336

A further processing module, which in a preferred embodiment of the invention is controlled by control component 5012 of the logistics system, or the logistics system 5020, is a sorting module 5130, 5336 within the distribution centre, which is preferably also used for diverting the parcels to the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 serves.

Preferably, a processing at the transfer facilities 5130, 5336 comprises an autonomous separation 5231, an optimised alignment 5232 of the parcels and an optimised compartment allocation 5233—for storage positions of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. The following processing operations are carried out as examples:

- Handover of parcels at a transfer facility 5130, 5336 to depot units 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322; preferably using a transport unit 1241, 1641, 1941, 1942, 1943, 1944, 1945, 2941, 2942, 2943, 2944, 2945, 5341;
- Transport of parcels from transfer facility 5130, 5336 to depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322;

Loading of the Depot Facilities 5140

In an equally advantageous embodiment of the invention, the processing operations and processing units shown in column 5140 include means for loading the depot facilities, in particular for loading the depot facilities with individual parcels and advantageously also including parcel identification characteristics for the individual parcels.

Immediately after the storage of parcels in the depot facility in the distribution centre 5301 has been completed, a data record is transmitted to the depot facility, preferably controlled by the control component 5012, while the depot facility is still present in the area of the distribution centre, for example at the transfer facilities 5130, 5336. Preferred contents of the data record are all relevant data that the depot facility requires for the handover of the parcels now in the depot facility or for the acceptance of already notified deliveries of parcels.

Preferably, these are for each parcel stored in the depot facility at the distribution centre or transfer facility 5130, 5336:

- Storage position within the depot facility;
- A parcel identification characteristic;
- Contact details of an planned recipient of the parcel;
- Authentication characteristics of the recipient of the parcel.

Preferably, these are for each parcel stored in the depot facility during a stay of the depot facility at a location, for example a joint optimized handover point:

- size of the parcel;
- Parcel identification characteristic;
- Contact details of the depositor;
- Authentication characteristics of the depositor;
- Contact details of a recipient of the parcel;
- Authentication characteristics of the recipient of the parcel.

This means that the depot facility can operate autonomously at its location without permanent communication with the logistics system or the control component 5012; i.e. all parcels in the depot facility can be handed out to the respective recipient on site at the location or already notified deliveries from shippers can be accepted and handed out again.

Storage and Removal 5241

Similarly, methods for supporting a storage of the parcels in storage positions of the depot facility 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 by transport unit (1241, 1641, 1741, 1742, 1743, 1841, 1842, 1845, 1940, 1941, 1942, 1943, 1944,

1945, 2140, 2141, 2142, 2145, 2642, 2643, 2644, 2645, 2741, 2742, 2743, 28,41, 2842, 2845, 2940, 2941, 2942, 2943, 2944, 2945,3140, 3141, 3142, 3145, 3340, 3341, 3342, 3343, 3344, 3345, 3540, 3541, 3542, 3543, 3544, 3545, 3740, 3741, 3742, 3743, 3744, 3745) as well as other devices, for example a slider 1430 are supported.

Storage Units 5342

An advantageous embodiment of this method is characterised by the fact that the parcels are assigned to predetermined storage positions on the basis of parcel identification characteristics, that the parcels move along a path defined in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 at least one transport unit 1241, 1641, 1941, 1942, 1943, 1944, 1945, 2941, 2942, 2943, 2944, 2945 is moved in such a way that it can remove parcels from a shipment flow of parcels on the basis of the parcel identification characteristics, in that, using the transport unit 1241, 1641, 1941, 1942, 1943, 1944, 1945, 2941, 2942, 2943, 2944, 2945, a transport of the parcels from the shipment flow into the depot facility 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322, wherein the transport of the transport unit 1041, 1241, 1641, 1940, 1941, 1942, 1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 within the depot facility 140, 240, 250, 340, 350, 1710,1720, 1730, 1810, 1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 taking into account the storage positions assigned to the respective parcels based on the parcel identification characteristics.

A particularly preferred processing operation for the parcel is:

Storage of parcels by a transport unit 1241, 1641, 1941, 1942, 1943, 1944, 1945, 2941, 2942, 2943, 2944, 2945,5341 in storage positions of the storage units: 5342 of depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Transport and Installation of Depot Facilities at Sites 5150

According to an appropriate further embodiment of the invention, the processing operations and processing units shown in column 5150 include means for transporting the depot facilities and for setting up the depot facilities at locations. According to a particularly advantageous embodiment, this is done including parking of the depot facilities at their respective locations, which is as automated as possible.

According to an appropriate embodiment of the invention, the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is transported from one location to another. In particular, the different locations are a distribution centre 5301 and a location in a catchment area of recipients of parcels and/or depositors of parcels as a joint optimized handover point for multiple parcels and/or also the sequential approach of multiple joint optimized handover points.

As soon as the depot facility has reached its output location, in particular at a joint optimized handover point, the depot facility sends this information to the control component 5012. The control component 5012 in turn informs, for example using notifications to user apps 5021, 5022 and/or user components of recipients, as many, preferably all, recipients for whom a parcel is stored in the depot facility with information about

- the specific location of the depot facility;
- with the period of availability of the depot facility on site (e.g. also with countdown functionality/clock), i.e. with information about the handover period for a parcel handover at the location of the depot facility;
- a link for a route description from the current location of the recipient to the location of the depot facility (with indication of the time required);
- possibly additional information regarding weather, traffic situation and vouchers of a retailer near the location of the depot facility;

A transport of depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to further locations may be controlled by the control device 5150 or a request unit 5180, 5281.

Previously, a preferred further embodiment of the processing operations and processing units shown in column 5190 was disclosed, in which means for transporting the depot facilities to the transfer facilities 5130, 5336 and/or from a first installation location to a further installation location are used as a further location for installing the depot facility. However, it is equally possible that at least a part of the depot facilities is located at one location for a longer period than the planned transfer periods or is even stationary, whereby stationary also means partially stationary, for example by a reversible connection of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 with another depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and/or another fixed reference point.

Control Device Autonomous or Semi-Autonomous Transport 5251

The logistics system 5020 preferably also includes control devices 5150, 5151 for controlling the transport of the parcels to the respective handover points. These ensure that a transport of a depot facility 140, 240, 250, 340, 350, 740, 830, 1711, 1721, 1731, 1811,1821, 1831, 1911,1921, 1931, 2111, 2121, 2131, 2141, 2303, 2321, 2611 containing the respective parcels, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to the respective handover point.

The control devices 5150, 5151 may be components of the control component 5012 and/or interact with the control component 5012.

It is advantageous that also transport operations of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are controlled by the control component 5012 and/or that the control component 5012 is connected to other control units, in particular vehicle control units 5150, 5151 control commands for controlling the transport of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 transmitted.

The corresponding control is carried out with the inclusion of a degree of autonomy of the means of transport for transporting the depot facilities.

It is advantageous to use vehicles, mobile robots and, where appropriate, driverless transport systems—hereinafter collectively referred to as vehicles—that have the highest possible level of autonomy that can be reliably achieved.

A control of the respective environment of the vehicle takes place in particular in autonomy levels 3, 4 and 5.

However, it is equally possible to use remote-controlled vehicles.

The use of a remote control has the advantage that, with a relatively low level of autonomy, a driver can control the vehicle on the basis of the control commands from the control device 5150 during the entire travel distance or during travel sections that cannot be travelled autonomously.

From autonomy level 3, permanent control by a driver is not required, but rather only an interface that enables a human driver to react appropriately in a short time when requested by a vehicle system.

In the case of an autonomy level of 4 or 5, the use of a driver acting remotely can usually be dispensed with. In particular, with an autonomy level of 4, the driving mode of the depot facilities 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 controlled so that all aspects of dynamic driving tasks can be performed by the automated driving system itself.

This is advantageously supported by deployment scenarios where depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are transported outside peak hours, preferably before the morning rush hour or after the evening rush hour, usually involving transport of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322 from the transfer facilities 5130, 5336 to the handover points before the morning rush hour and the return transport of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to transfer facilities 5130, 5336 after the evening rush hour. This ensures that during usual times of the day when many recipients are in the vicinity of the depot facilities or travel distances that are close to the handover points, the respective depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 can be achieved with the least possible effort.

According to an appropriate further embodiment of the invention, the processing operations and processing units shown in column 5190 include means for transporting the depot facilities to the transfer facilities 5130, 5336 and/or from a first installation location to a further installation location as a further location for installing the depot facility.

According to a particularly advantageous embodiment, the transport takes place including a preferably automated parking of the depot facilities 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 at the transfer facilities 5130, 5336 or at the joint optimized handover points.

User Component 5351

It is advantageous to design the logistics system, or one or more of the components of the logistics system, in such a way that they can interact with user components 5351 via a user interface, in particular react to requests for the handover of parcels. The user component 5351 is, for example, a smartphone, a smartwatch or smart glasses. In particular, the user interface is configured to transmit information initiating a handover of parcels and/or enhancing the handover of parcels. Examples of the transmittable information include parcel identification characteristics, user identification characteristics, authentication data and notification information.

The interaction of the logistics system component with the user components 5351 can be realised in various ways.

In principle, it is possible to design several of the depicted components of the logistics system so that they can interact with a user component 5351, but it is particularly appropriate if at least one of the components is a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Another component of the logistics system where integration of the user interface occurs is a preferably mobile depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, which is adapted to hand out and/or accept parcels.

Handover of Parcels to Recipient 5160

In a particularly preferred embodiment in the invention, the processing operations and processing units shown in column 5160 include means for handover of parcels to recipients.

The notification component 5027 transmits the following exemplary information to the recipient of a parcel and requests him to pick up his parcel:

"Dear Mr Müller,

Your parcel is now available for collection in the mobile locker until 9:00 p.m. today, at Philipsstraße 8, 52068 Aachen ready for you".

You can find the fastest way to your parcel here.

Your Mobile Locker Team"

The handover of the funds held in depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 located parcels to the recipients, herein also referred to as handover, can be directly controlled by the user app 5021, 5022. Furthermore, authentication of the recipients is preferably performed by an authentication module.

This is possible, for example, if a recipient who is a user of an app has configured the app in such a way that its approach to a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 initiates a transfer operation.

It is appropriate to provide an authentication module 5262 for an exchange of authentication information with the user component 5351 of the recipient and/or an app, in particular the user app 5021, 5022, so that authentication of the user is facilitated.

Alternatively or additionally, identification of the user involving biometric information is possible.

The authentication module 5262 preferably interacts with the control component 5012 and/or with the local control unit 5170, 5171.

The proximity of the recipient to the depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 can be determined by means of various location determination systems including satellite-based positioning systems, localisation via a mobile network, a WLAN and/or via NFC, whereby such localisation methods partly enable location accuracies in the cm range.

As soon as the recipient approaches the corresponding depot facility within a near-field radius of, for example, 5 m to 50 m, preferably 10 m to 20 m, the depot facility registers this independently, for example via Near Field Communication (NFC), and/or the control component 5012 of the logistics system registers this on the basis of localisation information received from the recipient, which is determined, for example, by means of GPS data or localisation within a mobile communication network.

After the proximity of the recipient to the depot facility has been determined, its user app 5021, 5022 and/or user component receives a notification. After receiving the notification, the user app 5021, 5022 and/or the user component is set to another operating state, in particular activated. This can also be done standalone by the depot facility or via the logistics system, preferably the control component 5012 of the logistics system.

Preferably, the recipient now receives a query from the user app 5021, 5022 and/or the user component asking whether he or she would now like to remove the parcel from the depot facility immediately. If the recipient confirms their wish to remove the parcel, they are asked to authenticate themselves via the app (e.g. via touch ID, or password entry, etc.). Authentication can also be carried out standalone by the depot facility and/or by the control component 5012 of the logistics system. If the authentication is positive, the recipient is also directly at the depot facility (e.g. at a maximum distance of 2 m) and a handover of the parcel is possible, the handover of the parcel is entered by the depot facility.

The aforementioned handover of the parcel is possible in particular if one or more of the aforementioned characteristics is fulfilled:

- there is no other recipient of the parcel before the recipient of the parcel;
- no parallel transfer of parcels takes place at the depot facility;
- a handover unit is available for a handover of the parcel at an individual handover point.

(Local) Control Unit for Handover of Parcels 5170

Particularly advantageous embodiments of processing operations and processing units in the area of a possibly local control unit for enabling a handover of the parcels are shown in column 5170.

A control unit 5170, 5171 controls several, preferably many, even more advantageous all processing operations at the depot facilities, in particular when the depot facilities are set up at the installation locations.

Examples of machining operations controlled by the control unit 5170, 5171 are:

- Use of depot facilities for the storage of parcels;
- Use of depot facilities for sorting parcels;
- Use of depot facilities for commisioning parcels;
- Use of depot facilities as sales facilities;
- Control of transfer operations at the depot facility.

Alternatively to the control by the user app 5021, 5022 it is also possible to control the handover of the parcels by a local control unit 5170, 5171 in the depot facility, wherein the local depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, as the case may be, receives allocation information between the parcel and the recipient from the database 5023 and performs the handover taking into account the allocation information or an authorisation transmitted by the database 5023.

It is particularly advantageous to use the control unit 5170, 5171 as a local control unit 5170, 5171 at the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, in particular the local control unit 5170, 5171 in such a way that it can control the depot facility 140, 240, 250, 340,350,740,830, 1711, 1721,1731, 1811,1821, 1831, 1911,1921, 1931,2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 such that a handover of the parcels is also enabled independently of the control component 5012. This embodiment of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 each with a local control unit 5170, 5171 has the advantage that operation of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 preferably including a deposit of parcels and a handover of parcels even if, for example, no data link between the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and tax component 5012.

Notifications to the recipient of the possibility of collection by the recipient may be made in particular when one of the following procedural steps is reached:

- Delivery of a parcel to a depot facility; especially for stationary depot facilities;
- Start of a transport of a mobile depot facility containing the parcel;
- Reaching a handover location of a mobile depot facility containing the parcel;
- Information that a document stored in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 can be assigned to a recipient.

Handover of Parcels at Individual Handover Points 5175

Advantageous embodiments of processing operations to perform and improve a handover of parcels at individual handover points are shown in column 5175.

There are several advantageous variants for the handover of parcels to a single recipient at an individual handover point.

An advantageous variant is the handover to a single recipient at an individual handover point by the depot facility itself. Thus, after leaving the joint optimized handover point for the handover of a plurality of parcels to several recipients and/or from several depositors, the depot facility can successively drive to different individual addresses and hand over one or more parcels there.

For the handover of one or more parcels, it is possible to determine an individual handover period and/or individual handover point by means of one of the selection methods disclosed in this application, in particular the methods described for optimising handover points.

It is advantageous to first determine the individual handover period and/or individual handover point with a confidence interval that may be selectable. The confidence interval preferably concerns the individual handover period and/or the individual handover point agreed with the recipient and/or communicated to the recipient.

An appropriate embodiment of the invention provides that the control component controls the processing operations in such a way that the handover of the parcel in the individual handover period and/or at the individual handover point is carried out with the minimum probability as soon as the individual handover period and/or individual handover point can be agreed with the recipient with a minimum probability of, for example, at least 95%, preferably significantly closer to 100%.

An equally advantageous embodiment of the invention provides for the handover of the parcel to the recipient during the individual handover period and/or at the individual handover point with a minimum probability of, for example, at least 95%, preferably significantly closer to 100%. The recipient is then informed of the transfer possibility. Preferably, the control component transmits a notification about the handover possibility by means of a user component 5351 of the recipient and/or an APP, in particular a user app 5021, 5022, and thus informs the recipient.

It is advantageous, as an alternative or in addition to the notification shown in the previous paragraph, to send a notification of the immediate handover possibility to the individual recipient immediately after the arrival of the depot facility at the individual handover point, preferably by means of a user component 5351 and/or an app, in particular a user app 5021, 5022, and to inform him in this way. The handover process is preferably analogous to the process at a joint optimized handover point.

Another advantageous variant of handover to an individual recipient at an individual handover point is handover by an autonomous handover unit. It is also possible to use the transport unit 1641 as a handover unit that can transport parcels between the depot facility and individual handover points for handover of parcels to individual recipients.

The individual recipient is informed of the immediate handover possibility via APP immediately after the handover unit arrives at the individual handover point.

As soon as the recipient has authenticated himself immediately before the handover unit, the handover unit releases the parcel for the recipient.

Request Unit for Handover at Individual Handover Points 5180

According to an appropriate further embodiment of the invention, the processing operations and processing units shown in column 5180 contain means for determining individual handover points for the individual recipients of the parcel and/or the handover of the parcel to the recipient and/or the acceptance of the parcel from the depositor. This is done in particular by a request unit 5180, 5281 for a handover of the parcel at an individual handover point, in particular at the depot facility by the depot facility itself and/or a handover unit. This applies to handovers of parcels in particular at joint optimized handover points and/or at individual handover points for individual recipients and/or depositors of parcels. The handover of parcels at individual handover points can include both the integration of a "front door handover" and handovers of parcels for a definable group of recipients and/or depositors, in particular at individual handover points.

In particular, the request unit 5180, 5281 is set up to interact—preferably via a user interface—with user components 5351 and/or an APP, in particular a user app 5021, 5022, in particular to respond to requests for handover of parcels. The user component 5351 is, for example, a smartphone, a smartwatch or smart glasses. In particular, the user interface is adapted to transmit information initiating a handover of parcels and/or enhancing the handover of parcels. Examples of the transmittable information include parcel identification characteristics, user identification characteristics, authentication data and notification information.

In particular, it is advantageous to implement the request unit 5180, 5281 as a component of the logistics system 5020.

Examples of the use of individual handover points are locations for depot facilities that are set up in such a way that handovers of parcels take place exclusively for a definable group of recipients and/or consignees.

Preferably, a request unit 5180, 5281 initiates a packet handover at an individual handover point.

Deposit of Parcels 5190

Advantageous embodiments of processing operations and processing units at a storage of parcels, goods objects and returned goods, preferably by means of a local control unit for enabling a delivery of the parcels, are shown in column 5190.

There are several advantageous embodiments of processing operations and processing units in the area of storage of parcels, goods objects and returned goods, preferably by means of a local control unit for enabling a delivery of the parcels, are shown in column 5190.

It is further appropriate to design the logistics system so that it is set up to carry out a method for receiving a plurality of parcels from a plurality of depositors, which is characterised in that that for a plurality of parcels from a plurality of possible spatially separated handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 715, 716, 717, 718, 719, 720 each a joint optimized handover point 120, 220, 230, 320, 330, 410, 415, 420, 495, 650 taking into account at least one effort parameter, 720 is determined for the receipt from the depositors within a certain handover period, and that the receipt from the depositors at the assigned joint handover point 120, 220, 230, 320, 330, 410, 415, 420, 495, 650, 720 takes place within the planned handover period.

Preferably, a receipt of a parcel represents a delivery of the parcel to a depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 and/or a handover to a handover unit constitutes a delivery into the logistics system.

It is particularly advantageous to design the logistics system in such a way that it is set up to carry out a procedure for handover of a plurality of parcels to a plurality of recipients and for receipt of a plurality of parcels from a plurality of depositors, characterised in that for a plurality of parcels from a plurality of possible spatially separated handover points (110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 650, 720), taking into account at least one effort parameter, a joint optimized handover point 120, 220, 230, 320, 330 is determined in each case for the handover to the respective recipients and for the receipt from the depositors within a specific handover period, and that the handover to the recipients and the receipt from the depositors takes place at the assigned joint handover point 120, 220, 230, 320, 330, 410, 415, 420, 495, 650, 720 within the planned handover period.

It is advantageous, to perform at the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 one or more of the following operations:

- 5291 Individual storage of goods objects from shippers;
- 5292, "real" first mile, in particular as the entry of the parcel into the logistics system to carry out one or more of the processing operations disclosed in this application;
- 5293, Return transport of a parcel stored at the depot facility but not handed over at the joint optimized handover point within the handover period.

It is advantageous to determine the extent to which storage positions of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 shall not be affected by the handovers required at the respective handover points of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 parcels assigned by control component 5012 are occupied and these unoccupied storage positions are used for storage and handover of commodity objects, also referred to as parcels in the context of this application, including for storage of returns or "true first mile shipments" by/in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

It is also possible to use depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 so that for local handover to depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 storage positions not provided for at the handover points for storage of parcels in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are communicated to the local control unit 5170, 5171 and/or the control component 5012.

Return Transport of the Depot Facility and Removal 5195 of the Parcels

It is particularly advantageous to keep a number of parcels not transferred to recipients as low as possible and instead to carry out processing operations, in particular processing operations at the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to be carried out in such a way, that as many as possible of the parcels in the depot facility, including at depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322 to recipients including alternative recipients for parcels not otherwise handed over.

The inclusion of recipients to whom respective parcels are only assigned after one or more processing operations is particularly advantageous. In particular, it is appropriate to determine an alternative recipient for at least some of the parcels, especially for parcels to which no recipient is assigned, so that a handover of the parcel to the alternative recipient takes place, especially as a goods object.

At the end of the transfer period, in a process step 5195, the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621 is further transported, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322 to further handover points or to a transfer facility 5130, 5336.

In method step 5195, from depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 those parcels which are not eligible for handover by the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are provided in a subsequent handover period, in particular parcels not collected within the provided handover period or parcels provided to the handover gates for further transport are retrieved.

The removal of the not for handover by the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 parcels provided in a subsequent handover period is preferably carried out in an automated processing 5296, 5396.

Handover of Goods

Embodiments of the invention include instances where parcels, including commodity objects referred to herein as parcels, are stored in depot facilities 140, 240, 250, 340, 350, 740, 830, 1711, 1721, 1731, 1811,1821, 1831, 1911,1921, 1931, 2111, 2121, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and are not delivered to a recipient of the Parcel until immediately in response to a purchase of a respective Parcel.

Also included in the invention are different ways of handling different parcels. In particular, the invention includes that some of the parcels are already assigned to a recipient when the respective order is placed, as described above, and that the parcel is assigned to the recipient at a later point in time.

This makes it possible to carry out accelerated ordering procedures for parcels and/or recipients, in the sense that parcels are already put on the transport route before they are actually ordered.

However, the invention also includes advantageous embodiments in which a link between parcels and recipients also takes place independently of an ordering process, or in which a parcel whose transport has already been initiated or which is on a transport route to a recipient or a handover point or which is in a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is associated with handover information for controlling a handover to another recipient. This recipient may be a recipient entered into the ordering system via an interface, for example, as well as a subsequent purchaser including a person who is only in a catchment area of a depot facility 140, 240, 250, 340, 350, 740, 830, 1711, 1721, 1731, 1811, 1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 performs at least one component of a purchase transaction, including an impulse purchase directly at the depot facility.

It is possible to work in depot facilities 140, 240, 250, 340, 350, 740, 830, 1711, 1721, 1731, 1811,1821, 1831, 1911,1921, 1931, 2111, 2121, 2131, 2141, 2303, 2321, 2611,

2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 as parcels to hold any articles ready for handover to recipients, being both recipients to whom the respective articles have already been delivered at or before their storage in the respective depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, as well as articles which are only assigned to a recipient after their storage in the depot facility or, if applicable, immediately before their handover.

The present invention is suitable both for use with individualised parcels, in which it is relevant that a parcel with a previously defined content is transmitted to a previously defined recipient, and for use for the handover of goods, in particular bulk goods including such goods for which there is no defined recipient prior to storage or during storage, possibly even during handover, but for which a previously unidentified person can also be the recipient, for example in the design of the depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 as a sales facility.

In order to enable a handover of goods, it is advantageous to hand over the goods as goods objects—preferably using a depot facility according to the invention 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322—to be transported. During the handover of goods objects, a plurality of parcels can be provided within one storage position depending on the respective dimensions of the goods objects. In such an application, it is appropriate to use product codes, or codes already used and applied by the shipper, which are already applied to a large number of goods objects, as parcel identification characteristics.

Furthermore, it is possible to transport parcels containing an exchangeable commodity, in particular a commodity object manufactured several times with the same characteristics, during a transport operation to a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 or only within depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to a recipient, preferably a privileged recipient, for example a purchaser.

Also depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 may be components of the ordering system and contain input means for identifying one or more goods objects. This or these commodity objects are grouped into parcels, each parcel usually containing one or more commodity objects. The provision of one or more goods objects as a parcel also includes the case where the goods objects are each themselves sent as parcels. Preferred embodiments of the invention provide for largely contactless or even completely contactless handling of the parcels during sorting in a distribution centre in a recipient's destination area and on the last mile to the recipient, so that in many cases it is also possible to dispense with repackaging the goods objects.

Local Logistics

Local logistics refers in particular to the execution of logistical processing operations in the area of the joint optimized handover points. Examples of logistical processing operations are inbound deliveries, sorting operations, picking operations and outbound deliveries; handover is preferably a collective term for inbound deliveries and outbound deliveries.

The additional integration of local logistics, in particular with handover and receipt of parcels directly at a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is particularly appropriate. It is advantageous that the additional integration takes place in such a way that goods objects in particular can be transferred as parcels.

Site Selection Procedure in Detail

FIG. 6

Description Procedure

FIG. 6 illustrates a preferred embodiment of determining the joint optimized handover point 120, 220, 230, 320, 330, 410, 415, 420, 495, 650, 720 as a multi-step process with multiple selection steps.

In the preferred embodiment of the determination of the joint handover point shown in FIG. 6, it is preferably assumed that the handover points 611, 612, 613, 614, 615, 616, 617615, 616, 617, 650 are as spatially separated as possible.

This selection process preferably includes one or more selection steps, for example a first selection step 601, a second selection step 602, a third selection step 603 and a fourth selection step 604.

It is particularly advantageous that the selection steps refer to different time periods for optimisation. For example, general location properties can be taken into account in the first selection step 601, for example a basic parking possibility for a mobile depot facility, if applicable.

The selection step 601 transforms the "long list" 605 of all potential locations into a list of locations 606 that are qualified in principle for the handover of parcels.

In the second selection step 602 following the first selection step 601, those handover points, in particular locations for depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921,

2931, 3111, 3121, 3131, 3141, 3311, 3321, 3331, 3511, 3521, 3531, 3711, 3721, 3731, 5242, 5243, 5321, 5322, in which a respective effort parameter for the commissioning of the depot facilities is as low as possible within a transfer period for the parcels preferably determined as an optimisation period. In the third selection step 603 following the second selection step 602, those handover points are determined at which a respective effort parameter for the users of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322 is low. The result of the selection steps 602 and 603 are thus lists 607 and 608 of in principle qualified sites that are increasingly limited in number.

In other, possibly subsequent or simultaneous selection steps 604, one or more further optimisation parameters can be taken into account, for example with regard to suitability for storage of goods as further parcels within the respective depot facility. The final result of the selection process is a list 609 of locations for depot facilities for a transfer period, in particular within the respective day. The list contains, for example, if methods according to the invention are implemented so extensively that they can, for example, perform handover processes within one or more countries, possibly several hundred thousand or even several million entries of joint optimized handover points. One of these joint optimized handover points is the joint optimized handover point 650 described in more detail in this application.

Preferably, the selection steps are performed such that, for a plurality of parcels, at least one of the possible handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617615, 616, 617, 650, 710, 711, 712, 713, 714, 714, 715, 716, 716, 717, 718, 719, 720 is a location 120, 220, 230, 320, 330, 410, 415, 420, 495, 650, 720 that is a joint optimized handover point 120, 220, 230, 320, 330, 410, 415, 420, 495, 650, 720 for handover to the respective recipients and that at the joint handover point a mobile depot facility 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 for joint storage of the multiple parcels and for handover of the multiple parcels to the respective recipients of the multiple parcels at the associated joint handover point 120, 220, 230, 320, 330, 410, 415, 420, 495, 650, 720 within the designated handover period.

It is advantageous that the parcels planned for handover at the handover points 120, 220, 230, 320, 330, 410, 415, 420, 495, 650, 720 are introduced into the mobile depot facilities 140, 240, 250, 340, 350 and that the mobile depot facilities 140, 240, 250, 340, 350 then transport the parcels to the handover points assigned to them (120, 220, 230, 320, 330), 220, 230, 320, 330 assigned to them, and in that, during the planned handover period, the parcels are stored in the mobile depot facilities 140, 240, 250, 340, 350 and made available for handover to the recipients of the parcels using the depot facilities 140, 240, 250, 340, 350.

It is further appropriate that a plurality of parcels planned for handover at one of the handover points 120, 220, 230, 320, 330, 650, 670, are transported to a transfer facility 5130, 5336 and placed at the transfer facility 5130, 5336 into one of the mobile depot facilities 140, 240, 250, 340, 350.

A preferred embodiment of the selection process takes into account an embodiment characterised in that, in addition to the plurality of parcels being deposited at the associated joint handover point 120, 220, 230, 320, 330, 650, 670 within the planned transfer period in the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, further parcels are provided to depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

A preferred embodiment of the selection method combinable therewith takes into account an embodiment characterised in that a part of the data stored in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 other parcels set is transported to a transfer facility 5130, 5336 after the end of the transfer period for the multiple parcels, provided they are not collected during the initial transfer period.

A further preferred embodiment likewise combinable therewith is characterised in that in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 parcels stored in response to a received hand out request within the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are transported to a handover gate where they are made available to the recipient.

Longer-term optimisation parameters, in particular in selection step 601, relate in particular to the technical suitability of the respective handover point, for example the possibility of installing a depot facility there 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322. In particular, these are locations where the respective depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 can be parked.

Other more long-term optimisation parameters include an availability of more parking spaces and/or proximity to public transport, There are long-term parameters, such as regulatory conditions, in particular regulations on the use of public parking spaces or privately owned parking spaces.

Individual of the long-term optimisation parameters thus concern parameters that are valid for several months, possibly even several years. Others of the longer-term optimisation parameters are significantly shorter than a month, but longer than a handover period usually lasting a day or shorter.

This can be seen, for example, in the map of an idealised city shown in FIGS. 4*a*, 4*b*, 4*c* 4*d* of an idealised city. Here a road connection between P—Street and J—Square in A—City is shown, marked by a thick black line. This is a scale representation. Approximately halfway between the locations of the recipients of a parcel is XX Street. This street is located at a distance of several 100 m from a zoo. During weekdays, there are numerous parking spaces available on this street. On weekends, however, parking spaces at the animal park are overcrowded, so that the parking spaces along XX—Street that are free at all other times are also occupied.

However, a handover on normal working days in the XX—Street area is possible here without any problems. There are sufficient parking spaces for both depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and for users of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 as well as for recipients and depositors of parcels. Proximity to public transport and thus a favourable expense parameter for public transport users is also given.

However, other parameters must be taken into account depending on the respective handover period. For example, it can be taken into account that construction work is occasionally carried out on a road, which causes numerous motorists to use detours and therefore reduces the number of potential recipients within a handover period that lies in the construction period accordingly. In this case, it is appropriate to choose a handover point that does not have such a restriction.

Another parameter is the suitability for storage of objects in the depot facility. Such items are also referred to as parcels in this application, even though they are not parcels in the classical sense.

When optimising locations for depot facilities, both the impact on the costs of the parcel service provider and the convenience for the recipients are taken into account. There is a trade-off between the two: the more depot facilities are used, the higher the convenience for the recipients, but also the higher the costs for the parcel service provider.

For example, it can be assumed that the parcel service provider does not want to exceed a certain level of total costs for the processing of a parcel—this then determines a total budget with the respective daily parcel quantity and, above this, the total number of depot facilities used on the respective day, e.g. in a city, i.e. the total number of locations. Given the total number of locations, these can then be distributed in such a way that the total effort for the respective recipients to reach the respective locations on the respective day is minimised. For this purpose, the respective location should be on or as close as possible to routes or places that the recipients will travel to or visit on the respective day anyway ("anyway routes"). Preference should be given to locations with good parking facilities (as long as a high proportion of parcels are collected by car). In addition, information about traffic jams and road works as well as about special events that may lead to traffic and parking disruptions can be included in the daily optimisation. Preferred embodiments of the invention take into account one or more of the following optimisation approaches:

- The easiest way is to optimise the location so that—over all recipients of parcels from the respective depot facility 140, 240, 250, 340, 350, 740, 830, 1711, 1721, 1731, 1811,1821, 1831, 1911,1921, 1931, 2111, 2121, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 on the day in question—the sum of the distance deviations to the anyway-routes or anyway-places is minimised.
- In addition, one can also take into account the recipient's mode of transport: Distances by car are usually covered more quickly than those on foot or by bicycle—therefore, knowing the mode of transport of the respective recipient, one can calculate the time required for the deviation from the route or location anyway and then minimise the additional time required across all recipients. The effort parameter would accordingly have the dimension "time required".
- The first two methods work with an equal weighting across all recipients. It would also be conceivable to weight recipients with a high number of parcels more heavily over the year—or recipients who have booked a premium service.
- Also appropriate are solutions according to which the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 in use at different locations throughout the day. Such solutions could be particularly useful in sparsely populated rural areas where stationary facilities for consolidated handover (stationary parcel locker facilities such as Packstations, branches and other stationary parcel delivery and acceptance units, etc.) have not previously been economically justifiable due to low mail volumes. For example, it is advantageous for a mobile depot facility to "drive off" a number of villages and stop there for e.g. 2 hours each time. During this time, the recipients of parcels on that day or substitute recipients authorised by them via a user component 5351 of the recipient and/or an app, in particular a user app 5021, 5022 app, can collect the parcels.

In cities, too, different locations in the course of a day are conceivable, e.g. in the morning at a first location in one district and in the afternoon at another location in another district. For recipients whose additional time required to reach the second location is less than at the first location, a trade-off then opens up: They can decide whether to collect the parcel already in the morning, accepting a higher time investment, or to minimise the effort, to move the depot facility 140, 240, 250, 340, 350, 740, 830, 1711, 1721, 1731, 1811,1821, 1831, 1911,1921, 1931, 2111, 2121, 2131, 2141,

2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to the second, closer location later in the day. If recipients assigned to the second location choose early pick-up, there may be a different optimal location for the second half of the day.

Such intraday optimisation is also covered by the invention, even if it is more costly due to the need for additional communication to customers with the content "The location of the depot facility has changed: You will now receive your parcel at location Y". To move the depot facility underground 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, the means of transport shown in this application, including vehicles with the degrees of autonomy shown, can be used for the transport operations between the transfer facilities 5130, 5336 and the depot facilities, as well as for the transport operations shown, whereby the corresponding control is also advantageously carried out here, taking into account the degree of autonomy of the means of transport for transporting the depot facilities.

An appropriate parameter for determining the joint optimized handover points when used as a selection procedure for selecting locations for depot facilities is that the parcels assigned to the respective depot facilities on the respective day actually all fit into the assigned storage units of the depot facilities. This is preferably ensured by the early measurement of the spatial dimension (length, width, height) of the parcels in the first distribution centre 5301 for parcels, in particular a distribution centre that processes the respective parcel, and the subsequent use of the spatial dimension in the selection procedure, regardless of whether the dimensions of the storage units are fixed or (within certain limits) flexibly configurable. Preferably, a simultaneous optimisation of locations and compartment/storage space configuration and preferably also of the transfer periods takes place:

With a flexible storage unit configuration of the storage units, especially shelves, and a "high" proportion of large parcels, the compartment configuration is also optimised simultaneously with the location optimisation in such a way that all "geographically", i.e. due to the low "extra time required" for collection, parcels matching the respective depot facility also fit into one of the enlarged compartments—accordingly, other compartments are then reduced in size to the extent possible.

If this optimisation reaches its limits, either because the number of large parcels is too high or the remaining compartments cannot be reduced sufficiently, a kind of iterative optimisation begins—as with a rigid compartment configuration of the shelves: It is determined which parcels can be moved to other depot facilities without much additional time expenditure for the recipient. This process is repeated until all parcels, including the large ones, fit into a compartment for the standing depot facilities that can be used for the handover of the parcels in the respective handover periods. In an advantageous embodiment, a priority rule can be introduced: Before too many small parcels are moved to less optimal locations, large parcels would be geographically relocated first, or the customer would be offered handover on a later day.

In a preferred embodiment of the invention, the optimisation of the locations and the communication with the customer can proceed as follows:

When the client downloads the user app, the app is configured to select between several, for example four, options that support the subsequent selection of locations for the depot facilities:

In a "basic version", the user can enter a limited number of so-called "points of interest" on a map (points of public life within a certain radius of his/her specified place of residence (e.g. supermarkets, schools, petrol stations, public transport stops) are shown here as an orientation), where he/she ideally spends at least one day of the week "anyway" (places of interest). He/she is asked on which days of the week he/she visits these locations and by which means of transport he/she travels.

In an "Advanced Variant", the customer specifies for each day of the week the places of residence, work, shopping and other "typical whereabouts", including means of transport (ideally also with times), so that the location optimisation system is able to calculate any-route distances.

In the "professional variant", the recipient allows the use of the locations of the smartphone or other suitable digital devices (e.g. smartwatch) at least over a certain period of time, but ideally permanently, so that the system is able to take into account and preferably continuously update the recipient's locations.

A fourth variant could be that the recipient allows the app to access previous locations of the recipient and these are incorporated into the optimisation processes.

If a parcel is generated in the system for handover by the shipper or recipient to the depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 two cases are to be distinguished:

The parcel exceeds a critical threshold in terms of weight and/or spatial dimensions that could make handover at the depot facility inconvenient, e.g. a threshold of 15 kg or of more than 1.20 m longest side. In this case, the recipient receives a notification which, with reference to the critical threshold value, gives him the choice between handover at joint optimized handover points and handover at an individual handover point, which may be subject to an extra charge. The recipient is clearly informed of the deadline for making a decision in this regard, if necessary in the form of a "countdown clock", preferably with a reminder, e.g. 5 minutes before the deadline expires. If the recipient does not make a choice within a predefined time, it is transferred by default to one of the depot facilities according to the invention.

For all parcels finally planned for handover to depot facilities, the location optimisation is carried out with the data entered in the user app during registration or with the current whereabouts, and in such a way that, for example, the time-related "additional effort" of "anyway" routes or "anyway" locations (for the "basic variant") to joint optimized handover points is minimised for all recipients and, if necessary, a corresponding KPI is complied with at the individual customer level. If "heavy users" or "premium customers" are preferred, the additional time required is preferably weighted).

After the location optimisation has been completed, the customer receives a handover notification that the parcel will be made available at a depot facility with a "quasi-precise" location and "probable" earliest and latest time of collection ("quasi-precise" and "probable" because an advised parking space may be occupied and parking at a new parking space or traffic jam on the approach costs time). If a mobile depot facility drives to different locations on the day in question, the recipient will also be notified of the other locations with the respective collection times for the sake of maximum transparency.

Furthermore, it is possible to additionally give the recipient the choice for a limited number of hours to initiate a handover at the nearest joint optimized handover point, in particular the nearest available depot facility, instead of the handover at the proposed joint optimized handover point. The additional effort generated by this could be justifiable if the system learns enough about the "true preferences" of the recipients (e.g. if the "initial data" of the recipients according to the basic variant or "advanced variant" is too bad or quickly outdated and not updated).

After completion of the parking process on the actual delivery day, the recipient receives a final handover notification with the then final location and confirmation that they can now collect parcels.

If detailed information is not or not completely available for recipients, a self-learning system, especially using neural networks, can also include past values: "Where, i.e. at which stationary pick-up facilities such as Packstations or branches/parcel shops has the recipient picked up parcel shipments in the past?"

The aim of daily or even intraday location optimisation is thus to enable as many recipients as possible, and also depositors, to receive parcels "on the way", i.e. without a diversion or with a minimum diversions, preferably while complying with KPIs via a maximum additional time. This is advantageous for all different expansion stages of the network of depot facilities:

In a first stage of expansion, the depot facilities are only designed as a "last mile" for parcels.

In a second expansion stage, depot facilities can be opened for any depositor in the vicinity of the respective location, e.g. in the respective city district. Retailers, other parcel service providers, other companies and also private individuals could store goods, parcels, or items and authorised recipients could then remove them.

In a further stage of expansion, the depot facilities, e.g. in a city, can be in a city can be connected to a network in such a way that parcels, goods or other objects can be deposited in a depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and then transported underground to another depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and made available there for the respective recipient.

In the first expansion stage, the location preferences of the recipients are taken into account as described earlier in this application. In the second expansion stage, the location preferences of shippers and recipients can be taken into account, at least for deposits and removals of parcels, goods objects or other objects booked on the previous day: If the shippers or recipients have entered their "anyway" routes or "anyway" locations in the system, or have given their consent to the transmission of whereabouts and/or routes, these can be taken into account in the same way as those of the recipients of parcels in the case of deposits and removals booked on the previous day. The situation is different for deliveries and removals booked at short notice on the respective "handover=delivery=removal day". Since the location optimisation takes place the evening before, only historical experience values can be taken into account for storage and removal booked on the same day. Here is an example: A telecommunication service provider books in fixed intervals (e.g. every three days), but only for the same day, compartments of the depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 in district X for handover of goods objects to customers. Since the system can derive this "regularity" from historical data, the telecommunication service provider's oh-route or location preferences are taken into account in the selection process, but in the case of daily changing customers, their location preferences are not, since they are unknown.

The third expansion stage is similar. If storage, transport and removal of goods objects are ordered one day in advance, movement data/location preferences of shippers and recipients can flow into the location optimisation. If the order takes place on the same day, which can be assumed in view of the predominant use case "same-day purchasing", historical experience values can at most flow into the optimisation (e.g. "bookshop X delivers every day").

Further changes in the location optimisation can result if advertisements for shops in the vicinity of the respective depot facility location are made when sending notifications for depot facility parcels. In a preferred embodiment, an additional criterion that flows into the selection process is minimising the distance to advertisers' shops.

Other more long-term optimisation parameters include an availability of further parking spaces and/or a proximity to public transport. In a preferred embodiment of the invention, a selection step independent of the respective parcels can be combined with a selection step related to the parcels, for example taking into account the weight and/or dimensions of a parcel in the optimisation/minimisation of an effort parameter related to the handover of this parcel A selection step 601 transforms the "long list" 605 of all potential locations into a list of locations 606 qualified in principle for the handover of parcels.

In the second selection step 602 following the first selection step 601, those handover points, in particular locations for depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, in which a respective effort parameter for the commissioning of the depot facilities is as low as possible within a transfer period for the parcels preferably determined as an optimisation period. In the third selection step 603 following the second selection step 602, those handover points are determined at which a respective effort parameter for the users of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821,2831, 2911, 2921, 2931,3111, 3121, 3131, 3141,3311, 3321, 3331, 3511,3521, 3531, 3711, 3721, 3731, 5242, 5243, 5321, 5322 is low. The result of the selection steps 602 and 603 are thus lists 607 and 608 of in principle qualified sites that are increasingly limited in number.

In other, possibly subsequent or simultaneous selection steps 604, one or more further optimisation parameters can be taken into account, for example with regard to suitability for storage of goods as further parcels within the respective depot facility. The final result of the selection process is a list 609 of locations for depot facilities for a transfer period, in particular within the respective day. The list contains, for example, if methods according to the invention are implemented so extensively that they can, for example, perform handover processes within one or more countries, possibly several hundred thousand or even several million entries of joint optimized handover points. One of these joint optimized handover points is the joint optimized handover point 650 described in more detail in this application.

In summary, particularly advantageous procedures and selection steps for site optimisation can be presented as follows.

Advantageously, a selection procedure (optimisation procedure) is used with a selection of a number of locations and precise localisation data of the locations, in particular with selection steps, in such a way that the locations are

- Meet basic criteria (sufficient size of site, available on the day in question, sufficient parking, easily accessible, safe, etc.),
- are cost-minimising for an operator of the logistics system,
- and fulfil certain secondary conditions:
  - the storage of the parcel shipments in the depot facilities must be technically possible in terms of the size and weight of the parcels,
  - the effort to reach the locations for parcel collection/delivery must remain within certain limits for recipients and, if applicable, local shippers.

Means to Achieve the Overall Objective

Sequential filtering methods as well as maximisation methods under constraints are used to achieve this overall objective.

A. Filtering Method

Filtering procedures ensure that basic criteria are met. They are preferably carried out independently and in advance of specific shipment data, either at longer intervals or daily, depending on the respective filter criterion:

- The locations are filtered out of the population (or long list) of parking spaces available in Germany (or another country),
  - which, due to their size, can be considered as parking spaces for mobile depot facilities,
  - and that have sufficient other parking spaces in the immediate vicinity that recipients of parcels can use to park their own vehicle.
- Then the locations that can be considered safe due to their nature (visibility, space, "local neighbourhood") are filtered out.
- Daily filters can ensure that the site is accessible and usable on the day in question in terms of traffic and weather, i.e. no unacceptable traffic jams, public festivals, markets, heavy rain, floods or similar impair its use.
- In addition, from the population of stationary depot facilities (e.g. packing stations), those can be filtered out that have capacity for the removal or storage of parcels on the day in question.

One result of this application of a filtering process is a short list of locations that could be considered for mobile depot facilities or for the stationary storage and removal of parcels.

B. Maximisation Procedure

Locations are associated with expenses (expenses for a journey from the respective distribution centres, expenses for a preferably reversible connection of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 with another depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and/or another fixed reference point (connection). However, sites can also offer revenue potential in at least two ways: Firstly, if advertisers want to advertise to recipients of parcel shipments at the location in question, e.g. via the shipment notification for collection. On the other hand, if local depositors (possibly also recipients) are willing to pay a surcharge on the normal parcel price for particularly close mobile depot facilities.

A connection of the depot facility is preferably effected as a reversible physical connection, in particular by means of a coupling element at the depot facility and a coupling element cooperating therewith of the facility to be connected thereto, in particular another depot facility, a building or a floor preferably by means of cooperating androgynous coupling elements. The coupling element is preferably designed to effect a releasable mechanical connection. In an advantageous embodiment, the coupling element contains supply lines for data and/or media, in particular electricity, liquids, in particular a cooling liquid, as well as gases.

The operator of a logistics system according to the invention or the operator of the network of depot facilities will ideally choose the number and geographical positions of the joint optimized handover points in such a way that for the day in question his net revenues (location-based revenues minus costs) are maximised. Of course, there are constraints to consider, which are described below.

C. Constraints

In maximisation procedures according to the invention, two groups of constraints are preferably used: The first group ensures the technical feasibility of the storage of the items of the day in question. Here, the size of the individual parcel shipments plays a role above all, but also their weight. In concrete terms: it must be ensured that all parcel shipments planned for the respective location on the day in question (regardless of whether they are to be outsourced to recipients or shipments booked in advance for storage by depositors) also fit into the mobile (or stationary) depot facility, and maximum weights for individual compartments or for the depot facility as a whole are not exceeded. Flexibly configurable shelving and storage space systems for the depot facilities are of particular advantage, as they open up more degrees of freedom.

The second group of constraints serves to limit the effort for recipients of parcel shipments, but also for local depositors of parcel shipments ("local shippers"). For this purpose, the effort parameters of the recipients or depositors are taken into account, which in each case record the additional time required to reach the respective location, based on the recipients' or depositors' existing locations and routes. All other factors that drive effort can or should be recorded additionally. These include the variance of locations (if certain recipients/depositors find the "constant change" of locations disadvantageous or prefer a constant location) or the carrying capacity on the way back from the depot facility to the car/bicycle/home address, especially for heavier items. If several factors are differentiated in the effort parameter, scoring methods or other suitable methods can be used to generate one-dimensional values or scores from a multi-dimensional effort parameter per recipient/depositor.

In the simplest case, the additional time required to reach the depot facility for all (or a high proportion of e.g. 95% of) recipients/depositors could be less than x, e.g. 10 minutes, or—in the case of several effort factors—a suitable score value is not exceeded. However, procedures are also conceivable in which different values are used for the secondary conditions for different groups of recipients or depositors. For example, it could be specified that the additional time required for Amazon Prime customers may only be 5 minutes, in contrast to the value for other recipients, and the same value applies for local depositors who book the storage one day in advance.

Finally, it is advantageous if past feedback from recipients or depositors about previous locations is also included as a secondary condition in the location selection ("only locations that have received an average score of x smileys as feedback"). Furthermore, not only effort parameters of actual recipients and depositors of the following day can be taken into account when selecting locations, but also the parameters of expected recipients or depositors, especially if goods are only sold to recipients or if the storage of goods by local shippers has not been booked in advance. In these cases, learning or self-learning procedures enable the determination of expected recipients or depositors as well as their expected locations and routes.

Preferably, the selection steps are performed such that, for a plurality of parcels, at least one of the possible handover points 110, 111, 112, 113, 114, 115, 116, 117, 118, 119, 120, 210, 211, 212, 213, 214, 215, 216, 217, 218, 219, 220, 230, 310, 311, 312, 313, 314, 315, 316, 317, 318, 319, 320, 330, 611, 612, 613, 614, 615, 616, 617, 650, 710, 711, 712, 713, 714, 715, 716, 717, 718, 719, 720 is a location 120, 220, 230, 320, 330, 410, 415, 420, 495, 650, 720 forming a joint optimized handover point 120, 220, 230, 320, 330, 410, 415, 420, 495, 650, 720 for the handover to the respective recipients and that at the joint handover point a mobile depot facility 140, 240, 250, 340, 350, 1710,1720, 1730, 1810, 1820, 1830, 1910,1920, 1930, 2110, 2120, 2130, 2140, 2710, 2720, 2730, 2810, 2820, 2830, 2910, 2920, 2930, 3110,3120, 3130, 3140, 5321 for a joint deposit of the multiple parcels and for the handover of the multiple parcels to the respective recipients of the multiple parcels and/or for the handover of the additional parcels by the depositors of the additional parcels at the assigned joint handover point 120, 220, 230, 320, 330, 410, 415, 420, 495, 650, 720 within the designated handover period.

It is advantageous that the parcels planned for handover at the handover points 120, 220, 230, 320, 330, 410, 415, 420, 495, 650, 720 are transferred to the preferably mobile depot facilities 140, 240, 250, 340, 350, 1710,1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5321 and that the mobile depot facilities 140, 240, 250, 340, 350 are then loaded with the parcels 140, 240, 250, 340, 350, 340, 350 transport the parcels 140, 240, 250, 340, 350 to the handover points (120, 220, 230, 320, 330) assigned to them and that during the planned handover period the parcels 140, 240, 250, 340, 350 are stored in the mobile depot facilities 140, 240, 250, 340, 350 and made available for handover to the recipients of the parcels 140, 240, 250, 340, 350 using the depot facilities 140, 240, 250, 340, 350.

It is further appropriate that a plurality of parcels planned for handover at one of the handover points 120, 220, 230, 320, 330, 650, 670 are transported to a transfer facility 5130, 5336 and placed at the transfer facility 5130, 5336 into one of the mobile depot facilities 140, 240, 250, 340, 350.

A preferred embodiment of the selection procedures takes into account an embodiment characterised in that, in addition to the plurality of parcels being deposited at the associated joint optimized handover point 120, 220, 230, 320, 330, 650, 670 within the designated transfer period at the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, other parcels provided by depositors to the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

A preferred embodiment of the selection method combinable therewith takes into account an embodiment characterised in that a part of the data stored in the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 other parcels set is transported to a transfer facility 5130, 5336 after the end of the transfer period for the multiple parcels, provided they are not collected during the initial transfer period.

A further preferred embodiment of the selection method which can likewise be combined therewith takes into account an embodiment which is characterised in that another part of the further parcels set in the depot facility 140, 240, 250, 340, 350 for handover to a depot facility located at the depot facility 140, 240, 250, 340, 350, 740, 830, 1711, 1721, 1731, 1811,1821, 1831, 1911,1921, 1931,

2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 received a request to hand out is issued.

The processes presented in this application, in particular the machining operations presented, can be improved by means of linear optimisation so that the processes and/or machining operations are carried out as efficiently as possible.

For example, the selection procedures presented above can also be improved by means of linear optimisation.

However, it is particularly advantageous to use artificial intelligence methods and systems and accordingly to use a learning or self-learning system.

MLLLS Mobile Locker Location Learning System

A particularly advantageous further embodiment of the invention is characterised by an implementation of a learning or self-learning system. Such a method and a corresponding system are referred to in the context of this application as MLLLS: Mobile Locker Location Learning System.

The self-learning system is preferably realised by a neural network. Calibrations, in particular learning processes of the neural network, are carried out, for example, with the inclusion of the data described in the article "Three useful tools to evaluate your machine learning system". https://medium.com/@turicodeag/drei-n%C3%BCtzliche-instruments-to-evaluate-your-machine-learning-system-cd8fa92d82a1 evaluation tools presented. The relevant data points presented in this article preferably correspond to the joint optimized handover points as defined in this notification.

The following is an example of the use of the MLLLS in the determination of joint optimized handover points according to the invention for the handover of parcels to the recipients and/or the receipt of parcels from the depositors at the assigned joint optimized handover points.

Here it is advantageous that for the selection of the joint optimized handover point (120, 220, 230, 320, 330, 410, 415, 420, 495, 650, 720) for at least some of the recipients and/or depositors at least one handover point selected for the handover of a parcel to the recipient and/or by the depositor is taken into account by the self-learning system, which is preferably facilitated by integration in the selection procedure for the joint optimized handover points, and in that the handover to the respective recipient and/or the handover by the depositor at the joint optimized handover points (120, 220, 230, 320, 330, 410, 415, 420, 495, 650, 720) takes place taking into account the handover points selected by the self-learning system.

This is exemplified in the explanation for the use of MLLLS in relation to the joint optimized handover point:

If, for example, a recipient or the shipper has only stored his or her private address in the database 5023 of his or her user app 5021, 5022 for recording and managing user data, the "Learning Parcel Mobile System" will independently make initial hypotheses for determining optimised handover points for this recipient or shipper.

For example, the system determines the nearest shopping facilities (e.g. retail shops for daily needs) and assumes that the recipient/or shipper regularly moves between their specified private address and the determined shopping facilities. Depending on the age, for example, a possible frequency of movement between the two points or the type of travel (car, bicycle, walking and public transport) between the two points is assumed.

Another parameter for the determination of an optimised handover point is the evaluation possibility for the recipient or shipper in the course of each pick-up of the recipient or each dispatch by the shipper.

Specifically: when the recipient or shipper is standing in front of the depot facility, has authenticated himself and the depot facility enters the handover of his parcel, the recipient or shipper is asked in the APP used for the handover, in particular a user app 5021, 5022, for an assessment of the handover point just used (e.g. "was the handover point easy for you to reach" or "would the handover point also be OK for you for future collections or shipments?(e.g. "was the handover point easy for you to reach?" or "would the handover point also be OK for you for future collections or shipments?"), e.g. relatively simply with a 3 smiley system (smile/neutral/sad). In addition, in a more advanced system, the reason for e.g. a neutral or negative smiley rating could be asked for (e.g. default of "no parking", "too far from where I live" etc.). This evaluation of the depositor and/or recipient is then included in all future determinations (as an effort parameter), especially for this depositor and/or recipient, regarding a joint optimized handover point.

For example, the MLLLS can thus determine whether the rating changes negatively after a certain distance between optimised handover points and the private address, or whether, for example, the rating is always positive to the south of the private address and negative to the west, or whether the rating shows trends on certain days of the week or in certain weather conditions.

Further criteria for deriving hypotheses about whereabouts and/or paths for the MLLLS and as a basis for self-learning systems can be e.g. age: younger users could, for example, be assumed to be more willing to travel longer distances. Other examples of criteria are:

- the catchment area of the user's address: urban fringe=higher degree of car or public transport use, inner city: bicycle, walking;
- the coupled offer of vouchers: e.g. whenever a voucher is provided to the user in connection with the use, the user is more likely to visit this place and rate it positively.
- be the urgency of the shipment/receipt/dispatch depending on content or derived by shipper.

Provided that the user's privacy requirements associated with the user app 5021, 5022 allow the information presented to be forwarded to a logistics service provider and/or a control component of the logistics system, this information is forwarded and improves investigations of:

- joint optimized handover points 120, 220, 230, 320, 330, 410, 415, 420, 495, 650, 720;
- envisaged handover periods;
- individual handover points for each recipient of the parcel for a handover of the parcel to the recipient and/or acceptance of the parcel from the depositor.

The greater the extent to which a user of the logistics system, in particular a depositor of a parcel and/or a recipient of a parcel, enables a link with information relevant to the handover of parcels to the user and/or from the user, in particular by linking with localisation information—contact data and calendar entries, the better the respective effort parameters can be optimised for handovers of parcels assigned to this user.

Preferably, functions and capacities of the system as well as position data of the parcels are checked, in particular in case of changes, and corresponding status information is transmitted to a control component, in particular the control component 5012 shown in this application and/or to one of the control devices.

An evaluation of the status information by the control component 5012 has the advantage that frictions in machining operations can be detected in real time and that accordingly as many machining operations as possible, in particular the represented machining operations, can be controlled and adapted to possibly adapting environmental conditions, for example in the case of transport operations failures of components, construction sites or traffic jams.

In order to achieve a high level of safety in the machining processes, it is appropriate to design redundant machining equipment and preferably to use predictive maintenance methods.

A real-time review of the processing operations and the system also make it possible to identify remaining capacities and/or opportunities.

It is particularly advantageous to check the processing operations in such a way that it is determined whether there are transport opportunities and/or handover opportunities, in particular for the handover of parcels.

For example, the system can be designed in such a way that in a country like Germany, 10 million parcel handovers can take place every day. In the city of Aachen, for example, with a population of approximately 250,000, there may be capacity for processing operations that allow 30,000 parcels to be handed over daily. Similarly, the daily capacity for handovers of parcels in Aachen and neighbouring areas, for example including motorway car parks in the vicinity of Aachen, is 100,000 parcels per day.

If it is determined by a control component of the system, for example the control component 5012, that free capacities, in particular for transport operations and/or transfer operations of parcels, are available in the entire logistics system and/or in selected areas, preferably geographical areas such as Aachen or in the surrounding area, it is possible to enable the acquisition of a use of the free capacities via an offer portal.

A particularly advantageous design of the offer portal is an integration of improved procedures of a Dutch Auction. In this case, transport operations and/or transfer operations of parcels are offered individually or in bundles. It is expedient that such a Dutch Auction starts at a high starting price and the price subsequently decreases to a range of marginal costs for respective transport operations and/or transfer operations of parcels.

FIG. 7

Figure 7:
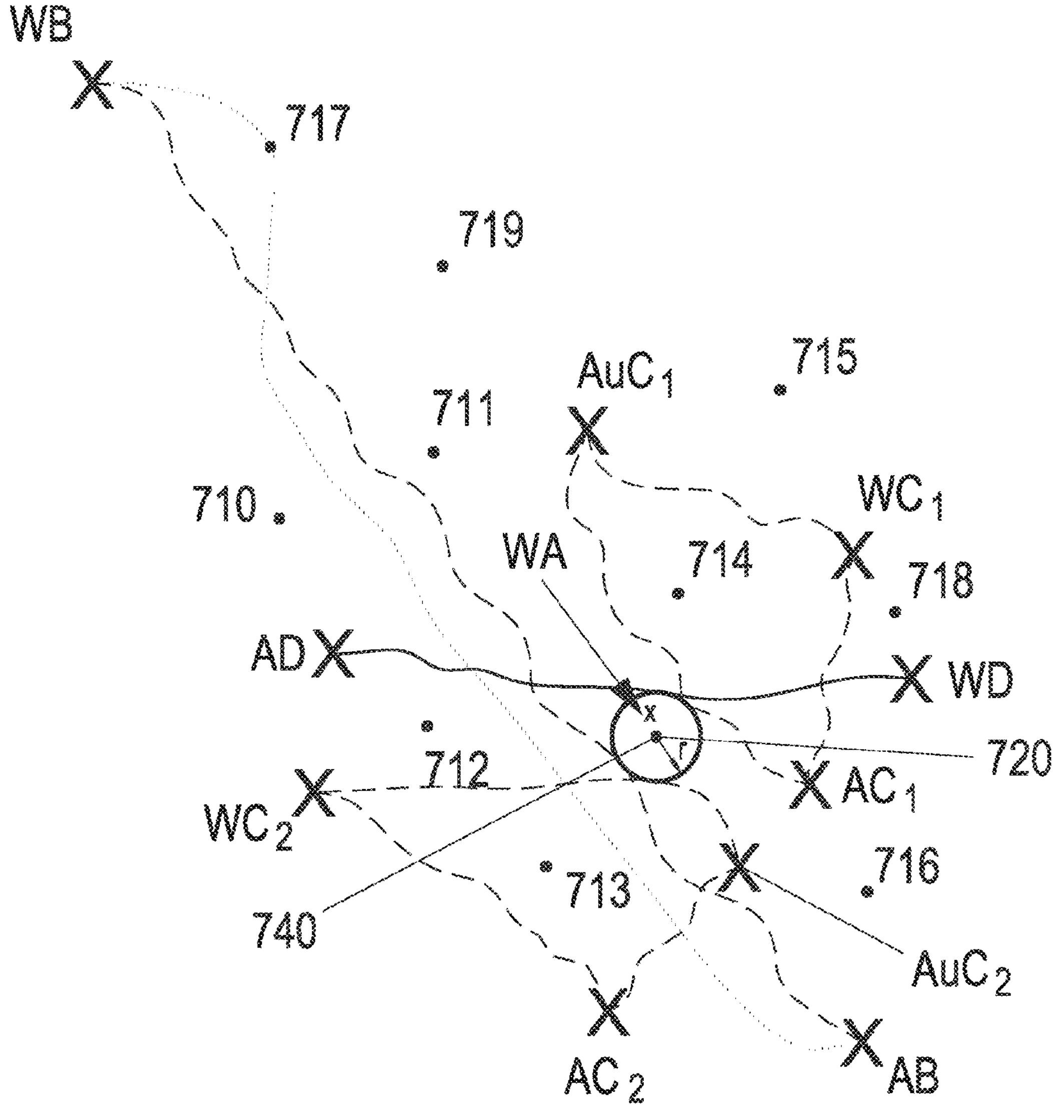
FIG. 7 A schematic diagram of handover points for delivering parcels to recipients according to the invention.

FIG. 7 illustrates a preferred embodiment of the determination of the joint optimized handover point 120, 220, 230, 320, 330, 410, 415, 420, 495, 650, 720, in particular with respect to the consideration of a different depth of information provided by both recipients and depositors of parcels prior to the handover of parcels when determining the effort parameter.

For example, it can be assumed that only the recipient A's home address WA is known, but no other places of work or residence. For depositor B, both the home address WB and the address of his place of work AB are known, but not the exact route between B's home address and place of work, so that the system calculates the dotted line as the route between WB and AB using a route optimisation algorithm. Recipient C may, for example, be known to be at different places of residence, work and stay, such that he either travels from home address WC1 to work address AC1 and from there to stay address AUC1 and from there back to his home address WC1, or from home address WC2 to work address AC2 and from there to home address AUC2 and from there back to home address WC2, whereby the exact routes are again unknown, so that the system calculates the dotted lines from WC1 to AC1 to AUC1 to WC1 or from WC2 to AC2 to AUC2 to WC2 as routes. Depositor D, on the other hand, has only one residential address WD and one work address AD, and communicates the route chosen between the two addresses—in FIG. 7 the solid line between WD and AD—via the app or via a permission to use localisation information, so that no route needs to be calculated.

Taking into account all known or estimated places of residence, work and stay as well as the distances travelled between them, whether known or calculated, leads in this example to the fact that the handover point 720, the centre of the hatched circle, offers itself as a joint optimized handover point. It is characterised by the fact that the additional effort, expressed as spatial distance, that the recipients and depositors A to D have to expend to reach the joint optimized handover point 720 from locations where they are anyway during the handover period, is equal to or smaller than a distance r that is still considered acceptable, where r denotes the radius of the hatched circle.

In reality, the places of residence, work and stay will not always be as conveniently located as in this example. In principle, therefore, the procedure for selecting a joint optimized handover point 720 is such that for each of the locations (711, 712, 713, 714, 715, 716, 717, 718, 719, 720) qualified in principle as a handover point, the minimum additional time that the respective recipient or depositor would have to spend to each qualified location from locations where he/she is anyway during the handover period is calculated for each recipient of a parcel at that location or depositor of a parcel at that location. For example, the additional time required for recipient B to reach a handover location 717 is the difference between the time required for the fastest route from WB to 717 and then to AB (dotted line) minus the time required for the fastest route directly from WB to AB (dashed line), based either on the means of transport specified by the recipients or depositors or calculated by the system using artificial intelligence methods, if applicable.

From the multitude of possible handover points 711, 712, 713, 714, 715, 716, 717, 718, 719, 720, the system then selects the handover point at which the additional time required is the least and/or best limited, viewed cumulatively across all recipients and depositors. Different operationalisations of the criterion "least" are conceivable. A particularly preferred method could, for example, provide that for each recipient and/or depositor who belongs to certain prioritised user groups, the additional time required may not exceed a threshold value of, for example, 5 minutes, and that, viewed over all recipients and depositors, the additional time required is less than 10 minutes for a proportion of 95%.

Logistics vehicle & mobile depot facility

FIG. 8

Figure 8:
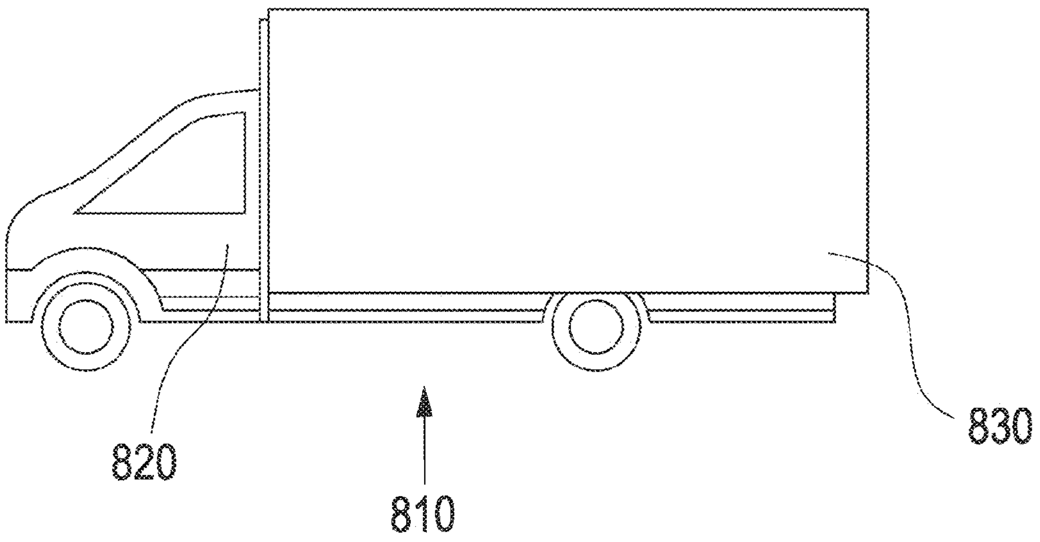
FIG. 8 a logistics vehicle according to the invention.

FIG. 8 shows an example of a logistics vehicle 810 according to the invention. In this embodiment, the vehicle is only partially adapted externally. For example, it has a driver's cab 820 and a load compartment 830.

The invention also includes more complex logistics vehicles, for example with devices for autonomous driving or semi-autonomous driving, whereby the driver's cab, for example, can be omitted, particularly in the case of autonomous driving.

The logistics vehicle 810 contains a control unit, which is preferably not shown.

In principle, it is possible to design the logistics vehicle 810 with a local control unit in such a way that it can control a route and/or a loading of the logistics vehicle 810 in such a way that it can control the parcels into storage positions provided for them within the loading space 830 of the logistics vehicle 810. Preferably, this is done by controlling a transport unit located in the depot facility and/or a gripper arm located in the depot facility.

However, it is even more advantageous to design the control component 5012 of the logistics system in such a way that it can control a loading of the logistics vehicle 810 in such a way that the parcels can be steered into the respective positions provided for them within the loading space 830 of the logistics vehicle 810.

In particular, the load compartment 830 has the structure illustrated in more detail with reference to FIGS. 9, 10, 11 and 14,15 and 17, 18, 19, 21, 27, 28, 29, 31, 33, 35, 37, 43.

In the embodiments illustrated in FIGS. 9, 10, 11, 14, 15, 17-19, 21 and 27-31, 35-37, 43, the depot facilities have a particularly simple and appropriate structure, each with a central aisle 1711, 1721, 1731, 1811, 1821, 1831, 1911, 1921, 1931, 2111, 2121, 2131, 214, 2711, 2721, 2731, 2811, 2821, 2831, 2911, 2921, 2931, 3111, 3121, 3131, 3141, 3311, 3321, 3331, 3511, 3521, 3531, 3711, 3721, 3731.

On the sides of each of the central aisles are shelves 1712, 1713, 1722, 1723, 1731, 1732, 1812, 1813, 1822, 1823, 1832, 1833, 1912, 1913, 1922, 1923, 1932, 1933, 2112, 2113, 2122, 2123, 2132, 2133, 2142, 2143, 2712, 2713, 2722, 2723, 2731, 2733, 2812, 2813, 2821, 2823, 2831, 2833, 2812, 2813, 2922, 2923, 2932, 2933, 3112, 3113, 3122, 3123, 3132, 3133, 3142, 3143, 3312, 3313, 3321, 3323, 3331, 3333, 3512, 3513, 3522, 3523, 3532, 3533, 3712, 3713, 3721, 3713, 3732, 3733. Of course, designs with other configurations of the storage positions are also possible.

FIG. 9

Figure 9:
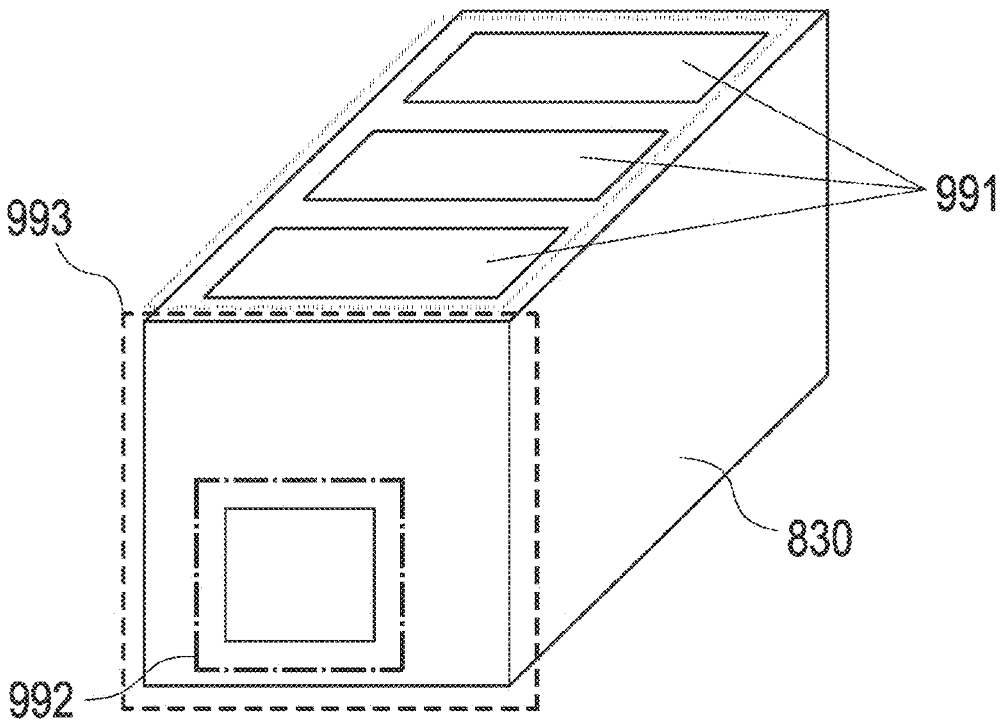
FIG. 9 a schematic representation of a loading space of a depot facility, in particular as part of a logistics vehicle according to the invention, in particular the logistics vehicle shown in FIG. 8.

FIG. 9 shows a schematic representation of a loading space of a depot facility 830, in particular as part of a logistics vehicle according to the invention, in particular the logistics vehicle shown in FIG. 8. On the loading space of the depot facility 830 there are preferably photovoltaic modules 991 for generating electricity, so that the depot facility can supply itself, for example, during the dwell time at joint handover points without connection to external power networks. The loading space of the depot facility 820 can be opened completely for loading in a distribution centre 5301. For this purpose, there is an opening front side 993 of the loading space of the depot facility 830, which can be opened by up to 180 degrees. A handover gate 992 is integrated into the opening front side 993. The handover gate 992 is used for the handover of parcels. The handover of parcels can be the handover of parcels from a storage unit of the depot facility to a recipient and/or the acceptance of parcels from shippers and the subsequent storage of the parcel in a storage unit in the depot facility.

FIG. 10

Figure 10:
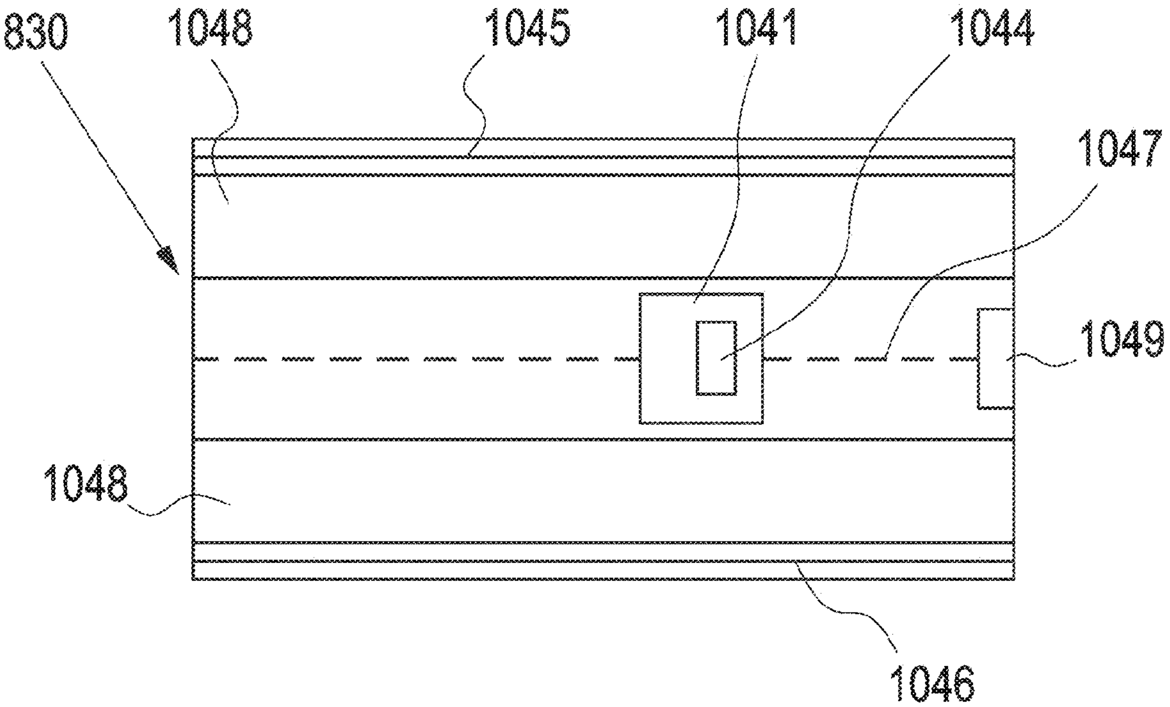
FIG. 10 a top view of a horizontal cross-sectional plane of the logistics vehicle shown in FIG. 8 with at least two racks.

FIG. 10 shows a top view of a horizontal cross-sectional plane of the logistics vehicle shown in FIG. 8 with at least two racks;

According to the invention, the loading space of a depot facility 830 has the following interior fittings:

A storage unit (shelf unit) 1048 for storing parcels is located on each of the two long sides. For an exemplary design of the storage unit, see FIGS. 11*a* to 11*d*. A storage unit (shelving unit) that can be reconfigured at any time, or even more advantageously an automatically configurable storage unit, is also particularly advantageous, see FIGS. 43, 43*a* and 43*b*.

Between the respective storage unit (shelf unit) 1048 and the outer skin of the loading space of the depot facility 830, the sliding unit 1045 and 1046 are located for the Moving parcels from the storage unit (shelf unit) 1048 to the transport unit 1041. The transport unit 1041 transports the parcel 1044 along the guide rail 1047 to the handover gate 1049.

In the case of a shipper delivering a parcel via the handover gate 1049, the transport unit 1041 transports the parcel 1044 to a storage position of the storage unit 1041.

FIGS. 11*a*-11*d*

Figure 11A:
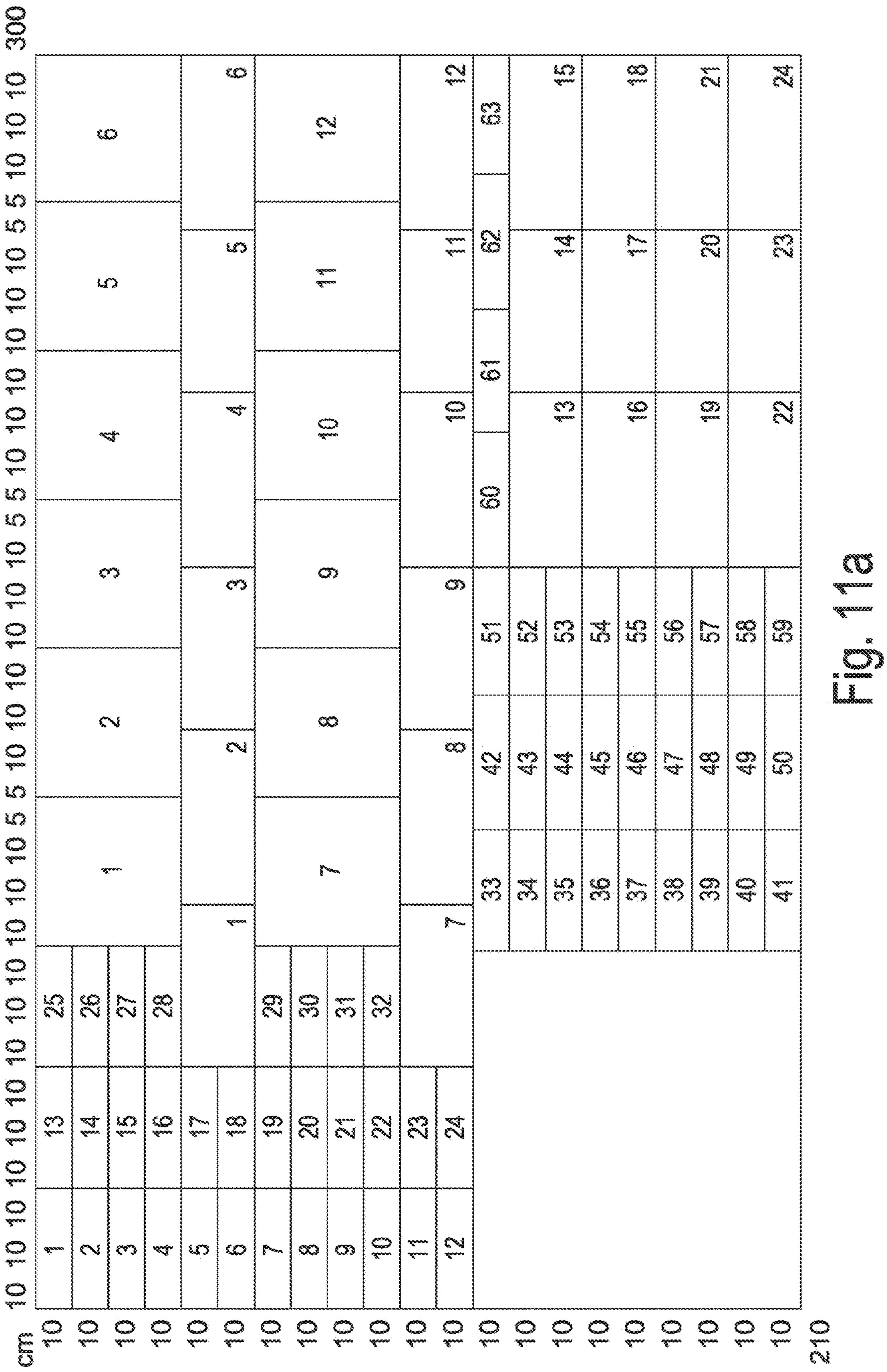
FIG. 11*a* an advantageous compartment configuration of a shelf according to the invention.
Figure 11B:
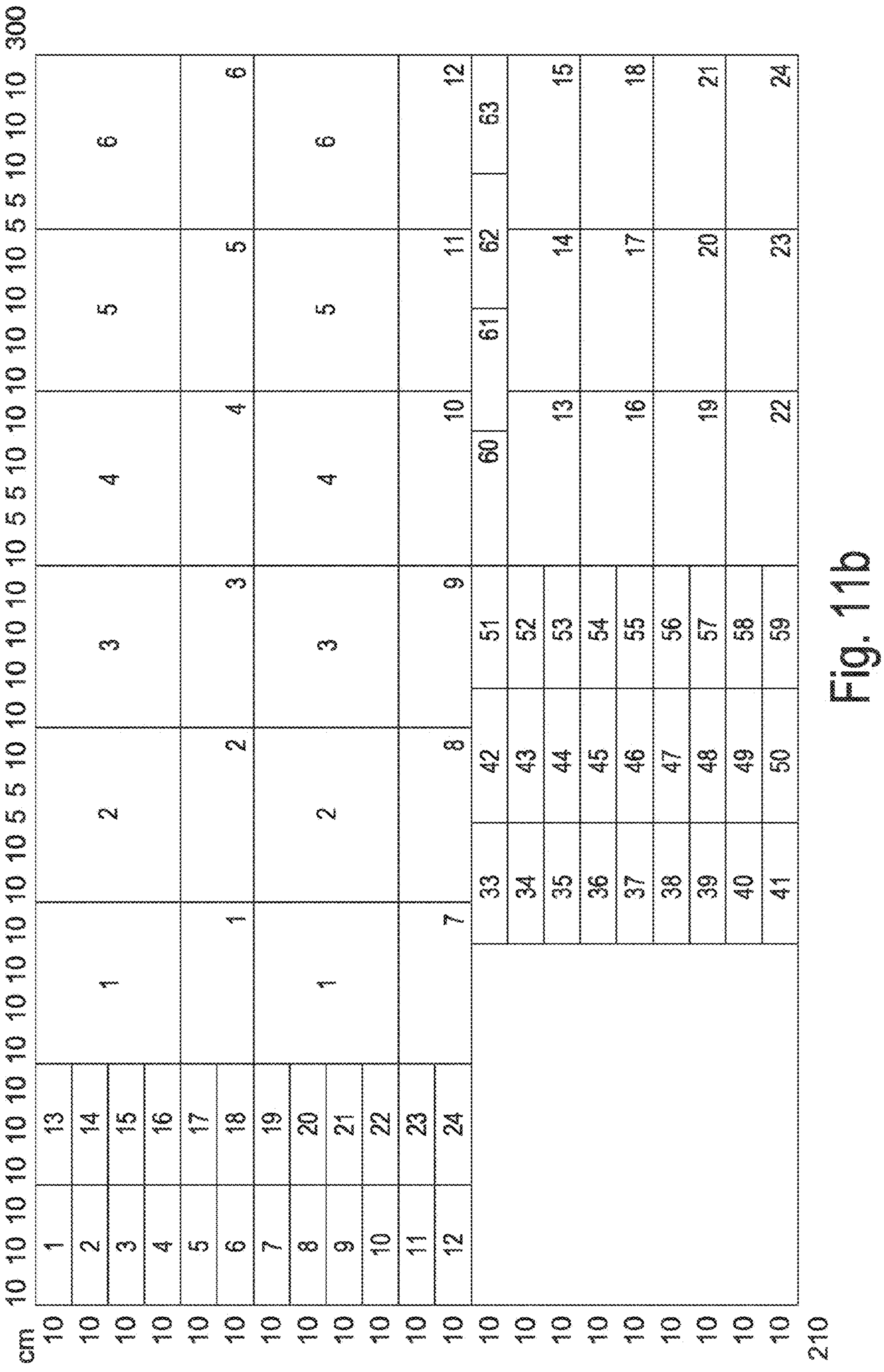
FIG. 11*b* an advantageous compartment configuration of a shelf according to the invention.
Figure 11C:
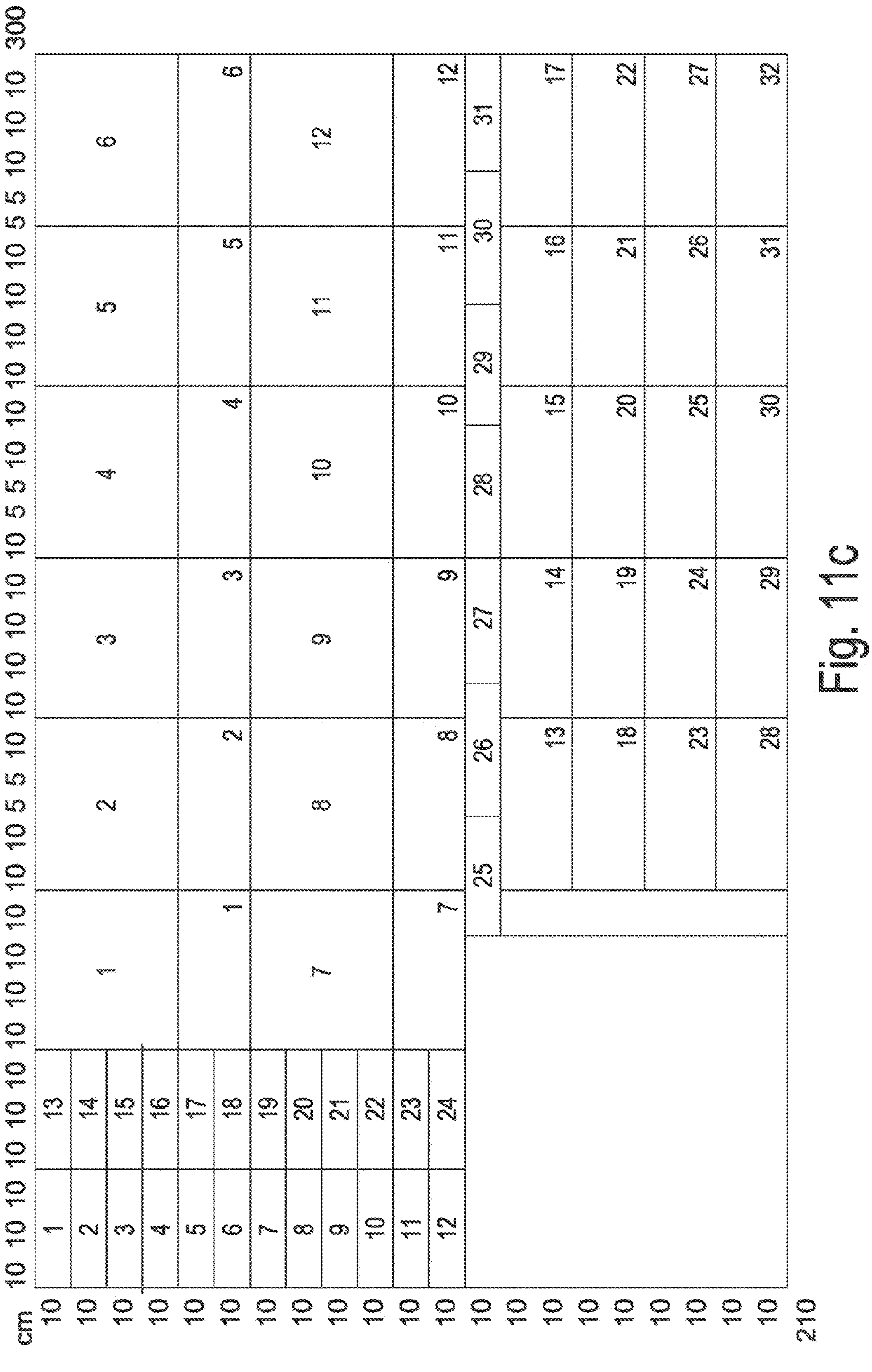
FIG. 11*c* an advantageous compartment configuration of a shelf according to the invention.
Figure 11D:
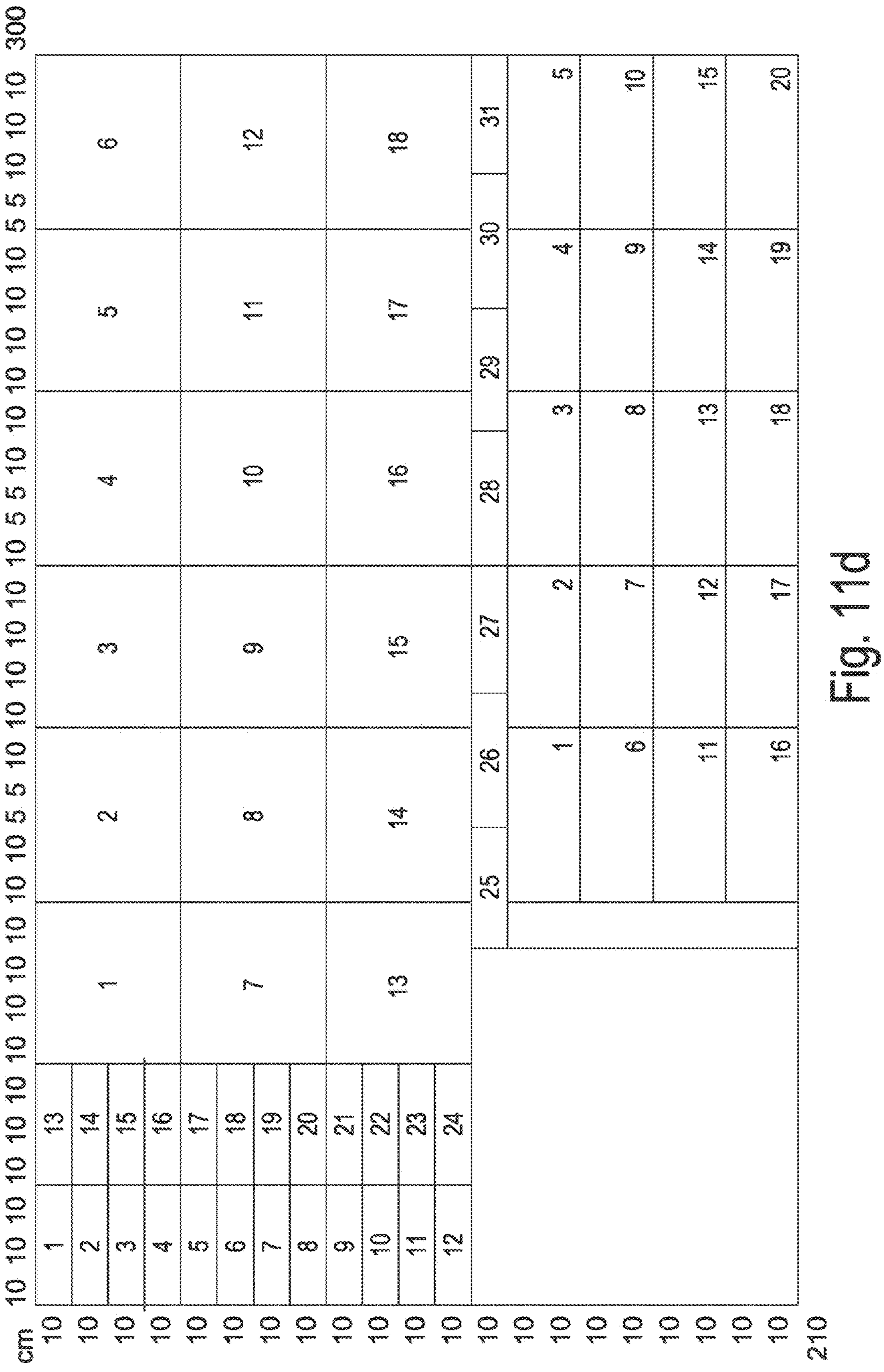
FIG. 11*d* an advantageous compartment configuration of a shelf according to the invention.

FIGS. 11*a-d* each show an advantageous compartment configuration of a shelf unit according to the invention; the storage units, which are preferably located e.g. within depot facilities for the storage of parcels, but are also useful as a storage unit installed in a distribution centre for the storage of parcels, as well as generally for the storage of objects, can have a fixed compartment configuration as shown in FIGS. 11*a* to 11*d*, e.g. in FIG. 11*a* with a total of 99 compartments divided into 63 compartments of size S (30 cm×10 cm×50 cm), 24 compartments of size M (35 cm×20 cm×50 cm) and 12 compartments of size L (35 cm×40 cm×50 cm), FIG. 11*b* with a total of 91 compartments divided into 55 S-size compartments (30 cm×10 cm×50 cm), 24 M-size compartments (20 cm×40 cm×50 cm) and 12 L-size compartments (40 cm×40 cm×50 cm), FIG. 11*c* with a total of 75 compartments divided into 31 S-size compartments (30 cm×10 cm×50 cm), 32 compartments of size M (20 cm×40 cm×50 cm) and 12 compartments of size L (40 cm×40 cm×50 cm) and FIG. 11*d* with a total of 69 compartments in the division with 31 compartments of size S (30 cm×10 cm×50 cm), 20 compartments of size M (20 cm×40 cm×50 cm) and 18 compartments of size L (40 cm×40 cm×50 cm).

FIGS. 14, 15

Figure 14:
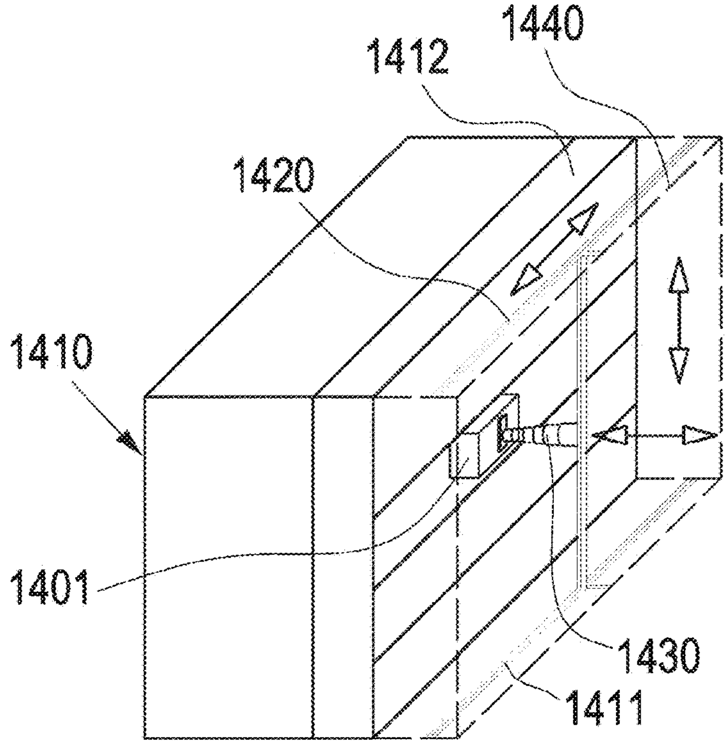
FIG. 14 an example of a bearing unit according to the invention.
Figure 14A:
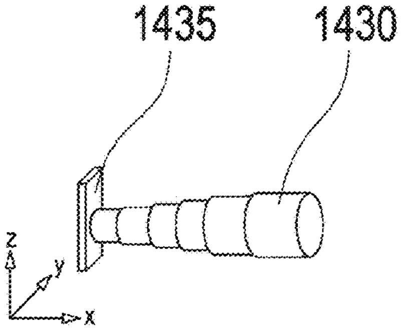
Figure 15:
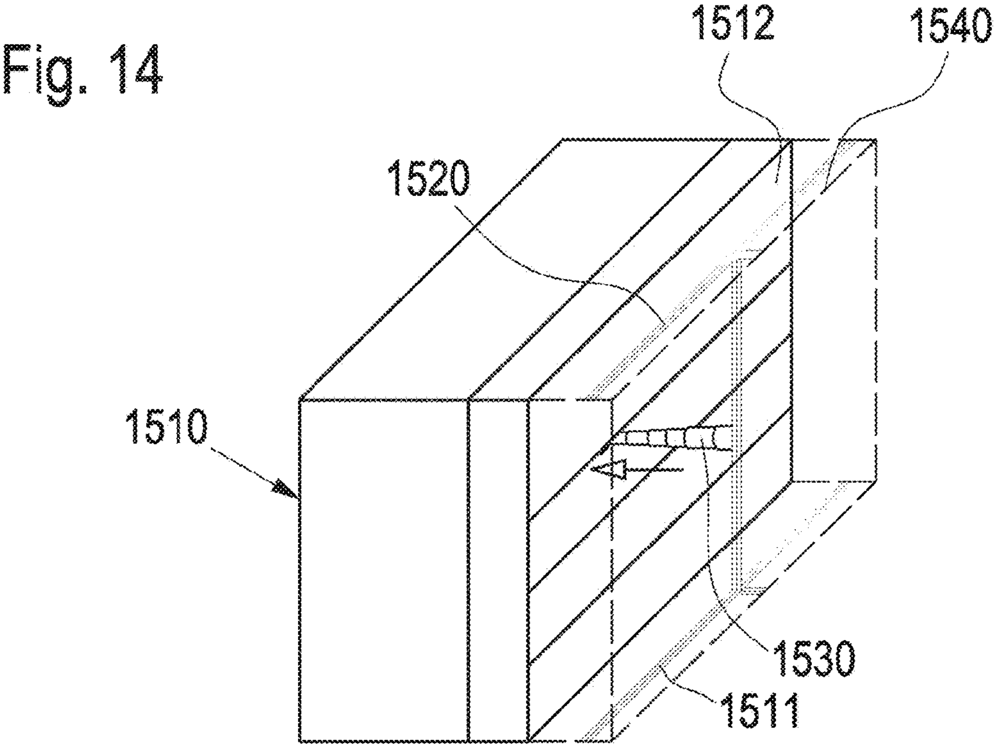
FIG. 15 an embodiment example of a bearing unit according to the invention.

FIGS. 14 and 15 show an embodiment example of a storage unit 1410 according to the invention, comprising a shelf unit and a pusher unit 1420 for moving parcels 1401 from a shelf 1412, 1512.

A guide rail 1420, respectively 1520, movably guides another guide rail along a predetermined path, in particular in horizontal (y-direction) direction and/or vertical (z-direction) direction, so that a slider 1430 is supported and movable along a complete side surface of the storage unit.

A plunger 1435 is extendably arranged on the pusher 1430 and is displaceable in the X-direction so that the pusher 1430 can convey parcels 1401 from the shelf 1412,1512, in particular onto a transport unit.

It is alternatively and/or additionally appropriate to use depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511,

3521, 3531, 3711, 3721, 3731, 5242, 5243, 5321, 5322 with one or more gripping arms not shown for reasons of simplification.

The gripping arms are preferably arranged inside the logistics vehicles and are preferably long enough to allow transport of parcels between storage positions of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and a handover gate 1601/2201 of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 preferably including a withdrawal from the handover gate 1601/2201 and a withdrawal from storage positions of the depot facility.

It is further advantageous to use depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 with at least one gripper arm, preferably similar to the gripper arms of the robots at the end chutes 21110, 21120, 21130, 21140, 31110, 31120, 31130, 31140.

Using the gripper arm(s) in depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, several or all of the following processing operations can be performed and/or facilitated:

- Transport of parcels between the handover gate 1601/2201 and storage positions of the depot facility;
- Carrying out and/or facilitating the storage of parcels in the storage positions of the depot facility;
- Perform and/or facilitate the removal of parcels from the storage positions of the depot facility;
- Transport of parcels between the storage positions of the depot facility and the handover gate 1601/2201.

Preferably, robot tools, preferably gripping systems, are attached to the gripper arms, in particular one or more suction pads, also called vacuum grippers. For example, the gripper systems known from DE 198 17 426 A1, in particular vacuum gripper systems, are adapted for this purpose. In particular, it is advantageous to use the measures described in this publication to monitor the gripping process by means of a force sensor. This enables corrections to be made in the event of incorrect gripping of parcels, as forces outside a tolerance range can be measured and used to vary a control of the gripping process.

Furthermore, it is appropriate to equip the gripper arms with one or more sensor modules, in particular at least one force sensor, to measure the force on the parcel to be lifted, in particular the parcels 2101, 2151, 2161, 21201. Furthermore, it is advantageous to use position sensors that are suitable for measuring a relative position or a distance between the parcel and the gripper or for determining the start and end points of a movement.

Preferably, a flexible gripping device is used to pick up the parcels, which is illustrated for example in DE 20 2007 013 673 U1. This gripping device has a gripper with a multi-section frame, which is adapted for the present invention in such a way that better adaptation to variable dimensions (geometries) of the parcels is possible.

Transport Unit

FIG. 12

Figure 12:
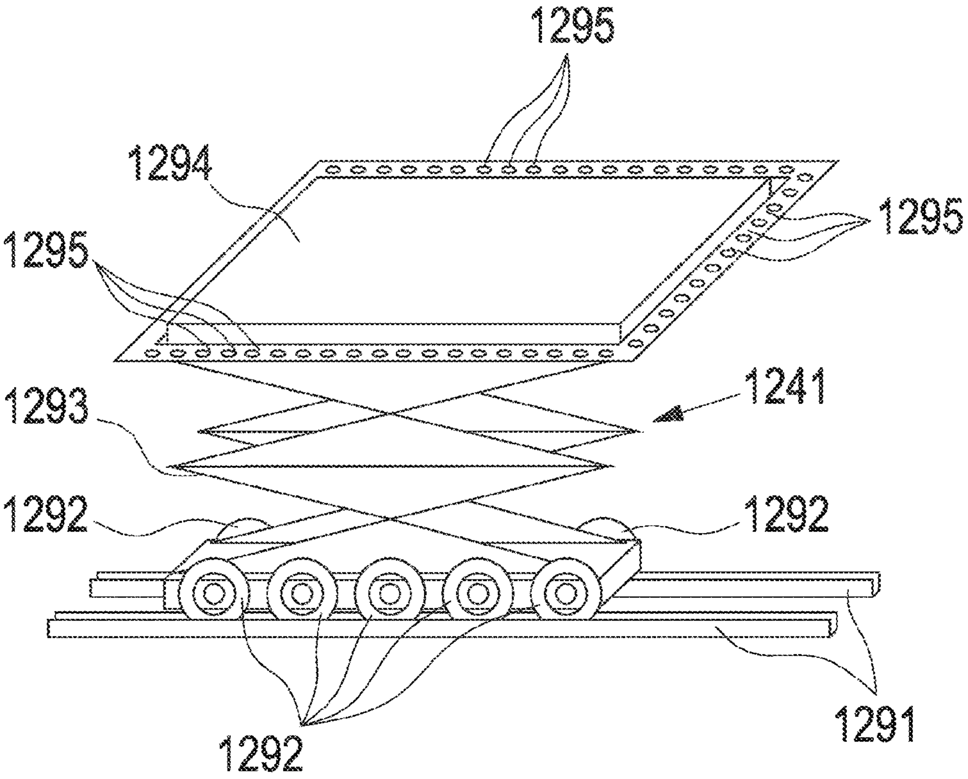
FIG. 12 a perspective view of a transport unit according to the invention.

FIG. 12 shows a perspective view of a transport unit according to the invention; transport units support the storage and removal of parcels to and from storage positions of storage facilities of the depot facilities as well as the transport to and from a handover gate of the depot facility. The transport unit 1241 according to the invention is guided on rails 1291 by means of wheels 1292, which is useful, for example, for use within depot facilities and/or at transfer facilities.

The transport unit 1241 has a height-adjustable device 1293 which, by way of example, is hinge-shaped. The height-adjustable device 1293 is used for the height-adjustable storage of a transfer platform 1294. The transfer platform 1294 preferably has a conveyor belt for transporting parcels. By means of the light barrier sensors 1295, it is checked whether, when a parcel is handover to and/or from the transfer platform 1294, the parcel is complete and ready for transport on the transfer platform 1294 or has been completely handed over from the transfer platform 1294 to the unit to be handed over.

FIG. 13

Figure 13:
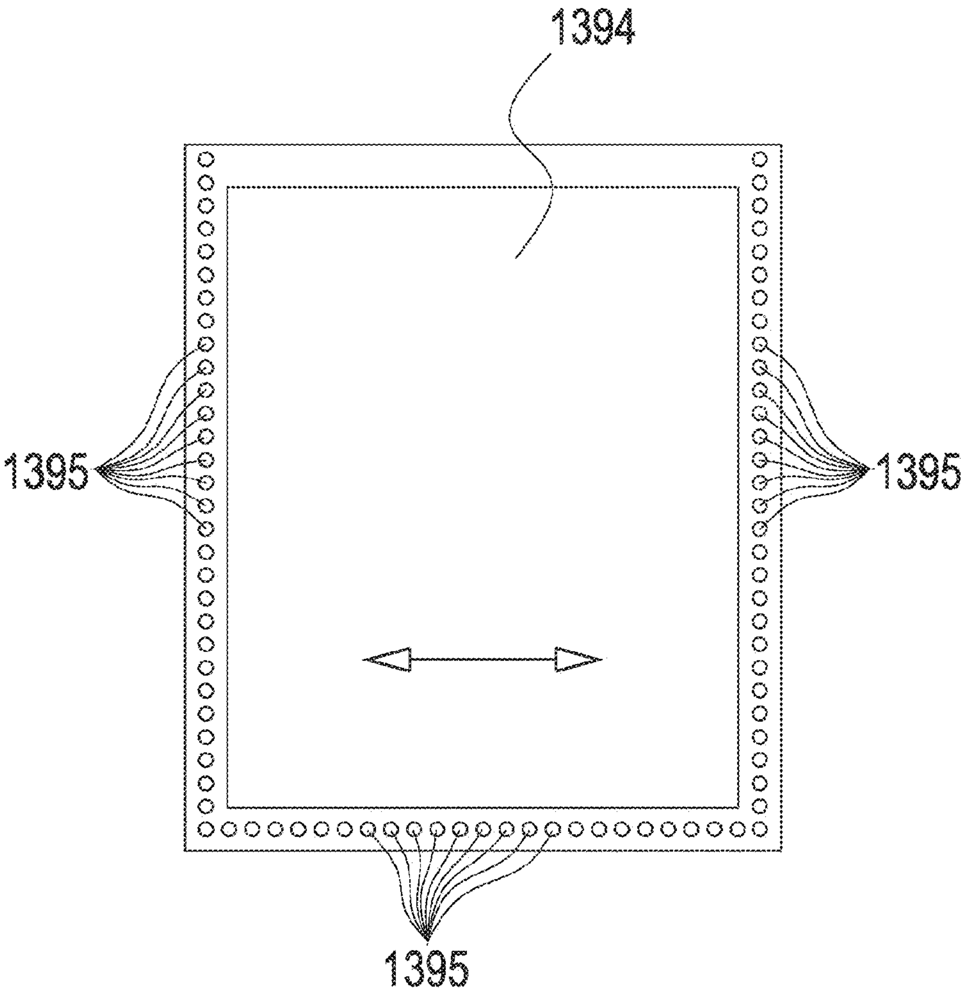
FIG. 13 a top view of a transport unit according to the invention.

FIG. 13 shows a top view of a transport unit according to the invention; the transfer platform 1394 preferably has a conveyor belt for transporting parcels. By means of the conveyor belt, a transfer of a parcel, for example to the transfer platform and/or from the transfer platform to a storage position of a depot facility, can take place. By means of the light barrier sensors 1395, it is checked whether, when a parcel is handover onto and/or from the transfer platform 1394, the parcel is complete and ready for transport on the transfer platform 1394 or has been completely handed over from the transfer platform 1394 to the unit to be handed over.

FIGS. 16*a*, 16*b*

In advantageous embodiments of the invention, at least some of the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 configured to move and/or control transport units therein to perform and/or facilitate individual ones of several or all of the following processing operations:

- Transport of parcels between the handover gate 1601/2201 and storage positions of the depot facility;
- Carrying out and/or facilitating the storage of parcels in the storage positions of the depot facility;
- Perform and/or facilitate the removal of parcels from the storage positions of the depot facility;
- Transport of parcels between the storage positions of the depot facility and the handover gate 1601/2201.

The transport unit 1641 according to the invention shown in FIGS. 16*a* and 16*b* is guided on rails, which is useful, for example, for use within depot facilities and/or at transfer facilities.

The transport unit 1641 has a height-adjustable device 1693, which is exemplarily hinge-shaped. The height-adjustable device 1693 is used for the height-adjustable mounting of a transfer platform 1694. The transfer platform 1694 preferably has a conveyor belt for transporting parcels, for example the parcel 1667 shown as an example in FIG. 16*a*. By means of the conveyor belt, a transfer of the parcel 1667, for example onto the transfer platform and/or from the transfer platform to a storage position of a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are supported.

The transfer platform 1694 is preferably rotatably mounted. This facilitates, for example, that the transfer platform 1694 can receive parcels from a conveyor belt of a transfer facility 5336 and/or—preferably after a rotation of the transfer facility 5336—transfer parcels to storage positions of storage units of the depot facilities.

Transport unit 1641 represents a preferred embodiment of transport units 1041, 1241, 1641, 1940, 1941, 1942,1943, 1944,1945, 2140, 2141, 21422, 2145, 2101*a*, 2102*a*, 2103*a*, 2104*a*, 2105, 2106*a*, 2140, 2141, 2153*a* shown in this application, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745.

It is also possible to use the transport unit 1641 as a handover unit which can transport parcels between the depot facility and individual handover points for a handover of parcels to individual recipients and/or from individual depositors (cf. section Individual handover points).

Sorting in the Distribution Centre, Loading Preparation &: Loading

Sorting

The sorting of parcels for recipients is preferably done in such a way that tours for mobile depot facilities on the one hand and tours with normal parcel delivery vehicles for door-to-door delivery on the other hand are separated. This is appropriate, since

- Parcels for depot facility handover should not exceed certain maximum dimensions,
- Parcels for depot facility handover are to be separated at the chute for loading.

Loading Preparation

From the sorting process, the parcels planned for handover with depot facilities are automatically identified, discharged, separated and transported via conveyor belt to the handover position to the logistics vehicle.

If the parcels have not already been separated—preferably in the distribution centre 5301 for parcels—a parcel separator is added to a chute of the distribution centre to separate the parcels, which lines up parcels at the chute individually and one after the other from the sorter towards the vehicle.

Preferably, the chutes are designed via a gradual narrowing and preferably configured by means of advancing side belts in such a way that the parcels are separated.

Variant 1: Fully automatic solution

Here, the chutes are configured via a gradual narrowing, as well as advancing sidebands, in such a way that a separation of the parcels results Variant 2: Fully automatic solution with alignment turntable and suspension Here, the chutes are configured via a gradual narrowing, as well as forward-pulling side belts, so that the parcels are separated, analogous to the fully automated solution without alignment spring.

There are two variants here:

- after scanning the 6-sided scanner, the parcel is forwarded and a "lump-sum adjustment" takes place, i.e. the parcel is automatically placed in the centre by springs permanently pressing on both sides.
- after scanning the 6-sided scanner, the parcel is moved on; the data on how the parcel is positioned on the conveyor belt is forwarded by the 6-sided scanner to a control component that moves the springs according to the position of the parcel (i.e. each spring individually) so that the parcel is also positioned centrally afterwards.

FIGS. 17-21 provide a more detailed description of these methods. In the embodiments of the invention illustrated in FIGS. 17, 18, 19, 20, 21, 32 and 37, parcels transferred from chutes are separated in the vicinity of conveyor belts and scanned after separation.

FIGS. 17, 18, 19, 20, 21,21*a* and 37 show transfer facilities 5130, 5336 in use in loading depot facilities 1710,1720, 1730, 1810,1820, 1830, 1910,1920, 1930, 2110, 2120, 2130, 2140, 2710, 2720, 2730.

FIG. 17

Figure 17:
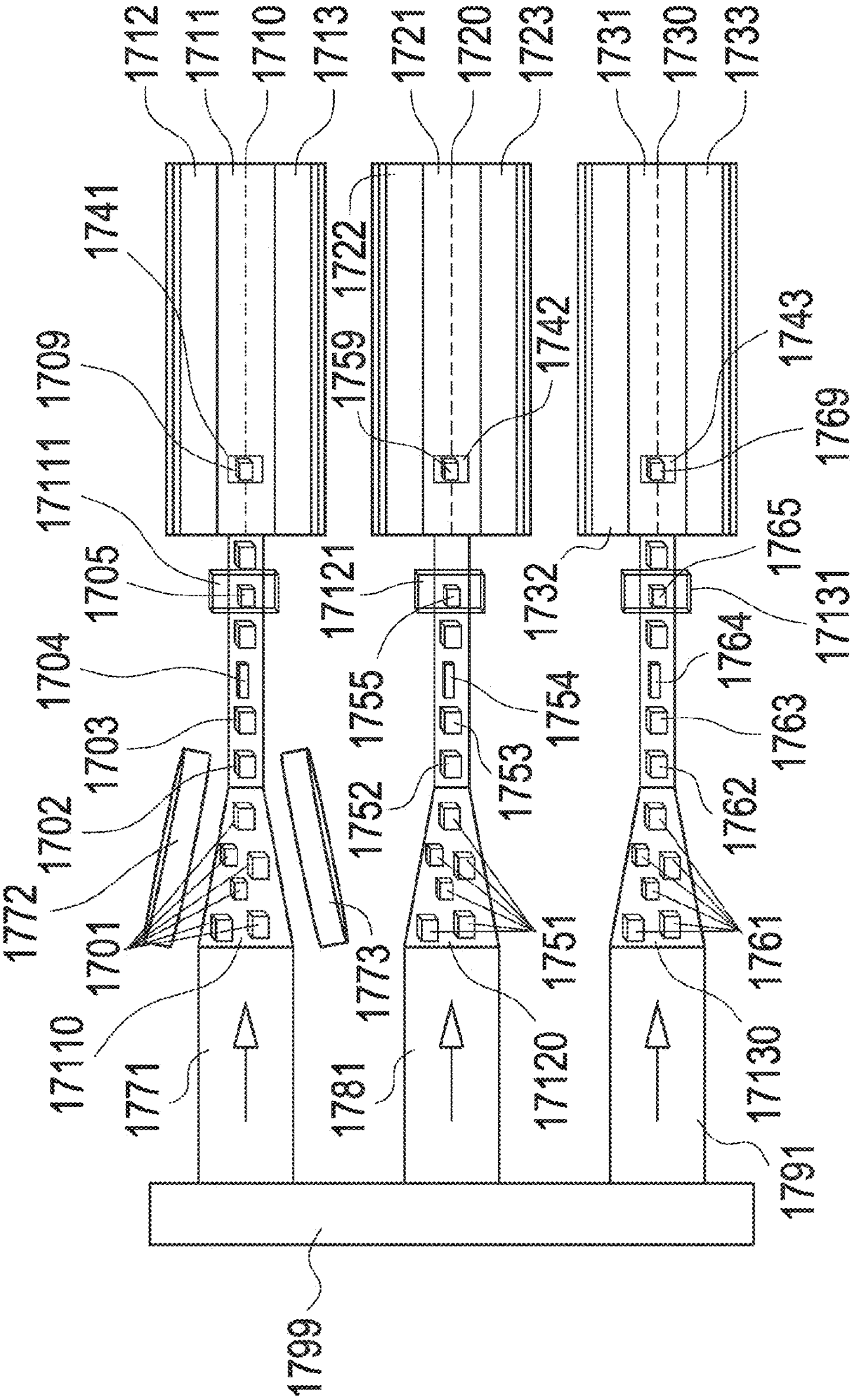
FIG. 17 a top view of a transfer facility according to the invention.

FIG. 17 shows a preferred embodiment of a transfer facility 5130, 5336 according to the invention. This is a fully automatic solution, whereby at chutes 1771, 1781, 1791 a conveyor belt 1771, 1781, 1791 is configured via a gradual narrowing 17110, 17120, 17130 as well as advancing side belts 1772, 1773 in such a way that a separation of the parcels 1701-1709, 1751-1759, 1761-1769 results.

Figure 20:
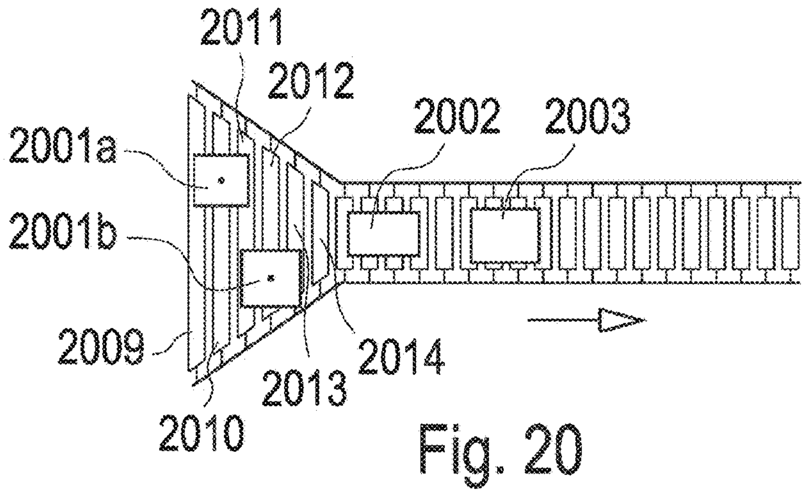
FIG. 20 a top view of a roller conveyor which can be used as a component of a distribution centre and/or transfer facility according to the invention, in particular as a section of the conveyor belts shown in FIGS. 17-19 and 27-29.
Figure 20A:
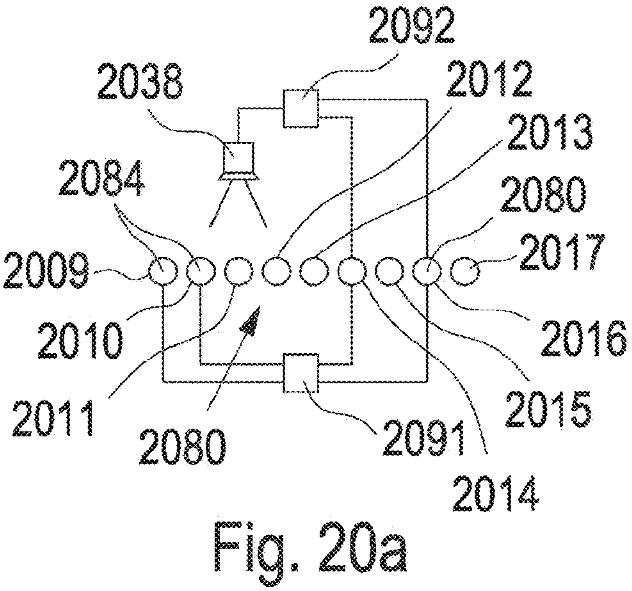
Figure 20B:
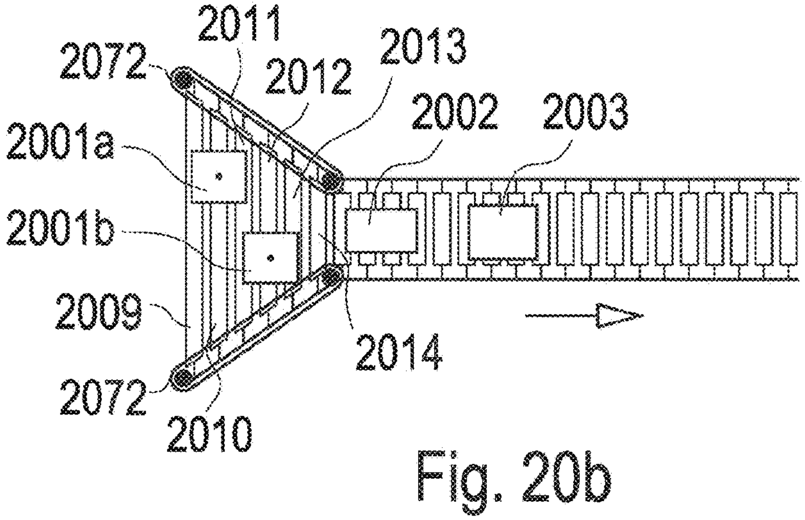

FIGS. 20, 20*a* and 20*b*

FIG. 20 shows a top view of a roller conveyor which can be used as a component of a transfer facility 5130, 5336 according to the invention, in particular as a conveyor belt.

Figure 18:
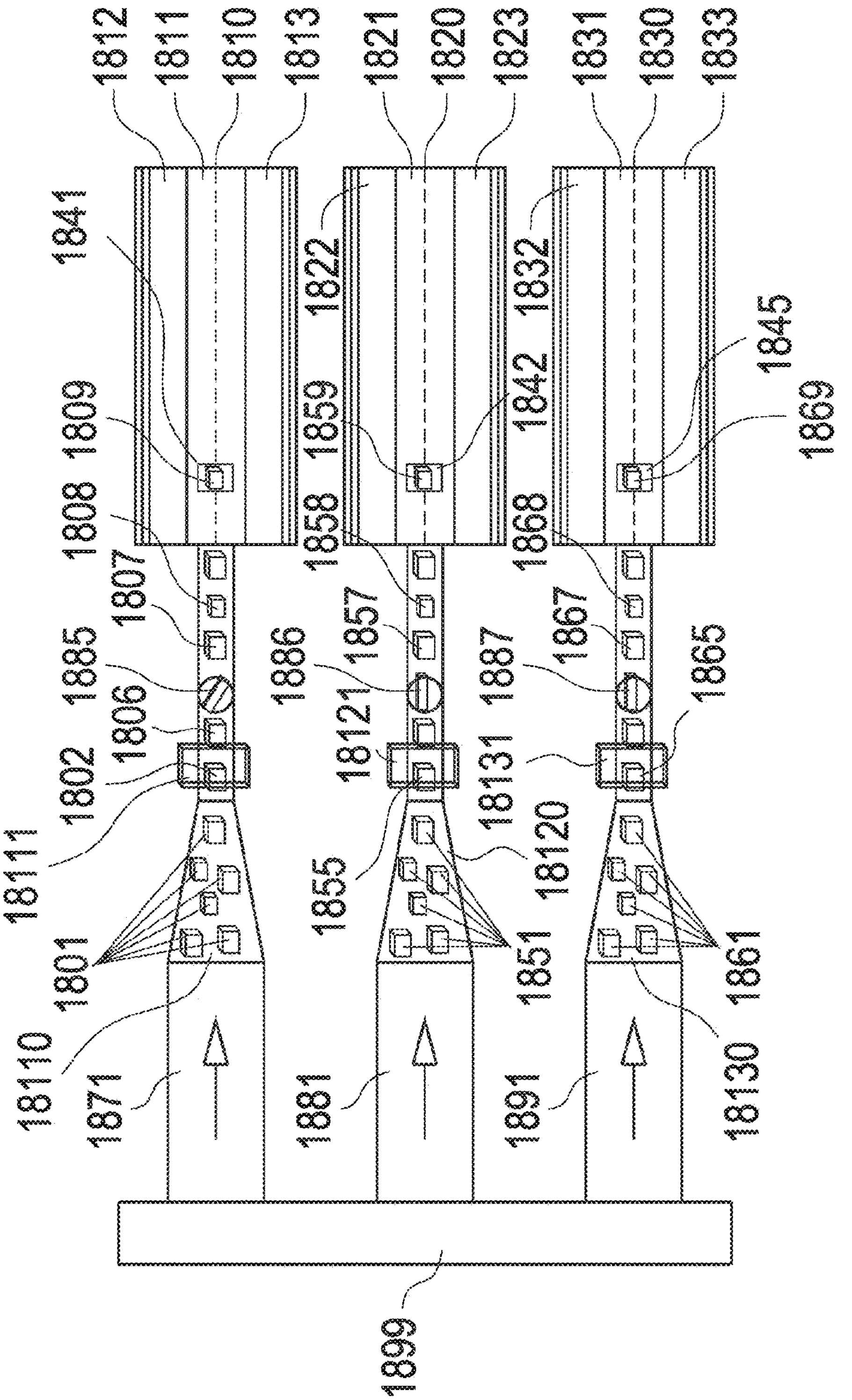
FIG. 18 a top view of a transfer facility according to the invention.
Figure 19:
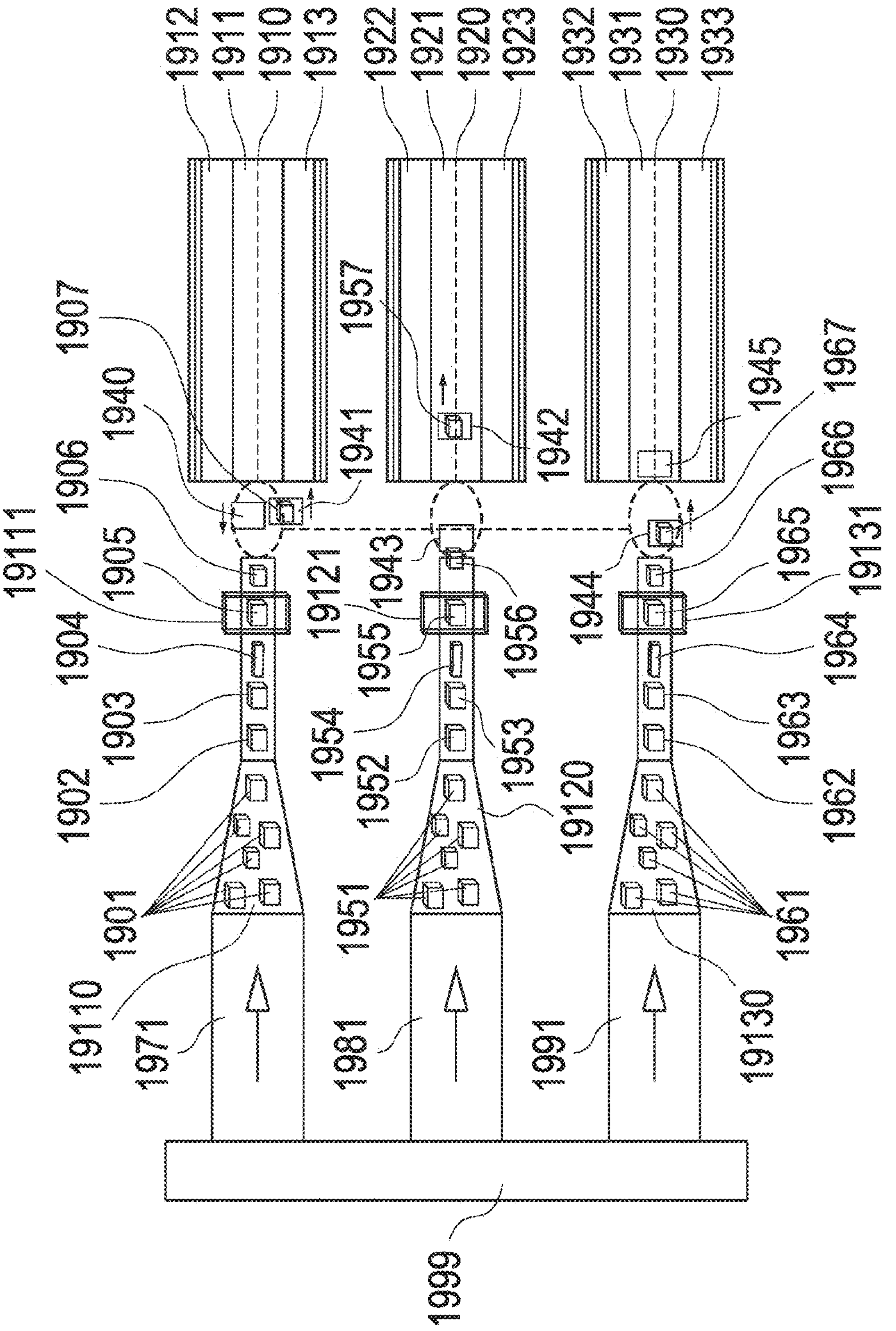
FIG. 19 a top view of a transfer facility according to the invention.

FIGS. 20, 20*a* and 20*b* illustrate advantageous embodiments for separating parcels both at chutes in distribution centres as shown in FIGS. 17-19 and on main conveyor belts of distribution centres according to the invention as shown in FIGS. 32-37.

The parcels 2001*a* and 2001*b*, 2002 and 2003 are transported by individual elements 2009-14 of a roller conveyor or by equivalent technical devices basically forward, in FIGS. 20 and 20*b* to the right. However, each individual element 2009-14 of the roller conveyor can also be rotated against the general direction of flow, i.e. to the left in FIGS. 20 and 20*b*. In addition, the speed of each individual element can be varied. Thus, in the case of parcels such as 2001*a* and 2001*b* that have not yet been sufficiently separated, the upper parcel 2001*a* can be slowed down and the lower parcel 2001*b* can be accelerated, resulting in complete separation of the parcels 2001*a* and 2001*b* by the time the roller conveyor tapers downstream of single element 2014. Technically, this is done by the single elements 2009 and 2010 turning to the left, and the single elements 2012 and 2013 turning to the right at an accelerated speed compared to the normal speed of the single elements, while single element 2011 does not turn at all for a short moment.

The separation process can be additionally supported by lateral belts 2072 as shown in FIG. 20*b*. The lateral belts 2072 can be rotated in both directions. The lower parcel 2001*b* can be accelerated forward not only by an accelerated movement of the individual elements 2012 and 2013, but also by a forward movement of the lower lateral band 2072, which supports the separation process.

FIG. 20*a*

FIG. 20*a* shows in cross-section a partial area of the roller conveyor according to the invention illustrated in FIGS. 20 and 20*b*. The roller conveyor shown by way of example in FIG. 20*a* has rollers 2009, 2010, 2011,2012, 2013, 2014, 2015, 2016, 2017 which are cylindrical in shape. The rollers are rotatably mounted via exemplary rotational axles 2084 and 2080.

Some of the rollers, in the case shown the rollers 2011, 2012, 2013, 2017 do not have their own drive, but are mounted rotatably along their respective axis of rotation, preferably with a corresponding low-friction storage unit, for example a ball bearing or a shaft bearing.

The rollers 2009, 2010, 2014, 2016 can each be driven, preferably individually, via a motor which is not shown for reasons of simplification. In particular, the motor driving each of the rollers 2009, 2010, 2014, 2016 is set up in such a way that it can actively rotate the rollers 2009, 2010, 2014, 2016 both clockwise and counterclockwise, so that parcels can be specifically accelerated or specifically decelerated in the areas where they rest on the respective roller.

The motors driving the reels 2009, 2010, 2014, 2016 are controlled by a control unit 2091, wherein the control unit 2091 can take into account evaluation signals of a detection unit 2092 regarding positions of parcels 2001*a*, 2001*b*, 2002, 2003. For this purpose, the detection unit 2092 cooperates with at least one and/or one camera device 2038 for detecting the positions of the parcels 2001*a*, 2001*b*, 2002, 2003.

As shown in FIG. 20, parcels 2001*a* and 2001*b* are close to each other on the conveyor belt formed by the roller conveyor. As also shown, parcel 2001*b* is in front of parcel 2001*a* in the direction of travel of the roller conveyor—according to the direction of the arrow. By controlling the rollers on which only the parcel 2001*b* but not the parcel 2001*a* is located in a clockwise direction and thus conveying the parcel 2001*b* in the conveying direction and by controlling the rollers on which only the parcel 2001*a* is located in a counterclockwise direction, the parcels 2001*b* and 2001*a* are separated from each other or a separation of the parcels 2001*a* and 2001*b* that takes place in another way—for example by the conveyor belts 2072—is supported accordingly.

FIG. 21

Figure 21:
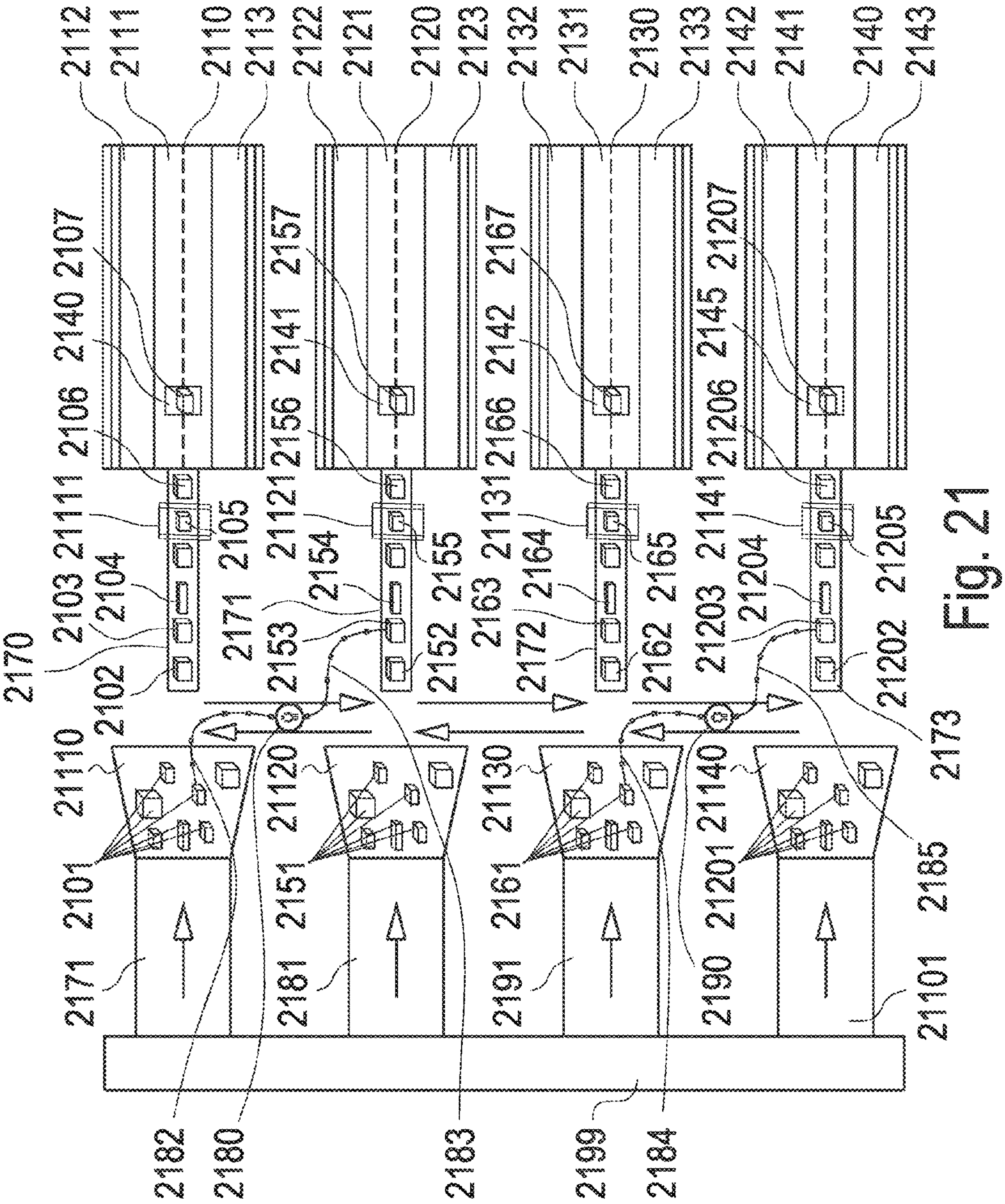
FIG. 21 a top view of a transfer facility according to the invention.

FIG. 21 shows a further advantageous embodiment of a transfer facility 5130, 5336 according to the invention. Here, no modification of the current chutes, which are exemplarily marked in FIG. 21 with reference number combinations 2171/21110, 2181/21120, 2191/21130, 21101/21140, is necessary, since the use of robots 2180, 2190 results in a "bridging (separation)" between the already existing chute, the conveyor belts 2170, 2171, 2172, 2173 to the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322: One of the robots is preferably in charge of 2-3 chutes 21110, 21120, 21130, 21140, especially in alternation. In a preferred embodiment, the chutes are serviced alternately in that the robot 2180, 2190 takes a plurality of parcels 21110, 21120, 21130, 21140, preferably 3 to 10 individual parcels 2101, 2151, 2161, 21201, from one of the chutes 21110, 21120, 21130, 21140 and places them on a conveyor belt 2170, 2171, 2172, 2173 located in the vicinity of the respective chute 21110, 21120, 21130, 21140. The robot 2180, 2190 then moves to the next of the chutes 21110, 21120, 21130, 21140 and the respective adjacent conveyor belt.

It is appropriate to equip the robots 2180, 2181 with gripper arms 2182, 2183, 2184, 2185. Preferably, robot tools not shown for reasons of simplification are attached to the gripper arms 2182, 2183, 2184, 2185, preferably gripper systems, in particular one or more suction pads, also called vacuum grippers. For example, the gripper systems known from DE 198 17 426 A1, in particular vacuum gripper systems, are adapted for this purpose. In particular, it is advantageous to use the measures described in this publication for monitoring the gripping process, including a force sensor. This enables corrections to be made in the event of incorrect gripping of parcels, as forces outside a tolerance range can be measured and used to vary a control of the gripping process.

Furthermore, it is appropriate to equip the gripper arms with one or more sensor modules, in particular at least one force sensor, to measure the force on the parcel to be lifted, in particular the parcels 2101, 2151, 2161, 21201. Furthermore, it is advantageous to use position sensors that are suitable for measuring a relative position or a distance between the parcel and the gripper or for determining the start and end points of a movement.

Preferably, a flexible gripping device is used to pick up the parcels, which is illustrated for example in DE 20 2007 013 673 U1. This gripping device has a gripper with a multi-section frame, which is adapted for the present invention in such a way that better adaptation to variable dimensions (geometries) of the parcels is possible.

FIG. 21*a*

Figure 21A:
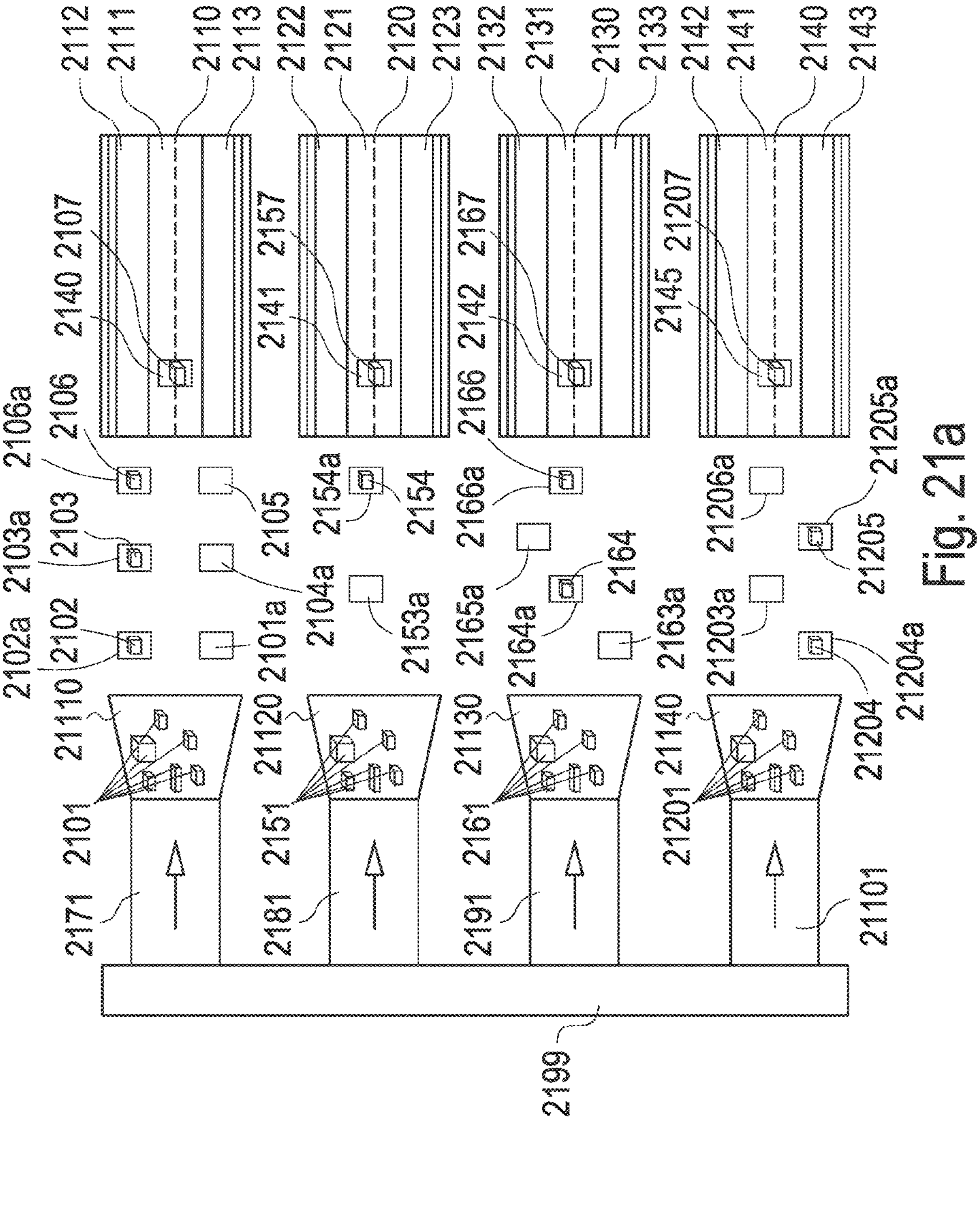

FIG. 21*a* is an advantageous modification of the transfer facility 5130, 5336 according to the invention previously illustrated with reference to FIG. 21. However, in the embodiment illustrated in FIG. 21*a*, the transport belts 2170, 2171, 2172, 2173 present in the embodiment illustrated in FIG. 21 are removed and are entirely replaced by transport units 2101*a*, 2102*a*, 2103*a*, 2104*a*, 2105, 2106*a*, 2153*a*, 2154*a*, 2163*a*, 2164*a*, 2165*a*, 2166*a*, 21203*a*, 21204*a*, 21205*a* and 21206*a*.

The transfer facility 5130, 5336 according to the invention shown in FIG. 21*a* is particularly advantageous when parcels are already transferred singly, as in particular in the preferred embodiments of distribution centres according to the invention shown in FIGS. 32, 34, 36,37.

In a preferred embodiment, the end points are serviced alternately in that the transport units approach the end points directly at the same height and the parcels are pushed from the end point directly onto the transport unit.

Loading Preparation

FIG. 18

FIG. 18 shows a fully automatic design of the transfer facilities 5130, 5336 with alignment turntable and spring.

Here, the chutes 1871, 1881, 1891 are configured by means of a gradual narrowing 18110, 17130 as well as, for reasons of simplification, not shown, preferably as shown on the basis of FIGS. 17 and 20, forward-pulling side belts and, in addition, by rotary plate and spring 1885, 1886, 1887 in such a way that a separation of the parcels results and, in addition, the following problem is solved:

Since parcels usually have different dimensions in length/width/height and the parcels may lie with the longer side facing forwards, i.e. vertically, on the separating conveyor belt 17110, 17120, 17130, 18110, and would thus also be transferred to the transport unit, the transport unit (since it rotates 90 degrees during storage) could only carry out storage in a compartment with the length of the longer side of the parcel; i.e. a parcel with a length of 10 cm and 50 cm, for example, would then require a compartment with a width of at least 50 cm, although a compartment width of 10 cm would also be sufficient in terms of dimensions if the compartment is sufficiently wide, i.e. a parcel with a length of 10 cm and 50 cm would then require a compartment with a width of at least 50 cm, although a compartment width of 10 cm would be sufficient if the compartment were sufficiently deep. In order to ensure that the handover to the transport unit always takes place with the shortest side, 1) a scanner scans the position of the parcel, 2) transmits this information to the subsequent alignment turntable, which 3) then turns the parcel according to the information regarding the position of the parcel so that the shortest side points forwards and pushes it on again so that it can be handed over to the transport unit.

Since the individual parcels 1701, 1702, 1703, 1704, 1705, 1751, 1752, 1753, 1754, 1755, 1761, 1762, 1763, 1764, 1765 differ considerably in dimensions, volume and shape, but an exact positioning of the parcel, namely always centrally on the conveyor belt, is advantageous for the handover to the transport unit, the parcel is centrally adjusted at the end of the conveyor belt with the help of a spring device. Otherwise, there would be a risk of the parcel being picked up laterally by the transport unit.

Loading

FIG. 19

FIG. 19 shows a transfer facility 5130, 5336 using two or more transport units 1041, 1241, 1641, 1940, 1941, 1942, 1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745. To load a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, alternatively two or more transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 for loading a depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

As opposed to loading a depot facility 140, 240, 250, 340, 350, 740, 830, 1711, 1721, 1731, 1811,1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 with one transport unit, transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741, 3742, 3733, 3744, 3745 when loaded with two or more transport units 1041, 1241, 1641, 1940, 1941, 1942,1943, 1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 to receive a parcel from depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 to the conveyor belt. For the section from the depot facility (140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322) to the conveyor belt, a guide rail (guide rail analogous to that in the depot facility) is used if necessary, which is seamlessly connected to the guide rail of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

By a control of transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744,3745 by the means for controlling the transfer facility, however, a guide rail is unnecessary. This is one of the advantages of using the transfer facility control means.

From the perspective of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 the "empty" transport unit travels e.g. over the right-hand side of the R. e.g. over the right side of the ring of the guide rail to the conveyor belt to pick up a parcel. Parallel to this, a second transport unit then waits on the left side of the ring, already loaded with a parcel from the conveyor belt. As soon as the empty transport unit passes the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 and moves to the conveyor belt, the transport unit loaded with a parcel moves to the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 for loading.

In a preferred embodiment of the invention, the loading of the depot facilities takes place in a distribution centre 5301.

For this purpose, the door covering as far as possible the complete rear of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, so wide open that depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 can be manoeuvred directly up to the loading ramp without any distance from it.

The loading of other mobile depot facilities in the area of the distribution centre 5301 is carried out in the same way. For this purpose, their doors, which take up the entire rear side of the depot facility, are also opened to such an extent that the depot facilities can be shunted directly to the loading ramp without any distance to it.

A particularly preferred embodiment of the invention provides for contactless, automated loading in the logistics centre of depot facilities and/or logistics vehicles. In this case, a conveyor belt is arranged downstream of the transfer facility in the direction of transport of the parcels.

After passing through the scanner, preferably the 6-page scanner as part of a transfer facility, the parcel is loaded onto a transport unit 1041, 1241, 1641, 1940, 1941, 1942,1943, 1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745, which moves within the logistics vehicle to the position of the planned storage compartment, adjusts itself there to the height of the compartment and stores the parcel.

It is appropriate to carry out storage of parcels in the storage positions of the depot facility, in particular in compartments of the shelves 1412, 1512. In a preferred embodiment of the invention, the storage of parcels in the storage positions of the depot facility is carried out using one or more of the illustrated transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 and/or using other transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745, which are preferably also movable within the depot facilities.

If the depot facility is 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 final loading, preferably only one transport unit remains in the depot facility in order to bring the parcels to the output tray at the final output location or to store the parcels from the output tray. store parcels from the output compartment.

Furthermore, the transport units 1041, 1241, 1641, 1940, 1941, 1942,1943,1944,1945, 2140, 2141, 21422, 2145 remaining in the logistics centre, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 connected to a guide rail between the individual chutes, can also be used for loading other depot facilities.

In addition, this connection makes it possible to automatically transport misdirected parcels from one chute to the next. Incorrectly diverted parcels are identified in the course of scanning with the 6-sided scanner on the conveyor belt. These could be parcels that have been e.g. to another depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 must be spent.

Handover

Overview

When a parcel is handover to the recipient, the parcel is first removed from the storage position of the depot facility, transferred onto the transfer platform 1694 of the transport unit 1641 and then into the handover gate 1601. Facilitating the removal of parcels from the storage positions of the depot facility can alternatively and/or additionally be done by using the pusher unit 1420 shown in FIGS. 14 and 15.

Figure 16:
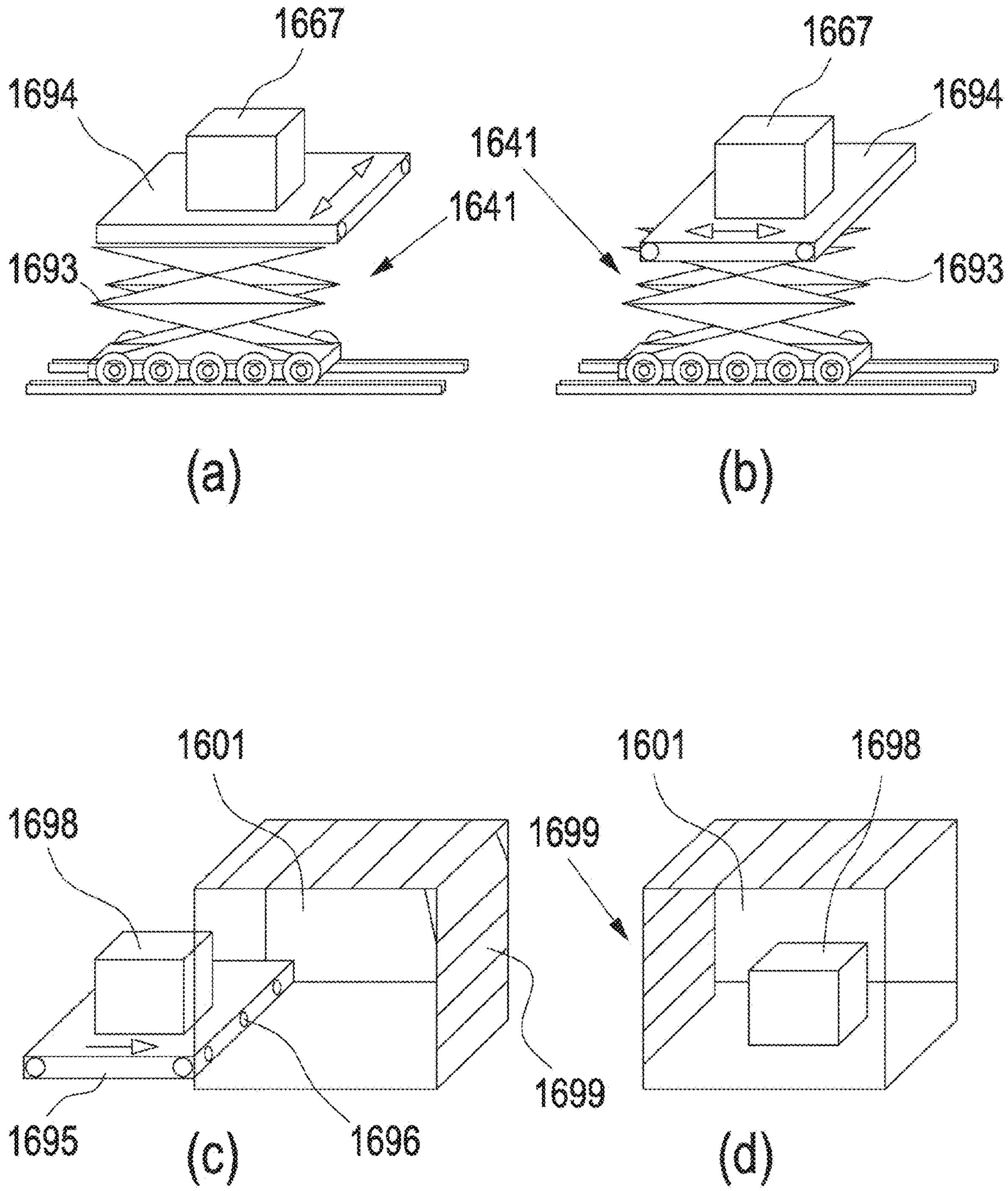
FIG. 16 in FIGS. 16*a* and 16*b* a transport unit according to the invention, which can also be used as a handover unit, and in FIGS. 16*c* and 16*d* a principle representation of a handover of a parcel 1698 in a region of a handover gate.

FIGS. 16 (*c* and *d*)

FIGS. 16*c* and 16*d* show a principle illustration of a handover of a parcel 1698 in an area of a handover gate that occurs during handover to recipient 5160 and local delivery 5190.

FIGS. 22 (*a* and *b*)

Figures 22A, 22B:
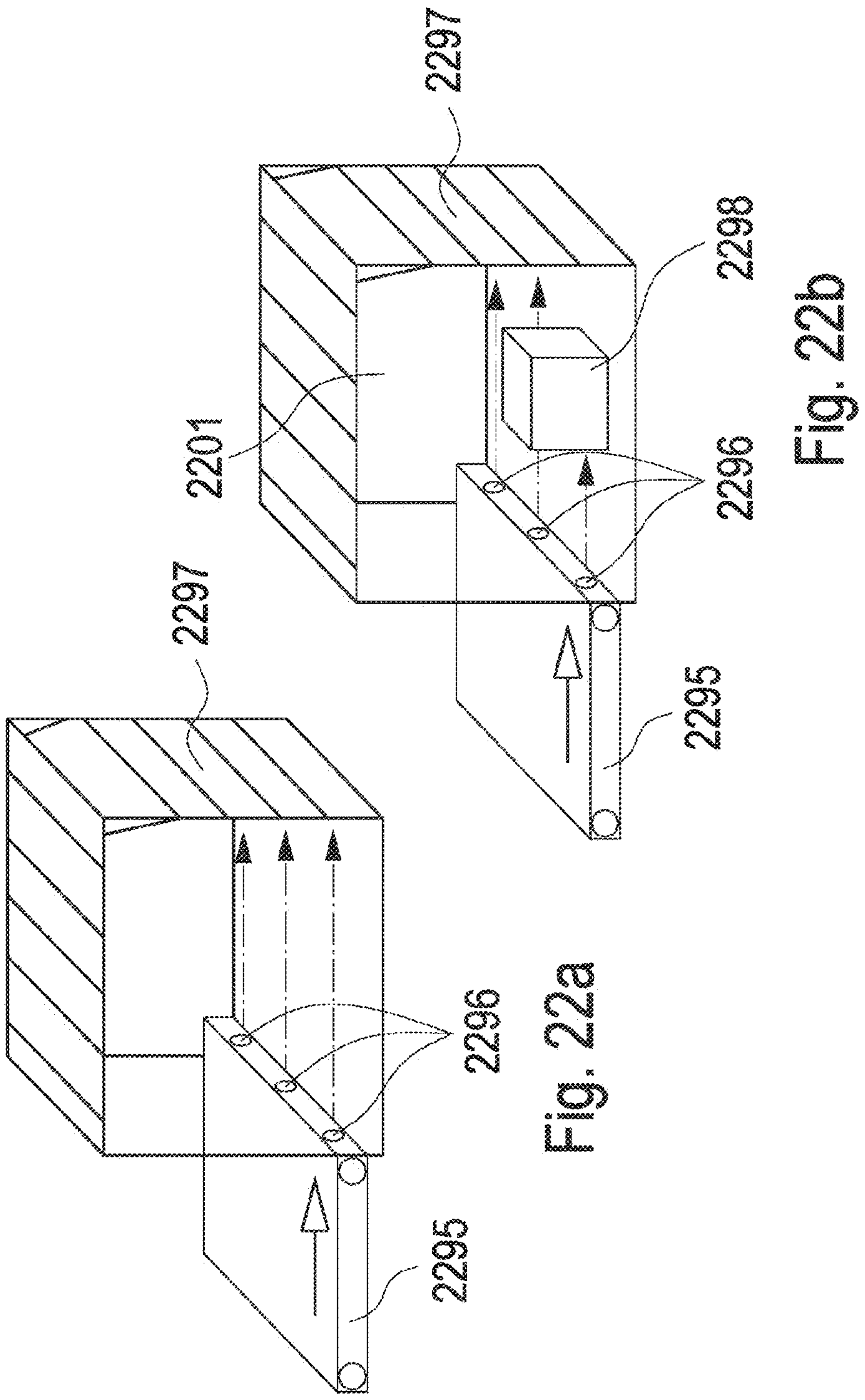
FIG. 22 a schematic diagram of a handover of a parcel to a recipient.

FIGS. 22*a* and 22*b* show a handover gate 2201 according to the invention, which may be the handover gate 1601 illustrated previously with reference to FIGS. 16*c* and 16*d*. The handover gate 2201 is used for handover of parcels. The handover of parcels can be the handover of parcels from a storage unit of the depot facility to a recipient and/or the acceptance of parcels from shippers and the subsequent storage of the parcel in a storage unit in the depot facility.

FIG. 22*a* shows an operational state of the handover unit 1601/2201 after a parcel, for example the parcel 1698 shown in FIG. 16*c*, has been removed from the handover unit 1601/2201 by a recipient and/or by a handover unit facilitating a handover to the recipient.

After a recipient has taken a parcel, the handover gate 1601/2201 closes again. In the operating state shown in FIG. 22*a*, the recipient has taken the parcel. The transport unit 2295 approaches the handover gate 1601/2201 and checks by means of the light barrier 2296 whether there is still a parcel in the handover gate 1601/2201. In the operating state of the handover gate 1601/2201 shown in FIG. 22*a*, the light barrier 2296 reports that there is no more parcel in the handover gate. The handover has thus been successfully completed. Preferably, the depositor of the parcel, in particular the shipper of the parcel, now receives a notification of the successful handover, in particular the successful handover to the recipient of the parcel. If the parcel was not assigned to an individualised recipient—this is the case, for example, if the parcel is a commodity object—the depositor preferably receives notification of the fact that the parcel has been successfully handed over.

FIG. 22*b* shows an operating state of the handover gate 1601/2201 in which the recipient has not removed the parcel. After the handover gate has been closed, the transport unit 2295 approaches the handover gate 2201 and uses the light barrier 2296 to check whether there is still a parcel in the handover gate 2201. In the operating state shown in FIG. 22*b*, the light barrier 2296 reports an interruption of one or more light beams by an object, in particular the parcel 2298. This is a preferred embodiment of a check, which can also be carried out by other means, whether a parcel or another object is located in the handover gate 1601/2201. Other equally applicable means of checking whether a parcel or other object is in the handover gate 1601/2201 are a scale or an ultrasonic sensor.

If a parcel or other object is in the handover facility 1601/2201, the depot facility and/or the system checks whether the recipient of the parcel is still in the immediate vicinity of the handover facility. If this is the case, the recipient is immediately contacted via the app and asked whether he/she would like to remove his/her parcel. If the recipient does not answer or says no, the parcel is transported by a transport unit and/or a gripper arm back to one of the storage positions of the depot facility, preferably to the storage position from which the parcel was removed.

Returning the parcel to one of the depot facility's storage positions is advantageous even if the recipient would no longer be in the immediate vicinity of the depot facility.

In a preferred embodiment, the system informs the shipper preferably in parallel so that the shipper can also contact the recipient and/or assign the parcel to another recipient.

If the recipient is still in the immediate vicinity of the depot facility and wishes to hand over again, the handover unit opens after the recipient has been authenticated accordingly.

Unloading at the Distribution Centre

Overview

After the end of the handover period at the location, the depot facilities 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 drive back to the logistics centre. The removal of parcels (uncollected parcels—after the collection deadline) or parcels deposited by depositors (returns or C2C parcels) from the logistics vehicle is also fully automated:

Not only the loading but also the unloading of the depot facilities 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 is preferably carried out using transfer facilities. In a preferred embodiment, the transfer facilities are constructed as the transfer facilities illustrated with reference to FIGS. 17, 18, 19, 20, 21 and 37. FIGS. 17, 18, 19, 20, 21 and 37 show an operation of the transfer facilities illustrated therein for loading depot facilities. It is possible to use the transfer facilities shown in FIGS. 17, 18, 19, 20, 21 and 37 for unloading depot facilities as well.

The transfer facilities shown in FIGS. 27, 28, 29, 31, 33 and 35 for unloading the depot facilities can also be used for loading depot facilities. In particular, the transfer facilities shown in FIGS. 27, 28, 29, 31, 33 and 35 may be the same transfer facilities previously illustrated with reference to FIGS. 17, 18, 19, 20, 21 and 37. The respective components of the transfer facilities may therefore be constructed in the same way as the transfer facilities previously illustrated with reference to FIGS. 17, 18, 19, 20, 21 and 37. However, since during unloading all parcels are transferred from the transport unit 1641, 2642, 2643, 2644, 2645, 2741, 2742, 2743, 28,41, 2842, 2845, 2940, 2941, 2942, 2943, 2944, 2945, 3140, 3141, 3142, 3145, 3340, 3341, 3342, 3343, 3344, 3345, 3540, 3541, 3542, 3543, 3544, 3545, 3740, 3741, 3742, 3743, 3744, 3745 are already conveyed singled from the depot facility, all components of the transfer facility that cause singling during loading can be "set to neutral" during unloading.

In the embodiments illustrated in FIGS. 27-31 and 35, the depot facilities have a particularly simple and appropriate structure, each having a central aisle 2711, 2721, 2731, 2811, 2821, 2831, 2911, 2921, 2931, 2911, 2921, 2931, 3111, 3121, 3131, 3141

Shelves 2712, 2713, 2722, 2723, 2732, 2812, 2813, 2822, 2823, 2832, 2912, 2913, 2922, 2923, 2932, 3112, 3113, 3122, 3123, 3132, 3142, 3143 are arranged on the sides of the central aisles. Of course, designs with other configurations of the storage positions are also possible.

In the embodiments of the invention illustrated with reference to FIGS. 27, 28, 29, 31, 33 and 35, parcels transferred singly from the depot facilities are transported on conveyor belts and, if necessary, scanned and transported to chutes.

FIGS. 27, 28, 29, 30, 31 and 35 show transfer facilities 5130, 5336 in use in unloading depot facilities 2710, 2720, 2730, 2810,1820, 2830, 2910,1920, 2930, 3110, 3120, 3130, 3140, 2710, 2720, 2730.

FIG. 27

Figure 27:
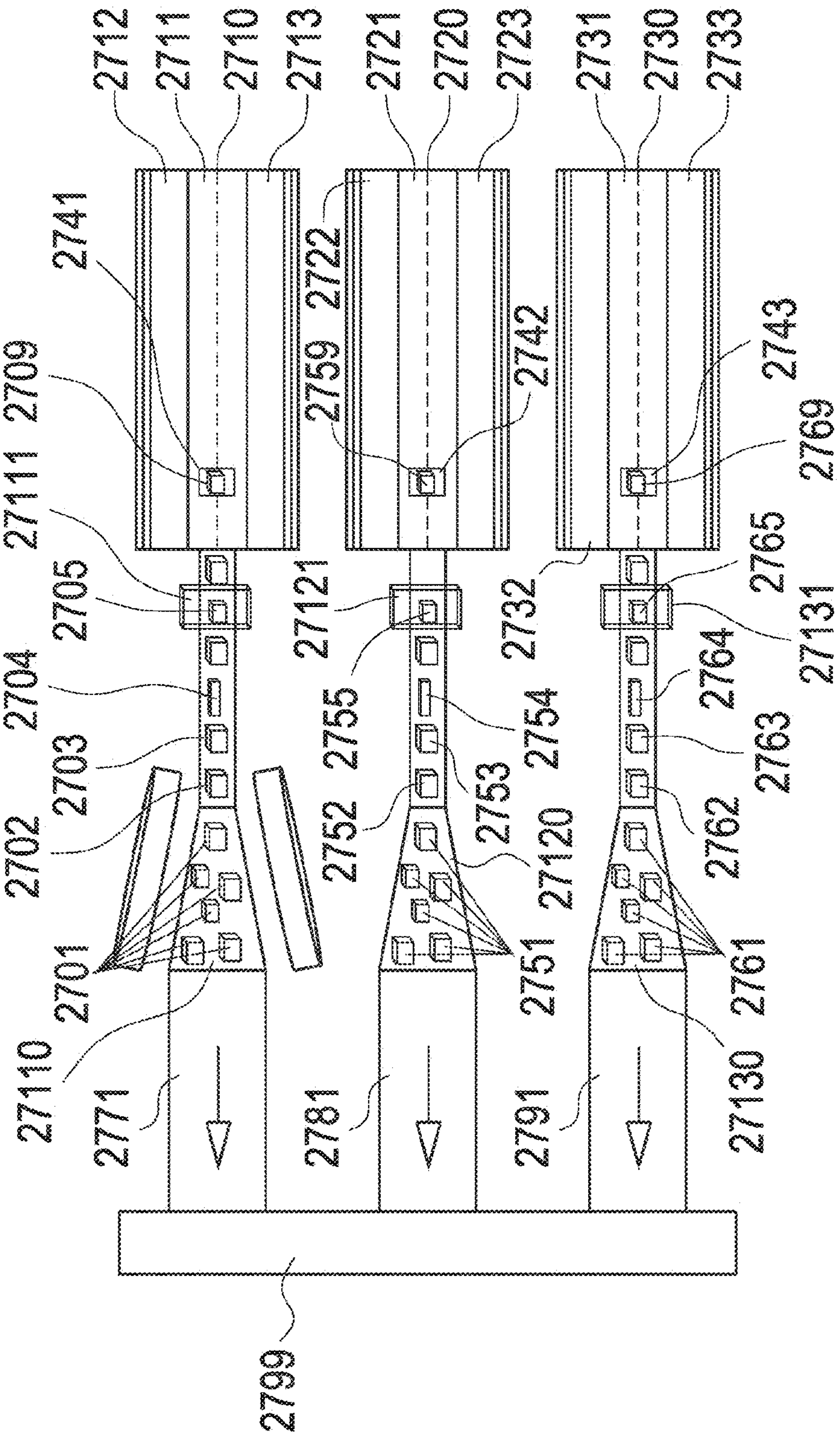
FIG. 27 a top view of a transfer facility according to the invention during an unloading process.

FIG. 27 shows a preferred embodiment of a transfer facility 5130, 5336 according to the invention.

FIG. 28

Figure 28:
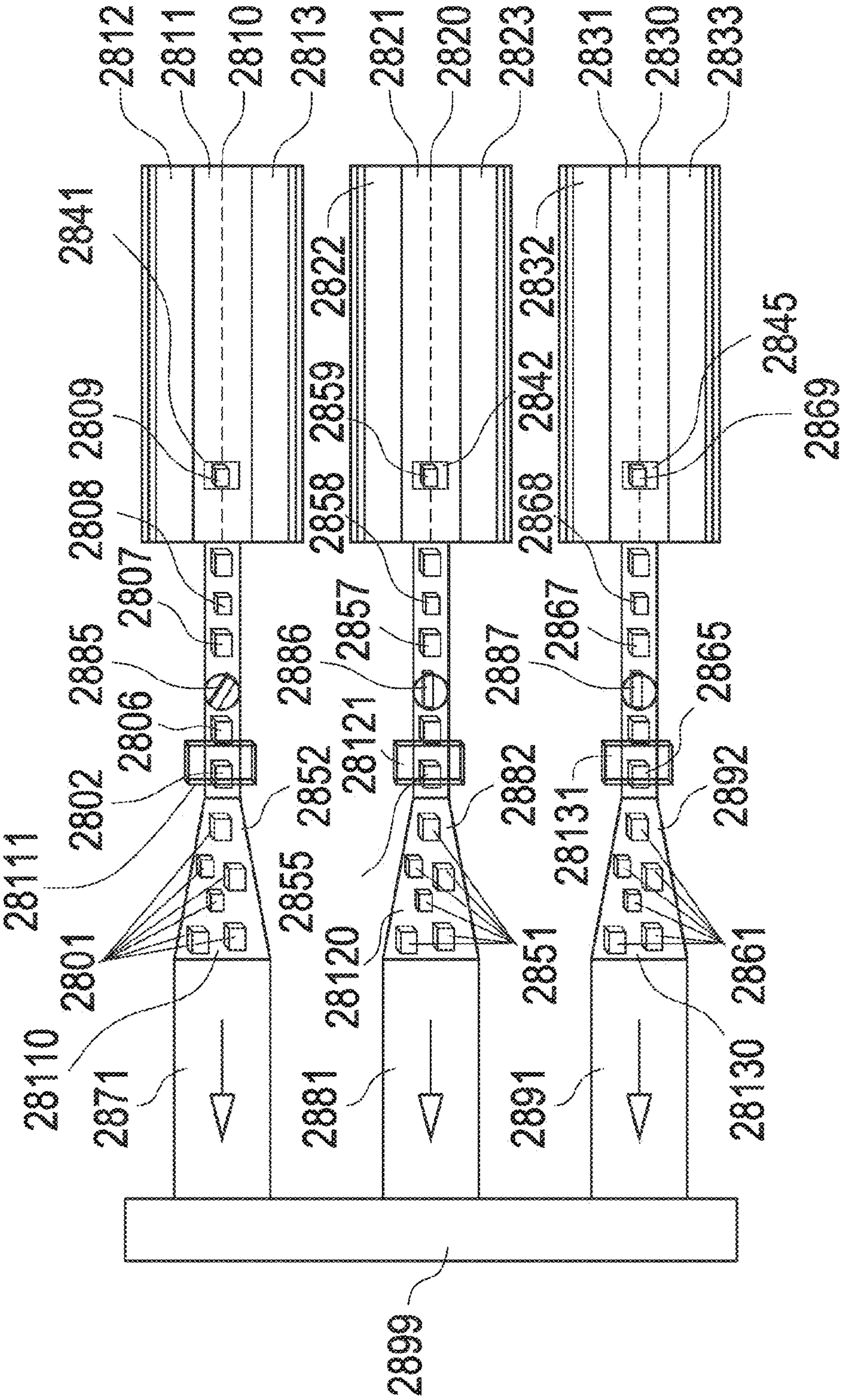
FIG. 28 a top view of a transfer facility according to the invention.

FIG. 28 shows a fully automatic embodiment of the transfer facilities 5130, 5336 with alignment turntable and suspension set to "neutral", as the parcels have already been conveyed singly by the transport unit out of the depot facility.

FIG. 29

Figure 29:
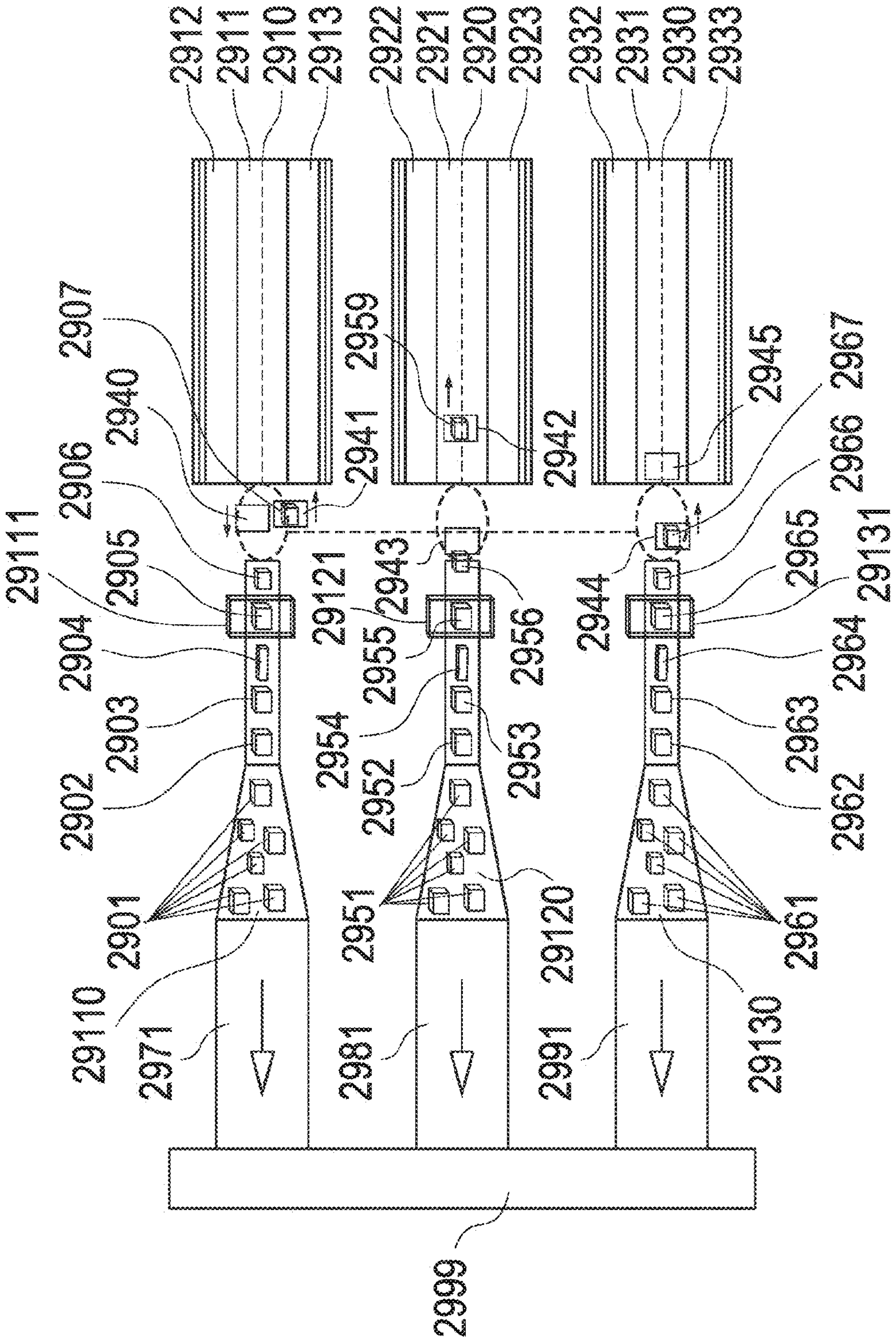
FIG. 29 a top view of a transfer facility according to the invention.

FIG. 29 shows a transfer facility 5130, 5336 using two or more transport units 1041, 1241, 1641, 1940, 1941, 1942, 1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745. To expedite the unloading of a depot facility 140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322), alternatively two or more transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 are used for unloading a depot facility (140, 240, 250, 340, 350, 2710,1720, 2730, 2810,1820, 2830, 2910, 1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322).

It is advantageous that for unloading a depot facility (140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322) one or more, preferably at least two transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 for receiving a parcel from the depot facility 140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322) to the conveyor belt. For the section from the depot facility (140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322 to the conveyor belt, an annular guide rail (guide rail analogous to that in the depot facility) is used, which docks seamlessly with the guide rail of the depot facility 140, 240, 250, 340, 350, 2710, 1720, 2730, 2810, 1820, 2830, 2910, 1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322.

From the perspective of the depot facility 140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322 a transport unit with a parcel unloaded from the depot facility travels e.g. over the right side of the guide rail. e.g. via the right side of the guide rail to the conveyor belt to transfer a parcel. Parallel to this, a second "empty" transport unit then waits on the left side of the guide rail to take over another parcel to be unloaded from the depot facility. As soon as the transport unit loaded with a parcel has left the depot facility (140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322) and moves to the conveyor belt, the empty transport unit moves to the depot facility 140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322 to take over a new parcel for unloading.

When the depot facility (140, 240, 250, 340, 350, 2710, 1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322) is finally unloaded, only one transport unit remains in the depot facility in order to store new parcels during a new loading process.

Furthermore, the transport units 1041, 1241, 1641, 1940, 1941, 1942,1943,1944,1945, 2140, 2141, 21422, 2145 remaining in the logistics centre, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 connected to a guide rail between the individual chutes can also be used for unloading other depot facilities.

FIG. 31

Figure 31:
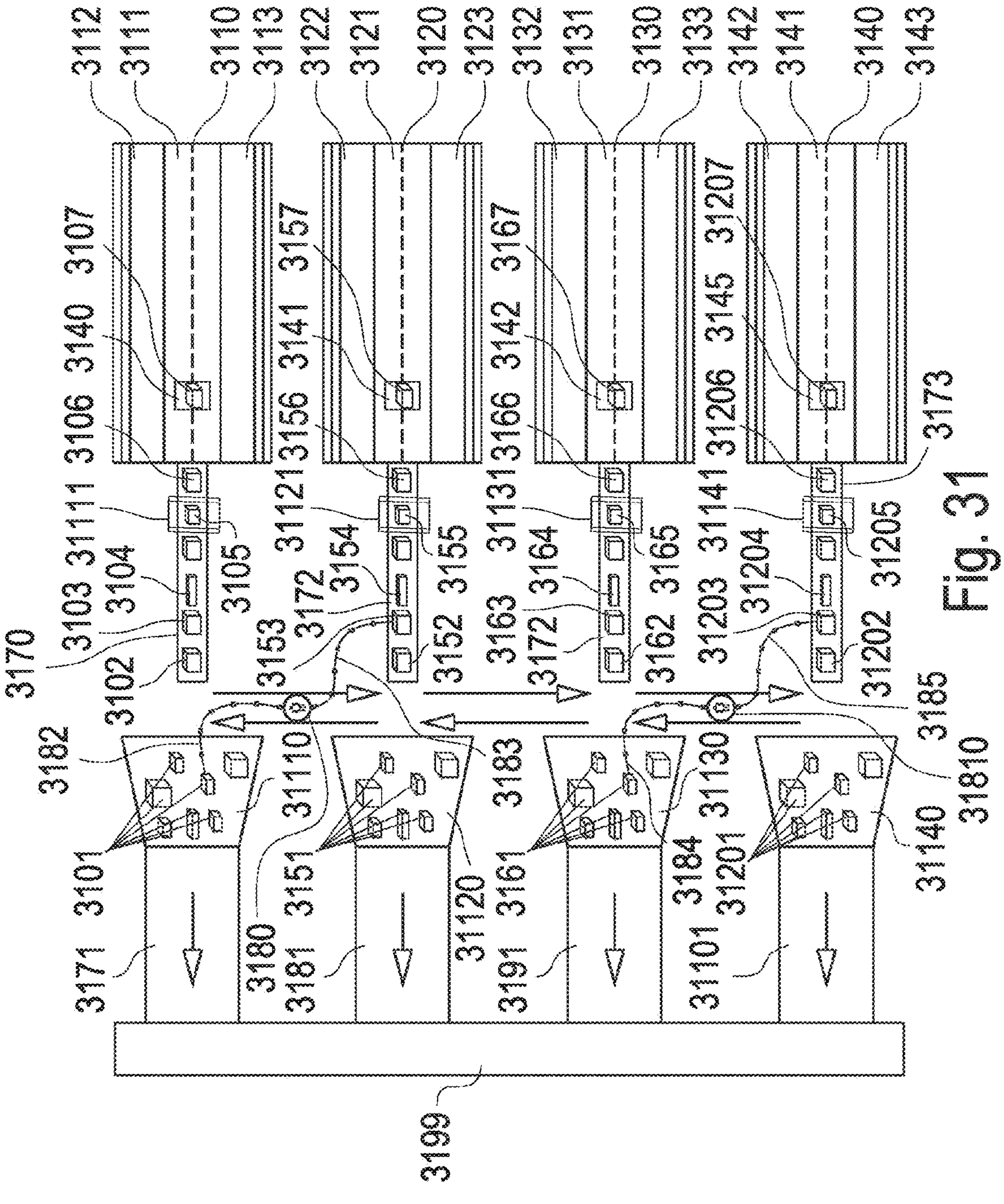
FIG. 31 a top view of a transfer facility according to the invention.

FIG. 31 shows a semi-automated implementation of a chute according to the invention. Here, no change to the current chutes is necessary, since the use of robots results in a "quasi-manual bridging" between the existing chute and the conveyor belt to the depot facility (140, 240, 250, 340, 350, 2710,1720, 2730, 2810,1820, 2830, 2910,1920, 2930, 3110, 3120, 3130, 3140, 2710, 2720, 2730, 2810, 2820, 2830, 2910, 2920, 2930, 3110, 3120, 3130, 3140, 5242, 5243, 5321, 5322): A robot takes care of 2-3 chutes in turn, takes over the parcels unloaded from the depot facilities from conveyor belts, feeds them to the respective chutes and then switches to a new conveyor belt.

The embodiments shown can be used in the logistics centres (depots) that exist today.

FIG. 31a

Figure 31A:
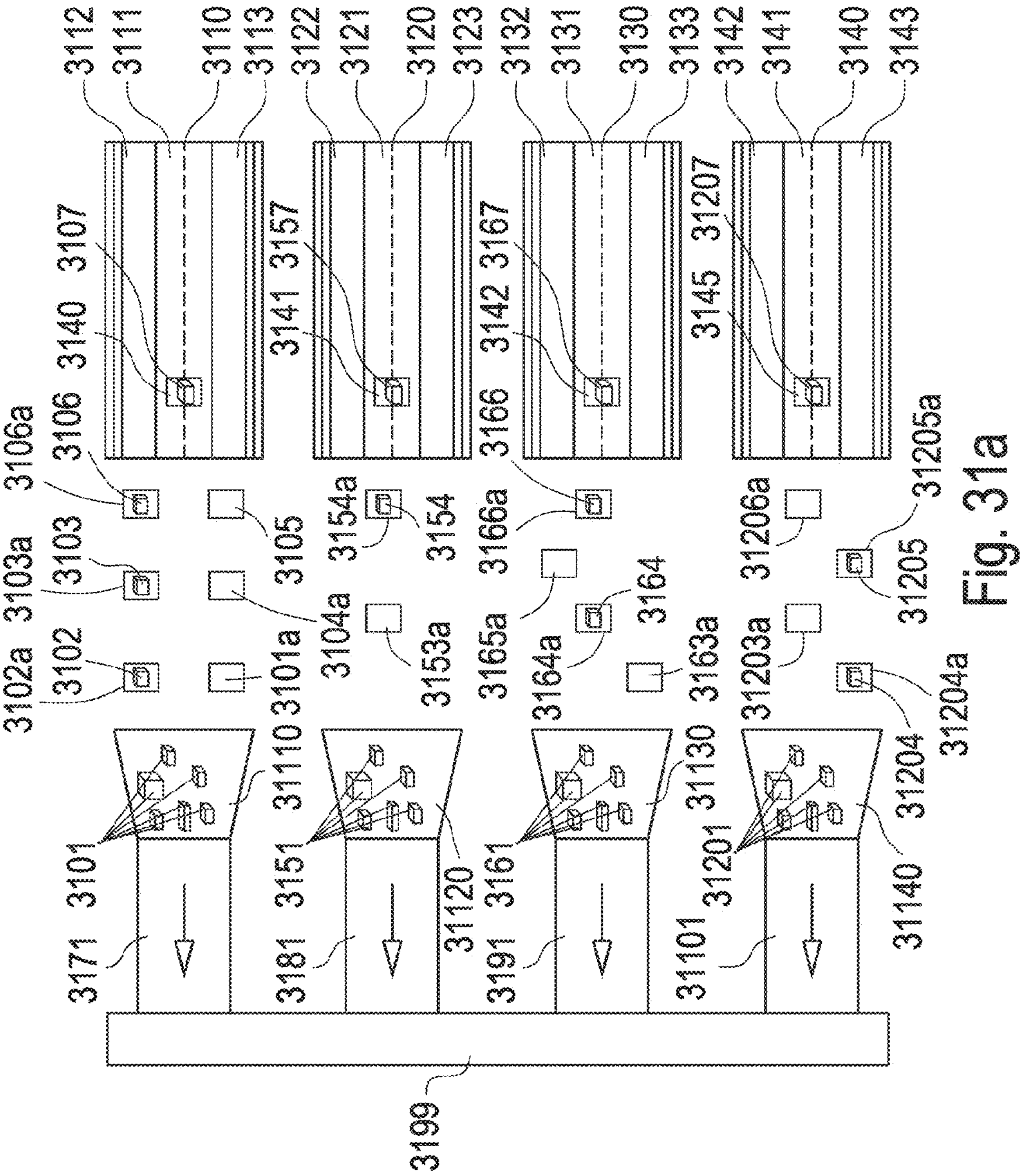

FIG. 31a is an advantageous modification of the transfer facility 5130, 5336 according to the invention previously illustrated with reference to FIG. 31. However, in the embodiment illustrated in FIG. 31a, the conveyor belts present in the embodiment illustrated in FIG. 31 are removed and are entirely replaced by transport units 3101a, 3102a, 3103a, 3104a, 3105, 3106a, 3153a, 3154a, 3163a, 3164a, 3165a, 3166a, 31203a, 31204a, 31205a and 31206a.

Loading and Unloading Modes in Detail

Overview

An advantageous embodiment of the depot facilities presented in this application provides for at least one of the depot facilities to have at least two different loading modes and/or at least two different unloading modes.

A first loading mode is exemplified in this application by the loading of the depot facilities 140, 240, 250, 340, 350,1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 at the transfer facilities.

The first loading mode (fast loading mode) is preferably characterised in that in this loading mode an uninterrupted path distance between an environment of the depot facility and an interior of the depot facility 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322.

Along the uninterrupted path, parcels can be transported without interruption from the outside to the storage positions of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 (loading) and/or from the storage positions of the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are transported to the outside (unloading).

Both in the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931 explained by way of example in this application, 3111, 3121, 3131, 3141, 3311, 3321, 3331, 3511, 3521, 3531, 3711, 3721, 3731, 5242, 5243, 5321, 5322, as well as depot facilities having a different structure therefrom, it is appropriate to provide a lock 1601 as exemplarily shown in FIGS. 16c and 16d.

It is particularly advantageous to provide the lock 1601 only during a loading mode for an individual storage of a parcel and/or during an unloading mode for an individual removal of a parcel between a storage facility of the depot facility and a delivery means, for example the transfer carriage 1695 shown in FIG. 16c. However, such a transfer carriage 1695 may also be part of one of the transport units and/or one of the handover units.

The interlock 1601 is not limited to the embodiments shown in FIGS. 16b,16c, 22a and 22b, but may have any of the functions and embodiments of a merchandise interlock, particularly with an electronically secured access.

In a loading mode for uninterrupted loading (fast loading mode) of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322, in particular in the case of loading at the transfer facilities, it is useful that the lock 1601 consists of a transport path for parcels 1044, 1401, 1667, 1698, 1701, 1702, 1703, 1704, 1705, 1709, 1751, 1752, 1753, 1754, 1755, 1759, 1761, 1762, 1763, 1764, 1765, 1769,1801, 1802, 1806, 1807, 1809, 1851, 1855, 1857, 1858, 1859, 1861, 1865, 1867, 1868, 1869, 1901, 1902, 1903, 1904, 1905, 1906, 1907, 1951, 1952, 1953, 1954, 1955, 1956, 1957, 1961, 1962, 1963, 1964, 1965, 1966, 1967, 2001a, 2001b, 2002, 2003,2101, 2102, 2103, 2104, 2105, 2106, 2107, 2151, 2152, 2153, 2154, 2155, 2156, 2157, 2161, 2162, 2163, 2164, 2165, 2166, 2167, 21201, 21202, 21203, 21204, 21205, 21206, 21207, 2298, 2320, 2321, 2322, 2701, 2702, 2703, 2704, 2705, 2709, 2751, 2752, 2753, 2754, 2755, 2761, 2762, 2763, 2764, 2765, 2769, 2801, 2802, 2806, 2807, 2808, 2809, 2851, 2855, 2857, 2858, 2859, 2861, 2865, 2867, 2868, 2869, 2901, 2902, 2903, 2904, 2905, 2906, 2907, 2951, 2952, 2953, 2954, 2955, 2956, 2961, 2962, 2963, 2964, 2965, 2966, 2967, 3101, 3102, 3103, 3104, 3105, 3106, 3107, 3151, 3152, 3153, 3154, 3155, 3156, 3157, 3161, 3162, 3163, 3164, 3165, 3166, 3167, 3202, 3203, 3204, 3262, 3263, 3264, 3265, 3267, 3268, 3273, 3275, 3277, 3278, 3283, 3285, 3287, 3288, 3301, 3302, 3302, 3304, 3305, 3306, 3307, 3351, 3352, 3352, 3354, 3355, 3356, 3359, 3361, 3362, 3363, 3364, 3365, 3366, 3367, 3501, 3502, 3503, 3504, 3505, 3506, 3551, 3552, 3553, 3554, 3555, 3556, 3559, 3561, 3562, 3563, 3564, 3565, 3566, 3567, 3701, 3702, 3703, 3704, 3705, 3706, 3707, 3751, 3752, 3753, 3754, 3755, 3756, 3759, 3761, 3762, 3763, 3764, 3765, 3766, 3767, 31201, 31202, 31203, 31204, 31205, 31206, 31207 is removed.

A lock 1601 is located between a storage unit of the depot facility and a dispensing means, for example the transfer carriage 1695 shown in FIG. 16c, during a secured unloading mode, in particular for a handover of a parcel.

In an unloading mode for uninterrupted unloading (rapid unloading mode) of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931,3111, 3121, 3131, 3141,3311, 3321, 3331, 3511,3521, 3531, 3711, 3721, 3731, 5242, 5243, 5321, 5322, in particular in the case of unloading at the transfer facilities, it is useful that the lock 1601 consists of a transport path for parcels 1044, 1401, 1667, 1698, 1701, 1702, 1703, 1704, 1705, 1709, 1751, 1752, 1753, 1754, 1755, 1759, 1761, 1762, 1763, 1764, 1765, 1769,1801, 1802, 1806, 1807, 1809, 1851, 1855, 1857, 1858, 1859, 1861, 1865, 1867, 1868, 1869, 1901, 1902, 1903, 1904, 1905, 1906, 1907, 1951, 1952, 1953, 1954, 1955, 1956, 1957, 1961, 1962, 1963, 1964, 1965, 1966, 1967, 2001a, 2001b, 2002, 2003,2101, 2102, 2103, 2104, 2105, 2106, 2107, 2151, 2152, 2153, 2154, 2155, 2156, 2157, 2161, 2162, 2163,

2164, 2165, 2166, 2167, 21201, 21202, 21203, 21204, 21205, 21206, 21207, 2298, 2320, 2321, 2322, 2701, 2702, 2703, 2704, 2705, 2709, 2751, 2752, 2753, 2754, 2755, 2761, 2762, 2763, 2764, 2765, 2769, 2801, 2802, 2806, 2807, 2808, 2809, 2851, 2855, 2857, 2858, 2859, 2861, 2865, 2867, 2868, 2869, 2901, 2902, 2903, 2904, 2905, 2906, 2907, 2951, 2952, 2953, 2954, 2955, 2956, 2961, 2962, 2963, 2964, 2965, 2966, 2967, 3101, 3102, 3103, 3104, 3105, 3106, 3107, 3151, 3152, 3153, 3154, 3155, 3156, 3157, 3161, 3162, 3163, 3164, 3165, 3166, 3167, 3202, 3203, 3204, 3262, 3263, 3264, 3265, 3267, 3268, 3273, 3275, 3277, 3278, 3283, 3285, 3287, 3288, 3301, 3302, 3302, 3304, 3305, 3306, 3307, 3351, 3352, 3352, 3354, 3355, 3356, 3359, 3361, 3362, 3363, 3364, 3365, 3366, 3367, 3501, 3502, 3503, 3504, 3505, 3506, 3551, 3552, 3553, 3554, 3555, 3556, 3559, 3561, 3562, 3563, 3564, 3565, 3566, 3567, 3701, 3702, 3703, 3704, 3705, 3706, 3707, 3751, 3752, 3753, 3754, 3755, 3756, 3759, 3761, 3762, 3763, 3764, 3765, 3766, 3767, 31201, 31202, 31203, 31204, 31205, 31206, 31207 is removed.

For the loading mode shown in FIGS. 16*c* and 16*d*, it is advantageous to use the lock device 1601 so that it is ensured that no unauthorised object, and certainly no unauthorised persons, can enter an interior of the depot facility.

The loading mode illustrated in FIGS. 16*c* and 16*d* is particularly suitable for use with depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 in areas where the depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 is accessible to recipients of parcels and/or to depositors of parcels. This loading mode is particularly appropriate if the depot facilities are located at locations for the handover of parcels, in particular at locations, in particular set-up locations as joint optimized handover points for the handover of parcels.

Similarly, this is an advantageous loading mode of depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 for a handover of parcels at individual handover points.

It is also advantageous to use the interlock device 1601 in an unloading mode which ensures that no unauthorised object, and certainly no unauthorised person, can enter an interior of the depot facility. This unloading mode with the interlock device 1601 is also particularly appropriate when the depot facilities 140, 240, 250, 340, 350, 740, 830, 1711, 1721, 1731, 1811, 1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are located at locations for the handover of parcels in particular at locations, in particular set-up locations as joint optimized handover points for the handover of the parcels.

In both loading modes and/or both unloading modes, it is advantageous that transport units carry out the storage of parcels, in particular the storage of parcels in the depot facilities 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322.

Special Forms of Design

Individual Handover Points

It is advantageous to use the transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a* shown in this application, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 as handover units. It is possible to use transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 shall be used unchanged. For the use of transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741,3742, 3733, 3744, 3745 as handover units are appropriate, the transport units 1041, 1241, 1641, 1940, 1941, 1942,1943,1944,1945, 2140, 2141, 21422, 2145, 2101*a*, 2102*a*, 2103*a*, 2104*a*, 2105, 2106*a*, 2140, 2141, 2153*a*, 2154*a*, 2163*a*, 2164*a*, 2165*a*, 2166*a*, 21203*a*, 21204*a*, 21205*a*, 2145, 21206*a*, 3141, 31422, 3145, 3101*a*, 3102*a*, 3103*a*, 3104*a*, 3105, 3106*a*, 3140, 3141, 3153*a*, 3154*a*, 3163*a*, 3164*a*, 3165*a*, 3166*a*, 31203*a*, 31204*a*, 31205*a*, 3145, 31206*a*, 3740,3741, 3742, 3733, 3744, 3745 with additional resources, in order to be able to use them more effectively as handover units and, in particular, to protect the parcel from environmental influences and/or from unauthorised removal during transport of the parcel between the depot facility and the individual handover point of the recipient.

This also applies accordingly to the transport of the parcel between the individual handover point of a depositor as well as to the transport of the parcel between the depot facility and individual handover points for a handover of parcels to individual recipients and/or from individual depositors.

For this purpose, it is appropriate, for example, to use handover units that contain a cover for the parcel and/or a gripper arm for a handover of the parcel.

In a preferred embodiment, in particular when the transport units can also be used as handover units, the gripper arms of the handover units and/or the transport units have at least one gripper arm similar to the gripper arms of the robots at the chutes 21110, 21120, 21130, 21140, 31110, 31120, 31130, 31140 or the gripper arms within the depot facilities.

In order to enable a safe use of the handover unit also in a more elaborate terrain and/or on stairs and inclines as well as declines, it is appropriate to use a handover unit that has legs, such as the robot dog Spot from Boston Dynamics/Hyundai or another robot with a comparable functionality.

Such a robot is associated with further advantages, these advantages arise in particular in the possible use of means for man-machine communication and/or for communication with a user component, in particular a smartphone, smart watch or smart glasses (smart glass)

The individual handover points can have different characteristics. It is possible, for example, that there is a recipient at the handover point and that the parcel is handed over directly to the recipient. It is also possible for the parcel to be handed over to other persons and/or to technical facilities including further depot facilities or parcel boxes as a substitute for the recipient and/or for the parcel to be deposited at the individual handover point or at another handover point agreed with a recipient of the parcel and/or a depositor of the parcel, preferably a location located in the vicinity and protected against unauthorised inspection.

A particularly appropriate further embodiment of the invention is one in which a depot facility is also located in the area of at least some of the individual handover points.

Alternative Loading Option for Depot Facility

FIG. 23

Figure 23:
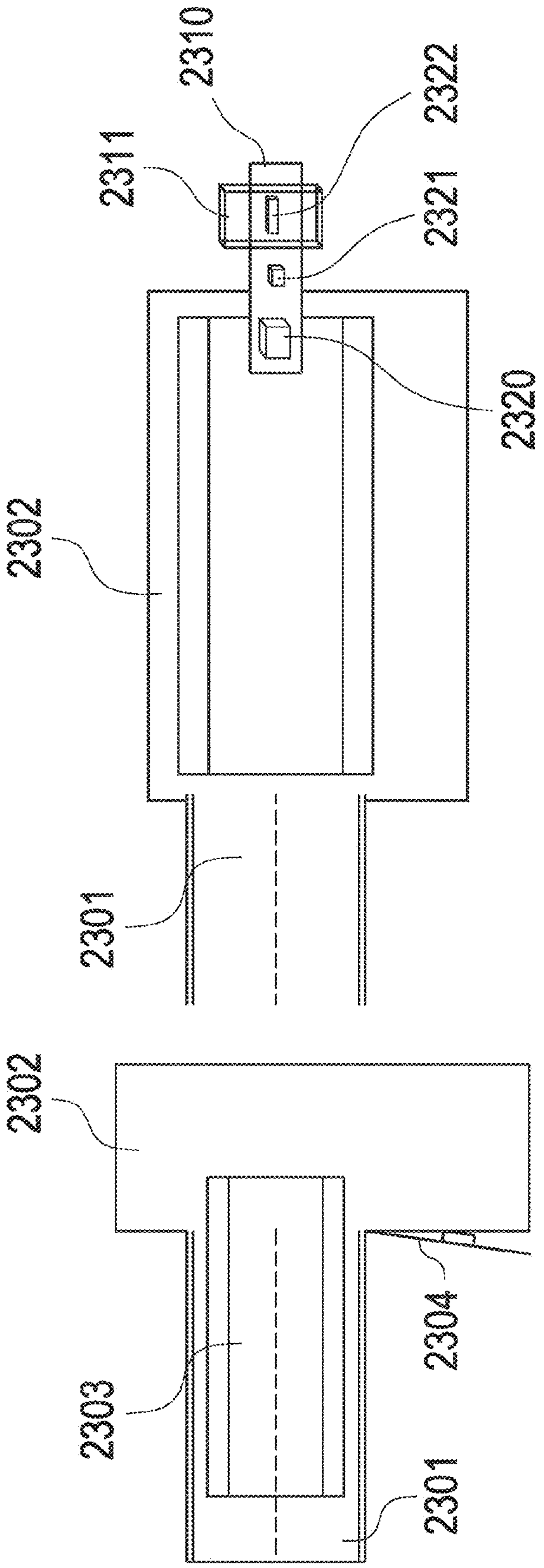
FIG. 23 a principle illustration of a loading of shelves according to the invention.

FIG. 23 describes an additional way to load a depot facility.

The depot facility 2301 is moved with its transport device to a delivery depot 2302. In order to be able to drive the storage unit 2303 as a whole out of the depot facility, the door 2304 at the rear of the depot facility is opened completely.

Within the delivery depot, the conveyor belt 2310 of the transfer facility can now be extended to between the two shelves of the storage unit. The parcels 2320 are detected by a parcel identification unit 2311 and their final storage position is queried or displayed.

The storage unit can then be loaded manually by personnel or by transport units.

This solution is also applicable if the depot facility is not used as a parcel mobile, but only as a pre-packed delivery vehicle.

Paternoster Systems as Alternative Depot Facilities

Figure 25:
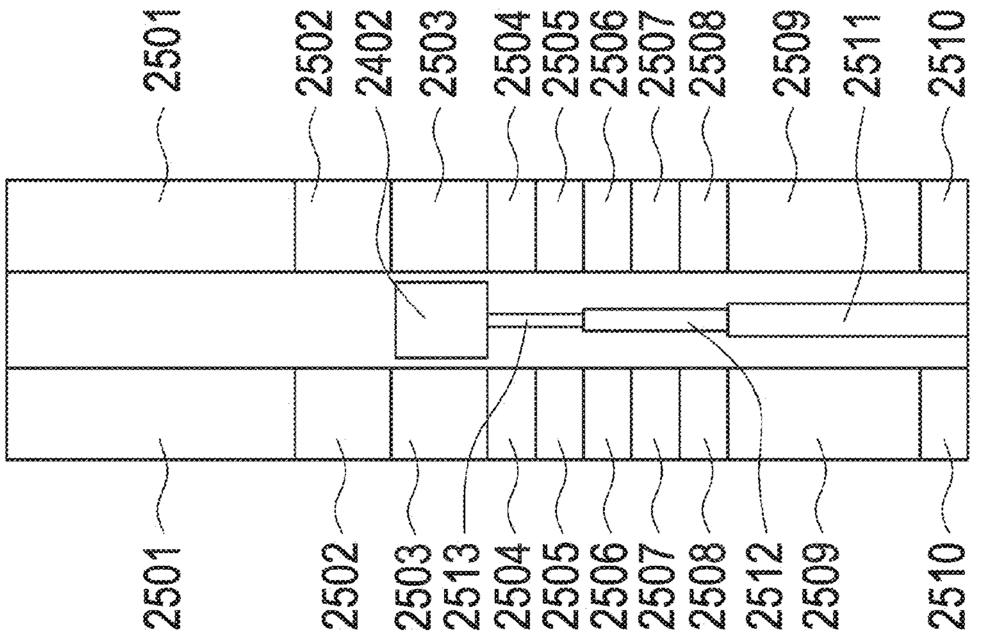
FIG. 25 is a schematic representation of a depot facility according to the invention comprising a paternoster system.
Figure 24:
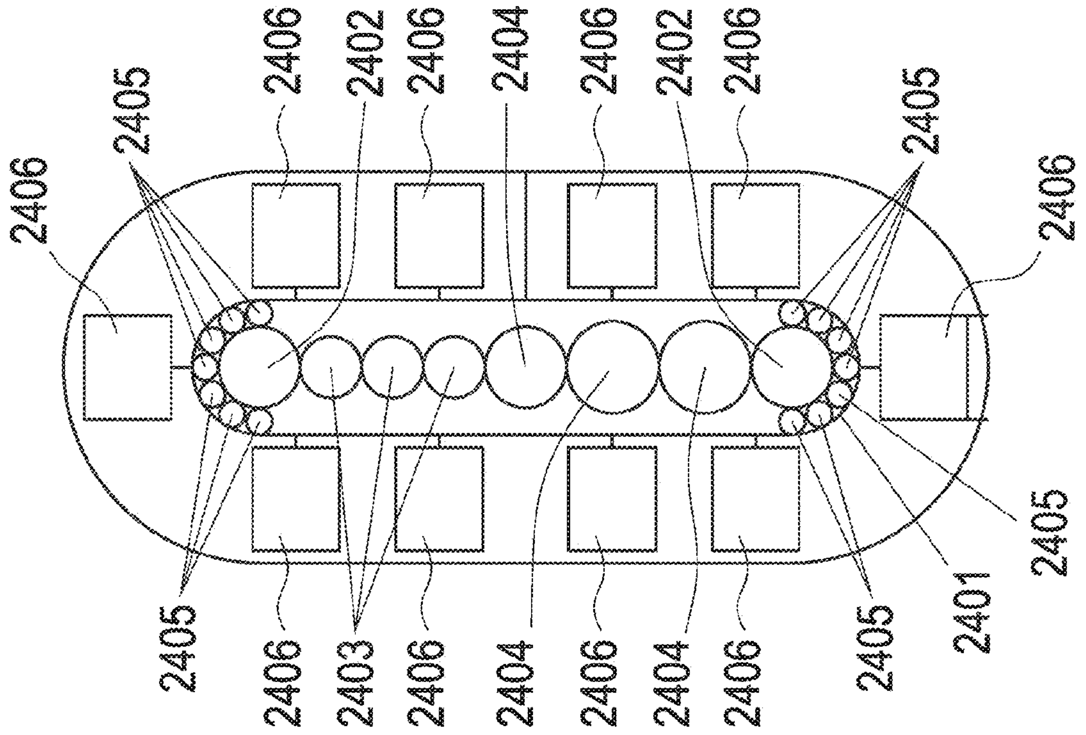
FIG. 24 a schematic representation of a depot facility according to the invention comprising a paternoster system.

FIGS. 24 and 25

FIG. 24 and FIG. 25 are schematic diagrams of a depot facility according to the invention comprising a paternoster system, wherein FIG. 24 is a top view and FIG. 25 is a side view of a depot facility according to the invention comprising a paternoster system.

On each of the levels 2501-2510 there is a rotating belt 2401, which is advantageously driven by a mechanism consisting of two motors 2402 per level and additional gears 2403, 2404 and 2405 per level or another suitable mechanical device. A plurality of parcel boxes 2406 are attached to each rotating belt 2401. As soon as a recipient wants to pick up a parcel or a depositor wants to insert a parcel, the correct storage position within the mobile depot facility is first determined. Then the motors are raised to the correct level by means of telescopic rods 2511-13 that can be moved into each other. The rotating belt then moves until the correct parcel box 2406 arrives in front of the output tray 2407, which then opens.

Multiple Depot Facilities

FIG. 26

Figure 26:
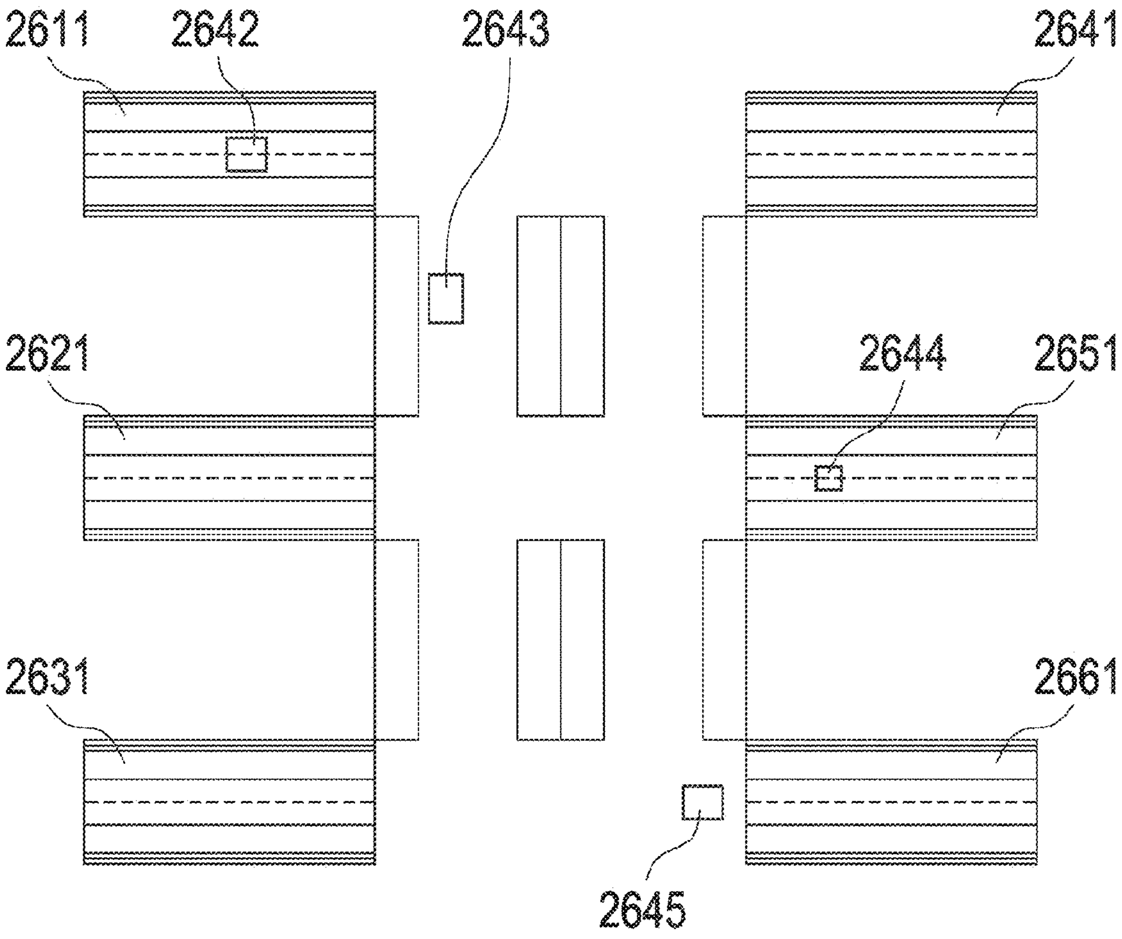
FIG. 26 shows a schematic diagram of a depot facility that can interact with several individual depot facilities.

FIG. 26 illustrates a depot facility that can interact with a plurality of individual depot facilities 2611, 2621, 2631, 2641, 2651 and 2661.

The depot facility shown in FIG. 26 also contains storage units for storing parcels between the individual depot units 2611, 2621, 2631, 2641, 2651 and 2661.

In an advantageous embodiment of the depot facility shown in FIG. 26, transport units 2642, 2643, 2644 and 2645 are available between each of the depot facilities 2611, 2621, 2631, 2641, 2651 and 2661 and in the intervening areas throughout the depot facility.

The depot facility shown in FIG. 26 is appropriate for the intermediate storage of parcels as well as for distribution, sorting and picking operations.

Distribution Centres of the Future

FIGS. 32, 34, 36 and 37

In parcel distribution centres according to the invention, particularly cost-effective and efficient solutions can be used additionally and/or alternatively.

FIGS. 32, 34, 36 and 37 show preferred embodiments of distribution centres according to the invention for the parcels, 3202, 3203, 3204, 3262, 3263, 3264, 3265, 3267, 3268, 3273, 3275, 3277, 3278, 3283, 3285, 3287, 3288, 3301, 3302, 3302, 3304, 3305, 3306, 3307, 3351, 3352, 3352, 3354, 3355, 3356 shown as rectangles in these figures, 3359, 3361, 3362, 3363, 3364, 3365, 3366, 3367, 3501, 3502, 3503, 3504, 3505, 3506, 3551, 3552, 3553, 3554, 3555, 3556, 3559, 3561, 3562, 3563, 3564, 3565, 3566, 3567, 3701, 3702, 3703, 3704, 3705, 3706, 3707, 3751, 3752, 3753, 3754, 3755, 3756, 3759, 3761, 3762, 3763, 3764, 3765, 3766, 3767, 31201, 31202, 31203, 31204, 31205, 31206, 31207.

Parcels can be conveyed from a main conveyor to chutes in various ways. For example, tilting trays can be used on a main sorter which, at the target end point, tilt in the direction of the end point by means of an electrical impulse and thereby unload the parcel by using gravity.

Conveyor belts—e.g. rubber tracks—usually use the same technique that a pinball machine uses to move the ball back to the upper part of the playing field by means of a lever. This lever swings over the conveyor belt from the side and deflects the parcel at the predetermined chute at a 45° angle If roller belts are used in which the rollers are individually motor-driven, rods can be extended through the spaces between the individual rollers, e.g. along line 3253 which then discharge the parcels at the predetermined chute at the same angle as the lever on the conveyor belt.

FIGS. 32, 34, 36 and 37 show preferred embodiments of distribution centres according to the invention.

The distribution centres shown in FIGS. 32, 34, 36 and 37 for parcels 3202; 3203; 3204; 3262; 3263; 3264; 3267; 3268; 3273; 3277; 3278; 3283; 3287; 3288, 3301; 3302; 3303; 3304; 3305; 3306; 3307; 3351; 3352; 3353; 3354; 3355; 3356; 3359; 3361; 3362; 3363; 3364; 3365; 3366; 3367, 3501; 3502; 3503; 3504; 3505; 3506; 3507; 3551; 3552; 3553; 3554; 3555; 3556; 3559; 3561; 3562; 3563;

3564; 3565; 3566; 3567, 3701; 3702; 3703; 3704; 3705; 3706; 3707; 3751; 3752; 3753; 3754; 3755; 3756; 3759; 3761; 3762; 3763; 3764; 3765; 3766; 3767 are preferably configured to provide means for transporting the parcels 3202; 3203; 3204; 3262; 3263; 3264; 3267; 3268; 3273; 3277; 3278; 3283; 3287; 3288, 3301; 3302; 3303; 3304; 3305; 3306; 3307; 3351; 3352; 3353; 3354; 3355; 3356; 3359; 3361; 3362; 3363; 3364; 3365; 3366; 3367, 3501; 3502; 3503; 3504; 3505; 3506; 3507; 3551; 3552; 3553; 3554; 3555; 3556; 3559; 3561; 3562; 3563; 3564; 3565; 3566; 3567, 3701; 3702; 3703; 3704; 3705; 3706; 3707; 3751; 3752; 3753; 3754; 3755; 3756; 3759; 3761; 3762; 3763; 3764; 3765; 3766; 3767, include.

Preferably, the distribution centres comprise transfer facilities for the transfer of the parcels, preferably singly, and means for the singular ejection of the parcels 3202; 3203; 3204; 3262; 3263; 3264; 3267; 3268; 3273; 3277; 3278; 3283; 3287; 3288, 3301; 3302; 3303; 3304; 3305; 3306; 3307; 3351; 3352; 3353; 3354; 3355; 3356; 3359; 3361; 3362; 3363; 3364; 3365; 3366; 3367, 3501; 3502; 3503; 3504; 3505; 3506; 3507; 3551; 3552; 3553; 3554; 3555; 3556; 3559; 3561; 3562; 3563; 3564; 3565; 3566; 3567, 3701; 3702; 3703; 3704; 3705; 3706; 3707; 3751; 3752; 3753; 3754; 3755; 3756; 3759; 3761; 3762; 3763; 3764; 3765; 3766; 3767 to transfer facilities.

Figure 32:
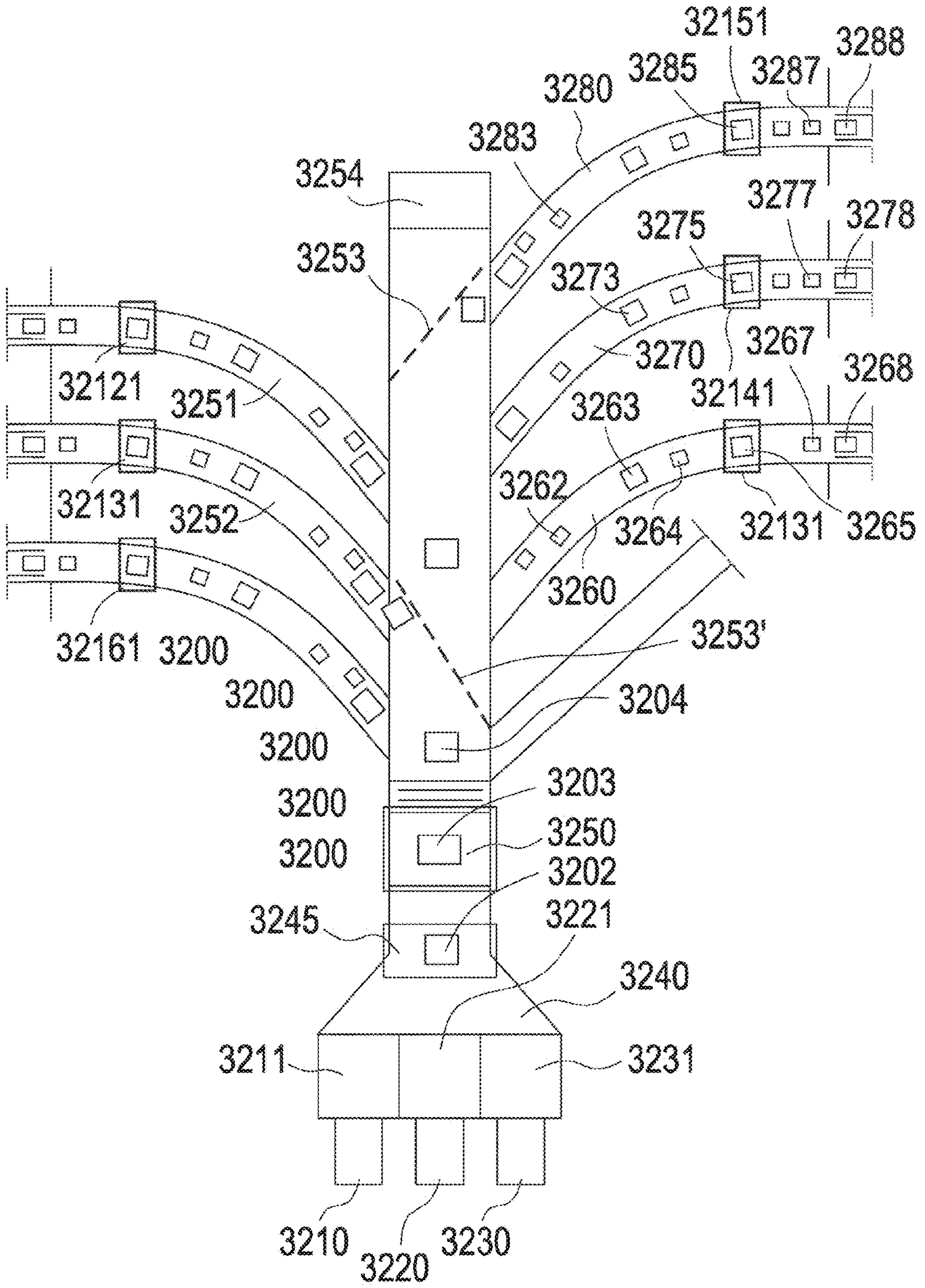
FIG. 32, 34, 35, 36, 37 preferred embodiments of distribution centres according to the invention.
Figure 33:
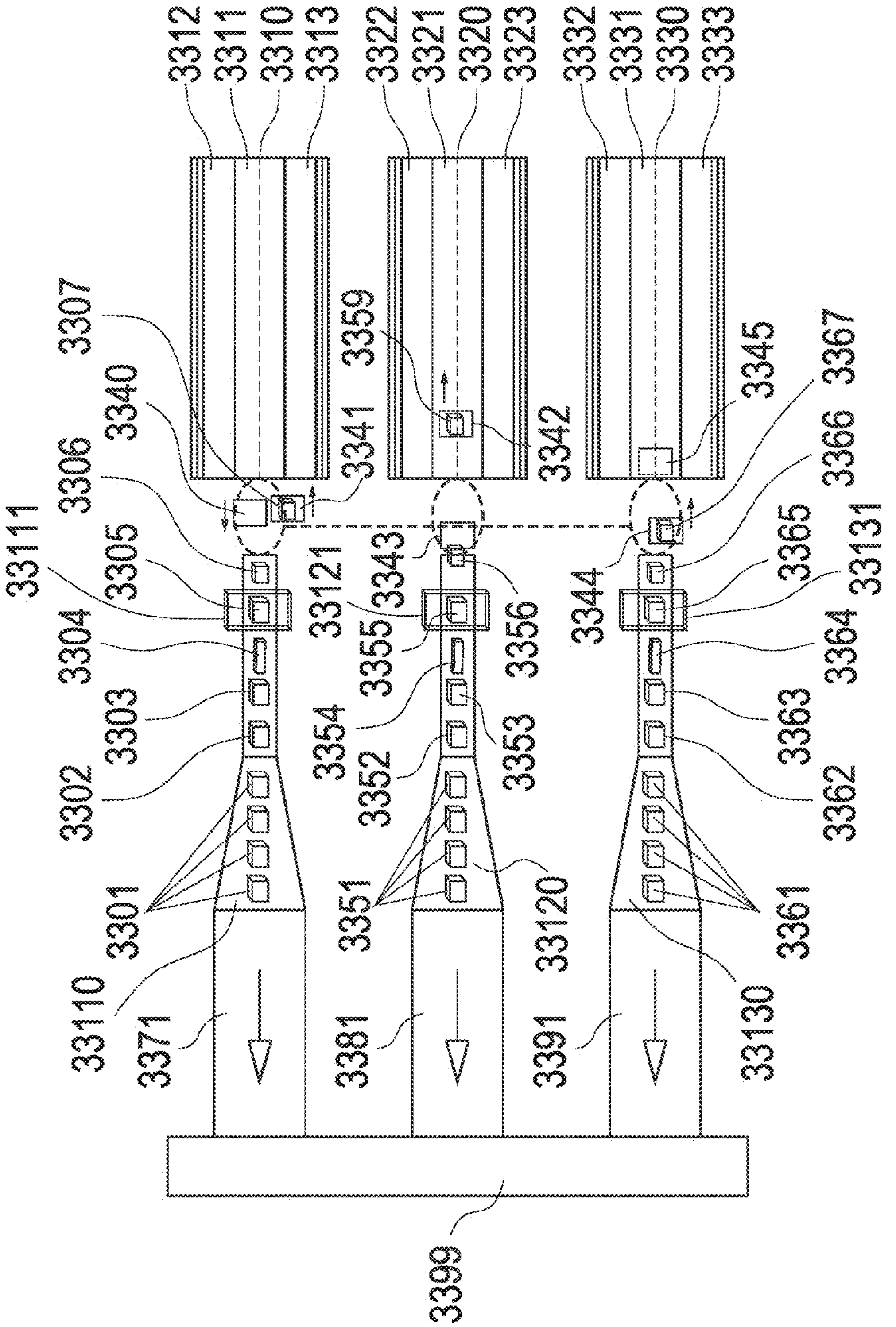
FIG. 33 a top view of a transfer facility according to the invention.
Figure 34:
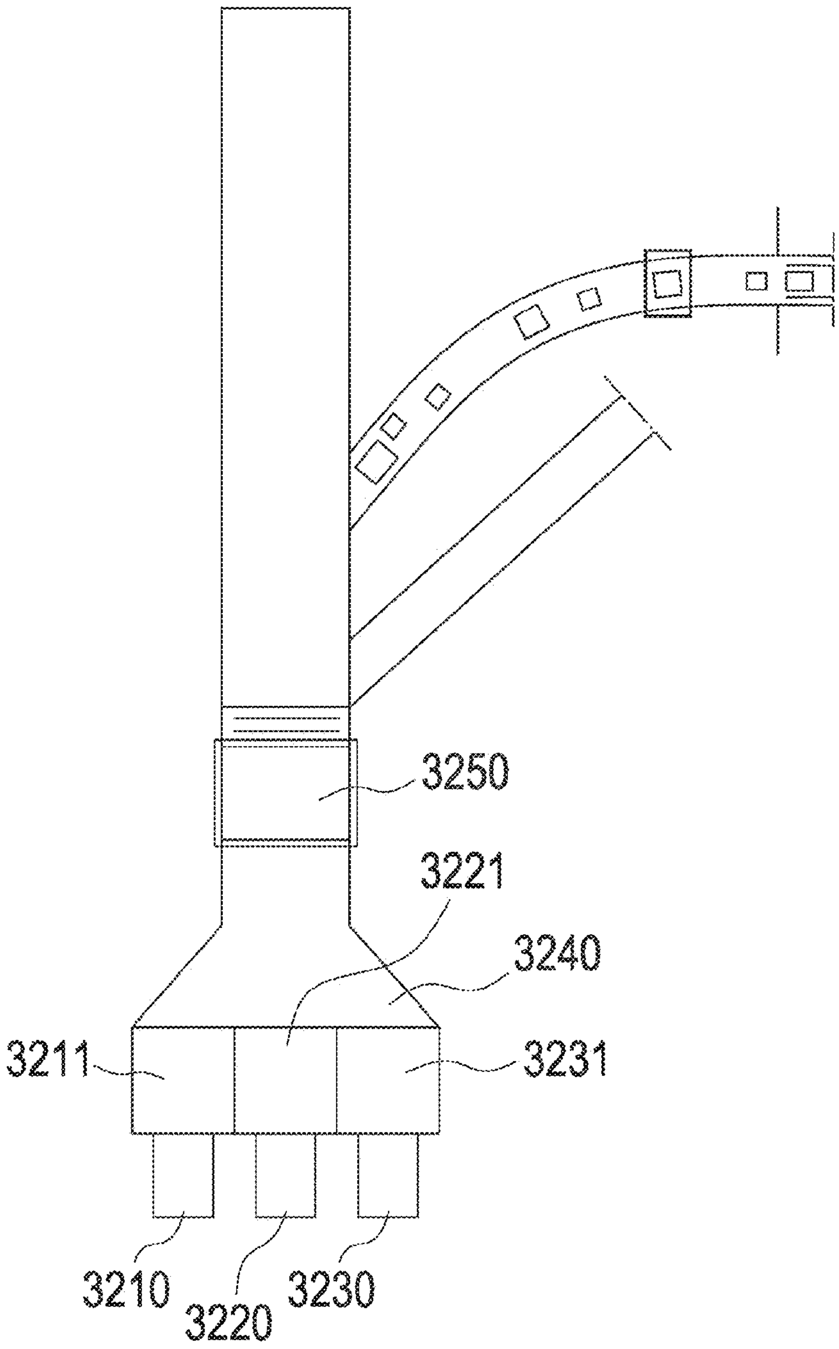
Figure 35:
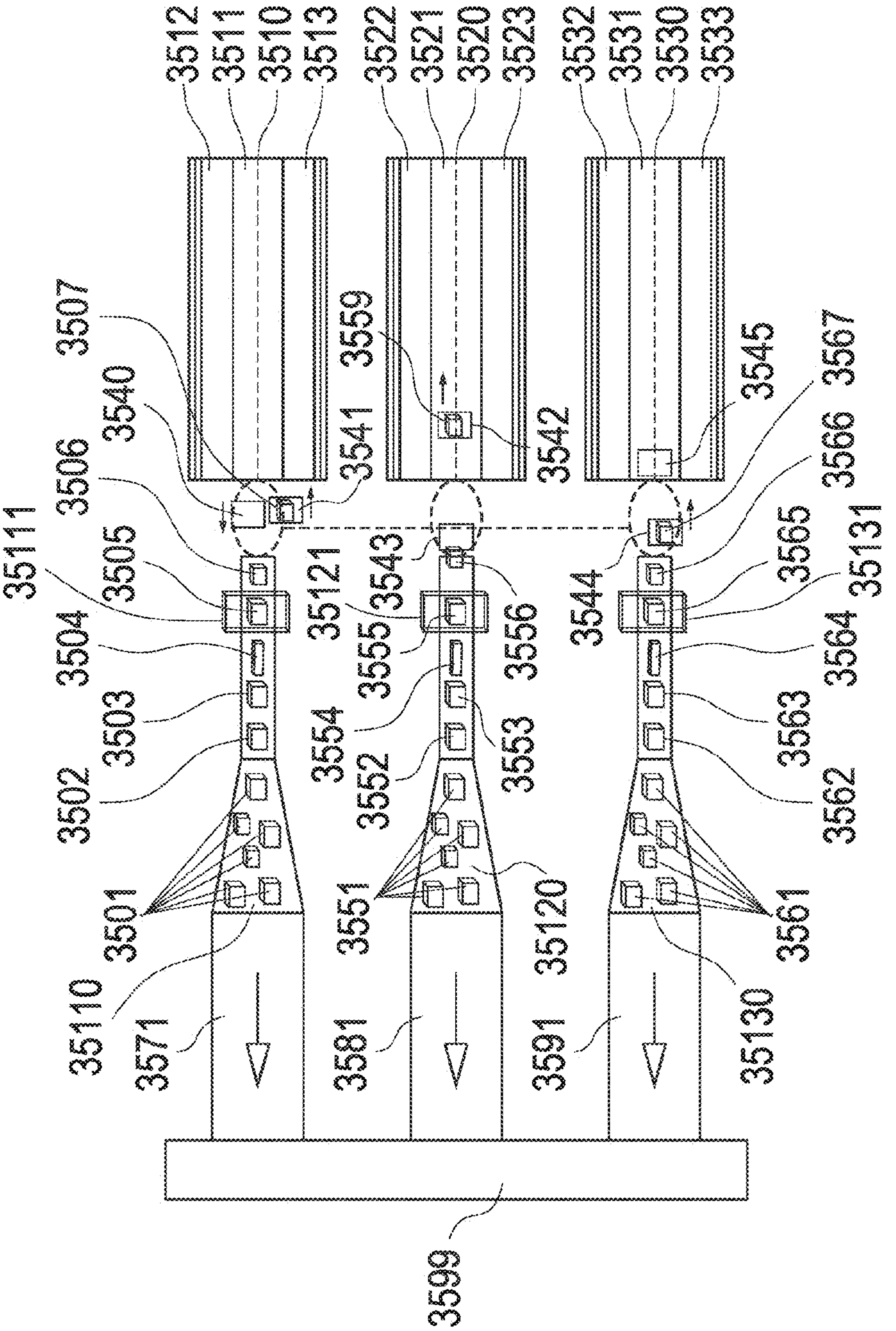
Figure 36:
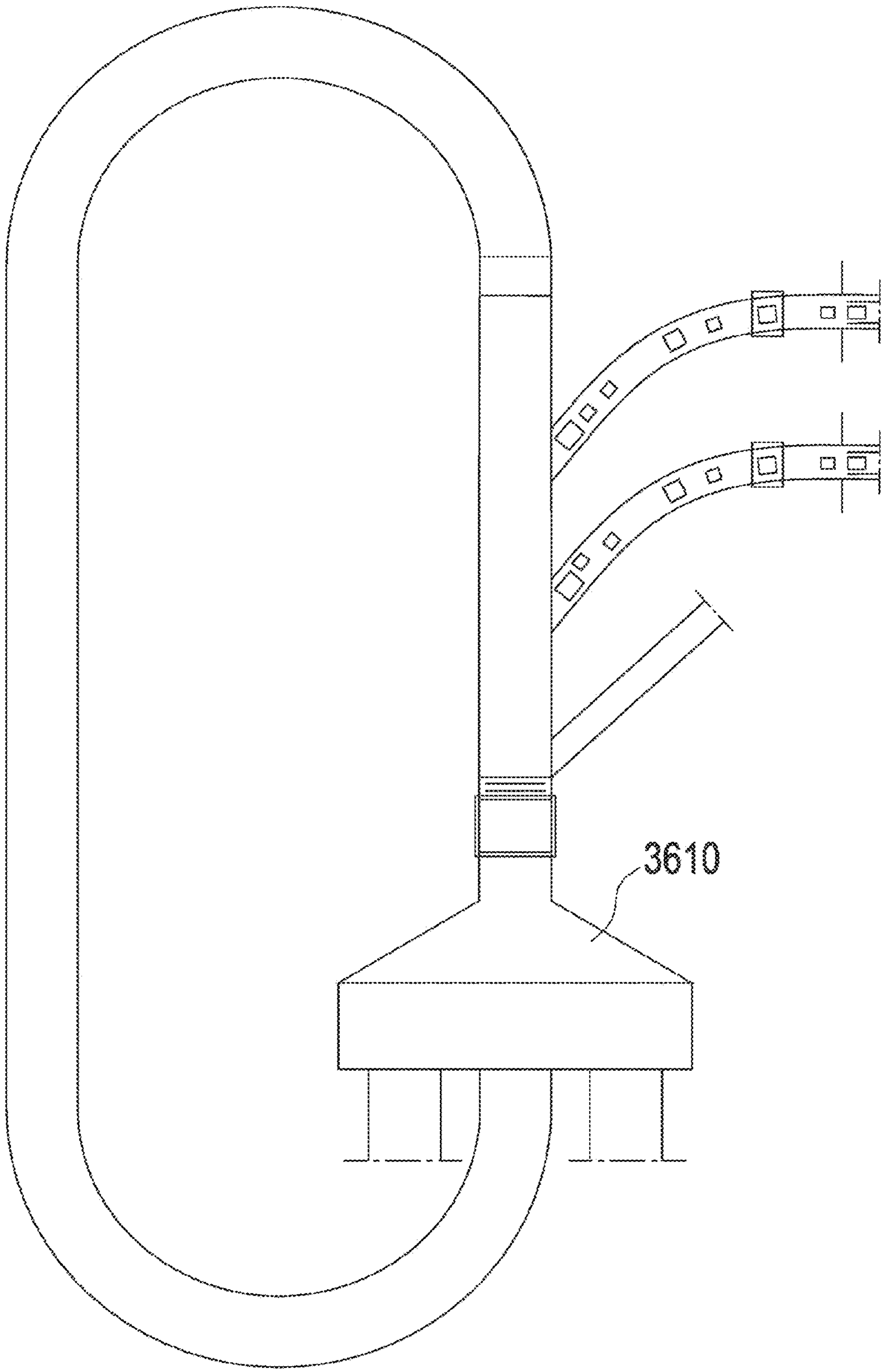
Figure 37:
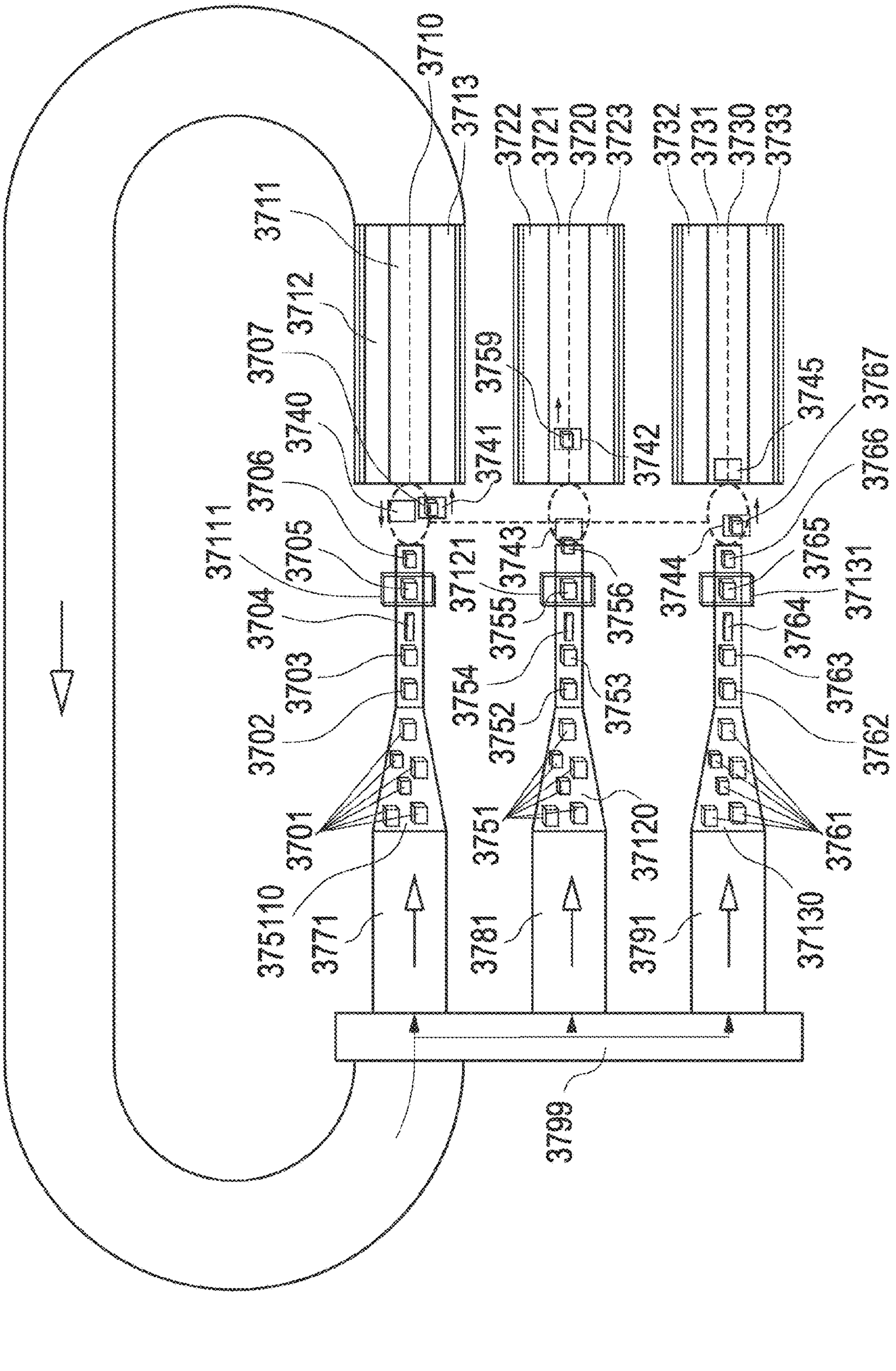
Figure 38:
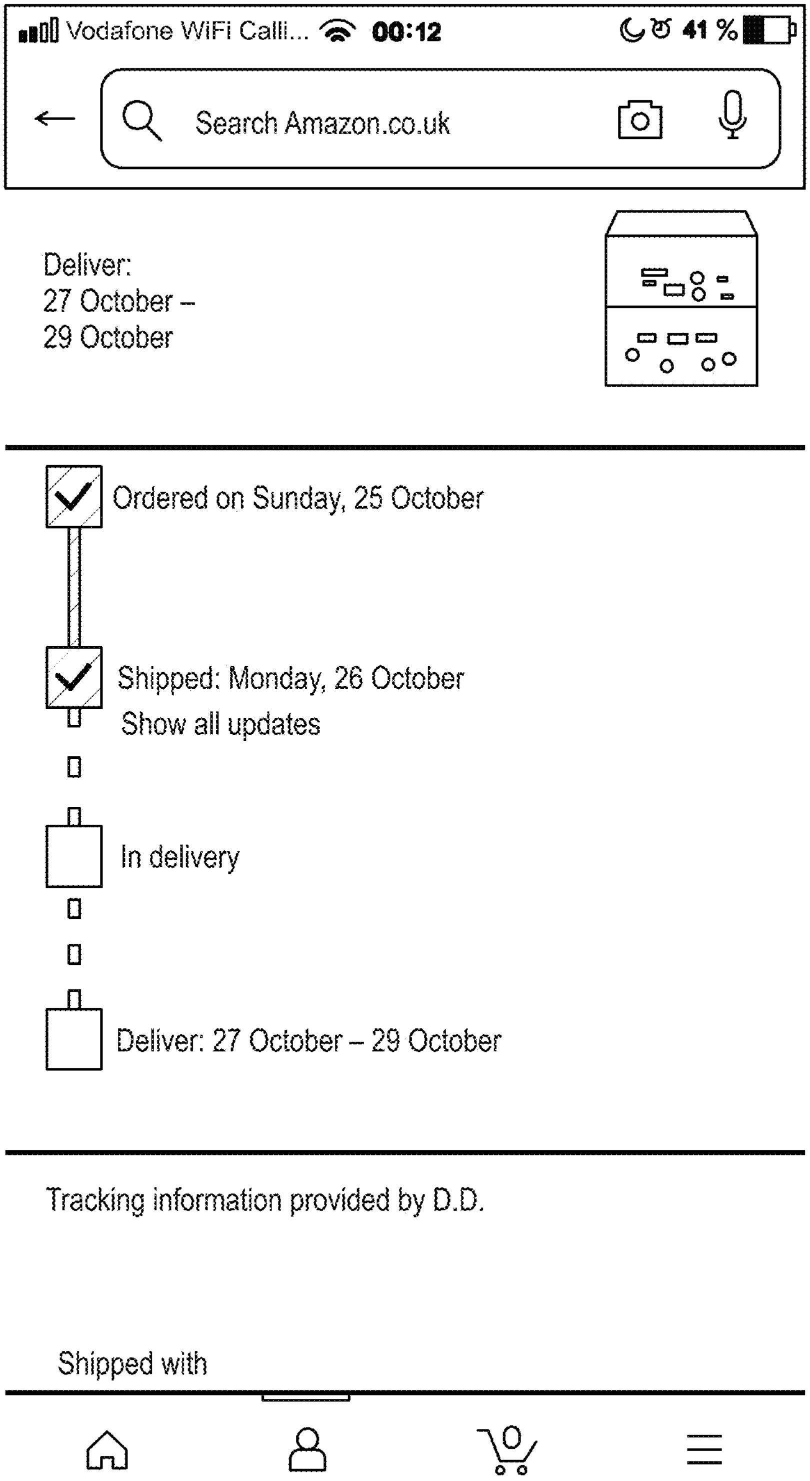
FIG. 38 a graphical user interface of a prior art user component.

The parcels—as shown in FIG. 32—are scanned, for example after unloading, preferably already on a main conveyor belt 3240 by a 6-sided scanner (incl. scales) 3250 to determine the parcel identification code and the room dimension (height/width/depth). Parallel to this, the weight of the individual parcel is determined.

The use of a digital twin for each parcel is particularly advantageous.

Scanning of a parcel is done either for the purpose of identification or for control.

After scanning on the main conveyor belt (identification), the parcel is transported until it leaves, for example, onto another conveyor belt, for example the end-of-line belt 32141 (one end-of-line belt per depot facility). The parcel is then discharged onto the corresponding terminal conveyor by corresponding means 3253. The parcel is discharged in such a way that it is already conveyed separately onto a belt, from which it is then finally conveyed to a depot facility 140, 240, 250, 340, 350, 1710,1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322. This is possible because at depot facilities the loading process can take several hours and thus considerably longer than before due to automation, and therefore the terminals do not need space to buffer parcels: Each parcel is discharged individually and then travels individually on a conveyor belt, in particular a roller conveyor, to the handover unit.

If, however, more parcels are diverted to the chute than are loaded into the depot vehicle at the end of the chute, a "traffic jam" may occur at the chute. In this case, the system ensures that no additional parcels are delivered to the chute. In addition, suspension mechanisms on the sides of the chutes must be used to ensure that parcels do not become wedged in the jam or change their order.

The main conveyor belt is preferably, in contrast to the state of the art, on the same level as the end-of-line belt. This means that the parcel is transported directly from the main conveyor belt to the end-of-line belt and would thus be automatically separated. The parcel remains unchanged in its order on the end-of-line conveyor until it finally reaches the storage positions of the depot facility 140, 240, 250, 340,

350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322. The parcels enter the end-of-line conveyor in the order in which they are scanned by the main conveyor scanner and are also transferred to the transport unit in this order.

To ensure (control) that it is the corresponding parcel that is transferred to the transport unit, on the one hand another 6-sided scanner can be used for each end point conveyor (scanning of the parcel identification code). It is particularly advantageous to alternatively or additionally use a scale (comparison of the weight with the weight determined by the scale on the main conveyor belt) or a room measurement scanner (comparison of the room measurement with the room measurement determined on the main conveyor belt). The information determined on the main conveyor belt is transmitted directly to a transfer facility 5130, 5336 so that it is already available to the measuring instrument, in particular a 6-sided scanner/balance/room measure scanner for comparison before the parcel arrives; i.e. the control component 5012 can take into account that a parcel requires e.g. 23 seconds from the main conveyor belt scanner to the measuring instrument of the corresponding terminal unit belt. Thus, the measuring instrument of the end point acquires the data on the main conveyor belt 23 seconds after the data has been acquired and matches it with the data of the parcel to be expected.

If the data determined by the main transport belt scanner/balance is identical to the data of the measuring instrument of the depot facility end chute, the parcel is transferred to the transport unit. The transport unit has then already received the corresponding storage location coordinates from a control component 5012 and stores the parcel accordingly in the depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322.

If the data determined by the main conveyor belt scanner/scale is not identical with the data of the measuring instrument of the depot facility end chute, it is automatically checked whether the determined data of the depot facility end chute is identical with other determined packet data from the main conveyor belt scanner/scale. If this data is identical to that of another parcel that is also transported to this depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 are to be stored, this parcel is handed over to the transport unit with the corrected data.

If the parcel does not have a parcel identification characteristic for this depot facility 140, 240, 250, 340, 350, 740, 830, 1711, 1721, 1731, 1811,1821, 1831, 1911,1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 are identical, this parcel is diverted, transported to a "no read" (post-processing) area and post-processed.

FIG. 30

FIG. 30 shows a flowchart for the creation of a shipping label in the state of the art.

First of all, the creation of the shipping label itself is necessary. It must be ensured that the shipping label contains two different barcodes, an identification code and a routing code including a correctly coded destination address (delivery information).

Then the shipping label must be printed, making sure that the label is printed without printing errors and that the size of the barcodes and quiet zones between the barcode and the label edge are observed.

Finally, it is also necessary to permanently affix the shipping label to the parcel, making sure that the label is completely smoothly affixed and not obscured by strapping or tape.

In a particularly preferred embodiment in the invention, however, it is possible to dispense with any shipping labels.

Even if shipping labels are used for the application of the invention, in preferred embodiments it is not necessary to enter the previously shown coded destination address (delivery information), as it is sufficient to identify the parcel itself.

In advantageous further embodiments of the invention, it is thus possible to dispense with known shipping labels and/or with individual, several or all of these process steps. The shipping labels can be replaced by other identification features, or it is possible to dispense with them entirely.

Figure 44:
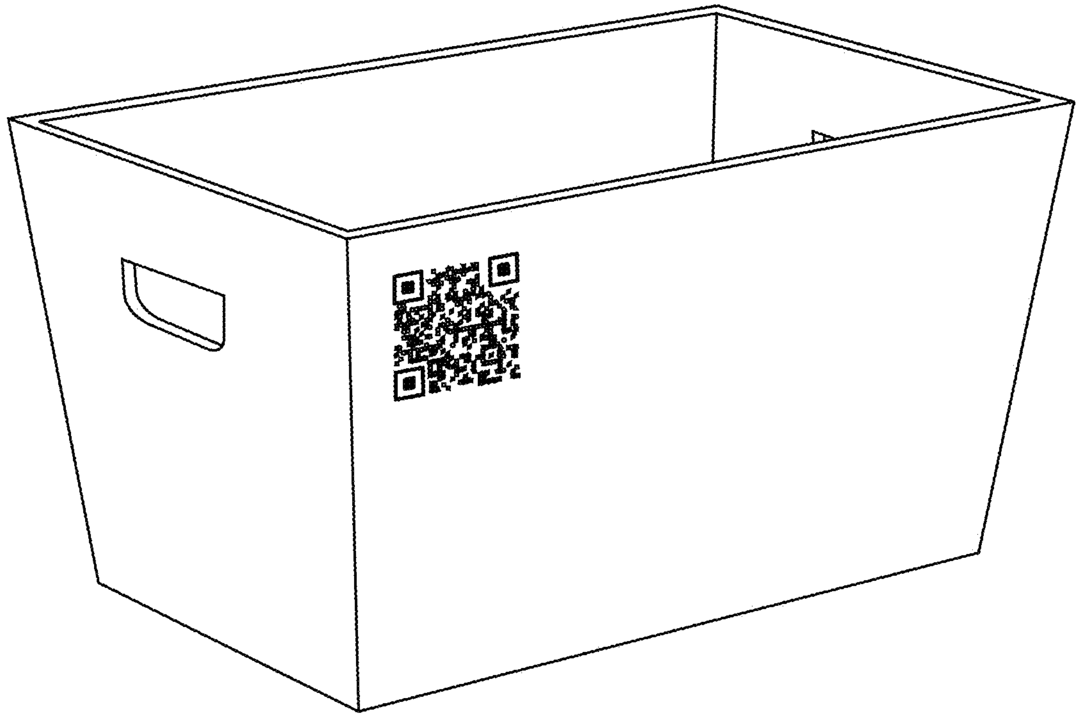
FIG. 44 a principle representation of a parcel according to the invention.

In particularly preferred embodiments of the invention, a shipping label is not used, for example, as in the case of the parcel illustrated in FIG. 44, which is virtually linked to a parcel identification code generated by a control device. This parcel identification code may further be associated with one or more other parcel identifiers.

Figure 39:
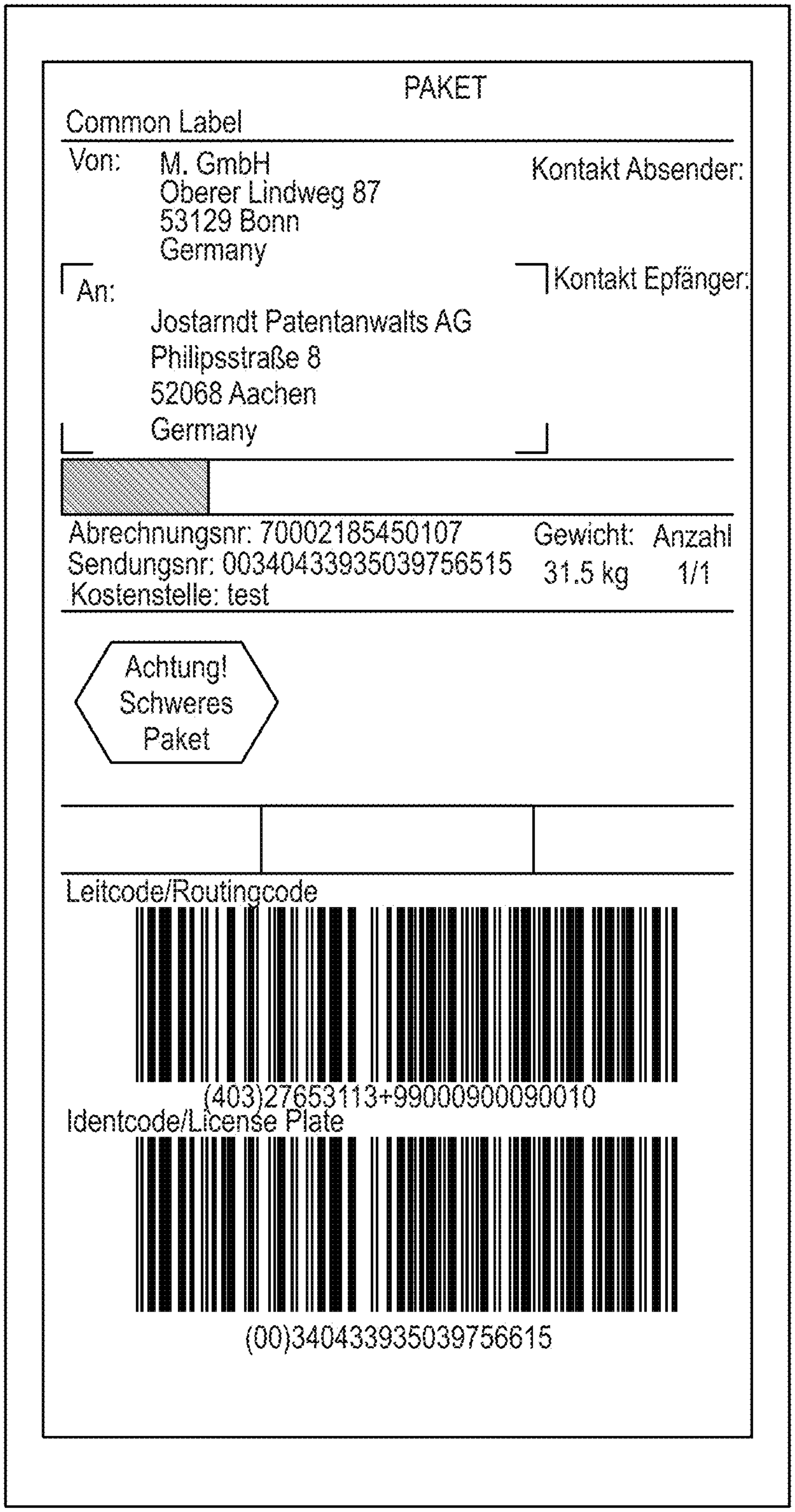
FIG. 39 a shipping label according to the state of the art.

FIGS. 39 and 40

FIG. 39 shows a prior art shipping label and FIG. 40 shows a prior art parcel; which is provided with a shipping label, the creation of which was previously illustrated using FIG. 30.

Figure 45:
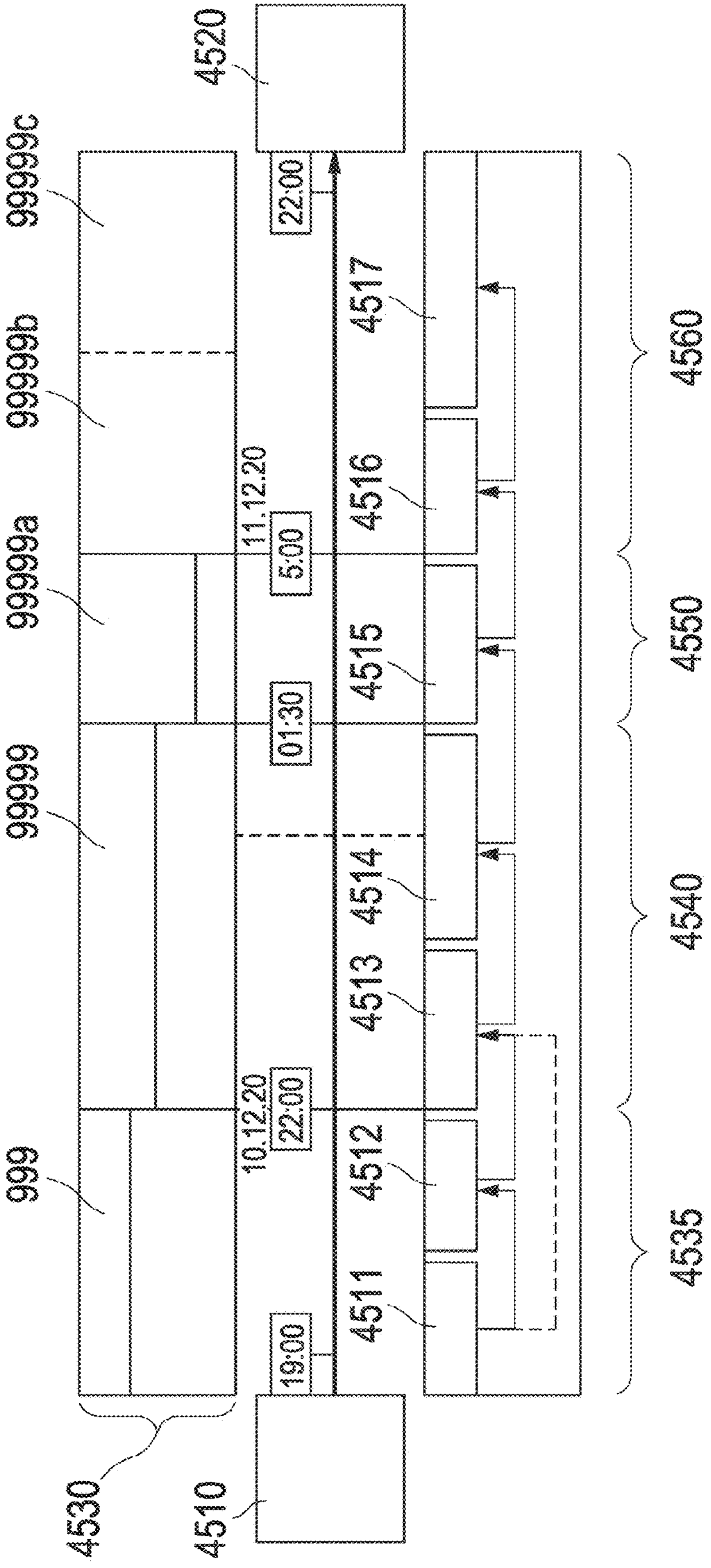
FIG. 45 principle representation of an allocation of parcels to recipients according to the invention based on recipient attributes for handling physical parcels by a logistics system according to the invention.

It is also possible to process such parcels according to the prior art and, in particular, to carry out transfer operations, storage and transport of these parcels according to the invention, whereby it is advantageous not to record individual items of information, in particular the delivery address, in particular because particularly preferred embodiments of the invention allow flexible assignment of parcels to recipients, in particular as shown by way of example in FIGS. 44 and 45.

FIG. 41

FIG. 41 shows a goods object according to the prior art. This goods object is an example from a numerically unlimited number of goods objects that can be processed with the processing operations according to the invention, in particular transfer operations, storage and transport.

In particular, the image shown in FIG. 41 can be created by means of a camera device and used as a parcel identification characteristic.

An advantageous further embodiment of the invention provides that machine-readable data are also assigned to goods objects, such as the goods object shown by way of example in FIG. 41, the data comprising at least one identifier with which the respective parcel can be uniquely identified. Conveniently, at least one of the parcel identification characteristics shown in this application is used as an identifier for the respective parcel.

Prior art parcels and prior art commodity objects—such as the exemplary parcel shown in FIG. 40 and the likewise exemplary commodity object shown in FIG. 41—can thus likewise be handled as parcels according to the invention with the inclusion of the processing operations shown.

Flexible Shelving Systems

Figure 43:
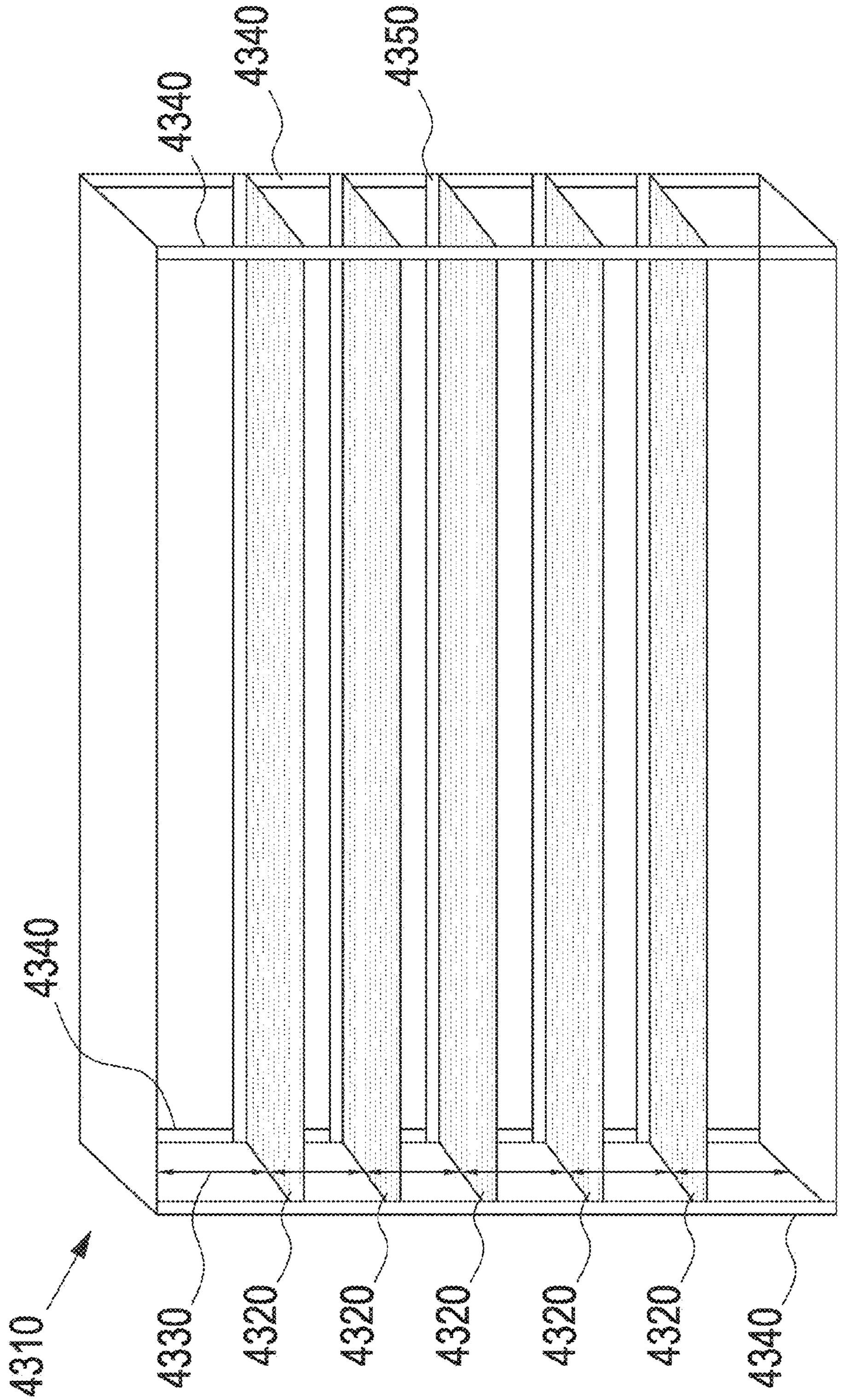
FIG. 43, 43*a*, 43*b* a principle representation of a shelving system according to the invention.
Figure 43A:
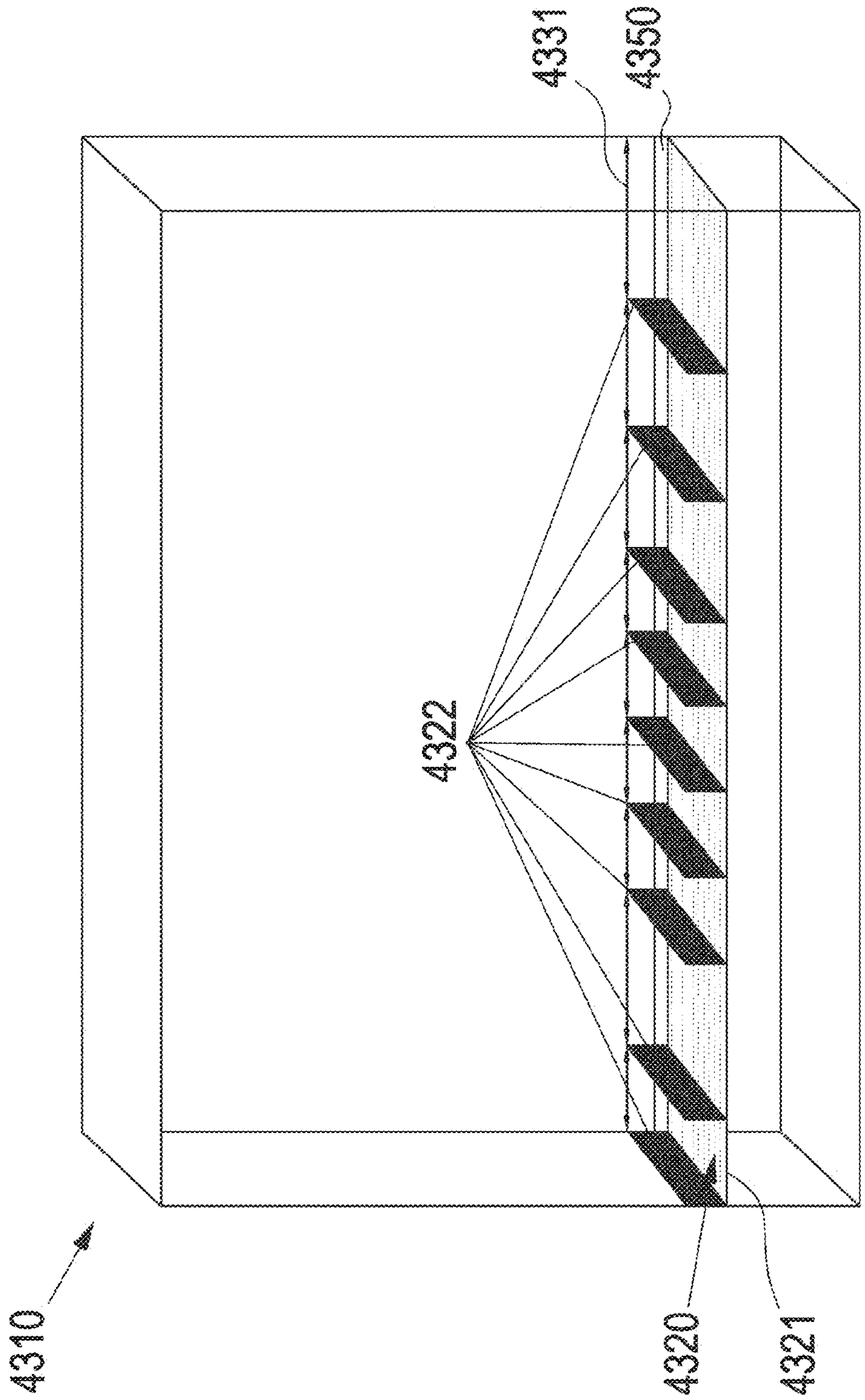
Figure 43B:
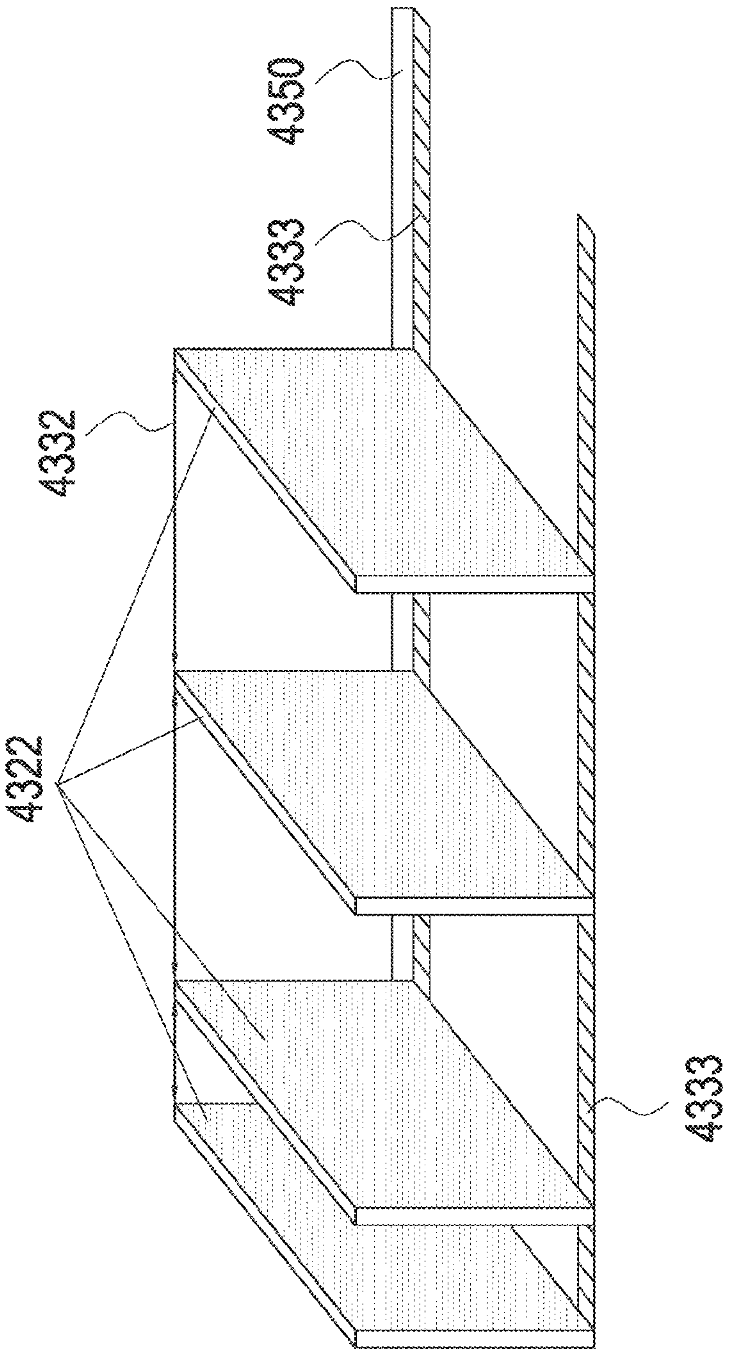

FIGS. 43, 43*a* and 43*b*

FIGS. 43, 43*a*, 43*b*, show a shelving system according to the invention. The shelving system according to the invention is particularly suitable for use in a storage unit of a depot facility. However, the shelf system shown is not limited to such an application. For example, the shelving system can also be used for other storage solutions.

The illustrated shelving system is characterised by the fact that shelves 4320 and/or lateral boundary partitions 4322 can be arranged in a displaceable manner.

This makes it possible to adapt the distance between different horizontal or vertical levels of the shelf to variable requirements. It is particularly advantageous to adapt the storage unit to the number and/or dimensions of goods to be stored, in particular goods objects, including the parcels shown in this application.

Logistics Solution for Goods Storage

FIG. 44

Particular advantages of the flexible allocation of parcels to recipients as well as the allocation of several individual items to one parcel are explained below using the parcel shown in FIG. 44.

The parcel shown in FIG. 44 is designed as an open carton that can easily be filled with other parcels and/or goods objects.

Alternatively, it is possible to use a closable or closed cardboard box or a tray-like container as a parcel.

A preferred embodiment of the invention provides that several of the cartons are stacked inside one another and that the top carton in each case is removed—for example with the aid of a suction pad—from a stack of cartons that is open at the top.

In order to facilitate stackability of the cartons and/or removal of cartons from a stack of several cartons, it is advantageous to use within a stack of cartons having the same dimensions and preferably outwardly sloping side surfaces, such as the exemplary carton shown in FIG. 44.

It is of course possible to use containers/parcels with different dimensions within the depot facilities, advantageously using multiple stacks that have cartons with dimensions that are the same within a stack and preferably different between different stacks.

It is advantageous to store the containers in a storage unit that takes their dimensions into account and to remove them from this storage unit as soon as a control command has been transmitted to carry out one or more of the logistical processing operations presented in this application.

It is not necessary to physically tag the parcels/cartons with a parcel identification code. The parcels/cartons shown in FIG. 44 are provided with a matrix code as an example. This can be an individual matrix code for each individual carton/parcel or the same matrix code for a plurality of parcels and/or several cartons. In this case, the matrix code can refer to a website of an order picker who fills the carton or of an operator of the logistics system, for example to the website www.parcelmobile.com.

The carton shown can be filled with parcels and/or goods objects at various locations. In principle, it is possible to move the carton from a first station where it is filled with one or more first parcels and/or one or more first goods objects to a second station where it is filled with one or more second parcels and/or one or more second goods objects or to carry out the entire filling of the carton in a single picking device. Of course, it is also possible to fill the cartons/parcels in a larger number of depot facilities.

As already illustrated in the description of the local logistics at the depot facilities, it is possible with the aid of the depot facilities according to the invention to carry out processing operations, in particular logistical functions. In a particularly preferred embodiment of the invention, such a logistical function is the picking of the parcels and/or goods objects at depot facilities according to the invention, in particular within the depot facilities or in a distribution centre 5301 for parcels.

Once the carton is planned to be filled, it is appropriate to treat it as a parcel within the meaning of the present invention. In particular, this means that it is possible to process a parcel formed by the unfilled or filled carton with one or more of the following processing operations:

- Acceptance as a parcel, for example as a posting, in particular by a depot facility or at a depot facility;
- transport of the parcel between the depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 and a depositor and/or a recipient of the parcel; in particular by a handover unit,
- Transport of the parcel within the depot facility 140, 240, 250, 340, 350, 1710, 1720, 1730, 1810, 1820, 1830, 1910, 1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322, in particular between a handover gate and storage positions of a storage unit of the depot facility;
- Transport of the parcel from a depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 to another depot facility;
- Transport of the parcel between the depot facility 140, 240, 250, 340, 350, 1710,1720, 1730, 1810,1820, 1830, 1910,1920, 1930, 2110, 2120, 2130, 2140, 2710, 2720, 2730, 2810, 2820, 2830, 2910, 2920, 2930, 3110, 3120, 3130, 3140, 5242, 5243, 5321, 5322 and a transfer facility 5130, 5336;
- Transport of the parcel within the transfer facility;
- Sorting the parcel within the transfer facility 5130, 5336;
- Sorting of the parcel within the parcel sorting centre (parcel sorting centre 5301);
- Transport of the parcel between two distribution centres.

This concerns in particular processing operations of the parcel:

- Delivery to a logistics system;
- Transport to a depot facility;
- Transport to a. Storage position of a depot facility;
- Handover to a recipient.

Whereas in the prior art it is necessary to physically tag parcels with both a parcel identification code and delivery address information, in a preferred embodiment of the invention this is not necessary, although it is of course possible to capture and/or use a parcel's parcel identification code and/or delivery address information as parcel identification characteristic(s).

As soon as one or more of the aforementioned machining operations are initiated by a control device, in particular

- a transport process,
- a filling process,
- storage,
- a hand out, the parcel is virtually linked to a parcel identification code generated by the control device. This parcel identification code can be linked to one or more other parcel identifiers. For example, it is possible to assign a previously unassigned unique parcel identification code 1234567890 to a parcel weighing, for example, 5.0182 kg and/or having storage position 58.

The design of the parcel as an open carton, as shown in FIG. 44, is an embodiment that is particularly useful when the parcel is protected from interference by unauthorised persons at all stages of processing until handover to a recipient.

According to the invention, a contactless logistics system is preferably provided in which the processing operations are carried out by machines so that the parcels and/or the objects contained in the parcels are protected from unwanted influences. Therefore, a complex outer packaging can be dispensed with.

Label & Identcodes

FIG. 30

FIGS. 38 to 42

While parcels in the prior art have to be provided with labels of the respective logistics service provider, which have to be created separately, it is possible with the invention to handle any physical objects—provided that dimensions and/or weights to be taken into account for the respective processing operations are observed—in the logistics system, in particular by one or more of the following processing operations:

- Deposit;
- Commissioning;
- Sorting;
- Transport;
- Handover.

Prior art parcels and prior art commodity objects—such as the exemplary parcel shown in FIG. 40 and the likewise exemplary commodity object shown in FIG. 41—can likewise be handled as parcels according to the invention with the inclusion of the processing operations shown, preferably An advantageous further embodiment of the invention provides that further information is assigned to the parcels as machine-readable data, in particular by using digital twins. An example of the further information is dimensions, in particular the spatial dimension of the parcel and/or the weight of the parcel, due date/time, penalties for late delivery, delivery costs, depositor—and recipient information, material, fragility and parameters of the required way of transporting the parcel, e.g. a refrigerated truck for goods that need to be refrigerated.

It is appropriate to add protocol functionality to the control components.

Assignment of Parcels to Recipients Based on Recipient Attributes

FIG. 45

Further advantageous further embodiments of carrying out processing operations of parcels according to the invention, in particular using individual, several or many of the processing operations shown in FIG. 5, are exemplified in FIG. 45.

FIG. 45 shows, among other things, an assignment of parcels to recipients on the basis of recipient attributes, whereby parcels are assigned changing proportions of fixed recipient attributes and variable recipient attributes in the course of their transport route Examples of the recipient attributes are the components of the address depth shown, in particular leading numbers of a postcode (for example the first two or three digits), further digits of the postcode, handover points shown in this application, and alternatively or additionally the complete postcode, preferably including the street or street section.

FIG. 45 shows in particular a principle representation of a handling of physical parcels by a logistics system according to the invention, in particular with characteristics of the logistics system 5020 shown above by way of example, in particular with reference to FIG. 5, preferably with individual, several, many or all of the processing operations shown in columns 5110, 5120, 5130, 5140, 5150, 5160, 5170, 5175, 5180.

While in conventional parcel processing systems processing operations of parcels provide for a transport of parcels from a fixed shipper to one or more predetermined recipients—this is equally possible with the processing operations depicted in the present application—the processing operations depicted as advantageous in the present application allow for a flexible assignment of parcels to recipients and/or handover points, whereby it is particularly advantageous to make a flexible assignment of a final recipient and/or a final handover point, which can be selected in particular from the joint optimized handover points and individual handover points for an individual recipient as the final recipient, as shown in this application.

In the processing operations of parcels shown as an example in FIG. 45, the same parcel identification characteristics, in particular those that remain the same, and/or parcel identification characteristics that differ from other parcel identification characteristics can be used to identify a parcel. The parcel identification characteristic may, for example, be the parcel identification code already explained in this application, which uniquely identifies a parcel. Such a parcel identification code is, for example, applied to a parcel before it is handed over to a logistics system or a unit of the logistics system, for example one of the receiving units shown in this application, for example the depot facilities shown, or the parcel identification code is applied to the parcel during a delivery to the logistics system or one of the processing operations within the logistics system.

Also included in the exemplary parcel processing operations shown in FIG. 45 are embodiments in which the parcel identification code is a physical code applied to, for example, the parcel, an outer package of the parcel, or a storage unit for the parcel and/or a transport unit for the parcel, and/or embodiments in which the parcel identification code is a digital code associated with the parcel and/or a digital twin of the parcel.

It is also advantageous in the processing operations exemplified in FIG. 45 if the respective digital twin of one of the parcels, preferably a plurality of parcels, even more advantageously as many parcels as possible, contains at least one parcel identification characteristic. In advantageous embodiments in which the parcel is associated with a parcel identification code, it is advantageous that the digital twin of the parcel contains the parcel identification code.

It is appropriate to integrate at least one, advantageously several, even more advantageously as much information as possible into the digital twin of a parcel.

A preferred further embodiment of the invention is to supplement processing operations by providing process protocols, advantageously including individual process protocols for individual parcels, and/or to use the provided process protocols for controlling processing operations. Using individual process protocols for individual parcels has the advantage that real-time applications can be implemented and/or that a link between individual parcels and their respective digital twins is facilitated.

An advantageous further embodiment of the invention provides that information is assigned to the parcels as machine-readable data, in particular by using digital twins, the data comprising at least one identifier with which the respective parcel is identifiable, in particular uniquely identifiable, and preferably taking into account further information such as due date/time, penalties for late delivery, delivery costs, depositor—and recipient information, material, fragility and parameters of the required transport, e.g. a refrigerated truck for goods that need to be refrigerated.

Conveniently, at least one of the parcel identification characteristics shown in this application is used as an identifier for the respective parcel.

A preferred design of a handling of parcels according to the invention provides for a parcel identification code to be assigned and/or recorded and then stored as a primary parcel identification characteristic. It is expedient to use at least one further, more easily and/or more quickly identifiable characteristic of the parcel as a secondary parcel identification characteristic, in particular for checking the correctness of the primary parcel identification characteristic and/or for controlling a further processing operation, in as many processing operations of parcels as possible, including the processing operations illustrated in FIG. 45. Examples of parcel identification characteristics that can be determined more quickly and/or with less effort are the weight and/or dimensions of a parcel.

Both the primary parcel identification characteristic and the parcel identification characteristic designated as secondary parcel identification characteristic can be parcel identification characteristics within the meaning of the present invention, whereby it is particularly advantageous to carry out processing operations, in particular processing operations of parcels on the basis of one of these parcel identification characteristics.

The shipper explained with reference to FIG. 45 is one embodiment of a depositor according to the invention.

After the parcel identification code has been defined and/or determined, a transport route and/or sorting route of the parcel can be planned, controlled and/or tracked—for example with the inclusion of a digital twin for the parcel—so that a subsequent processing operation of the parcel, in particular a sorting of the parcel and/or a transport of the parcel, can be carried out as precisely on the basis of a combination of the previously determined parcel identification code with a determination of another, preferably more easily and/or more quickly measurable parcel identification characteristic as is the case with a determination of the parcel identification code itself. This means that the parcel is reliably identified even if a parcel identification characteristic is determined more quickly and/or with less effort.

According to the invention, this general principle can be implemented in various processing operations, for example within one of the distribution centres according to the invention, in particular a sorting centre and/or also for the storage of parcels in depot facilities according to the invention. For example, the parcel identification code of a parcel can first be determined, and then one or more processing operations take place. It is advantageous to take a parcel identification characteristic into account during individual, several or all processing operations.

For example, it is possible to first determine a parcel identification code of a parcel and thereby reliably identify the parcel. Preferably, the parcel identification code is linked as a parcel identification characteristic with at least one other parcel identification characteristic, for example a weight and/or a dimension of the parcel. An image of the parcel, for example the image of a parcel shown in FIG. 41, can also be used as a parcel identification characteristic. This is particularly advantageous when goods objects are processed as parcels.

By linking, in particular using a linking interface, preferably the linking interface 5015, it is possible to assign the parcel to a shipper and/or a recipient even if shipper identification features and/or recipient identification features are omitted.

In a preferred embodiment, a preferred implementation of the assignment of parcels to shippers and/or recipients is carried out by means of the links shown in this application and/or the equally shown provision of process protocols, advantageously including individual process protocols for individual parcels, so that in particular a link between individual parcels and their respective digital twins is facilitated.

FIG. 45 also includes an illustration of preferred requirements of a desired or required recipient address depth 4530 of a parcel, preferably in the time sequence of the individual production stages of a logistics company from collection from the shipper to final handover to the recipient.

If the shipper 4510 initiates the dispatch of a parcel, he sends the logistics system 5020 an advice of the parcels to be collected in the course of a collection order. This advice contains, for example, the number of parcels to be collected, weight per parcel, parcel identification characteristics, etc.

The specification of a destination address for the parcel is not yet necessary, especially at this point.

After collection—processing operation—from the shipper 4511 by a component of the logistics system 5020, the parcel is transported further—processing operation—to a delivery depot 5302, in particular to the dispatch depot 4512 of the logistics system 5020. From here, the parcel is transported further—processing operation—to a distribution centre 5301, in particular to a dispatch distribution centre 4513 of the logistics system 5020. In the case of large shippers, it is also possible that parcels are transported directly to a dispatch distribution centre 4513 after collection, bypassing the dispatch depot 4512. Before the parcel arrives at the dispatch distribution centre of the logistics system 5020, it is appropriate for the shipper 4510 to inform the logistics system 5020 of the first three digits of the postal code 999. This is preferably done digitally in conjunction with suitable parcel identification characteristics. The logistics system 5020 links the first three digits of the postal code 999 with a parcel identification characteristic of the parcel stored in a control component of the logistics system, for example the parcel identification code of the parcel.

The first three digits of the postcode 999 can serve as a control code so that the parcel can be sorted to a correct linehaul 4514—to a further distribution centre 5301, in particular the planned—correct—inbound distribution centre 4515 for further processing operations of the parcel (requirement 4530).

The parcel then leaves the outbound distribution centre 4513 and is transported via linehaul 4514 to the inbound distribution centre of the logistics system 5020, 4515. At the latest until the parcel arrives at the inbound distribution centre of the logistics system 5020, 4515, a transmission of the shipper 4510 via the complete postcode, for example 99999, to the logistics system 5020 is necessary.

This is preferably done digitally. The logistics system 5020 links the complete postcode, for example 99999, with the already existing product identification feature of the parcel.

The complete postcode, for example 99999 is appropriate so that the parcel can be sorted to the correct incoming depot 4516 (requirement 4540).

After leaving the incoming distribution centre of the logistics system 5020, 4515 until the arrival of the parcel at the incoming depot of the logistics system 5020, 4516 at the latest, the shipper 4510 must now also inform the logistics system 5020 of a specific street, for example 99999a, in addition to the already existing complete postcode, for example 99999.

The complete postcode, for example 99999 and the specific street, for example 99999a are appropriate so that the parcel can be sorted to the correct depot facility, particularly due to a 4550 requirement.

In the incoming depot of the logistics system 5020, 4516 the parcel is now stored in the corresponding mobile depot facility 4517 and moved to the joint optimized handover point.

The shipper 4510 now has the option of assigning the parcel to a final recipient 4520 for handover of the parcel, in particular at a joint optimized handover point, in particular up to a point immediately before the depot facility leaves the distribution centre in which the depot facility has been loaded. If the data connection between the logistics system and/or user app on the one hand and the control component of the depot facility on the other hand is functioning, this assignment can also be carried out if the final recipient 4520 acquires the parcel immediately before the depot facility and the shipper 4510 then assigns the parcel to him.

The complete postcode, for example 99999, the specific street, for example 99999a and a recipient identifier, for example 99999b are advantageous so that the parcel can be transferred to the correct final recipient (requirement 4560).

It is also advantageous in the processing operations illustrated by way of example in FIG. 45 to keep the number of parcels not transferred to the recipient as low as possible and instead to carry out processing operations, in particular processing operations at the depot facility 140, 240, 250, 340, 350, 740, 830, 1711, 1721, 1731, 1811, 1821, 1831, 1911, 1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321, 3331, 3511, 3521, 3531, 3711, 3721, 3731, 5242, 5243, 5321, 5322 in such a way that as many as possible of the parcels in the depot facility are delivered to recipients including alternative recipients for the parcels not otherwise delivered.

The inclusion of recipients to whom respective parcels are assigned only after one or more processing operations is particularly advantageous in the implementation according to FIG. 45 as well as in the further embodiments of this application text. In particular, it is advantageous to assign at least some of the parcels, in particular parcels to which no recipient is assigned or for which it is determined that handover to a previously assigned recipient is not possible, to another recipient, in particular a final recipient, in particular as a commodity object.

FIG. 46

Figure 46:
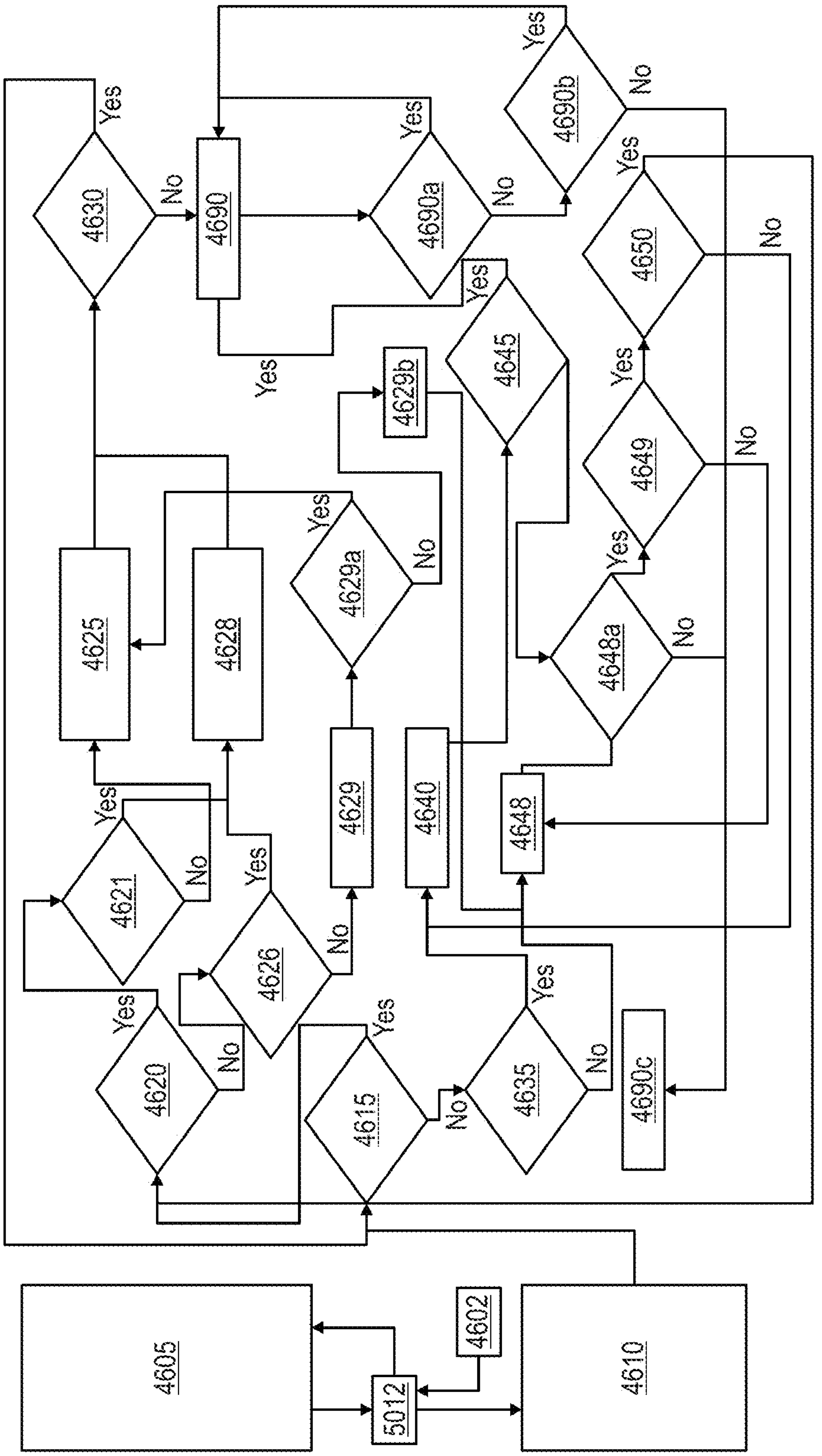
FIG. 46 a schematic diagram of a particularly preferred use of parcel identification characteristics and recipient attributes.

FIG. 46 shows a schematic diagram of a particularly preferred use of parcel identification characteristics and recipient attributes in a method for handover of a plurality of parcels from several shippers to several recipients by a logistics system, in particular wherein the logistics system carries out at least one processing operation of the parcels on the basis of a parcel identification code assigned to each of the parcels.

Preferably, the recipient attributes disclosed in this application serve to identify a respective planned recipient of a parcel, whereby it is also advantageous in this embodiment of the invention to assign to the respective parcels varying proportions of fixed recipient attributes and variable recipient attributes assigned to them in each case, whereby individual, several or all of the information which can identify the recipient can be used as recipient attributes, so that, as shown below by way of example with reference to FIG. 46, various assignments of a parcel to a recipient are possible, in particular:

- a recipient designated when the parcel is posted;
- a recipient selected after a posting of the parcel;
- a final recipient definable during a stay of the parcel in a depot facility, in particular
  - a member of a specific user group, in particular a prioritised user group;
  - a recipient who is willing to pay a designated fee for the parcel;
- a definable buyer and
- any buyer, especially in the case of a direct sale.

In the state of the art, shippers have to select a parcel identification code for each parcel from a closed number range specified by a logistics service provider, additionally specify the destination address of the parcel in full and apply both the parcel identification code and the information on the destination address to the parcel in one or more codes specified by the logistics service provider (e.g. barcodes, data matrix codes or 2D codes) on a label designed according to the specifications of the logistics service provider. Further information, e.g. about special services such as priority processing or collection of money during handover or delivery, must also be applied to the label according to fixed rules. The system according to the invention can be designed more flexibly:

- Original parcel identification characteristics freely chosen by the shipper, such as customer number, order number or invoice number, can be used as individual characteristics or in a combination of at least two characteristics as a parcel identification code or as components of the parcel identification code, and do not have to be applied to a label in the form of special codes, for example—after transmitting a control instruction for a plurality of parcels to the logistics system, it is sufficient for the individual parcels to have any characteristics, in particular alphanumeric characteristics, which are permanently linked to the parcel and are communicated in data ahead of the shipment.
- Neither in the data leading up to the shipment nor on the parcel does a destination address (in particular the address of a recipient, a logistical node, a joint optimized handover point or an individual handover point) have to be specified in full with information on the postcode, town, street and house number. Preferably, the shipper either specifies a final recipient in the data set and/or on the parcel by means of suitable information (e.g. e-mail address or mobile phone number), or the shipper initially only specifies individual recipient address attributes that enable the parcel to be transported to a specific processing unit and specifies the final recipient later.
- Other information, e.g. about special services such as priority processing or collection of funds during handover or delivery, can be specified on the parcel in the data leading up to the shipment and/or in any form that can be processed by the logistics system.

Preferably, the pre-transmission data for a parcel is part of a digital twin of the parcel and allows the creation of a digital twin of the parcel.

It is advantageous for shippers of the parcels to define rule instructions for a plurality of parcels, in particular for all of the shipper's parcels or for all of the shipper's parcels that are delivered to the logistics system within a processing period, in a method step 4602 and to transmit these rule instructions to the logistics system. In doing so, the control instructions determine which original parcel identification characteristic or characteristics physically connected to the parcel and which can be read out from the individual parcels delivered by the shipper are to be taken into account in order to form the parcel identification code assigned to the individual parcels, The original parcel identification characteristics of the individual parcels to be delivered by the shipper, which are associated with the individual parcels and can be read out, are preferably transmitted by the shipper to the logistics system as pre-shipment data in a process step 4605. The data to be transmitted in process step 4605 preferably also includes information from the shipper as to whether and, if so, up to what period of time the shipper will release the parcel for payment of any charge for temporary storage during the transport route.

In method step 4610, the parcel identification code of an individual parcel is generated. The parcel identification code of the parcel is generated taking into account at least one original parcel identification characteristic of the parcel, in particular at least two original parcel identification characteristics of the parcel.

It is advantageous to carry out process step 4610 after process steps 4602 and 4605: In method step 4602, a control component of the logistics system, in particular the control component 5012 explained with reference to FIG. 5, receives the control instructions of the shippers via an interface for receiving control instructions of the shippers, wherein the control instructions of the respective shippers determine which original parcel identification characteristic or characteristics physically connected to the parcel and capable of being read out is or are taken into account for forming the parcel identification code respectively assigned to the individual parcels. In a later method step 4605, the control component of the logistics system further receives information from the shippers about parcels to be delivered, the information for an individual one of the parcels containing at least one original parcel identification characteristic of the parcel corresponding to the control instruction, so that in method step 4610 the parcel identification code is formed taking into account the original parcel identification characteristic or the original parcel identification characteristics. In at least one processing operation of the parcel, the presence of the original parcel identification characteristic or characteristics is determined so that an identification of the parcel is performed, so that at least one subsequent processing operation of the parcel is performed taking into account the parcel identification code.

Prior art parcels and prior art commodity objects—such as the exemplary parcel shown in FIG. 40 and the commodity object shown in FIG. 41—can likewise be handled as parcels according to the invention, incorporating the processing operations shown.

It is appropriate that the parcel identification code of a parcel is stored as a primary parcel identification characteristic, that at least one secondary parcel identification characteristic different from the primary parcel identification characteristic is assigned to the parcel and that at least one processing operation of the parcel is carried out on the basis of the secondary parcel identification characteristic. This includes individual, several or all of the process steps 4615 ff as particularly preferred embodiments.

An advantageous further embodiment of the invention provides that further information is assigned to the parcels as machine-readable data, in particular by using digital twins. The assignment of machine-readable data, in particular the digital twins, is carried out in particular in process step 4610. An example of the further information is dimensions, in particular the spatial dimension of the parcel and/or the weight of the parcel, due date/time, penalties for late delivery, delivery costs, depositor and recipient information, material, fragility and parameters of the required transport of the parcel, e.g. a refrigerated lorry for goods that need to be refrigerated.

The invention includes both embodiments in which parcels are handed over to recipients, in particular by means of local logistics at theft delivery location or in the vicinity of their delivery location, and embodiments in which at least some of the parcels are transported and/or processed within the logistics system by means of a controlled transport route and/or sorting route after the parcel identification code has been defined and/or determined.

The control of the processing of the parcels in the process steps 4620 ff. is carried out taking into account the verification step 4615.

In verification step 4615, it is determined whether the shipper of the parcel has determined a final recipient of the parcel. The transmission of a potential final recipient of the parcel takes place, for example, in method step 4605 as part of the pre-shipment data. It is appropriate to specify the final recipient by at least one of the following pieces of information:

- E-mail address;
- Mobile phone number,
- Full postal address;
- Tax identification number;
- Pension insurance number;
- Identity card number;
- Credit card number;
- IBAN.

It is particularly advantageous to determine the final recipient of the parcel at a later stage, so that the verification step 4615 can be repeated if necessary, By using the processing steps shown in this application, in particular the processing steps shown on the basis of FIG. 46, it is possible to select and, if necessary, change the final recipient of the parcel until immediately before the handover of the parcel to the final recipient.

The process steps presented in this application can be, in particular, processing steps or verification steps.

If it is determined in the verification step 4615 that a final recipient of the parcel has been determined by the shipper, a verification step 4620 checks whether the final recipient is stored in a recipient database 5032 of the logistics system in order to take their delivery preferences and/or locations into account accordingly.

In an advantageous embodiment, the consideration of recipients as final recipients for the final handover of the parcel is achieved by using at least one depot facility 140, 240, 250, 340, 350, 740, 830, 1711, 1721, 1731, 1811,1821, 1831, 1911.1921, 1931, 2111, 2121, 2131, 2141, 2303, 2321, 2611, 2621, 2631, 2641, 2651, 2661, 2711, 2721, 2731, 2811, 2821, 2831, 2911, 2921, 2931, 3111, 3121, 3131, 3141, 3311, 3321 3331, 3511, 3521, 3531, 3711, 3721, 3731, 5242, 5243, 5321, 5322. In particular, the depot facility, if it has sufficient information to authorise the final recipient, can effect the final handover to the final recipient in a process step 4690.

If it is determined in the checking step 4620 that the recipient of the parcel is stored in the logistics system and/or a processing unit of the logistics system, in particular in a recipient database 5032 with at least one delivery preference, it is first checked in a checking step 4621, if applicable, whether there is an instruction from the shipper of the parcel regarding a restriction of delivery preferences of the recipient of the parcel. If there is no instruction from the shipper to restrict the selection of delivery preferences of the recipient, the parcel is processed in accordance with the transmitted and/or stored delivery preferences of the recipient in process step 4625, which may consist of several individual processing steps.

In step 4630, a check is made to see whether there is an instruction from the shipper to change the final recipient. If there is an instruction from the shipper to change the final recipient, further control of the processing of the parcels is carried out taking into account the verification operations and/or processing operations presented from verification step 4615. If no instruction is present, the parcel is made available for handover to the recipient by a final processing unit, for example a depot facility or a handover unit, in method step 4690. In particular, after successfully completing authentication, for example by means of a user app 5021, 5022 or a user component 5351, a user is authorised as a final recipient, in particular to remove a parcel from the depot facility.

At periodic intervals, e.g. at the end of each day, a check step 4690*a* follows in which it is checked whether the parcel is still in the depot facility because it has not been handover to the final recipient. If this is the case, verification step 4690*b* follows: the shipper or the recipient is asked whether he gives a release for payment of any fee for further storage in the depot facility If this is the case, the parcel remains in the depot facility until it is handover in accordance with procedure step 4690. If there is no such release, the parcel is returned to the shipper in accordance with process step 4690*c*.

If it is determined in the verification step 4620 that the final recipient previously communicated in the method step 4615 is not stored in the recipient database 5032 of the logistics system, it is verified in a further verification step 4626 whether the parcel itself, in particular in the form of information physically connected to the parcel (in particular "imprinted"; RFID transponder) or in the form of supplementary information to the parcel, for example as part of a digital twin of the parcel, has a complete address or a complete address can be determined on the basis of the supplementary information.

If it is determined in the verification step 4626 that the complete recipient address can be determined, the parcel is processed in the process step 4628 according to the address information of the shipper.

If a complete recipient address cannot be determined in the verification step 4626, a temporary storage of the parcel is carried out in the process step 4629. A query is then made to the recipient regarding their delivery preferences using recipient attributes that allow the recipient to be contacted. Recipient attributes that enable the recipient to be contacted are, for example, e-mail address or mobile phone number.

In verification step 4629*a*, the logistics system checks whether the recipient has transmitted corresponding delivery preferences. If this is the case, the parcel is processed in processing step 4625 according to the recipient's delivery preferences. If the recipient has not transmitted delivery preferences, the shipper is contacted in step 4629*b* and the shipment is temporarily stored in a processing unit in accordance with step 4648.

It is appropriate to check in a checking step 4648*a* whether the shipper has given a release for payment of any fee to be paid for the temporary storage of the parcel in the processing unit.

If the shipper does not give this release, or if a period released by the shipper for interim storage of the parcel has expired, the parcel is returned to the shipper in a process step 4690*c*.

If the shipper has given this release and the released period for the intermediate storage of the parcel has not been exceeded, a verification step 4649 checks whether the shipper has transmitted additional and/or new recipient address attributes.

If the shipper has not previously transmitted additional recipient address attributes when carrying out the verification step 4649, the parcel continues to be temporarily stored in the processing unit in the processing operation 4648 until the shipper transmits additional recipient address attributes or the time period released by the shipper for temporary storage of the parcel has expired.

It is appropriate to check in a checking step 4648*a* whether the shipper has given a release for payment of any fee to be paid for the temporary storage of the parcel in the processing unit.

If the shipper has transmitted the further recipient address attributes, a verification step 4650 checks whether the transmitted further recipient address attributes allow identification of the final recipient.

If the transmitted further recipient address attributes allow an identification of the final recipient, a branching to the verification step 4620 takes place.

If the transmitted further recipient address attributes do not allow sufficient identification of the final recipient, a branch to process step 4640 with a transport up to the processing unit determined by the supplemented recipient address attributes takes place.

Following the processing step 4640, a verification step 4645 is performed. In the verification step 4645, it is verified whether the shipper has authorised a direct sale of the parcel. If the shipper has authorised a direct sale of the parcel, a handover of the parcel to a buyer of the parcel as the final recipient takes place in processing step 4690.

The identification of the final recipient preferably includes not only the identification of uniquely identifiable authorised final recipients as in verification step 4620, but also final recipients who fulfil at least one requirement for the handover of the parcel to them. For example, a prerequisite or further condition for the handover of the parcel is the payment of a sum of money. Thus, in process step 4690, it is possible to also consider as final recipients for the final handover of the parcel recipients who, if applicable, pay a sum of money immediately before the final handover of the parcel or have proven membership of a user group and are otherwise not identifiable.

At periodic intervals, e.g. at the end of each day, the checking steps 4690*a* and 4690*b* follow, in which it is checked whether the parcel is still in the depot facility because it has not been handed over to the final recipient and, in this case, whether the shipper or recipient has given a release for payment of any fee. If this is the case, the parcel remains in the depot facility until it is handed over in accordance with step 4690. If no such release has been given, the parcel is returned to the shipper in accordance with step 4690*c*.

If it is determined in verification step 4645 that the shipper has not authorised a direct sale of the parcel, a further verification step 4648*a* takes place in which it is verified whether the shipper has given a release for payment of any fee payable for the temporary storage of the parcel in the processing unit.

If the shipper does not give this release, the parcel is returned to the shipper in a process step 4690*c*.

If the shipper gives this release, verification step 4649 follows, in which it is checked whether the shipper has in the meantime transmitted further recipient address attributes that were not previously available.

If the shipper has not yet transmitted any additional recipient address attributes when carrying out verification step 4649, the parcel is temporarily stored in the processing unit in a processing operation 4648 until the shipper transmits additional recipient address attributes or a period released by the shipper for temporary storage of the parcel has expired. Again, in verification step 4648*a*, it is checked whether the shipper has given a release for any charge for further intermediate storage. If this is not the case, the parcel is returned in accordance with process step 4690*c*.

If the shipper has transmitted the further recipient address attributes, a verification step 4650 checks whether the transmitted further recipient address attributes allow identification of the final recipient.

If the transmitted further recipient address attributes allow an identification of the final recipient, a branching to the verification step 4620 takes place.

If the transmitted further recipient address attributes do not allow identification of the final recipient, processing step 4640 is carried out again, which may consist of several individual processing steps, i.e. further transport and/or other processing of the parcel until the parcel has reached a node of the logistics system, in particular a processing unit, which is determined by the further recipient address attributes. Thereafter, the parcel is processed in accordance with the process steps 4645 to 4690 already described.

The verification step 4615 branches—in particular if it takes place following the processing operation 4610—to a further verification step 4635 as an alternative to the processing step 4620 in the event that the shipper has not specified a final recipient.

In verification step 4635, it is verified that the shipper has not assigned a final recipient to the parcel, but has assigned recipient address attributes.

If the shipper has assigned recipient address attributes to the parcel, further transport and/or other processing of the parcel takes place in a processing step 4640, which may consist of several individual processing steps, until the parcel has reached a node of the logistics system, in particular a processing unit, which is determined by the recipient address attributes. Following the processing step 4640, the further process steps already described above are carried out.

If it is determined in the verification step 4635 that the shipper has not assigned recipient address attributes to the parcel, a processing operation 4648 continues to temporarily store the parcel in the processing unit until the shipper transmits additional recipient address attributes or the time period released by the shipper for temporarily storing the parcel has expired.

Following the processing step 4648, the further process steps already described above take place.

FIG. 47

Figure 47:
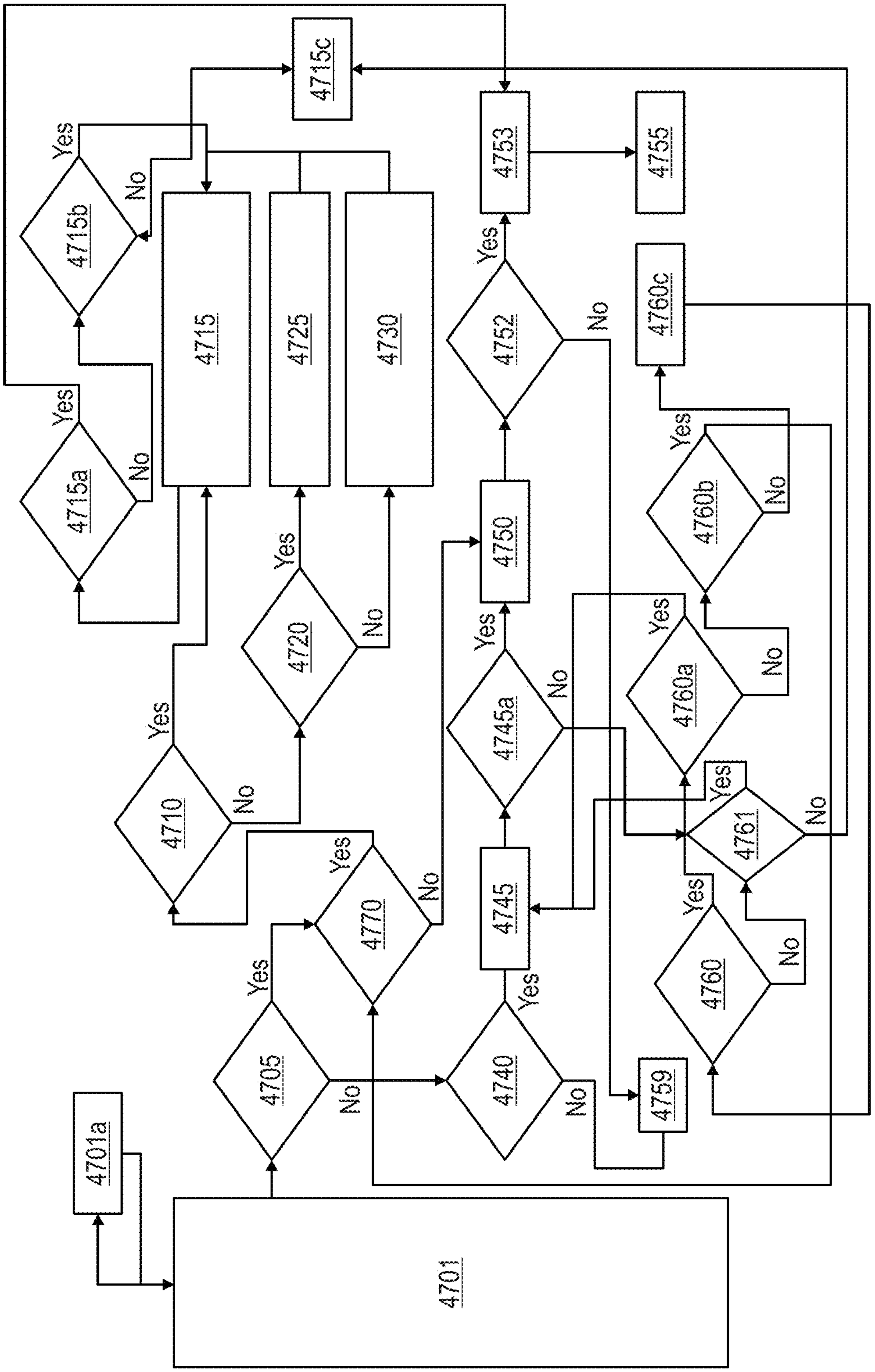
FIG. 47 procedural steps for the handover of a parcel to a customer as the final recipient.

FIG. 47 shows procedural steps for the handover of a parcel to a customer as the final recipient. In particular, FIG. 47 shows procedural steps for the local delivery and handover of a parcel at a location of a depot facility or in the area of influence of the depot facility. In particular, this is an implementation of local logistics in which at least some of the parcels are handed over to recipients at their point of delivery or in the vicinity of the point of delivery. The recipients are in particular purchasers of goods and/or services. The services include, in particular, processing the parcels or the contents of the parcels, for example by cleaning or repairing items.

Just as in the other embodiments, the parcels are unpackaged objects, packaged objects and repackaged objects, whereby in the case of packaged and repackaged objects, the parcel comprises the packaging or repackaging and the object packaged therein. Likewise, it is appropriate to process unpackaged objects, in particular commodity objects, according to the invention. In particular, the parcels can be handed over to recipients, for example sold as goods objects.

It is possible for the depositor to deliver at a handover unit instead of the depot facility, or for the handover to the recipient to be carried out by a handover unit.

The various assignments of a parcel to a recipient shown by way of example in FIG. 47 also show, in particular, an advantageous use of the recipient attributes disclosed in this application for identifying a respectively planned recipient of a parcel, it also being advantageous in this embodiment of the invention to assign to the respective parcels varying proportions of fixed recipient attributes and variable recipient attributes assigned to them in each case, it being possible to use individual, a plurality of or all of the information which identifies the recipient as recipient attributes, so that various assignments of a parcel to a recipient are possible, in particular:

- a recipient designated when the parcel is posted,
- a recipient selected after a posting of the parcel,
- a final recipient definable during a stay of the parcel in a depot facility, in particular
  - a member of a specific user group, in particular a prioritised user group;
  - a recipient who is willing to pay a designated fee for the parcel;
  - a definable buyer and
  - any buyer, especially in the case of a direct sale.

In a process step 4701, a delivery of one or more parcels is prepared and carried out. The delivery takes place in particular directly at the depot facility or, for example, via a handover unit in the area of influence of a depot facility.

In process step 4701, the delivery of the parcel to the logistics system, in particular to a depot facility of the logistics system, is prepared. The preparation of the delivery includes in particular the recording of the following information:

- Identification of the depositor,
- Recording of dimensions of the parcel and
- Indication of a maximum storage period, the maximum storage period being dependent in particular on a release for payment of any charge for storage of the parcel, in particular in a depot facility.

The storage period designates in particular a period of time for storage of the parcel, so that the storage period is also a period of time disclosed in this application, in particular a period of time according to the representation to FIG. 46.

A preferred preparation for depositing the parcel is characterised by the depositor, in particular the local depositor opening a user app 4701*a*, 5021, 5022 preferably with the characteristics described in paragraph 5021, 5022 and entering shipment data or capturing a code which may, for example, contain shipment data and/or information for payment of a fee for the deposit. For example, the depositor may enter:

- A) at least one parcel identification characteristic for identifying the parcel, in particular an originary parcel identification characteristic or
- B) at least two originary parcel identification characteristics to identify the parcel, or
- C) no specific data on the respective parcel.
- D) a recipient/collector of the parcel
- E) a fee to be paid.

It is particularly advantageous if the user app 4701*a*, 5021, 5022 supports a detection of dimensions of the parcel. In particular, if the user app 4701*a*, 5021, 5022 is installed on a mobile user unit, for example a smartphone, a smartwatch or a smartglass, it is advantageous that the mobile user unit detects at least one dimension of the parcel and transmits these detected dimensions to a processing unit of the logistics system, in particular the depot facility or a handover unit located within the sphere of influence of a depot facility.

The determination of parcel identification characteristics and/or the definition of a parcel identification code is possible, but not necessary, in particular in embodiments of local logistics in which the parcel is not transported between different processing units, but remains in particular in a depot facility.

If, however, a parcel identification code is to be captured and/or generated, in particular in order to implement options for transporting the parcel to further processing units, it is advantageous that the user app 4701*a*, 5021, 5022 of the depositor or a processing unit of the logistics system is set up in such a way that it can generate a parcel identification code identifying the parcel.

Particularly in the case of direct delivery of the parcel to a depot facility or within the sphere of influence of a depot facility, it is particularly advantageous if the depositor in variants A), B) and C) scans the respective parcel and records parcel identification characteristics, in particular the parcel identification code. Preferably, at least one parcel identification characteristic, in particular at least one dimension of the parcel, is detected by scanning the parcel.

The scanning of the parcels can be done, for example, using the depositor's user app 4701*a*, 5021, 5022 or via a scanning device of the depot facility.

Furthermore, it is possible to specify a purchase price for the parcel or to store a calculation rule for the purchase price.

An optionally feasible, but not necessary, further embodiment of the invention to prevent manipulation is carried out in that as soon as the parcel can no longer be physically removed from the depot facility (in particular by closing a flap of the handover gate), it is appropriate for the parcel to be photographed or scanned by one or more suitable devices of the depot facility in order to document the transfer of risk. Alternatively, after "contact" of the parcel with the transport unit or after storage in a storage position of the depot facility, the depositor receives a confirmation of the delivery and/or storage.

Following processing step 4701, a verification step 4705 determines whether the depositor has indicated a final recipient, in particular a final buyer. In the event that the depositor has indicated a final recipient of the parcel, it is checked in a verification step 4770 whether the final recipient, in particular the buyer, has already paid for the goods. If this is not the case, the parcel is processed in accordance with the procedure step 4750 described later and the subsequent further procedure steps. If the verification step 4770 shows that the final recipient, in particular the buyer, has paid for the goods, the control component 5012 of the logistics system checks in a subsequent verification step 4710 whether the specified final recipient, in particular the buyer of the goods, is in a recipient database.

If the specified final recipient, in particular the buyer of the goods, is in the recipient database, the parcel is temporarily stored in a process step 4715 and made available for handover to the specified final recipient, in particular the buyer of the goods.

The provision of the parcel in process step 4715 is carried out in particular by temporarily storing and providing the parcel in a depot facility, whereby the depot facility in an appropriate embodiment is the same depot facility in which the depositor previously deposited the parcel.

Alternatively, the deposited parcel can also be transported by the logistics service provider (manually or by a handover unit) from the depot facility at which the depositor has deposited the parcel to another depot facility and then handed over by this depot facility to the final recipient.

Following processing step 4715, a verification step **4715*a*** is carried out: This involves verifying whether the final recipient initiates a handover of the parcel during the maximum storage period of the parcel, in particular at a depot facility or within the sphere of influence of the depot facility.

If the final recipient initiates the handover of the parcel during the maximum storage period of the parcel, a processing step 4753 takes place: The handover to the final recipient is authorised and executed.

If it is determined in verification step **4715*a* that during the maximum storage period the final recipient of the parcel has not initiated a handover of the parcel, has not visited the depot facility, verification step 4715*b*** checks whether the depositor or the final recipient is willing to pay a fee for further storage or has paid a fee for further storage of the parcel in the meantime.

If it is determined in verification step **4715*b* that no one is willing, in particular neither the depositor of the parcel nor the final recipient of the parcel, to pay a fee for further storage or has paid a fee for further storage of the parcel in the meantime, the depositor of the parcel is requested to remove the parcel—in particular to remove it from the depot facility—in accordance with procedure step 4715*c***. Alternatively, the parcel is returned to the depositor, if necessary for an additional fee.

In the event that it is determined in verification step 4710 that no entry corresponding to the final recipient exists in a recipient database of the logistics system, a further verification step 4720 checks whether the depositor has provided contact details of the final recipient.

In the event that the depositor has provided contact details (e.g. mobile phone number, email address) of the final recipient, it is appropriate for the logistics system to send an authentication code and/or authorisation code directly to the final recipient in a processing step 4725.

Following processing step 4725, it is appropriate for the logistics system to temporarily store the parcel in a storage unit, in particular a depot facility, in process step 4715. Further processing of the parcel is then carried out according to the process steps **4715*a*, 4715*b*, 4715*c* and 4753** described above.

In the event that it is determined in verification step 4720 that the depositor has not provided any contact details of the final recipient or that it is not possible to transmit the authentication code and/or the authorisation code to the final recipient via the provided contact details of the final recipient, for example due to an incorrectness of the contact details of the final recipient, the authentication code and/or the authorisation code is transmitted to the depositor in a process step 4730, which the depositor can transmit, for example, to the final purchaser as final recipient or to another final recipient. With the authentication code and/or the authorisation code, the final recipient can effect a handover of the parcel at the depot facility in process step 4753.

If it is determined in verification step 4705 that the depositor has not specified a final recipient, a verification step 4740 determines whether a sale of the parcel at a price specified by the depositor to any buyer, if any, is possible as a direct sale.

Direct sale means in particular that a stored good or a stored parcel has not yet been assigned a final recipient and that anyone can purchase and remove the goods upon payment of a determinable sales price (remuneration).

If a direct sale of the parcel is possible, in a processing step 4745 the previously stored parcel is temporarily stored in a storage unit, in particular in the depot facility.

Subsequently, in a verification step **4745*a*, it is verified whether, during the maximum storage period, a potential purchaser arrives as a final recipient at a location of a depot facility or within the sphere of influence of the depot facility and intends to purchase the parcel In processing step 4750**, at least one payment option is made available to the potential buyer, for example by entering a code or monetary information, for example using PayPal, Apple Pay.

Monetary information is retrieved, for example, from a loading point, wherein, in a simple and equally appropriate embodiment, a random number and a payment identification number are formed in the loading point, wherein a seller receives the string as a monetary amount for a payment, and wherein the seller further submits the string to an e-commerce centre to verify its validity and to initiate a payment. For example, the payment transactions depicted in this application are made using Near Field Communication (NFC), in particular in combination with a wallet and/or to make payments in apps or browsers designed for this purpose. For example, a randomly generated pseudo-credit card number stored in a security module can be used for a payment transaction. It is appropriate that a device identification number of a device on which a user app 5021, 5022 is installed or of a user component 5351 of a user, in particular of the recipient of the parcel is transmitted to the vendor for payment transactions. In a catchment area of a depot facility, this is preferably done by means of near field communication. However, a transmission of the device identification number and/or the monetary information can also take place by means of an intranet or the Internet. The vendor transmits the monetary information, for example this number, to a payment service provider, who checks whether a payment release can be made using this information and then transmits the payment release to the vendor and/or to the logistics system. After receiving the payment release, a handover of the parcel for which the payment was to be made is released and authorised in the presence of the recipient.

Following processing step 4750, verification step 4752 checks whether payment has been made. If it is determined in verification step 4752 that payment has been made, in execution step 4753 a handover of the parcel to the buyer as the final recipient is authorised directly at the depot facility or, for example, via a handover unit within the depot facility's sphere of influence, in procedure step 4755 the depositor is informed and receives the payment (the sales price), for example by bank transfer or by a credit note in a credit note system.

If it is determined in verification step 4752 that no payment has been made, procedure step 4745 and the subsequent further procedure steps are run through again.

If it is determined in verification step 4745*a* that the maximum storage period has expired without a potential buyer/final recipient having purchased the parcel, verification step 4761 is carried out to check whether the shipper or depositor has given clearance to pay any fee for an extended storage period. Further processing of the parcel then follows the steps 4760, 4760*a*, 4760*b* and 4760*c* described below.

If it is determined in the verification step 4740 that no direct sale of the parcel is possible because the depositor has not entered an amount at which the parcel can be sold, the parcel is temporarily stored in a processing step 4759, in particular by storage in the depot facility.

In a verification step 4760, a check is made at time intervals during the maximum storage period to see whether the depositor has transmitted new information relevant to the further processing of the parcel:

If it is determined in verification step 4760 that the depositor has not transmitted any new information relevant for the further processing of the parcel to the logistics system and/or the depot facility during the maximum storage period, verification step 4761 takes place.

In verification step 4761, it is checked whether the depositor has given a release for payment of any fee for an extension of the storage period of the parcel.

If the depositor has given a release for payment of any fee for an extension of the storage period of the parcel, further storage of the parcel takes place in accordance with processing step 4759.

If the depositor is not prepared to pay a fee for further storage, the depositor is requested to collect the parcel in a processing step 4715*c* or, if necessary, it is returned to him. Preferably, an additional charge will be made for returning the parcel to the depositor.

If it is determined in verification step 4760 that the depositor has transmitted new information relevant to the further processing of the parcel to the logistics system and/or the depot facility during the maximum storage period, verification step 4760*a* is carried out immediately. This checks whether the new information from the depositor makes a direct sale possible. If this is the case, the further processing of the parcel is governed by process steps 4745, 4745*a*, 4750, 4752, 4753 and 4755 described above.

If it is determined in verification step 4760*a* that the new information from the depositor does not allow a direct sale, verification step 4760*b* is carried out immediately afterwards. This checks whether the depositor has indicated a final recipient. If this is the case, the further processing of the parcel takes place according to the above-described process step 4770 and the subsequent further process steps.

If it is determined in verification step 4760*b* that the depositor has not specified a final recipient, the new information relevant for the further processing of the parcel is preferably information about an extended storage period. After receiving this information in step 4760*c*, the further processing of the parcel takes place according to the already described step 4760 and the subsequent steps.

The embodiments shown here are only examples of the present invention and must therefore not be understood as limiting. Alternative embodiments contemplated by the skilled person are equally encompassed by the scope of protection of the present invention.

The invention claimed is:

1. A system for handling a plurality of parcels, the system comprising:

a mobile depot facility for storage and provision of the plurality of parcels within a planned handover period at one location as a joint optimized handover point for handover of the plurality of parcels to the respective recipients and/or by depositors of the plurality of parcels, the mobile depot facility having a center aisle and at least one transport path, the center aisle having shelves arranged on both sides thereof, and a plurality of storage positions;

an assignment system in communication with the mobile depot facility, the assignment system assigning parcel identification characteristics to the storage positions; and at least one transport unit being moveable along the at least one transport path, the transport unit having a height-adjustable transfer platform equipped with a conveyor belt, the conveyor belt transferring the plurality of parcels onto the transfer platform and/or from the transfer platform to the storage positions, the transport unit supporting the removal of parcels from a consignment stream to storage positions, in particular on the basis of parcel identification characteristics, the transport unit transporting the parcels from the consignment stream into storage positions of the mobile depot facility, wherein the transport of the parcels by the transport unit within the mobile depot facility can be controlled taking into account the storage positions assigned to the respective parcels on the basis of the parcel identification characteristics.

2. The depot facility of claim 1, wherein the transport of parcels from the assigned storage positions in the depot facility to a handover gate is done on the basis of parcel identification characteristics.

3. The depot facility of claim 1, wherein the depot facility has at least one handover gate for handovers of parcels at joint handover points and at least one handover unit for handovers at individual handover points different from the joint handover points.

4. The depot facility according to claim 1, wherein the at least one transport unit can be moved outside the depot facility.

5. The depot facility according to claim 3, wherein the handover gate is adapted to hand over parcels to recipients and/or to receive parcels from a depositor.

6. The depot facility according to claim 1, wherein the transport unit autono-mously carries out a transport as a handover unit from a location of the depot facility to the individual handover point for the individual recipient and/or for the individual depositor and carries out the delivery of the parcel to the recipient and/or the acceptance of the parcel from the depositor at the individual handover point.

7. The depot facility according to claim 1, wherein the depot facility stores and provisions a plurality of parcels and has at least two different loading modes and/or at least two different unloading modes.

8. The depot facility of claim 7, wherein, in a first loading mode, an uninterrupted path is formed between an environment of the depot facility and an interior of the depot facili-ty.

9. The depot facility of claim 7, wherein, in a second loading mode an individual storage of a parcel takes place using a handover gate.

10. The depot facility of claim 7, wherein, in a first unloading mode, an uninterrupted path is formed between an interior space of the depot facility and an environment of the depot facility.

11. The depot facility of claim 7, wherein, in a second unloading mode an individ-ual handover of a parcel to a recipient takes place using the handover gate.

12. A system for handover of a large number of parcels to a plurality of recipients and/or for receipt of a large number of parcels from a plurality of depositors, the system comprising:

a mobile depot facility for carrying out a procedure for handover of a plurality of parcels to a plurality of recipients and/or for acceptance of a plurality of parcels from a plurality of depositors, wherein a joint optimized handover point for handover to the respective recipients and/or for acceptance from the depositors within a specific handover period can be determined from a plurality of possible handover points spatially separated from one another, taking into account at least one parameter that includes additional distance or time required to reach the joint optimized handover point, and wherein the handover to the recipients and the acceptance from the depositors can take place at the joint optimized handover point within the handover period, the mobile depot facility storing and providing the plurality of parcels within the handover period at the joint optimized handover point;

a distribution center or delivery depot where storing and sorting operations take place:

a transfer unit that receives the parcels from the mobile depot facility, the transfer unit having a device for separating parcels; and a transport unit in communication with the mobile depot facility, the transport unit being used to enable parcels separated in the transfer unit to be transported as individual parcels to storage positions in the mobile depot facility, wherein the transport of the parcels by the transport unit can be controlled taking into account the storage positions assigned to the respective parcels on the basis of parcel identification characteristics.

13. The system according to claim 12, comprising a plurality of depot facilities, at least some of the depot facilities being designed as mobile depot facilities, and wherein a control component controls a transport of the mobile depot facilities from the transfer facility to installation locations as joint optimized handover points for the handover of the parcels.

14. A system according to claim 12, comprising:

a component that selects a joint optimized handover point from the plurality of possible handover points for handover to the respective recipients and/or for receipt from the respective depositors within the planned handover period, and wherein the depot facility performs handover to the recipient and/or receipt from the respective depositors at the joint optimized handover point within the planned handover period.

15. The system according to claim 12, wherein, in addition to the parcels planned for handover at the joint handover points, goods and/or objects can be deposited to, stored at and handed over as parcels at the depot facility.

16. The system according to claim 15, wherein at least a part of the goods and/or objects can be handed out at the depot facility where they were deposited as parcels.

17. The system according to claim 12, comprising:

a component that captures a plurality of potential locations for mobile depot facilities; and an assignment component that assigns the mobile depot facilities to the joint optimized handover points.

18. The system according to claim 17, comprising:

a component that controls the transfer facilities to operate the transfer units so the parcels planned for handover at a handover point are transported into the mobile depot facility assigned to the handover point.

19. The system according to claim 17, comprising:

a component that transmits geographical information on the joint optimized handover points to the depot facility; and/or a component that transports the depot facility, so that a transport of the depot facility to the joint optimized handover points can take place taking into account the geographical information.

20. The system according to claim 12, comprising:

a control component that forwards information on parcel identification characteristics to the transfer facility so that the parcels can be stored in the storage positions of the storage units of the depot facilities on the basis of the parcel identification characteristics.

21. The system according to claim 12, wherein the transport units of the transfer facility support storage of the parcels in storage positions of storage facilities of the depot facilities.

* * * * *